United States Patent
Marks et al.

(10) Patent No.: US 10,866,182 B2
(45) Date of Patent: Dec. 15, 2020

(54) METHOD AND OPTICAL SYSTEM FOR SATURATED ILLUMINATION OF ANALYTES BY A NUMBER OF BEAMS

(71) Applicant: MICROBIX BIOSYSTEMS INC., Mississauga (CA)

(72) Inventors: Randall Marks, San Jose, CA (US); Mark Luscher, Toronto (CA); Edward Lao, South San Francisco, CA (US); John Patrick Myers, Milpitas, CA (US)

(73) Assignee: MICROBIX BIOSYSTEMS INC., Mississauga (CA)

( * ) Notice: Subject to any disclaimer, the term of this patent is extended or adjusted under 35 U.S.C. 154(b) by 0 days.

(21) Appl. No.: 15/556,547

(22) PCT Filed: Mar. 10, 2016

(86) PCT No.: PCT/IB2016/000405
§ 371 (c)(1),
(2) Date: Sep. 7, 2017

(87) PCT Pub. No.: WO2016/142785
PCT Pub. Date: Sep. 15, 2016

(65) Prior Publication Data
US 2018/0038784 A1 Feb. 8, 2018

Related U.S. Application Data

(60) Provisional application No. 62/140,336, filed on Mar. 30, 2015, provisional application No. 62/140,199, (Continued)

(51) Int. Cl.
*G01N 15/14* (2006.01)
*G01N 15/10* (2006.01)
*G01N 15/00* (2006.01)

(52) U.S. Cl.
CPC ..... *G01N 15/1436* (2013.01); *G01N 15/1404* (2013.01); *G01N 15/1425* (2013.01);
(Continued)

(58) Field of Classification Search
CPC .......... G01N 15/1436; G01N 15/1434; G01N 15/1404; G01N 15/1425; G01N 15/1459;
(Continued)

(56) References Cited

U.S. PATENT DOCUMENTS 5,252,493 A 10/1993 Fujiwara et al.
2008/0215272 A1 9/2008 Fujita et al.
(Continued)

FOREIGN PATENT DOCUMENTS

CA 2 210 559 C 12/2001
JP 3011836 B2 2/2000
(Continued)

OTHER PUBLICATIONS

International Search Report and Written Opinion for Application No. PCT/IB2016/000405, dated Jul. 13, 2016.
(Continued)

*Primary Examiner* — Hwa Andrew Lee
(74) *Attorney, Agent, or Firm* — Marshall, Gerstein & Borun LLP

(57) ABSTRACT

A method of configuring an optical system to reduce variations in measured properties of an analyte includes selecting a number of beams into which radiation from a source of radiation is to be split, wherein, upon irradiating the analyte from a plurality of directions by the number of beams, a variation of a resulting measurement of the analyte is at or below a threshold. The method further includes aligning the source of radiation and a plurality of optical elements optically coupled to the source of radiation such that the
(Continued)

selected number of beams irradiate the analyte upon emission of radiation by the source of radiation.

17 Claims, 91 Drawing Sheets

Related U.S. Application Data filed on Mar. 30, 2015, provisional application No. 62/140,173, filed on Mar. 30, 2015, provisional application No. 62/130,821, filed on Mar. 10, 2015, provisional application No. 62/130,825, filed on Mar. 10, 2015, provisional application No. 62/131,043, filed on Mar. 10, 2015, provisional application No. 62/131,036, filed on Mar. 10, 2015, provisional application No. 62/130,957, filed on Mar. 10, 2015, provisional application No. 62/131,022, filed on Mar. 10, 2015.

(52) U.S. Cl.
CPC ..... *G01N 15/1434* (2013.01); *G01N 15/1459* (2013.01); *G01N 2015/0065* (2013.01); *G01N 2015/1006* (2013.01); *G01N 2015/149* (2013.01); *G01N 2015/1413* (2013.01); *G01N 2015/1452* (2013.01)

(58) Field of Classification Search
CPC ... G01N 2015/0065; G01N 2015/1452; G01N 2015/149; G01N 2015/1413; G01N 2015/1006
See application file for complete search history.

(56) References Cited

U.S. PATENT DOCUMENTS

| | | | |
|---|---|---|---|
| 2010/0245807 A1* | 9/2010 | Li | G01B 11/24 356/152.1 |
| 2013/0295682 A1 | 11/2013 | Vanoni et al. | |
| 2014/0030696 A1 | 1/2014 | Luscher et al. | |
| 2014/0220620 A1 | 8/2014 | Durack et al. | |

FOREIGN PATENT DOCUMENTS

| | | |
|---|---|---|
| JP | 2011149706 A | 8/2011 |
| WO | WO-92/04619 A1 | 3/1992 |
| WO | WO-94/02831 A1 | 2/1994 |

OTHER PUBLICATIONS

Supplementary European Search Report issued in European Patent Application No. EP16761156 dated Oct. 24, 2018.
International Preliminary Report on Patentability issued in PCT/IB2016/000405, dated Sep. 12, 2017.

\* cited by examiner

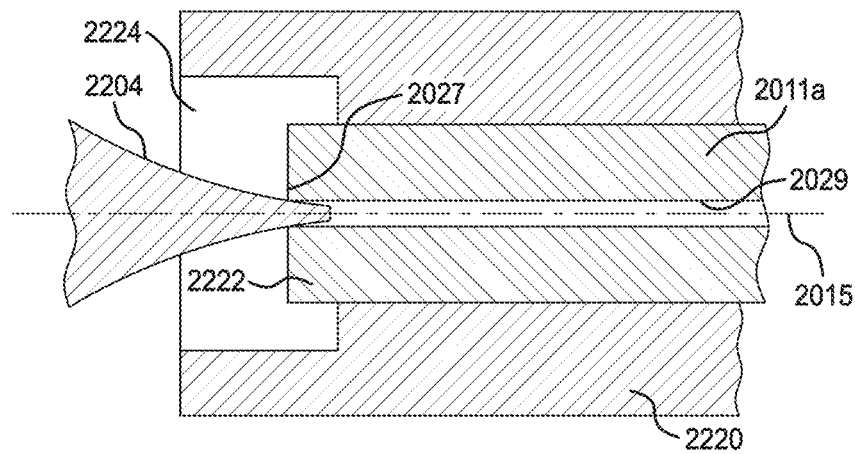
FIG. 2G
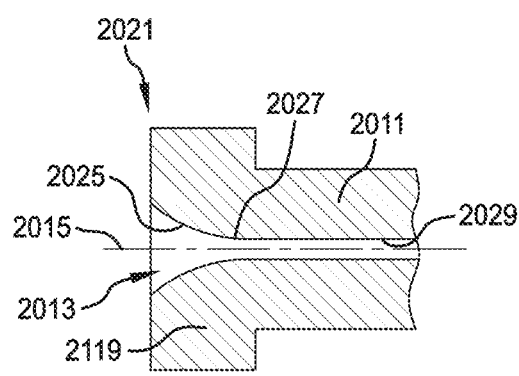
FIG. 2H
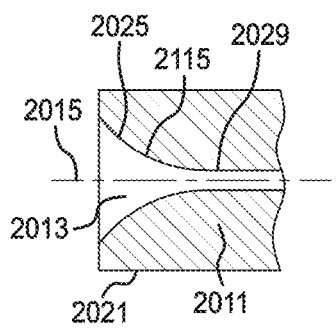     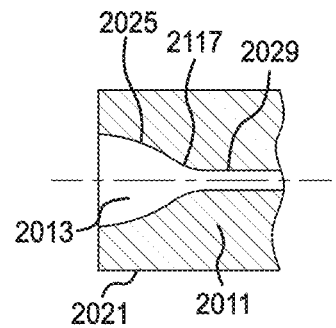     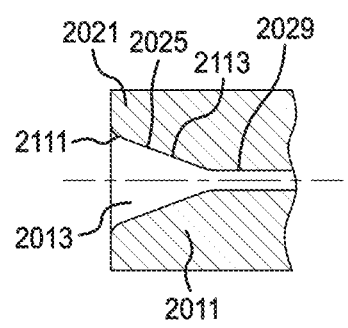
FIG. 2I                FIG. 2J                FIG. 2K

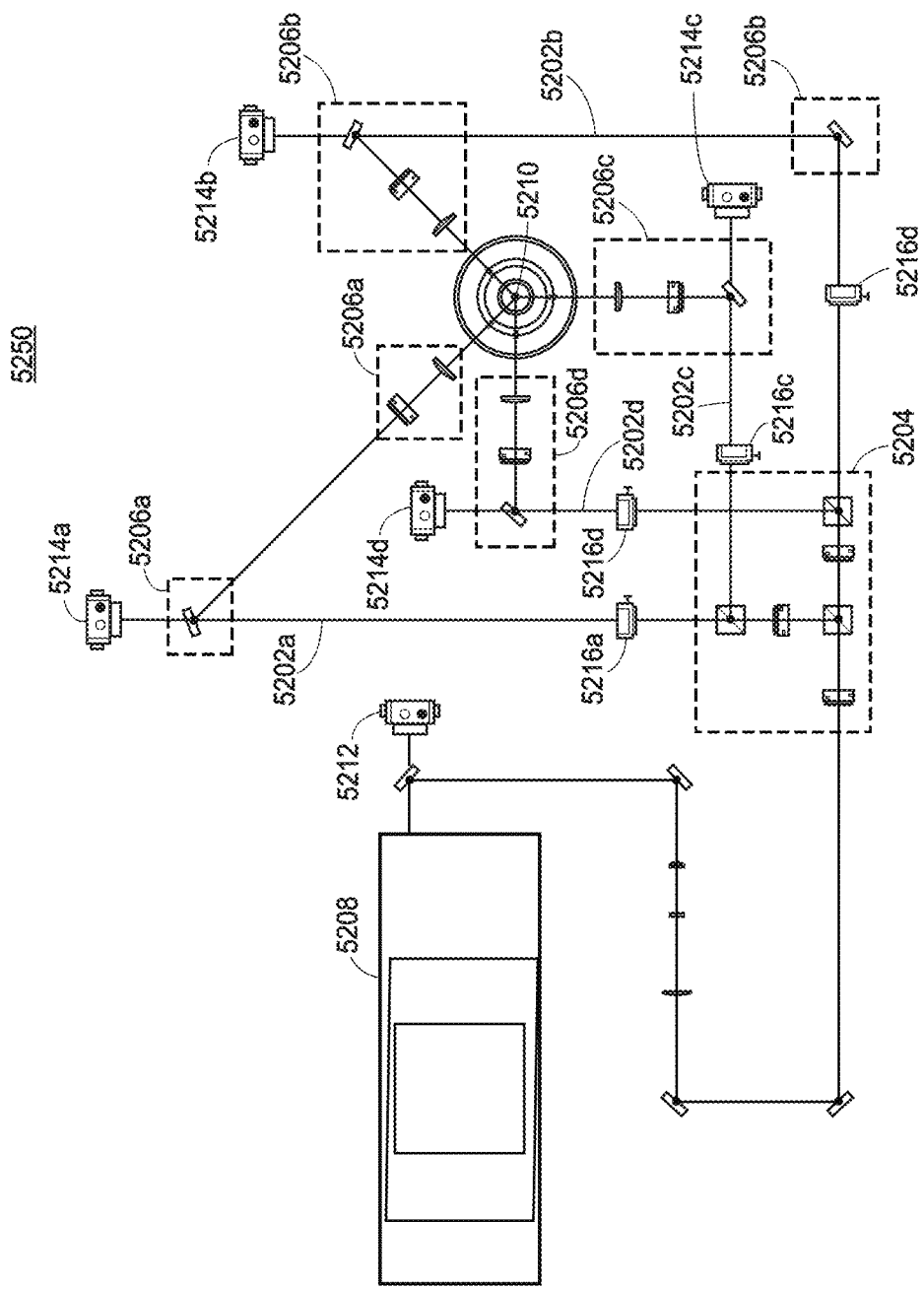

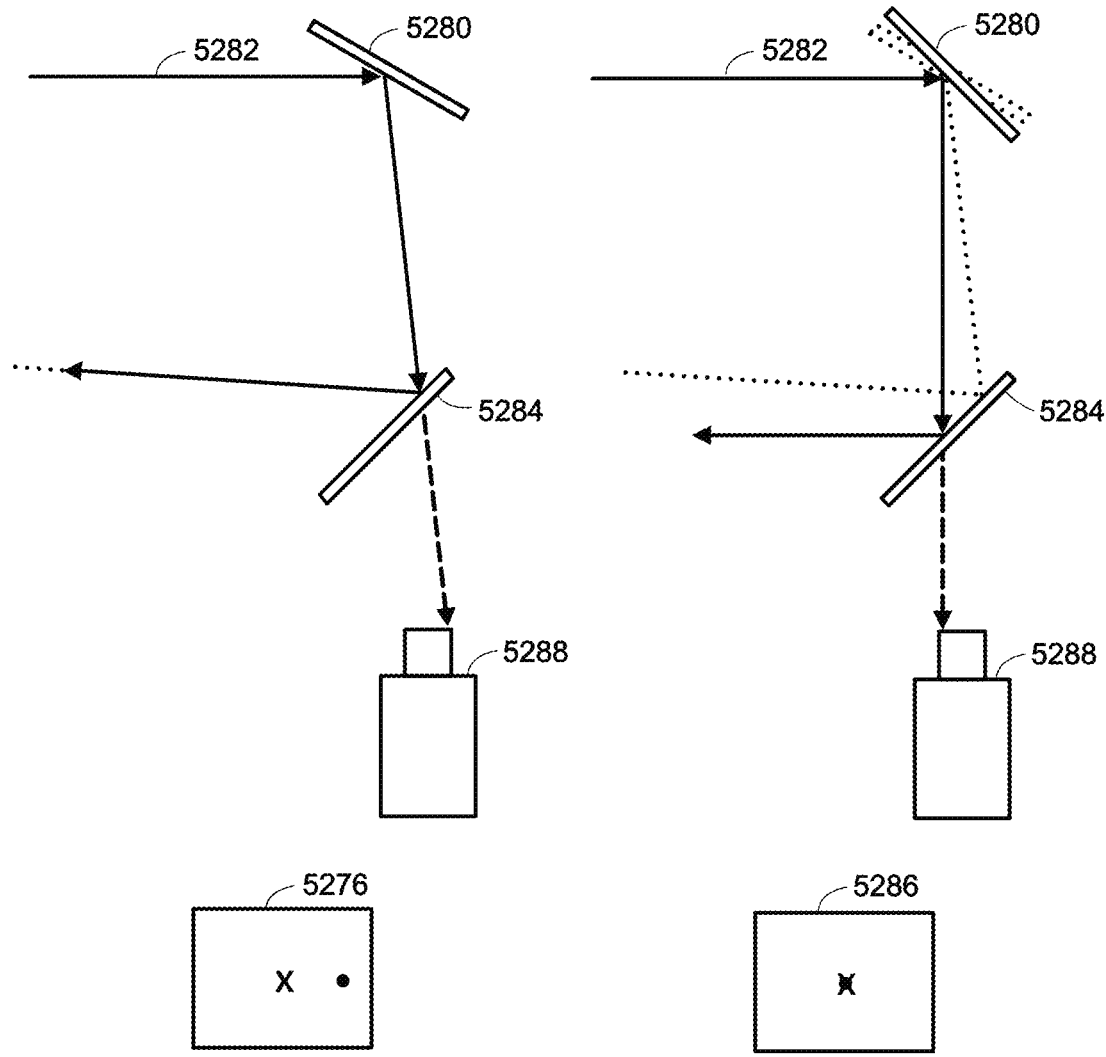

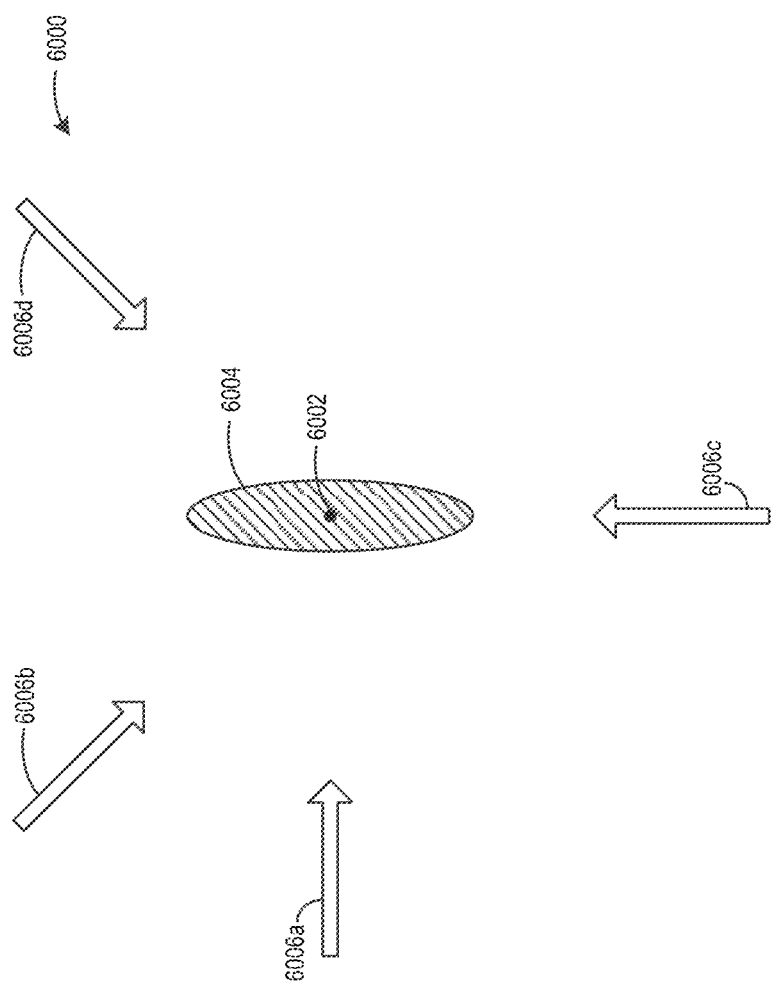

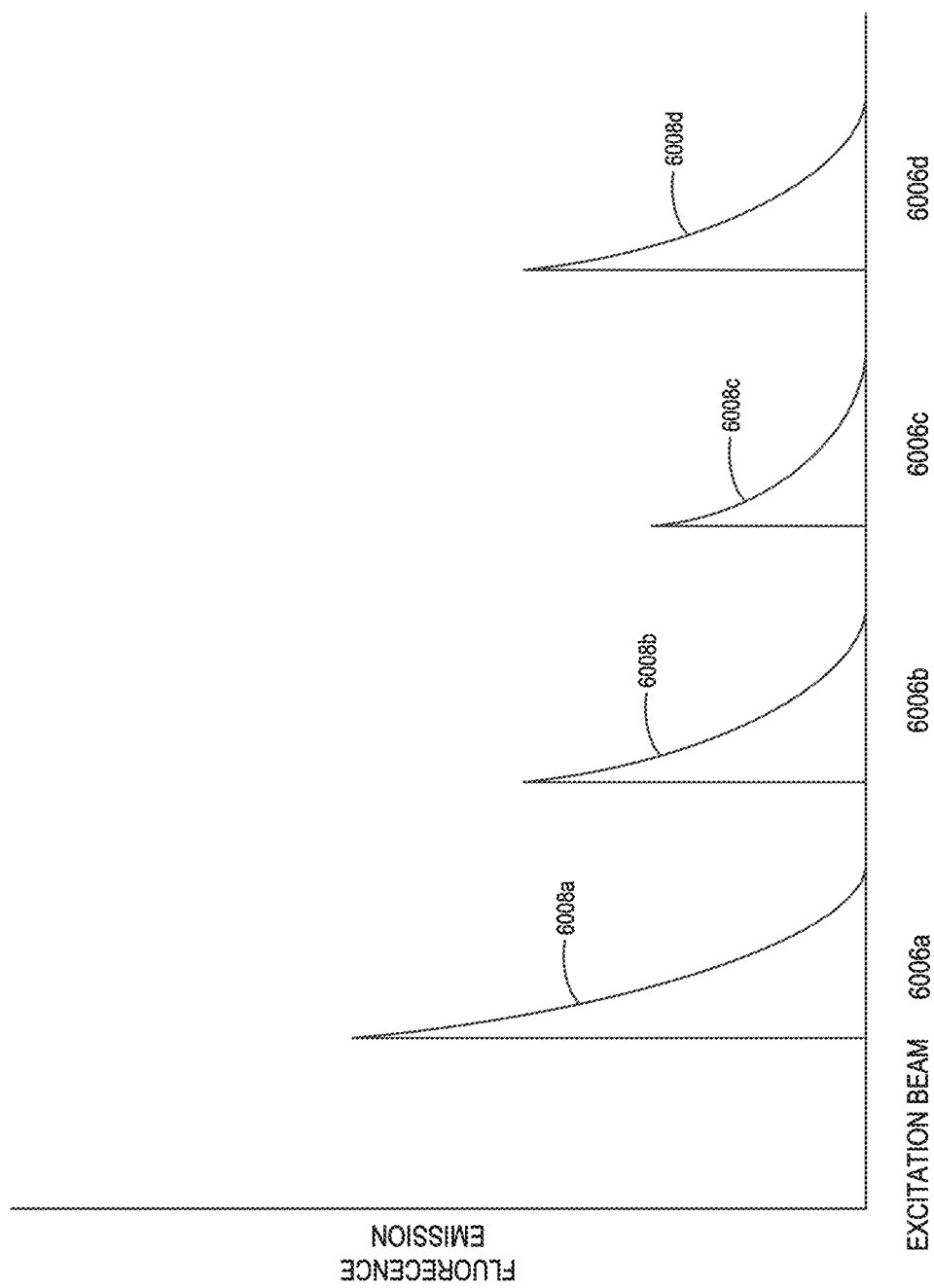

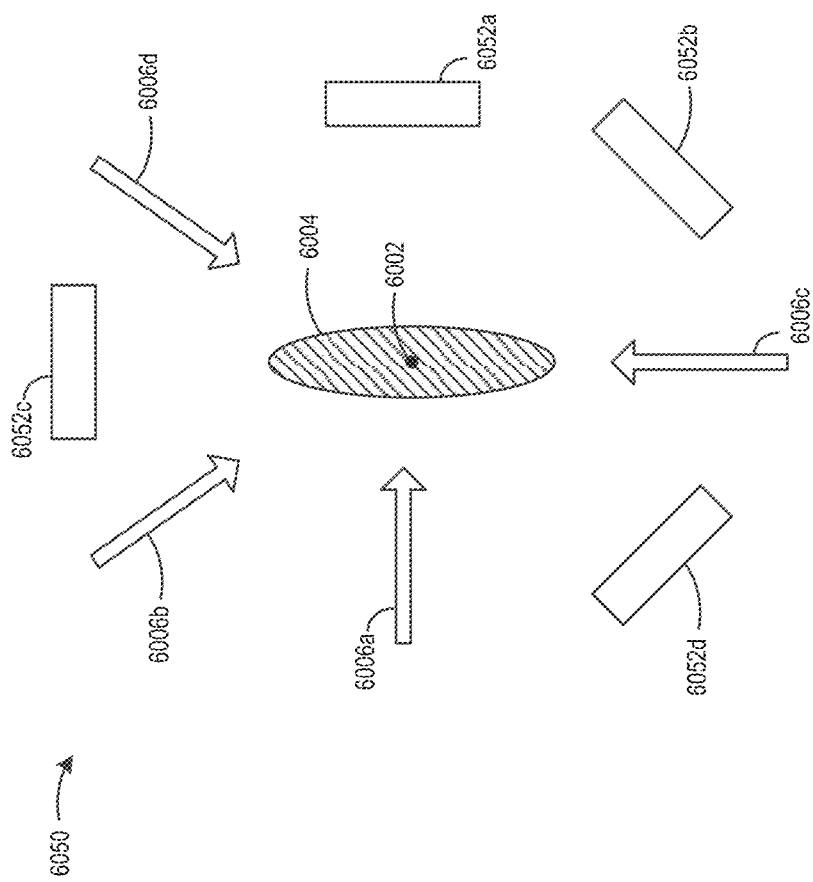

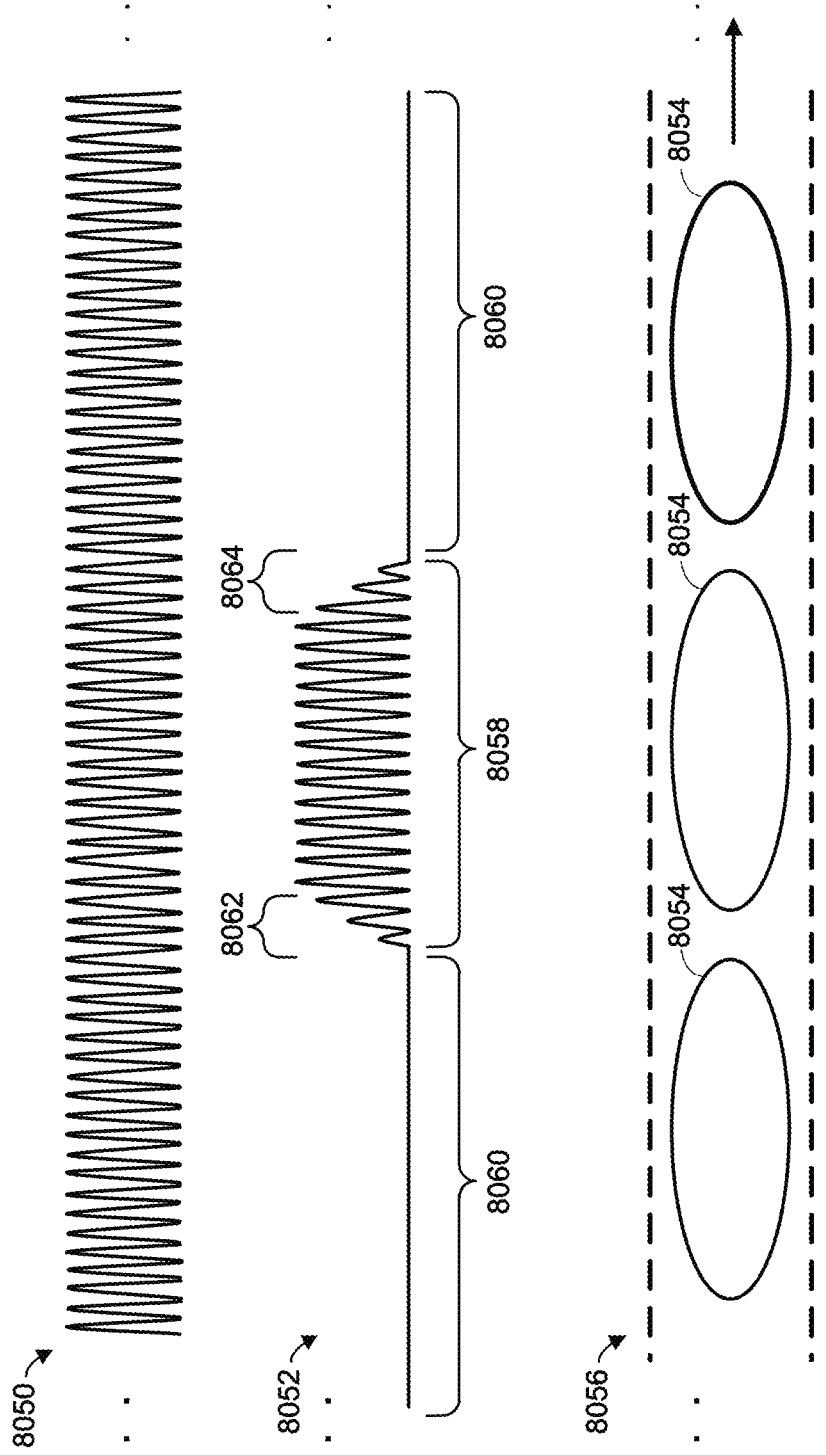

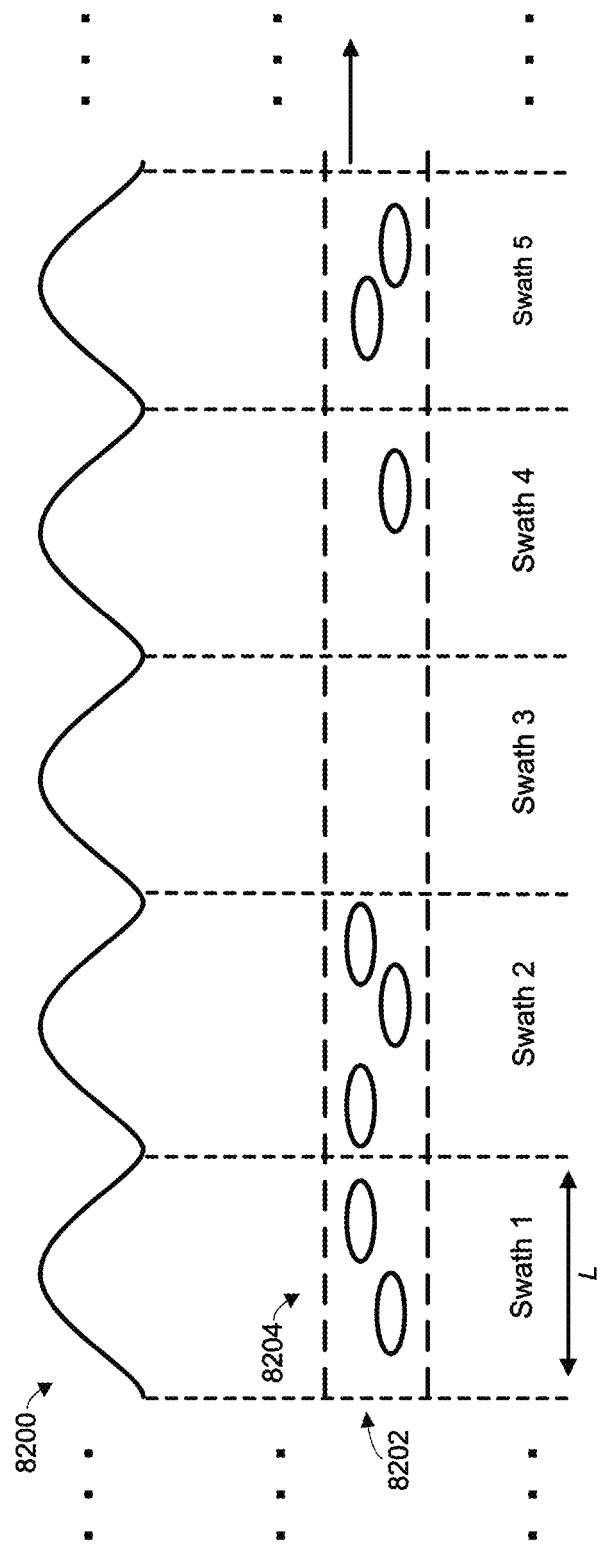

METHOD AND OPTICAL SYSTEM FOR SATURATED ILLUMINATION OF ANALYTES BY A NUMBER OF BEAMS

CROSS-REFERENCE TO RELATED APPLICATIONS

This application claims priority under 35 U.S.C. § 119 to: U.S. Provisional Patent Application No. 62/130,821, filed Mar. 10, 2015, and entitled "Optical Systems for Irradiating Analytes," U.S. Provisional Patent Application No. 62/130,825, filed Mar. 10, 2015, and entitled "Sorting of Analytes With Pulses of Radiation," U.S. Provisional Patent Application No. 62/131,036, filed Mar. 10, 2015, and entitled "Adjustable Flow Assembly for Positioning Core Stream for Use in Flow Cytometric Sorting," U.S. Provisional Patent Application No. 62/131,043, filed Mar. 10, 2015, and entitled "Method of Forming a Flow Cell Nozzle with Complex Curvature," U.S. Provisional Patent Application No. 62/130,957, filed Mar. 10, 2015, and entitled "Adjustable Mirror Assembly, System, and Method," U.S. Provisional Patent Application No. 62/131,022, filed Mar. 10, 2015, and entitled "Ball Lens and Capillary Tube Assembly," U.S. Provisional Patent Application No. 62/140,173, filed Mar. 30, 2015, and entitled "System and Method for Multi-Beam Morphology Analysis Using a QCW Laser," U.S. Provisional Patent Application No. 62/140,336, filed Mar. 30, 2015, and entitled "Method and System for Concentrating and Separating a Core Stream in a Flow Cytometer," and U.S. Provisional Patent Application No. 62/140,199, filed Mar. 30, 2015, and entitled "Method and System for Fluorescence Data Collection Using Synchronized Illumination and Detection." The entire contents of each application are hereby incorporated by reference herein, in its entirety and for all purposes.

FIELD OF THE DISCLOSURE

The present disclosure is directed to improvements in flow cytometry and flow cytometric sorting systems and, in particular, to improvements to the optical systems, fluidics, sorting protocols, illumination and detection protocols, and electronic controls associated with such systems.

BACKGROUND

Many types of devices depend on an irradiation of analytes by some optical system, which analytes are substances or materials whose properties are being identified or measured in the devices. These devices include flow cytometers and sorting flow cytometers configured, respectively, to analyze and to sort analytes, including biological matter (e.g., cells), quality control devices configured to irradiate non-biological, manufactured products, quantum computing devices configured to probe quantum systems via radiation, detectors configured to detect trace amounts of volatile heavy metals (e.g., mercury), forensic devices configured to visualize collected evidence (fibers, fingerprints, etc.), structural inspection devices utilized to identify cracks or other defects in mechanical parts or structures, etc.

Specifically, flow cytometric analysis permits quantitative and/or qualitative determinations about organic or inorganic particles, cells, populations of cells, organs, tissues, or organisms (referred to herein as simply "cells") via an irradiation of the cells. Such determinations may be used in many ways including but not limited to diagnosis, biomedical research, engineering, epidemiology, medicine, agriculture, animal husbandry, livestock management, zoology, biopharmaceutical industry, and other fields. During operation, typical sorting flow cytometers irradiate cells, measure a characteristic, such as fluorescence, of the cells and/or dyes with which the cells are "labeled," and select, enrich, apportion, or divide populations of cells based on the measured fluorescence.

However, flow cytometric methods and other methods relying on irradiation and corresponding measurement of analytes present a number of challenges, particularly with respect to the physical and optical properties of the analytes themselves (e.g., cells). For example, flattened or otherwise asymmetrical cells, such as mammalian epithelial cells, red blood cells or sperm cells, exhibit anisotropic absorption and emission of energy (e.g., light). The complex geometries of a cell's interior and/or the complex geometries of the cell's boundaries act to refract and/or reflect light in ways that are highly dependent on the orientation or position of the cell with respect to any sources of radiation and/or detectors used to differentiate between cells.

One common value used to evaluate the effectiveness of a flow cytometric sorting operation is the coefficient of variation (CV). In this context, the CV may be equal to the standard deviation of a detected signal over a measurement interval divided by the mean of the detected signal. In some flow cytometric sorting operations, a CV of less than 5%, or even less than 1%, may be preferred.

Flow cytometric sorting permits the selection, enrichment, apportionment, or division of populations of analytes, including, for example, cells or other bodies or particles of interest (hereinafter referred to as cells for simplicity). The selection criteria include measurable properties of individual cells that can be detected from outside the cell, with or without the aid of chemical reagents or of complexes or bodies that are, or that may be caused to be, associated with the cell. For instance, properties of cells may be measured or approximated by detecting and/or quantifying the association of the cells with one or more labels, such as molecules, complexes, or bodies that fluoresce or have been modified to be rendered fluorescent. While referred to and described as cells throughout this disclosure, the methods and apparatuses described herein may be used with the flow cytometric analysis of any particle or analyte in a stream (e.g., the flow cytometric sorting of a core stream of cells).

One example of such a property is the sex chromosome included in the diploid, haploid, or gamete genome, which may be an X chromosome, a Y chromosome, a Z chromosome, a W chromosome, or the lack of a sex chromosome (referred to as '0'), or combinations thereof depending on the cell type and the organism. Further, other sex determining systems are known that are related to the presence of other chromosomes or DNA sequences. In many cases, the determination of sex chromosome content of cells may be inferred using direct or indirect measurements or determinations using one or more methods. Such methods include the measurement of the DNA content of the cells determined relatively or absolutely; the presence or absence of certain DNA sequences, or markers of the presence or absence of certain DNA sequences; the size of the cells or of portions or organelles of the cells; the presence, localization, or absence of proteins or other markers characteristic of the sex chromosome content of the cells, or combinations or patterns of expression of such markers; or any other measurement that reflects the sex chromosome composition of the cell. Many other such measurements may be made, or properties determined, to identify cells that are of interest in a particular instance, situation, system, disease, condition, process, or circumstance.

Cells can be selected positively or negatively by the concentration, collection, separation, or partitioning of cells of interest or by the removal of cells that are not desired or of interest in the preparation. Such selection may be controlled on the basis of any parameter, characteristic, or combination of parameters or characteristics that may be determined as described above. Cells identified by methods including or related to those described above may be separated, partitioned, concentrated, depleted, or collected into any arbitrary number of groups.

There exists a number of methods and systems for performing flow cytometric sorting of cells. Among these are methods and systems designed to perform flow cytometric sorting of mammalian sperm cells and, in particular, to sort the non-human sperm cells (e.g., the sperm cells of bovine, porcine, or equine males) into populations of sperm cells bearing X chromosomes and/or populations of sperm cells bearing Y chromosomes, with the purpose of increasing the probability that fertilization of an egg with the sorted sperm will result in offspring with a desired sex. For example, a dairy farmer may desire to sort the sperm of a bull so that bovine embryos may be produced, by artificial insemination, in vitro fertilization, or other means, using a preparation of sperm cells having an increased frequency of X chromosome-bearing sperm cells, to produce additional female bovine offspring.

Flow cytometric sorting methods present a number of challenges, particularly with respect to sorting mammalian sperm cells for later use in producing offspring. Importantly, methods used to label and/or to differentiate between the cells and/or methods used to sort the cells must not adversely affect the viability of the desired cells. Often, one or more goals of the methods and/or systems involved (e.g., faster sorting, improved accuracy, etc.) conflict with other goals of the methods and/or systems. Various factors must be balanced and considered, including the temperatures, temperature changes, pressures and/or pressure changes to which the cells are subjected, the fluidic environments to which the cells are exposed, the chemical environments and substances to which the cells are exposed, the forces applied to the cells, and the lifespan of the cell.

Another challenge associated with sorting cells relates to the physical and optical properties of the cells. In particular, flattened or otherwise asymmetrical cells, such as some mammalian red blood cells or sperm cells, may exhibit anisotropic emission of energy (e.g., light). The complex geometries of a cell's interior and/or the complex geometries of the cell's boundaries act to transmit, refract and/or reflect light in ways that are highly dependent on the orientation of the cell with respect to any illumination sources and/or detectors used to differentiate between cells. For example, flow cytometry sorting of mammalian sperm cells into populations having increased frequency of cells containing X or Y chromosomes usually involves staining the cells with a molecule that binds to DNA within the cells and fluoresces brightly when bound. The variation in DNA content between the X and Y chromosomes of most mammalian species (Y chromosomes generally containing less DNA than X chromosomes) results in relatively greater fluorescence from cells containing X chromosomes. However, the difference in DNA content of X and Y chromosome bearing cells is typically on the order of only a few percent (which necessitates the low CV in systems performing such analysis) and, often, cell geometry and/or orientation, in addition to other factors such as optical variations, may affect the detected fluorescence by a percentage that exceeds the percentage difference in DNA content between the X and Y chromosomes. Additionally, such analysis requires that cells pass through the detection region singly, such that a detector does not interpret fluorescence from two cells as fluorescence from a single cell.

Flow cytometry sorting systems frequently employ a core-in-sheath fluidic mechanism to carry the cells through the detection region. As depicted in FIG. 1A, a relatively slow moving stream 100 of an aqueous suspension of cells 102 is injected by a fixed conduit tube 105 into a relatively faster moving flow 104 of sheath fluid. In some embodiments, the stream 100 of the aqueous suspension of cells 102 is injected by the conduit tube 105 at a speed that is equal to the flow 104 of sheath fluid. This arrangement focuses the cells 102 into a stream 106, referred to as the core stream. With appropriate selection of the pressures, of the shape, dimensions, orientation, and materials of the boundaries and components of the fluidic system, and the consequent velocities and organization of the core suspension and sheath fluid, the core stream is narrowed by hydrodynamic forces exerted by the sheath flow, and the cells in the core stream are distributed longitudinally such that they are carried mostly one by one in the flow. The forces that elongate and narrow the core stream have the additional benefit of orienting the cells 102 such that a lengthwise axis 108 of the cell 102 is generally parallel to the direction of flow of the single file stream 106. However, the orientation of the cells about the lengthwise axis 108 remains more or less random in systems where the core and sheath flows are designed to be generally cylindrically symmetric about the flow axis. Thus, as each cell 102 passes through the detection area, light incident upon the cell, light emitted from the cell (e.g., fluorescent light or scattered light or transmitted light), and/or light reflected off of the cell, remain dependent on the axial orientation of the cell 102. This is especially true of many types of mammalian sperm cells.

There is a number of solutions to the problem of sperm cell orientation with respect to illumination and detection of cells within flow cytometry systems. For example, FIG. 1B illustrates one solution, which employs a cut, beveled tip 110 on a fixed conduit tube 112 injecting a sample stream 114 into a sheath flow 116. The flattened or beveled tip 110 helps to orient the cells about their lengthwise axes 108 (illustrated in FIG. 1A) within the sheath flow 116 such that the flat faces of the cells tend to align in a consistent direction. Other solutions employ one or more detectors to estimate the orientation of each cell as it passes through a detection area and to measure the fluorescence of those cells that are found to be appropriately oriented such that precise quantitation of the fluorescent signal is possible. Still another solution to the problems associated with cell geometry and orientation utilizes optical detection along the same axis as the core-in-sheath flow that carries the cells. In one such solution, epi-illumination optics is used to illuminate the cell and detect light emitted by the cell. Yet another solution, utilizes one or more parabolic or ellipsoidal reflectors to illuminate cells uniformly and/or to collect light radially from the cells. The system utilizes a nozzle to emit a stream/jet of liquid containing individual cells.

The configuration of the optics of a flow cytometer can also affect the CV of the system as a whole and, accordingly, the accuracy of the measurements and analysis performed by the system. Mirrors are commonly used to collect electromagnetic energy scattered in various directions by a sample, or to collect beams of electromagnetic energy emitted from multiple light sources, and redirect the electromagnetic energy at a target where, for example, a detector, lens, or other optical element is located. The effectiveness of the mirror in redirecting the electromagnetic energy at the target may depend on the orientation of an optical axis of the mirror. More particularly, the mirror may possess one or more focal points aligned along its optical axis, and the effectiveness of the mirror at achieving a desired purpose may depend on aligning the one or more focal points at one or more locations of interest, for example, where a sample is to be illuminated and/or where a detector for detecting a signal generated by the sample in response to illumination is to be located.

Aligning the one or more focal points of the mirror may involve the use of a coarse adjustment mechanism and a fine adjustment mechanism. Initially, the coarse adjustment mechanism may be used to align the one or more focal points very close to, but perhaps not exactly, their desired location(s). The coarse adjustment mechanism may include, for example, a translational mount capable of moving the mirror in one or more linear directions (e.g., an x-direction, a y-direction, and/or a z-direction). After the coarse adjustment, the fine adjustment mechanism may be used to make small adjustments to the angular orientation of the optical axis of the mirror such that the one or more focal points are better aligned with their desired location(s).

One known fine adjustment mechanism employs an adjustable set screw that presses directly against the exterior of the mirror. The adjustable set screw is typically arranged at an angle relative to the optical axis of the mirror. This configuration may enable the adjustable set screw to tilt the mirror about an axis transverse to the optical axis. However, the pressure exerted by the adjustable set screw tends to deform the mirror and consequently degrade its ability to reflect the electromagnetic energy to the desired location. Also, this arrangement may require the mirror to be clamped between a top mount and a base mount formed of several bearings. The compressive force used to clamp the mirror between these mounts, and the shear forces exerted by the bearings, may further deform the mirror and reduce its ability to properly reflect the electromagnetic energy to the desired location. Additionally, the known fine adjustment mechanism may not have the ability to tilt the mirror about more than one axis.

Other aspects of the system can also negatively affect the CV of the system and of the analysis performed by the system. Such aspects include: refractive effects in the optical paths of the illumination and detection optics; variations in the analytes, including, where used, the staining of the analytes (e.g., the application of fluorescent or other markers); variations in the detected emissions (due to factors other than the characteristic being measured); variation in the electronics performing the excitation and/or detection; etc.

Other challenges, particular to sorting flow cytometry in which the sorted output of the cytometer are used for another purpose, include balancing yield and purity, and preserving the utility of the product. With respect to sperm cells being sorted according to the sex chromosome contained in each cell—usually for purposes of creating offspring (in non-human animals) of a desired sex—lower purity increases the chance that the offspring that result from fertilization with those cells will be of the undesired sex. At the same time, it is also important to maintain the viability of the sperm cells bearing the desired sex chromosome after the sorting procedure.

SUMMARY

An embodiment of an adjustable flow assembly for use in positioning a core stream of cells in flow cytometric sorting of the cells includes an elongated conduit member extending along a conduit axis from a first end to a second end. The conduit member including a conduit passageway extending from the first end to the second end. The adjustable flow assembly also includes a needle member extending along the conduit axis from a first end to a second end. The needle member includes a needle passageway extending from the first end to the second end of the needle member. The needle member is coupled to the conduit member such that an external portion of the needle member extends from the first end of the conduit member, and the conduit passageway and the needle passageway are adapted to receive the core stream of cells. The first end of the needle member is longitudinally offset from a tube having a tube passageway that extends along a tube axis, and the tube passageway is adapted to receive the core stream of cells when as the core stream of cells exits the first end of the needle member. The adjustable flow assembly also includes a tilt adjustment assembly coupled to the conduit member and the needle member such that the conduit member and the needle member are displaceable relative to the tube between a first tilt position, in which the conduit axis is coaxially aligned with the tube axis, and a second tilt position, in which the conduit axis forms an oblique angle with the tube axis.

An adjustable flow assembly for use in positioning a stream of analytes, including an elongated conduit member extending along a conduit axis from a first end to a second end. The conduit member includes a conduit passageway extending from the first end to the second end. A needle member extends along the conduit axis from a first end to a second end, and the needle member includes a needle passageway extending from the first end to the second end of the needle member. The needle member is coupled to the conduit member such that an external portion of the needle member extends from the first end of the conduit member, and the conduit passageway and the needle passageway are adapted to receive the stream of analytes. The first end of the needle member is longitudinally offset from a tube having a tube passageway adapted to receive the stream of analytes as the stream of analytes exits the first end of the needle member, and the tube passageway extends along a tube axis. An offset adjustment assembly is coupled to the conduit member and the needle member such that the conduit member and the needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

A system for use in flow cytometry includes a tube having a tube passageway adapted to receive a stream of analytes, and the tube passageway extending along a tube axis. The system also includes an adjustable flow assembly for use in positioning the stream of analytes within the tube passageway, and the adjustable flow assembly includes an elongated conduit member extending along a conduit axis from a first end to a second end, the conduit member including a conduit passageway extending from the first end to the second end. The adjustable flow assembly also includes a needle member extending along the conduit axis from a first end to a second end, the needle member including a needle passageway extending from the first end to the second end of the needle member. The needle member is coupled to the conduit member such that an external portion of the needle member extends from the first end of the conduit member. The conduit passageway and the needle passageway are adapted to receive the stream of analytes, and the first end of the needle member is longitudinally offset from the tube having the tube passageway adapted to receive the stream of analytes as the stream of analytes exits the first end of the needle member. The adjustable flow assembly also includes a tilt adjustment assembly coupled to the conduit member and the needle member such that the conduit member and the needle member are displaceable relative to the tube between a first tilt position, in which the conduit axis is coaxially aligned with the tube axis, and a second tilt position, in which the conduit axis forms an oblique angle with the tube axis.

A further system for use in flow cytometry includes a tube having a tube passageway adapted to receive a stream of analytes, the tube passageway extending along a tube axis. The system additionally includes an adjustable flow assembly for use in positioning the stream of analytes within the tube passageway, the adjustable flow assembly including an elongated conduit member extending along a conduit axis from a first end to a second end, the conduit member including a conduit passageway extending from the first end to the second end. The adjustable flow assembly also having a needle member extending along the conduit axis from a first end to a second end, the needle member including a needle passageway extending from the first end to the second end of the needle member. The needle member is coupled to the conduit member such that an external portion of the needle member extends from the first end of the conduit member. The conduit passageway and the needle passageway are adapted to receive the stream of analytes, and the first end of the needle member is longitudinally offset from the tube having a tube passageway adapted to receive the core stream of cells as the stream of analytes exits the first end of the needle member. The adjustable flow assembly also includes an offset adjustment assembly coupled to the conduit member and needle member such that the conduit member and needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

A system for use in flow cytometry includes a tube member having a tube passageway configured to receive a stream of analytes, the tube passageway being defined by a passageway surface and extending along a tube axis from a first end of the tube member to a second end of the tube member. The tube passageway includes a transition portion extending from the first end of the tube member to a first point of the tube member and a main portion of the tube passageway extending from the first point to a second point of the tube member, and the first point is disposed between the first end and the second point of the tube member. The transition portion has a normal cross-sectional geometry that varies along the tube axis from the first end of the tube member to the first point of the tube member, and the varying normal cross-sectional geometry is selected according to an energy dissipation rate to which the analytes traversing the transition portion will be exposed.

A method of reducing the energy dissipation rate of a stream of analytes in flow cytometric process includes determining a desired maximum energy dissipation rate for the stream of analytes flowing through a tube passageway of a tube member. The tube passageway extends along a tube axis from a first end to a second end, and the tube passageway includes a transition portion extending from the first end to an intermediate point and a main portion extending from the intermediate point to the second end of the tube passageway. The method further includes determining a three-dimensional shape of the transition portion of the tube passageway, and a maximum internal width of the transition portion at the first end is greater than a maximum internal width of the transition portion at the intermediate point. The three-dimensional shape of the transition portion is selected to result in an energy dissipation rate less than the desired maximum energy dissipation rate. The method also includes constructing the transition portion of the tube passageway to have the determined three-dimensional shape.

A capillary tube for use in flow cytometry includes an outer surface and a tube passageway disposed radially inward of the outer surface, the tube passageway adapted to receive a stream of analytes. The tube passageway is defined by a passageway surface and extends along a tube axis from a first end of the capillary tube to a second end of the capillary tube. The tube passageway includes a transition portion extending from the first end of the capillary tube to a first point of the capillary tube and a main portion of the tube passageway extending from the first point to a second point of the capillary tube. The transition portion has a three-dimensional inner surface shape selected to result in an energy dissipation rate less than the desired maximum energy dissipation rate. The first point is disposed between the first end and the second point of the capillary tube, and the transition portion has a maximum internal width at the first end that is greater than a maximum internal width at the first point.

A method of manufacturing a tube member for use in flow cytometric processes includes positioning a pre-fabricated portion of the tube member in a mold such that an end portion of the pre-fabricated portion of the tube member is disposed in a cavity of the mold. The method also includes inserting a shaped insert into the cavity such that an end portion of the shaped insert is disposed in or adjacent to the end portion of the pre-fabricated portion. The method further includes injecting a material into the cavity to form an end portion of the tube member that includes the transition portion and the first end of the tube member.

A method of manufacturing a capillary tube member for use in flow cytometric processes, the capillary tube member having a tube passageway defined by a passageway surface and extending along a tube axis from a first end of the capillary tube member to a second end of the capillary tube member, includes printing the capillary tube member using a three-dimensional printer.

One aspect of the present disclosure includes an adjustable mirror assembly having a base mount, a mirror mount, a mirror, a first biasing member, and a first adjustable positioning member. The mirror mount may be suspended from and movable relative to the base mount. The mirror may be fixed to the mirror mount, and have a concave interior surface, at least one focal point, and an optical axis passing through the at least one focal point. The first biasing member may be connected between the base mount and the mirror mount and may exert a first biasing force that urges the mirror mount toward or away from the base mount. The first adjustable positioning member may be connected between the base mount and the mirror mount and configured to tilt the mirror mount about at least a first axis transverse to the optical axis of the mirror.

Another aspect of the present disclosure provides a system for detecting an analyte in a fluidic sample. The system may include an illumination source, a flow cell, a detector, a base mount, a mirror mount, a mirror, a first biasing member, and a first adjustable positioning member. The illumination source may be configured to generate electromagnetic energy to illuminate the sample at an interrogation region. The flow cell may include a sample inlet, a sample outlet, and a flow path defined between the sample inlet and the sample outlet. The flow path may pass through the interrogation region. The detector may be configured to detect a signal generated by the analyte in response to illumination. The mirror mount may be suspended from and movable relative to the base mount. The mirror may be fixed to the mirror mount. The mirror may have a concave interior surface, a first focal point to be coincidentally aligned with the interrogation region, and an optical axis passing through the first focal point. The first biasing member may be connected between the base mount and the mirror mount and may exert a first biasing force that urges the mirror mount toward or away from the base mount. The first adjustable positioning member may be connected between the base mount and the mirror mount and configured to tilt the mirror mount about at least a first axis transverse to the optical axis of the mirror.

Yet another aspect of the present disclosure provides a method for adjusting an angular orientation of a mirror assembly. The mirror assembly may include a base mount, a mirror mount suspended from and movable relative to the base mount, a mirror fixed to the mirror mount and having a concave interior surface and an optical axis. The mirror assembly may also include a first biasing member connected between the base mount and the mirror mount, a first adjustable positioning member connected between the base mount and the mirror mount, and a second adjustable positioning member connected between the base mount and the mirror mount. The method may include: (a) adjusting the first adjustable positioning member to increase or decrease a first distance between the base mount and the mirror mount, thereby tilting the mirror mount about at least a first axis transverse to the optical axis of the mirror; and (b) adjusting the second adjustable positioning member to increase or decrease a second distance between the base mount and the mirror mount, thereby tilting the mirror mount about at least a second axis transverse to the optical axis of the mirror.

In one embodiment, a lens assembly for use in performing flow cytometric sorting of cells includes an elongated tube member extending along a tube axis from a first end to a second end. The tube member has an outer surface and an inner surface disposed radially inward of the outer surface. The inner surface defines a tube passageway that extends from the first end to the second end of the tube member, and the tube passageway is adapted to receive a core stream of the cells to be sorted. The lens assembly further includes a lens member having an outer surface and a lens aperture extending from a first portion of the outer surface to a second portion of the outer surface. The lens aperture is defined by an inner surface, and the inner surface extending along a lens axis from a first end at or adjacent to the first portion of the outer surface of the lens member to a second end at or adjacent to the second portion of the outer surface of the lens member, and at least a portion of the tube member is disposed within the lens aperture, and the lens member is adapted to focus light used to detect a property of one or more of the cells of the core stream disposed within the tube passageway.

In another embodiment, a lens assembly for use in performing flow cytometric sorting of cells includes an elongated tube member extending along a tube axis from a first end to a second end, and the tube member has an outer surface and an inner surface disposed radially inward of the outer surface. The inner surface defines a tube passageway that extends from the first end to the second end of the tube member, and the tube passageway is adapted to receive a core stream of the cells to be sorted. The lens assembly also includes a lens member adapted to focus light used to detect a property of one or more of the cells of the core stream disposed within the tube passageway. The lens member has an outer surface and a lens aperture extending from a first portion of the outer surface to a second portion of the outer surface, the lens aperture being defined by an inner surface. The inner surface extends along a lens axis from a first end at or adjacent to the first portion of the outer surface of the lens member to a second end at or adjacent to the second portion of the outer surface of the lens member. The outer surface of the tube member has a circular cross-sectional shape having a first diameter and the inner surface defining the lens aperture of the lens member has a circular cross-sectional shape having a second diameter, and the first diameter is equal to the second diameter such that no radial gap between the inner surface of the lens aperture and the outer surface of the tube member is formed.

A method of configuring an optical system to reduce variations in measured properties of an analyte includes selecting a number of beams into which radiation from a source of radiation is to be split, wherein, upon irradiating the analyte from a plurality of directions by the number of beams, a variation of a resulting measurement of the analyte is at or below a threshold. The method further includes aligning the source of radiation and a plurality of optical elements optically coupled to the source of radiation such that the selected number of beams irradiate the analyte upon emission of radiation by the source of radiation.

In another embodiment, an optical system for saturated irradiation of analytes comprises a source of radiation and a plurality of optical elements. At least some of the optical elements are configured to split radiation emitted by the source of radiation into multiple beams, the multiple beams saturating the analytes, and the multiple beams irradiating the analytes from multiple directions, wherein saturating the analytes and irradiating the analytes from multiple directions produces a variation in a measured property of the analytes at or below a predetermined threshold.

In yet another embodiment, a method of calibrating components of an optical system having multiple beams comprises, for each of the multiple beams: obstructing all but the beam such that only the beam irradiates analytes, causing the beam to irradiate the analytes from each of a set of directions, and detecting a set of measured properties of the analytes corresponding to the set of directions. The method also includes, for each of the multiple beams, aligning the beam to a particular one of the set of directions, the particular one of the set of directions corresponding to an optimum of the set of measured properties.

In still another embodiment, a method of calibrating components of an optical system having multiple beams comprises (a) for each of the multiple beams: obstructing all but the beam such that only the beam irradiates analytes, and measuring at least one of: (i) a measured property of the analytes, or (ii) an optical property of the beam. The method further includes (b) determining a variation between the multiple beams in the at least one of (i) the measured property of the analytes, or (ii) the optical property, and (c) based on the variation between the multiple beams, adjusting one or more optical elements to balance, among the multiple beams, the at least one of (i) the measured property of the analytes, or (ii) the optical property.

In yet another embodiment, a system for maintaining calibrations of an optical system comprises one or more source adjustment components at least one of physically or optically coupled to a source of radiation, one or more detectors detecting at least one of (i) a measured property of analytes irradiated by radiation from the source of radiation, or (ii) an optical property of the radiation emitted by the source of radiation, and a computing device at least one of electronically or communicatively coupled to the one or more source adjustment components and the one or more detectors. The computing device is configured to: receive measured values of the at least one of (i) the measured property of analytes irradiated by the radiation from the source of radiation, or (ii) the optical property of the radiation, determine one or more adjustments for the source of radiation based on the received measured values, and trigger at least one of the one or more source adjustment components to complete the determined one or more adjustments for the source of radiation.

In still another embodiment, an apparatus to automatically adjust an optical system of a flow cytometer comprises an optical element configured to at least one of direct radiation utilized by the flow cytometer or non-spatially manipulate the radiation, an actuator physically coupled to the optical element, and a detector to detect at least one of a direction of propagation of the radiation, a non-spatial property of the radiation, or a measured property of analytes analyzed by the flow cytometer. The apparatus further includes one or more processors communicatively coupled to the actuator and the detector. The one or more processors are configured to: receive, from the detector, an indication of the at least one of the direction of propagation of the radiation, the non-spatial property of the radiation, or the measured property of analytes analyzed by the flow cytometer, and based on the received indication, control the actuator to automatically adjust the optical element.

A system for performing flow cytometry includes a flow cell having an input, an output, and a flow path in fluid communication with the input and the output. The flow cell is configured to carry an analyte and has an analysis region disposed along the flow path. An arrangement of optical components is configured to deliver to the analysis region two or more beams of pulsed laser energy. Each of the two or more beams travels along a respective optical path and arrives at the analysis region at a time offset from each of the other of the two or more beams. Each optical path is configured to deliver the beam from the optical path to the analysis region from a different angle relative to the flow path. A detector is configured to detect a resultant energy signature occurring in response to each of the two or more beams and to output a signal representative of each of the energy signatures. An analysis unit is configured to receive from the detector each of the signals representative of the energy signals, and to determine from the signals representative of the energy signatures a property of an analyte in the analysis region of the flow cell.

A system for performing flow cytometry includes a flow cell having an input, an output, and a flow path in fluid communication with the input and the output. The flow cell is configured to create in the flow path a core-in-sheath flow carrying, in a core of the core-in-sheath flow, an analyte. An excitation source is configured to emit pulsed excitation energy directed to the analyte, and a detector is configured to detect from the analyte each of a plurality of signals emitted in response to the pulsed excitation energy. The signals emitted in response to the pulsed excitation energy are indicative of a characteristic of the analyte. A synchronization circuit is configured to generate a synchronization signal in response to each pulse of the pulsed excitation energy emitted by the excitation energy source. A digitizer circuit, having an input responsive to the synchronization signal, is configured to digitize a representation of each signal emitted in response to the pulsed excitation energy.

A method of selecting analytes for irradiation includes, for each of a plurality of analytes traveling in a stream: receiving an indication of a measured property of the analyte, and determining a swath of a stream in which the analyte is disposed, the swath of the stream being one of a plurality of swaths. Further, the method includes, for each of the plurality of swaths, determining, based on the measured properties of a subset of the plurality of analytes disposed in the swath, if the swath is to be irradiated by one or more pulses emitted by a source of radiation.

In another embodiment, an optical system for selectively irradiating analytes comprises a source of radiation emitting pulses of radiation, a modulator through which the pulses of radiation pass, the modulator operating to selectively direct the pulses of radiation, and a detector. The optical system further includes a computing device at least one of electrically or communicatively coupled to the modulator and to the detector. The computing device is configured to receive indications of a property of each of a plurality of analytes from the detector, and control, based on the received indications of the properties of the plurality of analytes, the modulator to direct certain of the pulses of radiation towards selected subsets of the plurality of analytes and to direct the remaining of the pulses of radiation away from the plurality of analytes.

In yet another embodiment, a method of selecting analytes for irradiation comprises, for each of a plurality of analytes traveling in a stream: receiving an indication of a measured property of the analyte, and determining, based on the indication of the measured property, if the analyte is to be irradiated by one or more pulses emitted by a source of radiation. The method further includes, for each of the plurality of analytes traveling in the stream, one of: if it is determined that the analyte is to be irradiated, causing the analyte to be irradiated by the one or more pulses, or if it is determined that the analyte is not to be irradiated, causing the analyte to not be irradiated by the one or more pulses.

In still another embodiment, an optical system for selectively irradiating analytes comprises a source of radiation emitting pulses of radiation, a modulator through which the pulses of radiation pass, the modulator operating to selectively direct the pulses of radiation, and a detector. The optical system further includes a computing device at least one of electrically or communicatively coupled to the modulator and to the detector. The computing device is configured to, for each of a plurality of analytes: receive an indication of a measured property of the analyte from the detector, and determine, based on the indication of the measured property, if the analyte is to be irradiated by the pulses of radiation. Still further, the computing device is configured to one of: if it is determined that the analyte is to be irradiated, control the modulator to direct the pulses of radiation towards the analyte, or if it is determined that the analyte is not to be irradiated, control the modulator to direct the pulses of radiation away from the analyte.

In yet another embodiment, a method of selecting analytes for irradiation comprises, for each of a plurality of analytes traveling in a stream: receiving an indication of a measured property of the analyte, and determining a swath of a stream in which the analyte is disposed, the swath of the stream being one of a plurality of swaths. The method further includes, for each of the plurality of swaths, determining, based on the measured properties of a subset of the plurality of analytes disposed in the swath, if the swath is to be irradiated by radiation emitted by a source of radiation.

In still another embodiment, an optical system for selectively irradiating analytes comprises a source of radiation, a detector, and a computing device at least one of electrically or communicatively coupled to the modulator and to the detector. The computing device is configured to, for each of a plurality of analytes, receive an indication of a measured property of the analyte from the detector, and determine, based on the indication of the measured property, if the analyte is to be irradiated by radiation emitted by the source of radiation. The computing device is further configured to one of, if it is determined that the analyte is to be irradiated, cause the radiation emitted by the source of radiation to be directed towards the analyte, or, if it is determined that the analyte is not to be irradiated, cause the radiation emitted by the source of radiation to be directed away from the analyte.

In yet another embodiment, a method of sorting sperm cells in flow comprises selecting a sperm cell in the flow to irradiate with radiation emitted by a laser. The method further includes using the laser to irradiate the sperm cell in the flow with the radiation, the radiation having a wavelength between one hundred nanometers and eight hundred nanometers, the radiation including pulses having a repetition rate greater than one megahertz, and the radiation delivering an energy density greater than one microjoule per millimeter squared to the sperm cell.

In still another embodiment, a system for sorting sperm cells in flow comprises a laser emitting radiation, the radiation: having a wavelength between one hundred nanometers and eight hundred nanometers, including pulses having a repetition rate greater than one megahertz, and delivering an energy density greater than one microjoule per millimeter squared to the sperm cells. The system further includes a computing device configured to cause the radiation emitted by the laser to be modulated such that select ones of the sperm cells are irradiated by the radiation.

In accordance with an exemplary aspect, a method of producing a concentrated stream of analytes in a flow cytometric process is disclosed. The method includes injecting a sheath fluid into an inlet nozzle, injecting a core stream comprising analytes into the sheath fluid via an inlet tube arranged in the inlet nozzle, and forming, in the inlet nozzle, a core-in-sheath flow comprising the core stream and the sheath fluid. The method also includes passing the core-in-sheath flow from the inlet nozzle to an outlet nozzle through a tube member arranged between the inlet nozzle and the outlet nozzle. The method further includes recovering the core stream from the core-in-sheath flow once the core-in-sheath flow exits the tube member.

In accordance with another exemplary aspect, a device for use in a flow cytometric process is disclosed. The device includes an inlet nozzle, a tube member, an outlet nozzle, and a capture mechanism. The inlet nozzle includes an inlet tube arranged to receive a core stream including analytes. The inlet nozzle defines an inlet cavity arranged to receive sheath fluid around the inlet tube. The inlet nozzle is configured to form a core-in-sheath flow comprising the sheath fluid surrounding the core stream. The tube member has a tube passageway having an inlet end and an outlet end opposite the inlet end, with the inlet end arranged to receive the core-in-sheath flow from the inlet nozzle. The outlet nozzle is arranged to receive the core-in-sheath flow from the tube member via the outlet end of the tube member. The capture mechanism is positioned in the outlet nozzle proximate to the outlet end of the tube member, such that the capture mechanism is configured to recover the core stream from the core-in-sheath flow once the core-in-sheath flow exits the tube member.

BRIEF DESCRIPTION OF THE DRAWINGS

FIG. 1O is a front view of an embodiment of an adjustable flow assembly for use in performing flow cytometric sorting of cells;

FIG. 2G is a top partial view of an embodiment of a mold for an embodiment of the tube member;

FIG. 2H is a top partial sectional view of the embodiment of the tube member fabricated by the mold of FIG. 2G;

FIG. 2I is a top cross-sectional view of an embodiment of an end portion of an embodiment of the tube member;

FIG. 2J is a top cross-sectional view of an embodiment of an end portion of an embodiment of the tube member;

FIG. 2K is a top cross-sectional view of an embodiment of an end portion of an embodiment of the tube member;

FIG. 5I illustrate an example arrangement of components implementing the optical system of FIG. 5H;

FIGS. 5J, 5K, 5L, and 5M illustrate example spatial adjustments which may be implemented in the optical system of FIGS. 5H and 5I;

FIG. 6A depicts an example arrangement of illumination energy sources for determining orientation and/or morphology of an analyte;

FIG. 6B depicts example signals detected as a result of the arrangement of energy sources of FIG. 6A;

FIG. 6E is an example of an implementation of multiple detectors to detect the multiple illumination energy sources;

FIG. 8B illustrates an example repetition rate of pulses emitted by a laser as compared with a rate of analytes traveling through a stream;

FIG. 8E illustrates example swaths of a stream in which analytes travel;

FIGS. 8N and 8O illustrate another example sorting strategy which may be utilized in the optical system of FIG. 8A;

FIG. 9O is a schematic diagram illustrating a vacuum pump connected to one of the capture mechanisms to apply a vacuum pressure to help recover core stream and direct the core stream to a fluid connection receptacle.

DETAILED DESCRIPTION

Method for Performing Flow Cytometry

Figure 1A:
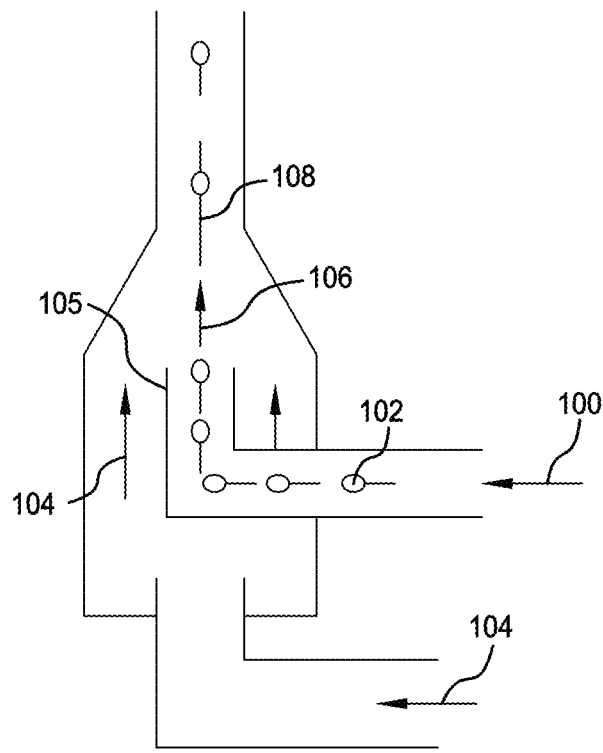
FIG. 1A is a schematic illustration of a first embodiment of a known core-in-sheath fluidic mechanism.
Figure 1B:
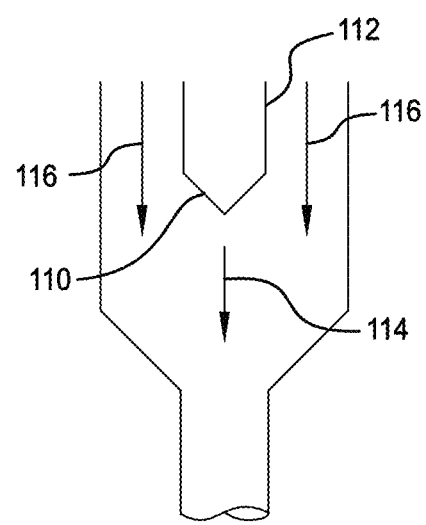
FIG. 1B is a schematic illustration of a second embodiment of a known core-in-sheath fluidic mechanism.
Figure 1C:
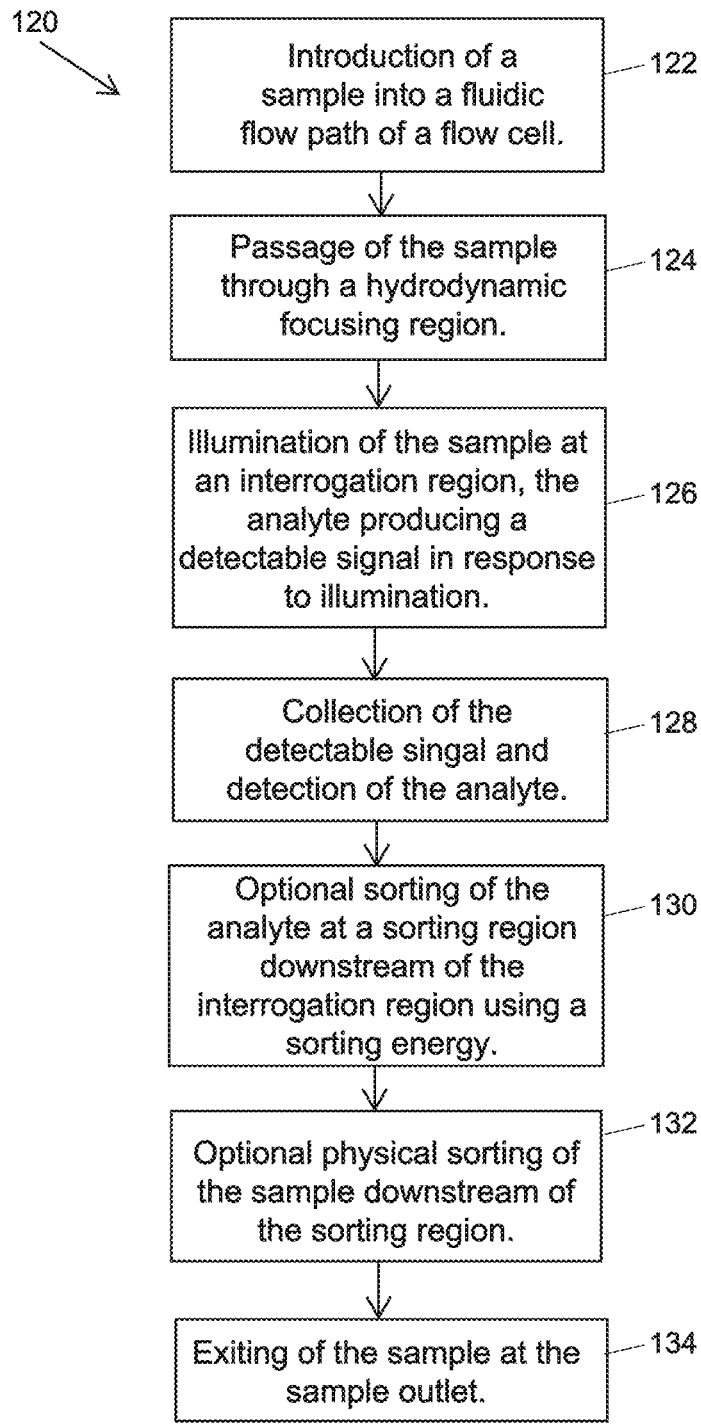
FIG. 1C is a flow diagram illustrating a method of detecting and optionally sorting an analyte in accordance with various embodiments of the disclosure.

Referring to FIG. 1C, in an embodiment of the disclosure, a method 120 for detection and, optionally, for high-speed sorting of an analyte may generally sequentially include, for example, introduction of a sample containing or suspected of containing an analyte into a fluidic flow path of a flow cell through a sample inlet (block 122), passing the sample through a hydrodynamic focusing region (block 124), illumination of the sample at an interrogation region, the analyte generating a detectable signal in response to illumination (block 126), collection of a detectable signal and detection of the analyte or a desired feature of the analyte (block 128), optionally sorting the analyte or an analyte of interest using a sorting energy directed at the analyte in a sorting region downstream of the interrogation region, the sorting energy operable to modify, damage, or destroy the analyte (block 130), optionally physically sorting the sample at the sample outlet or other region downstream of the sorting region (block 132), and exiting of the sample through a sample outlet of the flow cell (block 134).

While the various steps of the method 120 are described separately above and in detail below, it should be understand that steps of the method 120 can be performed simultaneously or substantially simultaneously. For example, introduction of the sample into the fluidic flow path and hydrodynamic focusing can occur simultaneously, for example, in embodiments in which the flow cell is formed of a capillary tube. The capillary tube can effect near immediate focusing of the sample. In another embodiment, a hydrodynamic focusing element can be provided at the sample inlet such that the sample inlet is the hydrodynamic focusing region and/or includes a hydrodynamic focusing apparatus and the sample becomes focused upon entry into the fluidic flow path of the flow cell. Alternatively, a hydrodynamic focusing element or region can be provided downstream of the sample inlet and the sample can be focused after introduction at the inlet.

Another example of steps that can occur simultaneously or substantially simultaneously include the optional physical sorting of the sample downstream of the sorting region and exiting of the sample out the sample outlet. As described in detail below, the physical sorting can occur while the sample exits the sample outlet. In other embodiments, a region of physical sorting upstream the sample outlet, but downstream the sorting region can also be provided such that physical sorting occurs prior to exiting of the sample.

For example, illumination of the sample, collection of the detectable signal, and detection of the analyte can all occur substantially simultaneously as well. By substantially simultaneously, it should be understood that the illumination, collection, and detection steps are performed at the speed at which the sample can be illuminated, generate a detectable signal, and the detectable signal can be collected and transmitted to a detector. For example, such action can occur at about the speed of the electromagnetic energy and thus, can be considered substantially simultaneous.

Control System for Performing Flow Cytometry

Figure 1D:
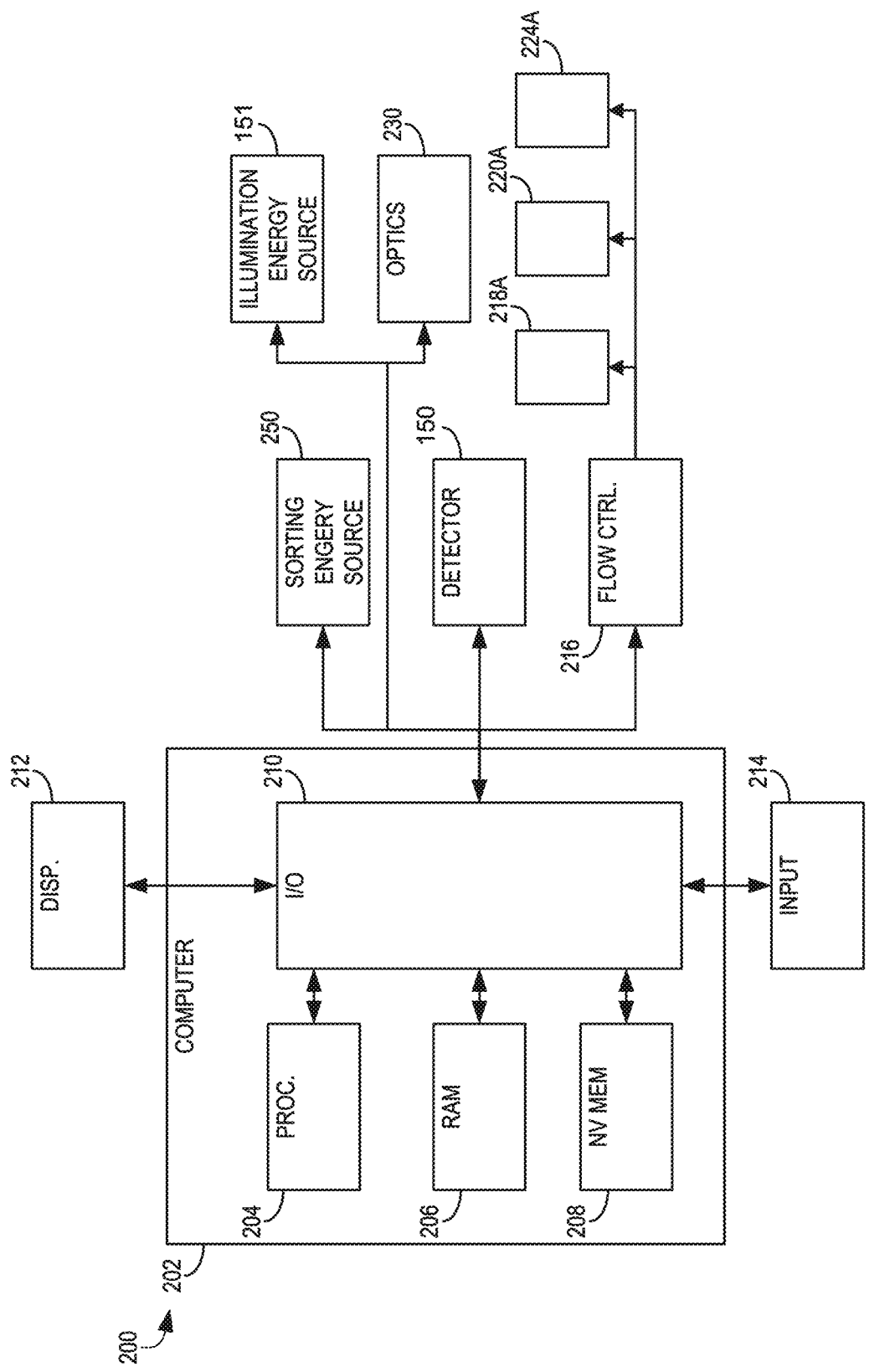
FIG. 1D is a schematic illustration of a control system for apparatus and methods in accordance with various embodiments of the disclosure.

Referring to FIG. 1D, the flow cytometry system may include a computer control system 200. The computer control system 200 may include one or more computer devices 202, such as workstations, laptop computers, tablet computers, netbook computers, personal digital assistants, and the like. As generally known, each computer device 202 may include or have access to one or more microprocessor devices 204, one or more volatile memory devices (e.g., RAM) 206, and one or more non-volatile memory devices (e.g., hard disk drives, optical memory devices, etc.) 208. The microprocessor device 204 may store machine-executable instructions and data on the volatile memory device 206 during runtime operation and, similarly, may store instructions and/or data on the non-volatile memory device 208. For example, as is generally known, instructions for one or more routines or programs may be stored in the non-volatile memory device 208 for retrieval by the microprocessor device 204. The microprocessor device 204 may, upon execution of a routine, retrieve the routine from the non-volatile memory device 208 and store a copy of the routine in the volatile memory device 206. During execution of the routine, the microprocessor device 204 may additionally store data in one or both of the volatile and non-volatile memory devices 206 and 208, respectively. Additionally, the microprocessor device 204 may receive, process, and/or store in the memory devices 206, 208 data from one or more devices external to the computer 202 as described below. One or more input/output (I/O) devices 210 may facilitate communication between the microprocessor 204 and the external devices and, additionally, between the microprocessor 204 and the memory devices 206, 208. Further, the I/O device 210 may communicate with a display device 212, which may be internal or external to the computer device 202, and may be used to display a user interface for allowing an operator to control the cytometry system. One or more input devices 214 (e.g., a mouse, a touch screen, a keyboard, etc.) may allow the user to input data or commands to the cytometry system.

When programmed with the machine-executable instructions, the microprocessor 204 is transformed into a special-purpose microprocessor configured to perform the tasks associated with performing flow cytometry, as described below and throughout the application. Of course, microprocessor 204 could alternatively be an application specific integrated circuit (ASIC) device, a field programmable gate array (FPGA) device, or another type of processor that is built or otherwise programmed specifically to perform the tasks and execute the instructions associated with the operation of the flow cytometry and/or sorting system. Of course, the microprocessor 204 may be a single device or multiple devices, may comprise one or more processing cores in one or more discrete packages, etc., as is generally understood. Throughout this specification, the term microprocessor will be used to refer to any processing device configured to execute the instructions required to perform flow cytometry according to the described embodiments.

The I/O device 210 may facilitate communication between the microprocessor 204 and the cytometry hardware, such as a sorting energy source 250, a detector 150, an illumination source 151 and a fluidic system. With respect to the fluidic system, specifically, the I/O device 210 may facilitate communication between the microprocessor 204 and a flow control subsystem 216 operating to control the flow of sheath fluid and sample fluid from supplies of sheath fluid and sample fluid, respectively, and to a collection container. For example, the flow control subsystem 216 may control a pump 218A in fluid communication with a sheath fluid supply 218 (see FIG. 1E), may control a pump 220A in fluid communication with a sample fluid supply 220 (see FIG. 1E), and/or may control a pump 224A in fluid communication with a collection container 224 (see FIG. 1E). Further, the flow control subsystem 216 may include or communicate with sensors operable to sense the volume or rate of flow of the sheath fluid, of the sample fluid, of the fluid entering the collection container 224, and/or of the core-in-sheath flow formed within the flow cytometry system. Lastly, the I/O device 210 may facilitate communication between the microprocessor 204 and one or more components 230 of an optical subsystem. The components 230 may include one or more movable optical elements (e.g., mirrors or lenses) and/or one or more electrochromic devices which may be used to selectively direct, redirect, and/or block energy from a sorting energy source 250 and/or an illumination energy source 151. Additionally, the components 230 may include one or more movable optical elements operable to calibrate and/or control, or to facilitate the calibration and/or control of: (1) the position of an optical element; (2) the direction of illumination energy, sorting energy, and/or detected energy; and/or (3) the intensity of illumination energy, sorting energy, and/or detected energy.

As will be appreciated, the computer 202 may store and execute various computer-readable instructions for implementing the one or more routines, which may include control routines, analysis routines, sorting routines, etc. and, in particular, to control the relative flow of the sheath and sample fluids, to receive and analyze data output by the detector 150, to control the illumination source 151, to control the sorting energy source 250, to control the configuration of an optical element, to analyze one or more properties of the fluid flow, etc. While the routines are described as stored on tangible, non-transitory memory devices and executed by a microprocessor device, the routines may also be hardware modules. A hardware module is a tangible unit capable of performing certain operations and may be configured or arranged in certain manner. In example embodiments, one or more computer systems (e.g., a stand-alone, client or server computer system) or one or more hardware modules of a computer system (e.g., a processor or a group of processors) may be configured by software (e.g., an application or application portion) as a hardware module that operates to perform certain operations as described above.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

An Example Flow Cytometer

Figure 1E:
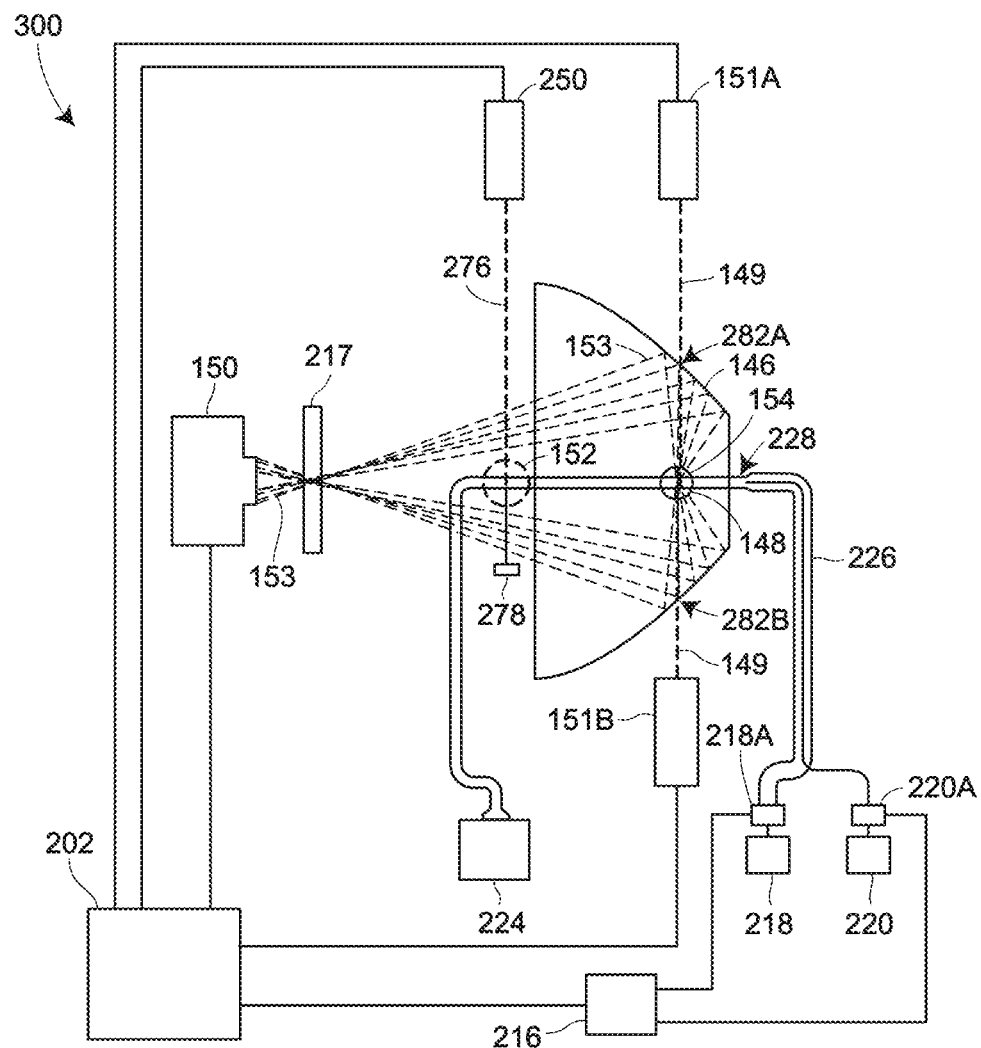
FIG. 1E is a schematic illustration of an exemplary system for detection and optional sorting of an analyte in accordance with various embodiments of the disclosure.

FIG. 1E depicts an exemplary embodiment of a system 300 for performing flow cytometry. The computer 202, as described above, controls the system 300. The computer 202 receives sensor signals and other information from the flow control subsystem 216, and sends control signals back to the flow control subsystem 216. The flow control subsystem 216 operates in accordance with the signals received from the computer 202 to control the pump 218A pumping sheath fluid from the sheath fluid supply 218 and to control the pump 220A pumping sample fluid from the sample fluid supply 220. As a result, a flow is created along a flow path 226. The flow path 226 includes a hydrodynamic focusing element 228 that operates to create a core-in-sheath flow. A routine executed by the processor 204 of the computer 202 causes the computer 202 to provide signals to the flow control subsystem 216 such that the flow control subsystem 216 maintains and/or adjusts the flows of sheath fluid and sample fluid to maintain a stable flow and to optimize the spacing of the analyte particles within the core-in-sheath flow.

The computer 202 is also communicatively coupled to the illumination energy sources 151A and 151B, providing to each one or more control signals for selectively energizing the illumination energy source 151A, 151B and/or determining a power setting of the illumination energy source 151A, 151B. Illumination energy 149 is projected from each of the illumination energy sources 151A, 151B through a respective opening 282A, 282B in an ellipsoidal collector element 146. The illumination energy 149 is directed toward the interrogation region 148 in the flow path 226. A spherical molding 154 integrally formed in the flow cell at the interrogation region 148 ensures that the illumination energy 149 is not refracted as it falls incident on the analyte.

As the illumination energy 149 falls incident on an analyte within the interrogation region 148, it causes the analyte to emit the detectable signal 153 in the form of fluorescence. The spherical molding 154 integrally formed in the flow cell at the interrogation region 148 minimizes refraction of the detectable signal 153 as it leaves the flow cell. The detectable signal 153 falls incident on the ellipsoidal collector element 146, which has a first focal point coincident with the interrogation region 148 in the flow path 226. The ellipsoidal collector element 146 reflects the detectable signal 153 toward the second focal point of the ellipsoidal collector element 146, which second focal point corresponds to the location of a pinhole 217. The detectable signal 153 passes through the pin-hole 217 and then falls incident on the detector 150.

The detector 150, communicatively coupled to the computer 202, sends to the computer 202 a signal corresponding to the detectable signal 153. The computer 202 executes a routine operable to receive the signal from the detector 150, and to determine from the detector 150 whether the analyte from which the detectable signal 153 was emitted is in a desired sub-population or not in the desired sub-population.

The computer 202 is further communicatively coupled to the sorting energy source 250. The computer 202 sends a signal to the sorting energy source 250 to selectively energize the sorting energy source 250 at a time when the analyte from which the detectable signal 153 was emitted will be in a sorting region 152, which is disposed in the path of electromagnetic radiation 276 emitted by the sorting energy source 250. The computer 202 causes the sorting energy source 250 to emit electromagnetic radiation 276 when the analyte is not in the desired sub-population, and causes the sorting energy source 250 not to emit electromagnetic radiation 276 when the analyte is in the desired sub-population. A routine executing on the computer 202 may determine when the analyte will be in sorting region 152 according to known parameters of the flow, which are, in any event, also controlled by the computer 202 via the flow control subsystem 216. A beam stop 278 may prevent the electromagnetic radiation 276 from falling incident on other parts of the system 270.

The collection container 224 collects the fluid containing the sorted sample at the end of the flow path 226.

A number of improvements will be described in the descriptions below. Each of the improvements may be employed with the control system and/or example flow cytometer and/or methods described above. While various combinations of elements will be described and explicitly mentioned by way of example, those of skill in the art will understand that these examples are non-limiting and will readily appreciate the various combinations of elements possible.

Adjustable Sample Injection

In a flow cytometer implementing a core-in-sheath flow to carry analytes past and/or through an analysis or interrogation region, alignment of the core stream—that is, precise and proper positioning of the core stream within the flow path is important not least because of the very narrow focal volume from which the optics of some such systems (such as those analyzing sperm cells or other analytes that emit or transmit a signal anisotropically) collects a signal from the analyte. Because of the difficulty and/or complexity of adjusting the optics to account for movement of the core stream within the flow path, the proper alignment of the core stream in the core-in-sheath flow is important to maintaining the flow of analytes along the optimal path such that each analyte passes through the focal volume, which, in turn, is important to achieving the desired quantity and quality of the signal collected by the optics. Achieving this alignment is difficult, especially in closed-cell cytometers (i.e., cytometers in which the flow path is fully enclosed through the analysis region), because the very focused core flow is labile and is easily affected by fluidic perturbations such as pressure change, temperature change, change in particulate density of the analyte, debris in the flow path (e.g., dirt buildup, clogging) etc.

The various embodiments of adjustable flow cells described herein solve the problem of maintaining proper and precise alignment of the core stream within the flow path and, in doing so, improve the quantity and/or quality of the signal received from the analyte via the optics of the system. As a result, poor or sub-optimal definition, distinction, and/or separation of analytes, caused by deviations in the path of the core stream, are mitigated. Additionally, it is possible with some of the described embodiments to use the core stream to deliver solvents, surfactants, abrasives, or other agents (liquid or solid) to the site of debris or clogging to clean the flow cell and return the flow of the core stream to its optimal position without requiring an adjusted path.

Figure 1F:
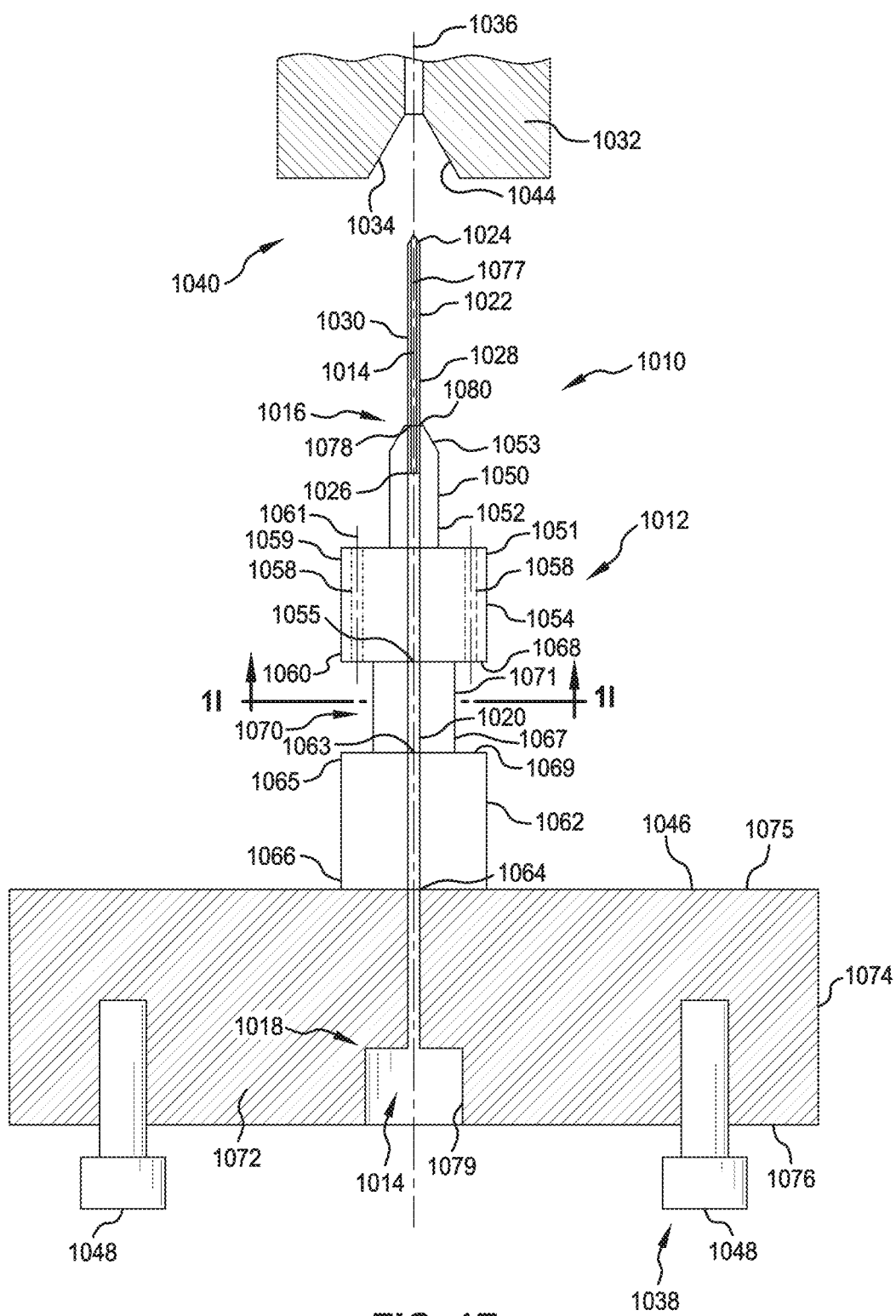
FIG. 1F is a front view of an embodiment of an adjustable flow assembly for use in flow cytometry.

As illustrated in FIG. 1F, an adjustable flow assembly 1010 for use in positioning a stream of analytes (e.g., a stream of cells, such as non-human sperm cells, in a core-in-sheath flow) in a flow cytometric application (e.g., a flow cytometric sorting of the stream of cells) includes an elongated conduit member 1012 extending along a conduit axis 1014 from a first end 1016 to a second end 1018. The conduit member 1012 including a conduit passageway 1020 extending from the first end 1016 to the second end 1018. The adjustable flow assembly 1010 also includes a needle member 1022 extending along the conduit axis 1014 from a first end 1024 to a second end 1026. The needle member 1022 includes a needle passageway 1028 extending from the first end 1024 to the second end 1026 of the needle member 1022. The needle member 1022 is coupled to the conduit member 1012 such that an external portion 1030 of the needle member 1022 extends from the first end 1016 of the conduit member 1012, and the conduit passageway 1020 and the needle passageway 1028 are adapted to receive the core stream of cells. The first end 1024 of the needle member 1022 is longitudinally offset from a tube 1032 having a tube passageway 1034 that extends along a tube axis 1036, and the tube passageway 1034 is adapted to receive the core stream of cells when as the core stream of cells exits the first end 1024 of the needle member 1022.

Still referring to FIG. 1F, the adjustable flow assembly 1010 also includes a tilt adjustment assembly 1038 coupled to the conduit member 1012 and the needle member 1022 such that the conduit member 1012 and the needle member 1022 are displaceable relative to the tube 1032 between a first tilt position 1040 (illustrated in FIG. 1F), in which the conduit axis 1014 is coaxially aligned with the tube axis 1036, and a second tilt position 1042 (illustrated in FIG. 1G), in which the conduit axis 1014 forms an oblique angle 8101 with the tube axis 1036. So configured, the adjustable flow assembly 1010 may be a portion of a flow cell, and the first end 1024 of the needle member 1022 may be adjustable relative to the tube 1032, thereby allowing the core stream of cells to be precisely positioned within the tube passageway 1034 as the core stream of cells exits the first end 1024 of the needle member 1022. The precise positioning of the core stream of cells within the tube passageway 1034 allows individual cells comprising the core stream to be directed to a precise location within the tube passageway 1034 and potentially within a sheath flow surrounding the core stream, or focal point of a stationary apparatus (e.g., a laser) that processes (e.g., detects, categorizes, and/or energizes) the cells and is disposed downstream of a first end 1044 of the tube passageway 1034.

Figure 1G:
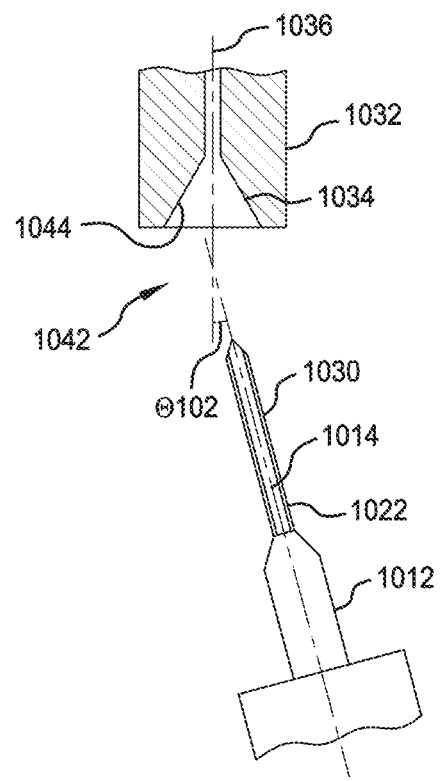
FIG. 1G is a partial view of an embodiment of a conduit member and needle member in a second tilt position relative to a tube.
Figure 1T:
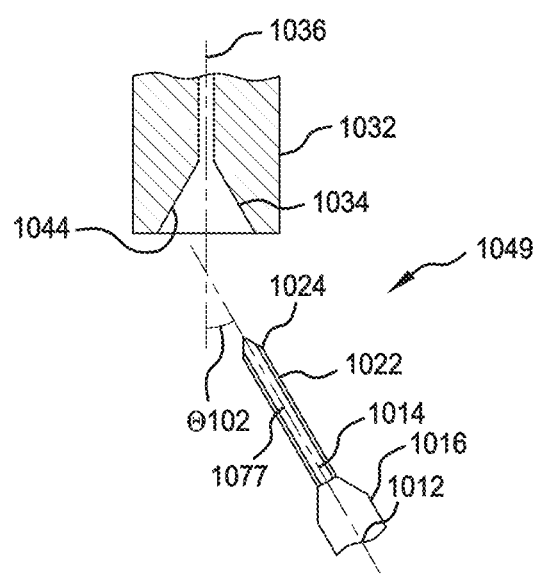
FIG. 1T is a partial view of an embodiment of a conduit member and needle member in a third tilt position relative to a tube.

Turning to the adjustable flow assembly 1010 in more detail, the elongated conduit member 1012 illustrated in FIG. 1F may extend along the conduit axis 1014 from the first end 1016 to a second end 1018, and the conduit passageway 1020 may extend from the first end 1016 to the second end 1018. The conduit member 1012 may include an end portion 1050 that extends from the first end 1016 of the conduit member 1012 to a first intermediate point 1051 offset downwardly (i.e., towards the second end 1018) along the conduit axis 1014. The end portion 1050 may have a cylindrical body 1052 and a tapered or beveled end portion 1053 that gradually decreases in diameter towards the first end 1016 of the conduit member 1012. The cylindrical body 1052 may be symmetrical about the conduit axis 1014. The conduit member 1012 may also include a first collar portion 1054 disposed between the first intermediate point 1051 and a second intermediate point 1055 offset downwardly along the conduit axis 1014. The first collar portion 1054 may be cylindrical and may be symmetrical about the conduit axis 1014. The first collar portion 1054 may have a diameter greater than a diameter of the body 1052 of the end portion 1050. One or more sheath passageways 1058 may extend longitudinally through the first collar portion 1054 from a first end 1059 of the first collar portion 1054 to a second end 1060 of the first collar portion 1054. Each of the one or more sheath passageways 1058 may be have a sheath passageways axis 1061 that extends longitudinally or substantially longitudinally, and each sheath passageways axis 1061 may be parallel to and radially (i.e., in a direction normal to the conduit axis 1014) offset from the conduit axis 1014. In some embodiments, three or more sheath passageways (e.g., between eight and twelve sheath passageways 1058) may be radially and/or uniformly arrayed around through the first collar portion 1054, as illustrated in FIG. 1I.

Referring to FIG. 1F, the conduit member 1012 may further include a second collar portion 1062 disposed between the first collar portion 1054 and the second end 1018 of the conduit member 1012. Specifically, the second collar portion 1062 may be disposed between a third intermediate point 1063 (offset downwardly from the second intermediate point 1055 along the conduit axis 1014) disposed at a first end 1065 of the second collar portion 1062 and a fourth intermediate point 1064 (offset downwardly from the third intermediate point 1063 along the conduit axis 1014) disposed at a second end 1066 of the second collar portion 1062. The second collar portion 1062 may be cylindrical and may be symmetrical about the conduit axis 1014. The second collar portion 1062 may have a diameter greater than a diameter of the body 1052 of the end portion 1050. For example, the second collar portion 1062 may have a diameter equal to or approximately equal to the diameter of the first collar portion 1054.

Still referring to FIG. 1F, an intermediate portion 1071 may be disposed between the second end 1060 of the first collar portion 1054 and the first end 1065 of the second collar portion 1062 (i.e., between the second intermediate point 1055 and the third intermediate point 1063). The intermediate portion 1071 may be cylindrical and may be symmetrical about the conduit axis 1014. The intermediate portion 1071 may have a diameter smaller (e.g., 5% to 40% smaller) than the diameter of one or both of the first collar portion 1054 and the second collar portion 1062. Accordingly, an outer surface 1067 defining the intermediate portion 1071, a surface 1068 defining the second end 1060 of the first collar portion 1054, and a surface 1069 defining the first end 1065 of the second collar portion 1063 may cooperate to form a circumferential recess 1070.

As illustrated in FIG. 1F, the adjustable flow assembly 1010 also includes a base member 1046 rigidly secured to the conduit member 1012, and one or more adjustment members 1048 of the tilt adjustment assembly 1038 may be movably coupled to the base member 1046 such that displacement of the one or more adjustment members 1048 relative to the base member 1046 causes the conduit member 1012 and needle member 1022 to displace from the first tilt position 1040 to the second tilt position 1042. The base member 1046 may be disposed at or adjacent to the second end 1018 of the conduit member 1012. For example, the base member 1046 may be (and/or have the shape of) a cylindrical flange 1072 coupled to the second end 1018 of the conduit member 1012. The cylindrical flange 1072 may extend longitudinally along the conduit axis 1014 from the fourth intermediate point 1064 to the second end 1018 of the conduit member 1012. The cylindrical flange may have a diameter that is greater (e.g., between two and six times greater) than the diameter of one or both of the first collar portion 1054 and the second collar portion 1062. The cylindrical flange 1072 may have an outer surface 1074 that is symmetrical about the conduit axis 1014. The cylindrical flange 1072 may have a top surface 1075 that may extend normal or substantially normal (e.g., forming a relative angle between 90 degrees and 85 degrees) to the conduit axis 1014, and the top surface 1075 may be planar or substantially planar. The cylindrical flange 1072 may additionally have a bottom surface 1076 that may extend normal or substantially normal (e.g., forming a relative angle between 90 degrees and 85 degrees) to the conduit axis 1014 at or adjacent to the second end 1018 of the conduit member 1012, and the bottom surface 1076 may be planar. A fitting recess 1079 may be disposed partially through the cylindrical flange 1072 and may extend upwardly from the bottom surface 1076 at the second end 1018 of the conduit member 1012 towards the first end 1016 of the conduit member 1012. The fitting recess 1079 may be adapted to receive a fitting or coupling (not shown) that is coupled to a tube or reservoir (not shown) that supplies or provides the core stream of cells flowing through the conduit passageway 1020 from the second end 1018 (i.e., the inlet) to (and out of) the first end 1016 of the conduit member 1012.

Figure 1H:
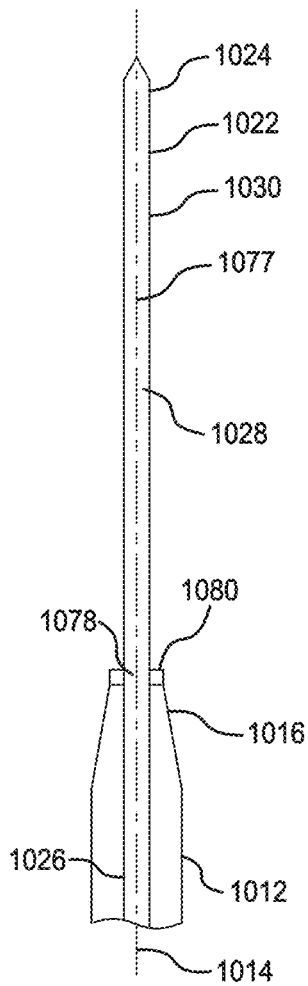
FIG. 1H is a partial cross-sectional view of an embodiment of a conduit member and needle member in the embodiment of the adjustable flow assembly of FIG. 1F.
Figure 1I:
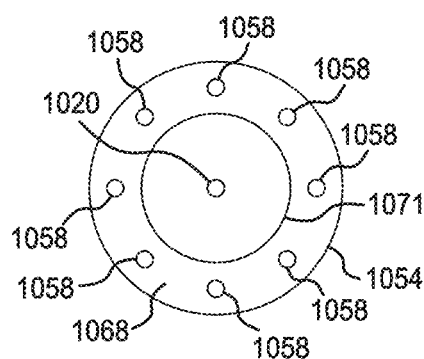
FIG. 1I is a partial cross-sectional view of an embodiment of the conduit member taken along line 1I-1I of FIG. 1F.

Referring to FIGS. 1F and 1H, the adjustable flow assembly 1010 also includes the needle member 1022 extending along the conduit axis 1014, and the needle member 1022 includes the needle passageway 1028 extending from the first end 1024 to the second end 1026 of the needle member 1022 along a needle axis 1077. The needle member 1022 may be cylindrical and may be symmetrical about the needle axis 1077, and the needle axis 1077 may be coaxially aligned with the conduit axis 1014. The needle member 1022 may be coupled to the conduit member 1012 in any manner that allows the core stream of cells flowing upwardly through the conduit passageway 1020 to flow through the needle passageway 1028 from the second end 1026 to (and out of) the first end 1024. Specifically, the needle member 1022 may be coupled to the conduit member 1012 such that an external portion 1030 of the needle member 1022 extends from the first end 1016 of the conduit member 1012. In some embodiments, an intermediate point 1078 of the needle member 1022 may be disposed at or adjacent to the needle axis 1077 between the first end 1024 and the second end 1026, and the external portion 1030 of the needle member 1022 extends from the first end 1024 to the intermediate point 1078 such that the intermediate point 1078 of the needle member 1022 is disposed at or adjacent to the first end 1016 of the conduit member 1012. So disposed, a portion of the needle member 1022 disposed between the second end 1026 and the intermediate point 1078 may be disposed within a portion of the conduit passageway 1020. A seal 1080 may be disposed at or adjacent to the first end 1016 of the conduit member 1012 and/or at or adjacent to the intermediate point 1078 of the needle member 1022 to seal a gap between an exterior surface of the needle member 1022 and an interior surface of the conduit passageway 1022. The seal 1080 may be any suitable material, component, or combination of materials or components, or such as an annular resilient seal (e.g., an o-ring) or a wax, a glue, or hardening seal, for example.

Figure 1J:
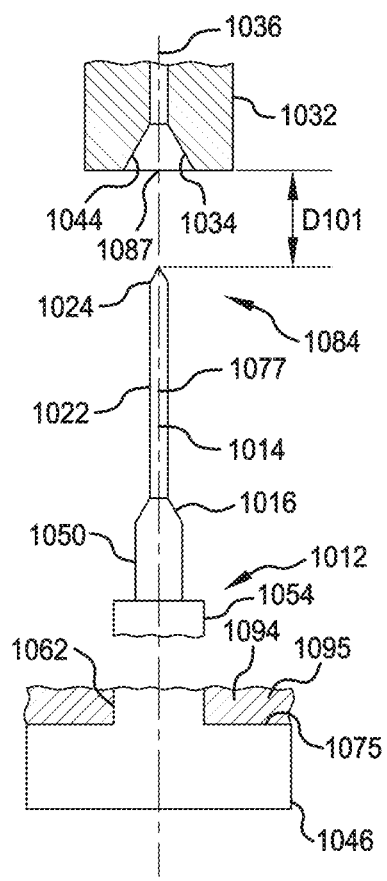
FIG. 1J is a partial cross-sectional view of an embodiment of the conduit member and needle member in a first offset position relative to the tube.
Figure 1K:
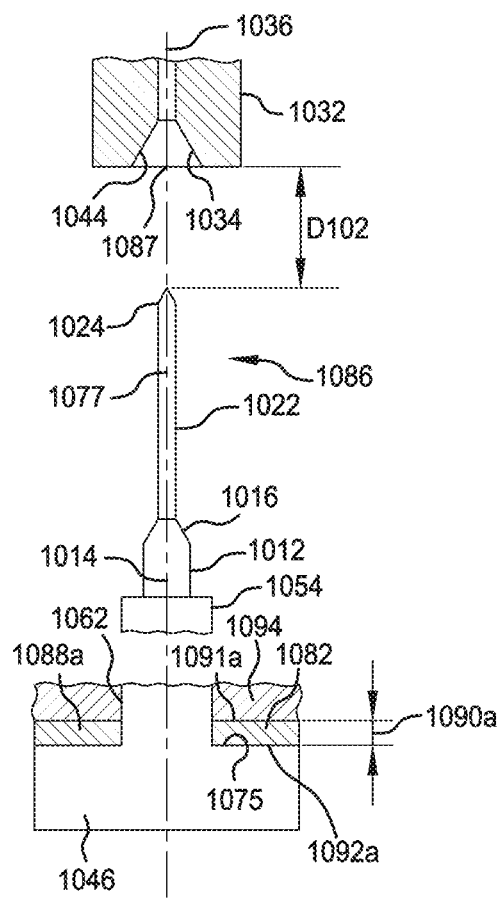
FIG. 1K is a partial cross-sectional view of an embodiment of the conduit member and needle member in a second offset position relative to the tube.

As illustrated in FIG. 1K, the adjustable flow assembly 1010 also includes an offset adjustment assembly 1082 that may be coupled to the conduit member 1012 and the needle member 1022 such that the conduit member 1012 and needle member 1022 are displaceable relative to the tube 1032 adapted to receive the core stream of cells when as the core stream of cells exits the first end 1024 of the needle member 1022. Specifically, the conduit member 1012 and needle member 1022 are displaceable relative to the tube 1032 between a first offset position 1084 (illustrated in FIG. 1J) and a second offset position 1086 (illustrated in FIG. 1K). In the embodiment of FIG. 1K, the offset adjustment assembly 1082 is utilized to displace the conduit member 1012 and needle member 1022 relative to the tube 1032 from the first offset position 1084 to the second offset position 1086.

In the first offset position 1084 of FIG. 1J, the first end 1024 of the needle member 1022 is longitudinally offset a first distance D101 from a reference point 1087 along the tube axis 1036 at the first end 1044 of the tube passageway 1034. So disposed, the top surface 1075 of the base member 1046 may be coupled to (e.g., in contact with or immediately adjacent to a surface of) a structure or surface 1094 fixed or stationary relative to the tube 1032. For example, as illustrated in FIG. 1O, the structure or surface 1094 may be a portion of a body 1095 coupled to the tube 1032, wherein the body 1095 includes an interior cavity 1096 adapted to receive the sheath flow and direct the sheath flow within the tube passageway 1034 in a manner that will be described in more detail below.

In the second offset position 1086 illustrated in FIG. 1K, the first end 1024 of the needle member 1022 is longitudinally offset a second distance D102 from the reference point 1087 along the tube axis 1036 at the first end 1044 of the tube passageway 1034, and the second distance D102 is greater than the first distance D101. In some embodiments, the needle axis 1077 (and/or the conduit axis 1014) may be coaxially aligned with the tube axis 1036 in the first offset position 1084 and/or the second offset position 1086. However, the needle axis 1077 (and/or the conduit axis 1014) may form the oblique angle θ101 (e.g., a range between 0.10° and 15.00°, or more particularly, a range between 0.10° and 7.00° or between 0.10° and 5.00°) with the tube axis 1036 in the first offset position 1084 and/or the second offset position 1086.

Figure 1L:
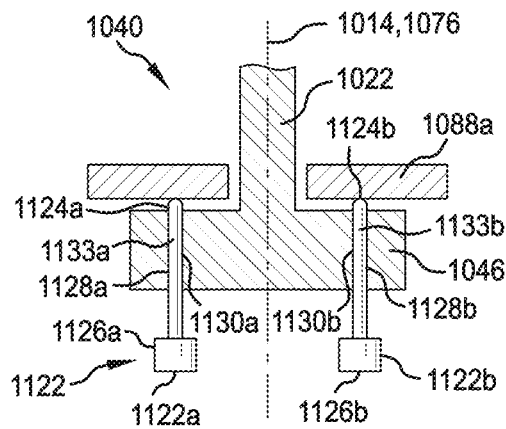
FIG. 1L is a partial cross-sectional view of an embodiment of the conduit member and needle member in a third offset position relative to the tube.
Figure 1M:
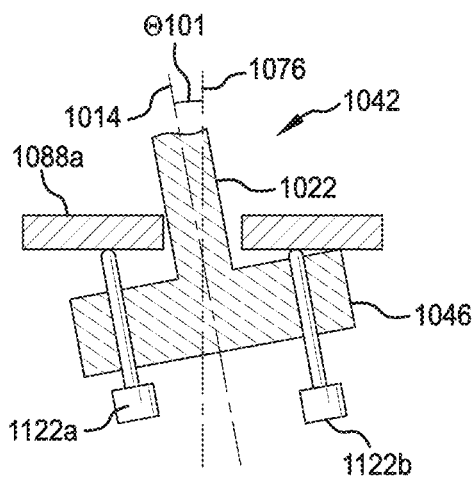
FIG. 1M is a perspective view of an embodiment of a first offset member.

In the second offset position 1086 illustrated in FIG. 1K, the offset adjustment assembly 1082 may include or comprise a first insert member 1088a. The first insert member 1088a may be a disk (as illustrated in FIG. 1M) having a central bore with a diameter slightly greater than the diameter of the second collar portion 1062 (and greater than the diameter of the first collar portion 1054). The first insert member 1088a may have a cylindrical shape. Specifically, the first insert member 1088a may have an outer surface 1089a that is symmetrical about an insert axis 1093a that may be coaxially aligned with the conduit axis 1014 when coupled to the conduit member 1012. The first insert member 1088a may have a top surface 1091a that may extend normal or substantially normal to the conduit axis 1014 and/or insert axis 1093a, and the top surface 1091a may be planar or substantially planar. The first insert member 1088a may additionally have a bottom surface 1092a that may extend normal or substantially normal to the conduit axis 1014 and/or the insert axis 93a, and the bottom surface 1092a may be planar or substantially planar. Referring to FIG. 1K, the first insert member 1088a may have a first longitudinal thickness 1090a that may be equal to the difference between the second distance D102 and the first distance D101. In addition, the bottom surface 1092a may be adapted to be in contact with or immediately adjacent to the top surface 1075 of the base member 1046. The top surface 1091a may be adapted to be coupled to (e.g., in contact with or immediately adjacent to a surface of) the structure or surface 1094 that may be a portion of a body 1095.

Figure 1N:
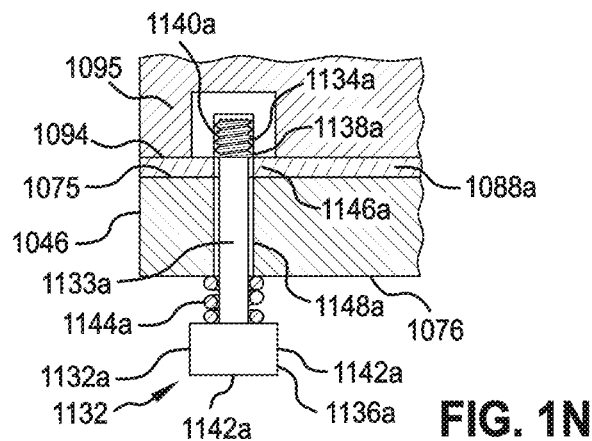
FIG. 1N is a perspective view of an embodiment of a second offset member.
Figure 10:
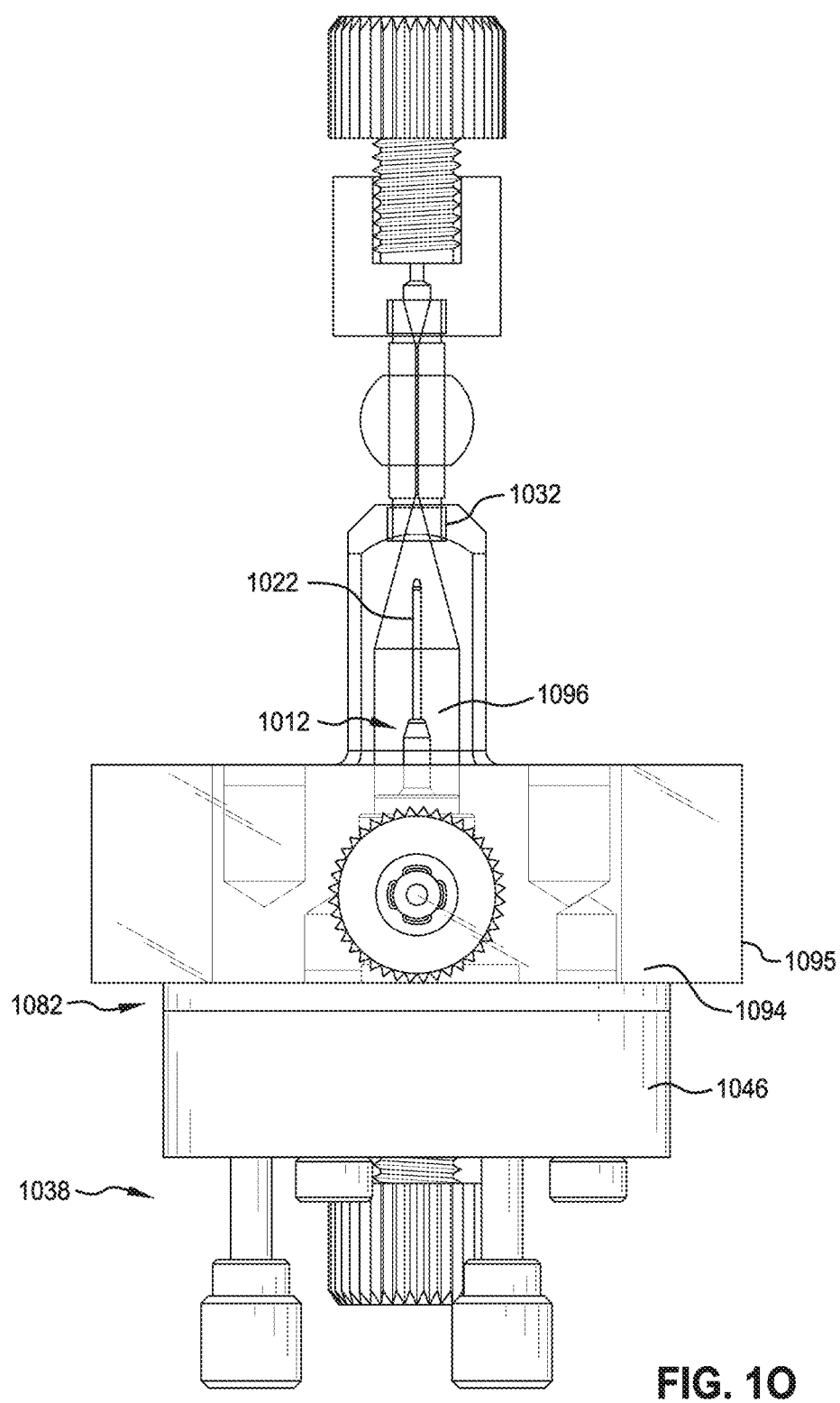

Any number of additional offset positions is also possible. For example, in a third offset position 1098 illustrated in FIG. 1L, the first end 1024 of the needle member 1022 is longitudinally offset a third distance D103 from the reference point 1087 along the tube axis 1036 at the first end 1044 of the tube passageway 1034, and the third distance D103 is greater than the first distance D101 and the second distance D102. In the third offset position 1098, the offset adjustment assembly 1082 may include or comprise a second insert member 1088b (or second insert member 1088b and a first insert member 1088a). The second insert member 1088b may be a disk having a central bore with a diameter slightly greater than the diameter of the second collar portion 1062 (and greater than the diameter of the first collar portion 1054). As illustrated in FIG. 1N, the second insert member 1088b may have a cylindrical shape, and the second insert member 1088b may have an outer surface 1089b that is symmetrical about an insert axis 1093b that may be coaxially aligned with the conduit axis 1014 when coupled to the conduit member 1012. The second insert member 1088b may have a top surface 1091b that may extend normal or substantially normal to the conduit axis 1014 and/or insert axis 1093b, and the top surface 1091b may be planar or substantially planar. The second insert member 1088b may additionally have a bottom surface 1092b that may extend normal or substantially normal to the conduit axis 1014 and/or the insert axis 1093ab, and the bottom surface 1092b may be planar or substantially planar. As illustrated in FIG. 1L, the second insert member 1088b may have a second longitudinal thickness 1090b that may be greater than the first longitudinal thickness 1090a, and the second longitudinal thickness 1090a may be the difference between the third distance D103 and the first distance D101. The bottom surface 1092b may be adapted to be in contact with or immediately adjacent to the top surface 1075 of the base member 1046. The top surface 1091b may be adapted to be coupled to (e.g., in contact with or immediately adjacent to a surface of) the structure or surface 1094 that may be a portion of a body 1095 (as illustrated in FIG. 1O). The second insert member 1088b (and/or the first insert member 1088a) may comprise a single, unitary part or may be made up of or comprise multiple component parts (e.g., multiple, stacked thin disks).

As illustrated in FIG. 1O, the adjustable flow assembly 1010 also includes the tilt adjustment assembly 1038 such that the conduit member 1012 and the needle member 1022 are displaceable relative to the tube 1032 between the first tilt position 1040 (illustrated in FIG. 1F), in which the conduit axis 1014 is coaxially aligned with the tube axis 1036, and the second tilt position 1042 (illustrated in FIG. 1G, which is exaggerated for clarity), in which the conduit axis 1014 forms the oblique angle θ101 with the tube axis 1036.

Figure 1P:
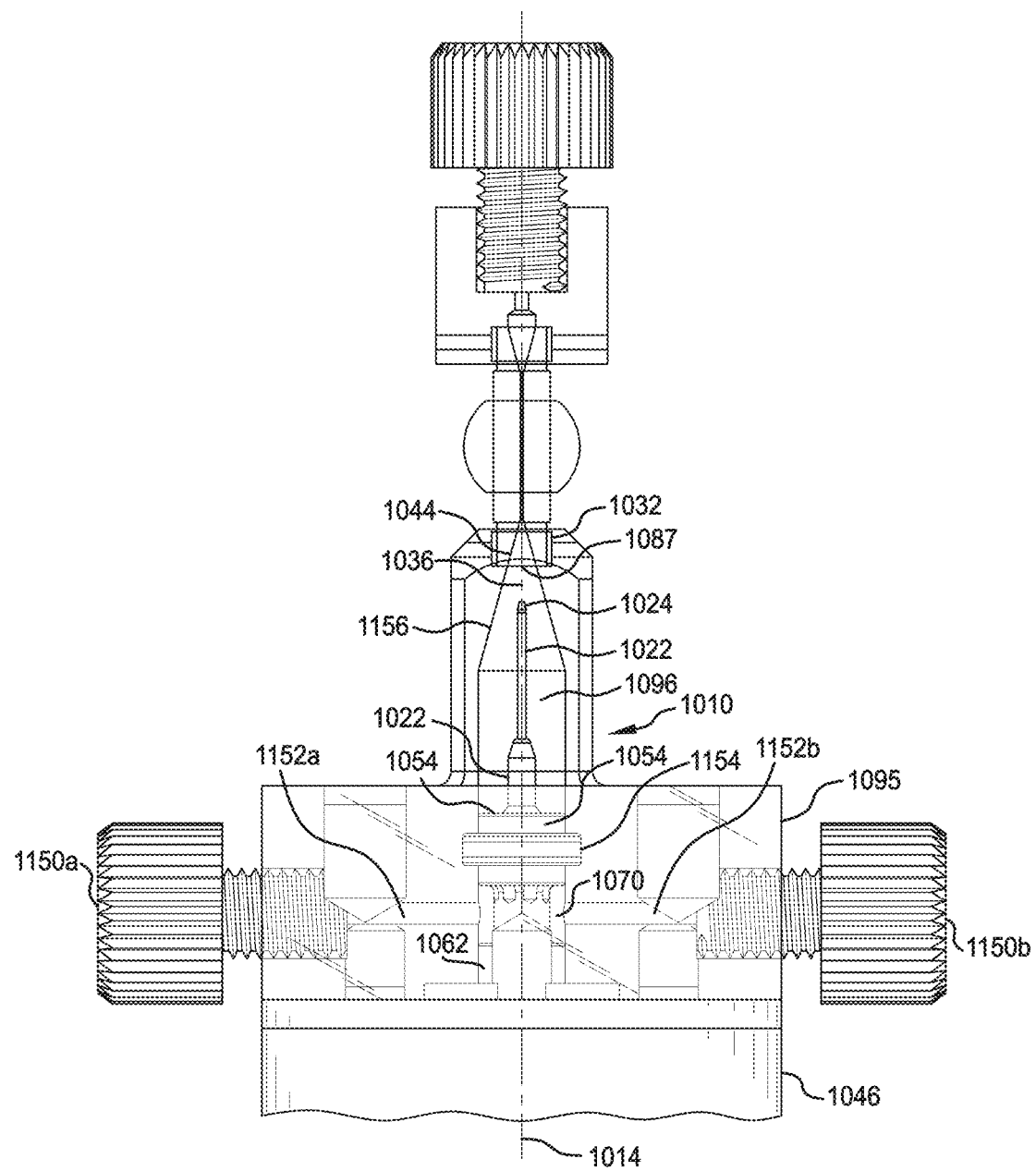
FIG. 1P is a front view of an embodiment of an adjustable flow assembly for use in performing flow cytometric sorting of cells.
Figure 1Q:
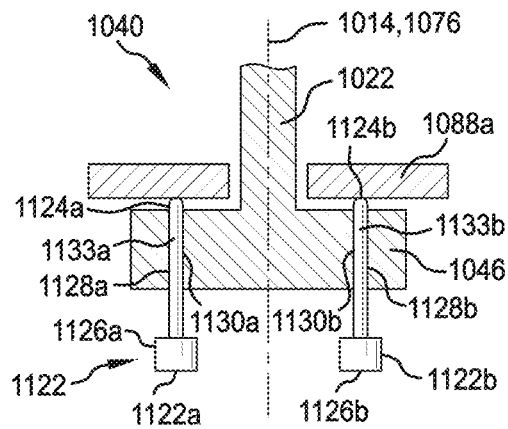
FIG. 1Q is a partial cross-sectional view of an embodiment of the conduit member and needle member in a first tilt position relative to the tube.
Figure 1R:
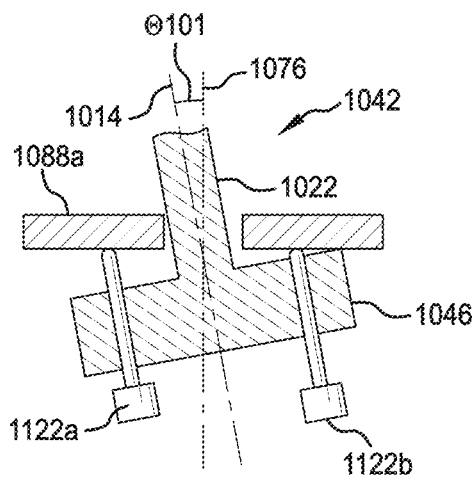
FIG. 1R is a partial cross-sectional view of an embodiment of the conduit member and needle member in a second tilt position relative to the tube.

As illustrated in FIG. 1Q, the tilt adjustment assembly 1038 may include one or more adjustment members 1122 movably coupled to the base member 1046 such that displacement of the one or more adjustment members 1122 (for example, two, three, four, or more adjustment members 1122) relative to the base member 1046 causes the conduit member 1022 and needle member 1012 to displace from the first tilt position 1040 (illustrated in FIG. 1Q) to the second tilt position 1042 (illustrated in FIG. 1R, with the angle of tilt θ101 exaggerated for clarity).

As illustrated in FIG. 1Q, the tilt adjustment assembly 1038 may include a first adjustment member 1122a and a second adjustment member 1122b, and each of the first adjustment member 1122a and a second adjustment member 1122b may be elongated and may extend from a first end 1124a, 1124b to a second end 1126a, 1126b, respectively. Each of the first adjustment member 1122a and the second adjustment member 1122b may have a threaded portion 1128a, 1128b disposed between the first end first end 1124a, 1124b and the second end 1126a, 1126b, and the threaded portion 1128a, 1128b may threadedly engage a corresponding threaded bore 1130a, 1130b formed through the base portion 1046 such that a rotation of the first adjustment member 1122a and/or the second adjustment member 1122b about an axis of the threaded bore 1130a, 1130b results in a corresponding displacement of the first adjustment member 1122a and/or the second adjustment member 1122b relative to the base member 1046. The first adjustment member 1122a and a second adjustment member 1122b may be rotated in any suitable manner. In some embodiments, the first adjustment member 1122a and a second adjustment member 1122b may be rotated by an automated driver (not shown) in communication with a computer or user interface (not shown). In other embodiments, the second end 1126a, 1126b of each of the first adjustment member 1122a and a second adjustment member 1122b may have a head portion that may be adapted to be manually rotated using a tool, such as a screwdriver or hex wrench.

As illustrated in FIG. 1Q, the first end 1124a, 1124b of each of the first adjustment member 1122a and a second adjustment member 1122b may be adapted to contact a portion of the bottom surface 1092a of the first insert member 1088a (or a portion of the bottom surface 1092b of the second insert member 1088b illustrated in FIG. 1K), which is fixed relative to the tube 1032. In some embodiments, the first end 1124*a*, 1124*b* of each of the first adjustment member 1122*a* and a second adjustment member 1122*b* may be adapted to contact the structure or surface 1094 (illustrated in FIG. 1O) that may be a portion of the body 1095 coupled to the tube 1032. Accordingly, when the first adjustment member 1122*a* and/or the second adjustment member 1122*b* is rotated about the axis of the threaded bore 1130*a*, 1130*b* such that the first adjustment member 1122*a* and/or the second adjustment member 1122*b* translates towards the first insert member 1088*a* (or second insert member 1088*b*) and engages the portion of the bottom surface 1092*a*, 1092*b* of the first or second insert member 1088*a*, 1088*b* (or the structure or surface 1094 of FIG. 1O), further displacement of the first adjustment member 1122*a* and/or the second adjustment member 1122*b* towards the fixed first insert member 1088*a* (or second insert member 1088*b*) will displace the base member 1046 and the conduit member 1012/needle member 1012.

In some embodiments, three adjustment members 1122 (the first adjustment member 1122*a*, the second adjustment member 1122*b*, and a third adjustment member 1122*c*) may be used, and the first adjustment member 1122*a*, the second adjustment member 1122*b*, and the third adjustment member 1122*c* may be radially arrayed (e.g., uniformly radially arrayed) about the conduit axis 1014. The third adjustment member 1122*c* may be identical in form and function to the first adjustment member 1122*a* and the second adjustment member 1122*b*.

Figure 1S:
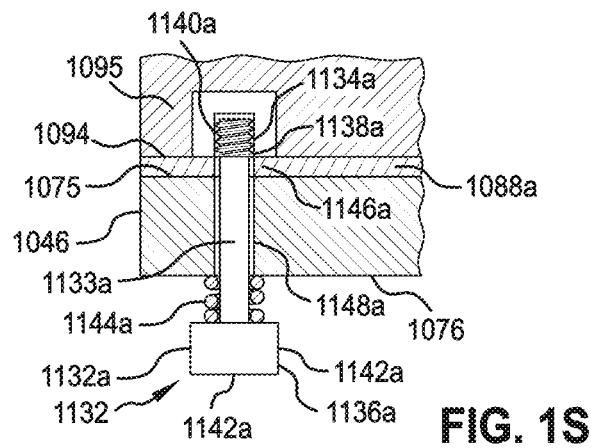
FIG. 1S is a partial cross-sectional view of an embodiment of a biasing assembly of a tilt adjustment assembly.

As illustrated in FIG. 1S, one or more biasing assemblies 1132 may be used to bias the top surface 1075 of the base member 1046 towards the first insert member 1088*a* (or second insert member 1088*b*) and/or the body 1095. Specifically, one or more biasing assemblies 1132, such as a first biasing assembly 1132*a*, may have a shaft 1133*a* that may be elongated and may extend from a first end 1134*a* to a second end 1136*a*. A threaded portion 1138*a* may be disposed adjacent to the first end 1134*a*, and the threaded portion 1133*a* may threadedly engage a corresponding threaded bore 1140*a* formed in the body 1095 (or in an insert disposed in a cavity or bore of the body 1095). The second end 1136*a* of the shaft 1133*a* may have an enlarged head portion 1142*a* that extends beyond the bottom surface 1076 of the base member 1046. The shaft 1133*a* may extend through a bore 1146*a* in the first insert member 1088*a* and/or through a bore 1148*a* through the base member 1046, and each of the bores 1146*a*, 1148*a* may have a diameter greater than a diameter of the shaft 1133*a* to allow the shaft 1133*a* to move within the bores 1146*a*, 1148*a* when the conduit member 1012 displaces from the first tilt position 1040 (illustrated in FIG. 1F) to the second tilt position 1042 (illustrated in FIG. 1G) or any further tilt position. A biasing member 1144*a*, such as a coil spring, may be disposed around the shaft 1133*a* between the head portion 1142*a* and the bottom surface 1076 of the base member 1046, and the biasing member 1144*a* may provide a force that biases the base member 1046 towards the tube 1032 and/or the first insert member 1088*a* and/or the body 1095. So positioned, the biasing member 1144*a* may also bias the first end 1124*a*, 1124*b* of the first and/or second adjustment member 1122*a*, 1122*b* into contact or engagement with the bottom surface 1092*a*, 1092*b* of the first or second insert member 1088*a*, 1088*b* (or the structure or surface 1094 of the body 1095).

The skilled person would recognize that the biasing member 1144*a* may also be disposed at any suitable location at or near the shaft 1133*a* to bias the base member 1046 towards the tube 1032 and/or the first insert member 1088*a* and/or the body 195. For example, the biasing member 1144*a* may be disposed at or adjacent to the first end 1134*a* and the second end 1136*a* may be fixed or in contact with the bottom surface 1076 of the base member 146.

In some embodiments, three biasing assemblies 1132 (the first biasing assembly 1132*a*, a second biasing assembly (not shown), and a third biasing assembly (not shown)) may be used, and the first biasing assembly 1132*a*, the second biasing assembly 1132*b*, and the third biasing assembly 1132*c* may be radially arrayed (e.g., uniformly radially arrayed) about the conduit axis 1014. The second biasing assembly 1132*b* and third biasing assembly 1132*c* may be identical in form and function to the first biasing assembly 1132*a*.

In use, as illustrated in FIG. 1P, the adjustable flow assembly 1010 may be disposed such that the first end 1024 of the needle member 1022 of the adjustable flow assembly 1010 is longitudinally offset from the reference point 1087 along the tube axis 1036 at the first end 1044 of the tube passageway 1034 of the tube 1032. Sheath fluid may be introduced via sheath inlets 1150*a*, 1150*b* through a corresponding sheath passageway 1152*a*, 1152*b* that each terminates in the recess 1070 defined between the first collar portion 1054 and the second collar portion 1062. Sheath fluid in the recess 1070 flows upwardly through the one or more sheath passageways 1058 extending longitudinally through the first collar portion 1054 and into the interior cavity 1096. Once within the interior cavity 1096, the sheath fluid is smoothly directed by a frustoconical or contoured surface 1156 into the tube passageway 1034, where the sheath flow surrounds the core stream of cells exiting the first end 1024 of the needle member 1022. A seal 1154 may be disposed around first collar portion 1054 to prevent sheath fluid from flowing through a gap between the outside surface of the first collar portion 1054 and a surface of the body 1095.

With reference to FIG. 1F, if it is desired to reposition the first end 1024 of the needle member 1022 relative to the tube 1032 to direct the core stream of cells exiting the first end 1024 of the needle member 1022 within the tube passageway 1034, the first adjustment member 1122*a* (illustrated in FIG. 1Q) may be upwardly displaced (i.e., towards the first end 1016 of the conduit member 1012) as previously described relative to the base member 1046, thereby displacing the conduit member 1012 and the needle member 1022 relative to the tube 1032 between the first tilt position 1040 of FIG. 1F, in which the conduit axis 1014 is coaxially aligned with the tube axis 1036 and the second tilt position 1042 illustrated in FIG. 1G, in which the conduit axis 1014 forms the oblique angle θ101 with the tube axis 1036. In some embodiments, the conduit member 1012 and the needle member 1022 may be displaced relative to the tube 1032 between the first tilt position 1040, in which the conduit axis 1014 is forms a first oblique angle θ101 with the tube axis 1036, and the second tilt position 1042, in which the conduit axis 1014 is coaxially aligned with the tube axis 1036. In other embodiments, the conduit member 1012 and the needle member 1022 may be displaced relative to the tube 1032 between the second tilt position 1042, in which the conduit axis 1014 is forms the first oblique angle θ101 with the tube axis 1036, and a third tilt position 1049, in which the conduit axis 1014 forms a second oblique angle θ102 (illustrated in FIG. 1T) with the tube axis 1032, and wherein the first oblique angle θ101 is different than the second oblique angle θ102. To more accurately fine tune the position of the core stream of cells, the second adjustment member 1122*b* and or third adjustment member 1122*c* may be independently positioned (instead of or in conjunction with the first adjustment member 1122*a*) in the manner previously described.

With reference to FIG. 1K, to further reposition the first end 1024 of the needle member 1022 relative to the tube 1032 to direct the core stream of cells exiting the first end 1024 of the needle member 1022 within the tube passageway 1034, the offset adjustment assembly 1082 may displace the conduit member 1012 and needle member 1022 relative to the tube 1032 along the conduit axis 1014 and/or tube axis 1036. Specifically, to longitudinally displace the first end 1024 of the needle member 1022 relative to the tube 1032 between the first offset position 1084 (illustrated in FIG. 1J) and the second offset position 1086 (illustrated in FIG. 1K), the first offset member 1088*a* may be inserted over the conduit member 1012 so the bottom surface 1092*a* of the first insert member 1088*a* is in contact with or immediately adjacent to the top surface 1075 of the base member 1046. So positioned, the first end 1024 of the needle member 1022 is longitudinally displaced a distance equal the longitudinal thickness 1090*a* of the first offset member 1088*a* away from the reference point 1087 along the tube axis 1036 at the first end 1044 of the tube passageway 1034. Additional or alternative offset members 1088 (such as a second offset member 1088*b* having a longitudinal thickness 1090*b*) may be used as desired. So configured, the first end 1024 of the needle member 1022 is adjustable relative to the tube 1032 both longitudinally and angularly, allowing the core stream of cells to be precisely positioned within the tube passageway 1034 as the core stream of cells exits the first end 1024 of the needle member 1022.

It should be well understood in view of the foregoing description that three or more adjustment members 1122 are desirable such that the angle of the needle member 1022 with respect to the tube axis 1036 is adjustable in three dimensions. Alternatively, two adjustment members 1122 adjusting in orthogonal axes would be sufficient to perform three-dimensional adjustments of the needle member 1022 with respect to the tube axis 1036. Additional adjustment members 1122 may be provided if finer adjustability is desired.

Additionally, in any of the embodiments described above, the adjustment members 1122 may be mechanically coupled in any known way to one or more motors or drivers (not shown) operable to rotate the adjustment members 1122 (or otherwise adjust the adjustment members 1122 if not actuated by rotational movement). The motors or drivers—one for each of the adjustment members 1122—may be controlled by a controller operating according to a control routine as should be readily appreciated. The control routine may operate according to a control algorithm that has, as one input, a feedback signal. The feedback signal may be, for example, a detector signal providing an indication or measurement of an optical signal strength of a signal received from the analyte. The control algorithm may control the motors or drivers to adjust the adjustment members 1122 to maximize the feedback signal (e.g., the detector signal), indicating that the position of the core stream is aligned with the focal volume of the optics. In some embodiments having two adjustment members adjusting in orthogonal directions, the control algorithm may simply cause the motors or drivers to adjust the adjustment members in a manner that "scans" the axes and "peaks" (i.e., maximizes or otherwise optimizes) the signal.

Alternatively, the feedback signal may be two, three, or more detector signals providing respective indications or measurements of the optical signal strength of a signal received from the analyte at respective angles relative to the tube axis. By analyzing the multiple signals, the control algorithm may determine the optimal adjustment position of the core stream and may control the motors or drivers to adjust the adjustment members 1122 accordingly.

As another alternative, the system may measure a coefficient of variation (CV) value associated with the measurements of the analytes passing through the interrogation region and being analyzed by an analysis system receiving signals via the optics. CV is generally understood as a standardized measure of dispersion of a probability distribution or frequency distribution, and is defined as the ratio of the standard deviation to the mean. The control algorithm may control the motors or drivers to adjust the adjustment mechanism in a manner that minimizes the CV.

The assembly 1010 may employ or be employed in any suitable flow cell configuration including those disclosed throughout this specification.

While various embodiments have been described above, this disclosure is not intended to be limited thereto. Variations can be made to the disclosed embodiments that are still within the scope of the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. An adjustable flow assembly for use in positioning a stream of analytes, the adjustable flow assembly comprising: an elongated conduit member extending along a conduit axis from a first end to a second end, the conduit member including a conduit passageway extending from the first end to the second end, a needle member extending along the conduit axis from a first end to a second end, the needle member including a needle passageway extending from the first end to the second end of the needle member, the needle member being coupled to the conduit member such that an external portion of the needle member extends from the first end of the conduit member, the conduit passageway and the needle passageway being adapted to receive the stream of analytes, and the first end of the needle member being longitudinally offset from a tube having a tube passageway adapted to receive the stream of analytes as the stream of analytes exits the first end of the needle member, and wherein the tube passageway extends along a tube axis, a tilt adjustment assembly coupled to the conduit member and the needle member such that the conduit member and the needle member are displaceable relative to the tube between a first tilt position, in which the conduit axis is coaxially aligned with the tube axis, and a second tilt position, in which the conduit axis forms an oblique angle with the tube axis.

2. The adjustable flow assembly of aspect 1, further comprising: a base member secured to the conduit member, wherein the tilt adjustment assembly includes one or more adjustment members movably coupled to the base member such that displacement of the one or more adjustment members relative to the base member causes the conduit member and needle member to displace from the first tilt position to the second tilt position.

3. The adjustable flow assembly of either aspect 1 or 2, further comprising: an offset adjustment assembly coupled to the conduit member and needle member such that the conduit member and needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

4. The adjustable flow assembly of any one of aspects 1 to 3, wherein in the first offset position, the conduit axis is coaxially aligned with the tube axis, and in the second offset position, the conduit axis is coaxially aligned with the tube axis.

5. The adjustable flow assembly of any one of aspects 1 to 4, further comprising: a base member secured to the conduit member, wherein the offset adjustment assembly includes a first insert member non-movably coupled to the base member, the first insert member having a longitudinal height equal to the difference between the first distance and the second distance, wherein when the first insert member is coupled to the base member, the first end of the needle member is longitudinally offset the second distance from the portion of the tube.

6. The adjustable flow assembly of any one of aspects 1 to 5, wherein the offset adjustment assembly includes a second insert member non-movably coupled to the base member, the second insert member having a longitudinal height equal to the difference between the first distance and a third distance, wherein when the second insert member is coupled to the base member, the first end of the needle member is longitudinally offset the third distance from the portion of the tube.

7. The adjustable flow assembly of any one of aspects 1 to 6, wherein the first insert member has a cylindrical shape having a planar top surface that is longitudinally-offset from a planar bottom surface by the longitudinal height of the first insert member.

8. The adjustable flow assembly of any one of aspects 1 to 7, wherein an intermediate point of the needle member is disposed between the first end and the second end of the needle member, and wherein the external portion of the needle member extends from the first end to the intermediate portion such that the intermediate point of the needle member is disposed adjacent to the first end of the conduit member.

9. The adjustable flow assembly of any one of aspects 1 to 8, wherein the base member is a cylindrical flange coupled to the second end of the conduit member.

10. The adjustable flow assembly of any one of aspects 1 to 9, wherein the one or more adjustment members is a threaded member.

11. The adjustable flow assembly of any one of aspects 1 to 10, wherein the threaded member engages a threaded bore formed through the base member such that the threaded member is movably coupled to the base member.

12. The adjustable flow assembly of any one of aspects 1 to 11, wherein the one or more adjustment members includes two or more adjustment members, wherein each of the two adjustment members is a threaded member, and wherein each of the threaded members engages a threaded bore formed through the base member such that the threaded member is movably coupled to the base member.

13. The adjustable flow assembly of any one of aspects 1 to 12, wherein the threaded member extends in a direction parallel to the conduit axis.

14. The adjustable flow assembly of any one of aspects 1 to 13, wherein the oblique angle is between 0.5° and 10°.

15. The adjustable flow assembly of any one of aspects 1 to 14, wherein the base member is integrally formed with the conduit member.

16. An adjustable flow assembly for use in positioning a stream of analytes, the adjustable flow assembly comprising: an elongated conduit member extending along a conduit axis from a first end to a second end, the conduit member including a conduit passageway extending from the first end to the second end, a needle member extending along the conduit axis from a first end to a second end, the needle member including a needle passageway extending from the first end to the second end of the needle member, the needle member being coupled to the conduit member such that an external portion of the needle member extends from the first end of the conduit member, the conduit passageway and the needle passageway being adapted to receive the stream of analytes, and the first end of the needle member being longitudinally offset from a tube having a tube passageway adapted to receive the stream of analytes as the stream of analytes exits the first end of the needle member, and wherein the tube passageway extends along a tube axis; an offset adjustment assembly coupled to the conduit member and needle member such that the conduit member and needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

17. The adjustable flow assembly of aspect 16, wherein in the first offset position, the conduit axis is coaxially aligned with the tube axis, and in the second offset position, the conduit axis is coaxially aligned with the tube axis.

18. The adjustable flow assembly of either aspect 16 or 17, further comprising: a base member secured to the conduit member, wherein the offset adjustment assembly includes a first insert member non-movably coupled to the base member, the first insert member having a longitudinal height equal to the difference between the first distance and the second distance, wherein when the first insert member is coupled to the base member, the first end of the needle member is longitudinally offset the second distance from the portion of the tube.

19. The adjustable flow assembly of any one of aspects 16 to 18, wherein the offset adjustment assembly includes a second insert member non-movably coupled to the base member, the second insert member having a longitudinal height equal to the difference between the first distance and a third distance, wherein when the second insert member is coupled to the base member, the first end of the needle member is longitudinally offset the third distance from the portion of the tube.

20. The adjustable flow assembly of any one of aspects 16 to 19, wherein the first insert member has a cylindrical shape having a planar top surface that is longitudinally-offset from a planar bottom surface by the longitudinal height of the first insert member.

21. The adjustable flow assembly of any one of aspects 16 to 20, wherein an intermediate point of the needle member is disposed between the first end and the second end of the needle member, and wherein the external portion of the needle member extends from the first end to the intermediate portion such that the intermediate point of the needle member is disposed adjacent to the first end of the conduit member.

22. The adjustable flow assembly of any one of aspects 16 to 21, wherein the base member is a cylindrical flange coupled to the second end of the conduit member.

23. The adjustable flow assembly of any one of aspects 16 to 22, wherein the base member is integrally formed with the conduit member.

24. A system for use in flow cytometry, the system comprising: a tube having a tube passageway adapted to receive a stream of analytes, the tube passageway extending along a tube axis; and an adjustable flow assembly for use in positioning the stream of analytes within the tube passageway, the adjustable flow assembly comprising: an elongated conduit member extending along a conduit axis from a first end to a second end, the conduit member including a conduit passageway extending from the first end to the second end, a needle member extending along the conduit axis from a first end to a second end, the needle member including a needle passageway extending from the first end to the second end of the needle member, the needle member being coupled to the conduit member such that an external portion of the needle member extends from the first end of the conduit member, the conduit passageway and the needle passageway being adapted to receive the stream of analytes, and the first end of the needle member being longitudinally offset from the tube having the tube passageway adapted to receive the stream of analytes as the stream of analytes exits the first end of the needle member; and a tilt adjustment assembly coupled to the conduit member and the needle member such that the conduit member and the needle member are displaceable relative to the tube between a first tilt position, in which the conduit axis is coaxially aligned with the tube axis, and a second tilt position, in which the conduit axis forms an oblique angle with the tube axis.

25. The system of aspect 24, further comprising: a base member secured to the conduit member, wherein the tilt adjustment assembly includes one or more adjustment members movably coupled to the base member such that displacement of the one or more adjustment members relative to the base member causes the conduit member and needle member to displace from the first tilt position to the second tilt position.

26. The system of either aspect 24 or 25, further comprising: an offset adjustment assembly coupled to the conduit member and needle member such that the conduit member and needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

27. The system of any one of aspects 24 to 26, wherein in the first offset position, the conduit axis is coaxially aligned with the tube axis, and in the second offset position, the conduit axis is coaxially aligned with the tube axis.

28. The system of any one of aspects 24 to 27, further comprising: a base member secured to the conduit member, wherein the offset adjustment assembly includes a first insert member non-movably coupled to the base member, the first insert member having a longitudinal height equal to the difference between the first distance and the second distance, wherein when the first insert member is coupled to the base member, the first end of the needle member is longitudinally offset the second distance from the portion of the tube.

29. The system of any one of aspects 24 to 28, wherein the offset adjustment assembly includes a second insert member non-movably coupled to the base member, the second insert member having a longitudinal height equal to the difference between the first distance and a third distance, wherein when the second insert member is coupled to the base member, the first end of the needle member is longitudinally offset the third distance from the portion of the tube.

30. The system of any one of aspects 24 to 29, wherein the first insert member has a cylindrical shape having a planar top surface that is longitudinally-offset from a planar bottom surface by the longitudinal height of the first insert member.

31. The system of any one of aspects 24 to 31, wherein an intermediate point of the needle member is disposed between the first end and the second end of the needle member, and wherein the external portion of the needle member extends from the first end to the intermediate portion such that the intermediate point of the needle member is disposed adjacent to the first end of the conduit member.

32. The system of any one of aspects 24 to 31, wherein the base member is a cylindrical flange coupled to the second end of the conduit member.

33. The system of any one of aspects 24 to 32, wherein the one or more adjustment members is a threaded member.

34. The system of any one of aspects 24 to 33, wherein the threaded member engages a threaded bore formed through the base member such that the threaded member is movably coupled to the base member.

35. The system of any one of aspects 24 to 34, wherein the one or more adjustment members includes two or more adjustment members, wherein each of the two adjustment members is a threaded member, and wherein each of the threaded members engages a threaded bore formed through the base member such that the threaded member is movably coupled to the base member.

36. The system of any one of aspects 24 to 35, wherein the threaded member extends in a direction parallel to the conduit axis.

37. The system of any one of aspects 24 to 36, wherein the oblique angle is between 0.5° and 10°.

38. The system of any one of aspects 24 to 37, wherein the base member is integrally formed with the conduit member.

39. A system for use in flow cytometry, the system comprising: a tube having a tube passageway adapted to receive a stream of analytes, the tube passageway extending along a tube axis; and an adjustable flow assembly for use in positioning the stream of analytes within the tube passageway, the adjustable flow assembly comprising: an elongated conduit member extending along a conduit axis from a first end to a second end, the conduit member including a conduit passageway extending from the first end to the second end, a needle member extending along the conduit axis from a first end to a second end, the needle member including a needle passageway extending from the first end to the second end of the needle member, the needle member being coupled to the conduit member such that an external portion of the needle member extends from the first end of the conduit member, the conduit passageway and the needle passageway being adapted to receive the stream of analytes, and the first end of the needle member being longitudinally offset from the tube having a tube passageway adapted to receive the core stream of cells as the stream of analytes exits the first end of the needle member; and an offset adjustment assembly coupled to the conduit member and needle member such that the conduit member and needle member are displaceable relative to the tube between a first offset position, in which the first end of the needle member is longitudinally offset a first distance from a portion of the tube, and a second offset position, in which the first end of the needle member is longitudinally offset a second distance from the portion of the tube, wherein the second distance is greater than the first distance.

40. The system of aspect 39, wherein in the first offset position, the conduit axis is coaxially aligned with the tube axis, and in the second offset position, the conduit axis is coaxially aligned with the tube axis.

41. The system of either aspect 39 or 40, further comprising: a base member secured to the conduit member, wherein the offset adjustment assembly includes a first insert member non-movably coupled to the base member, the first insert member having a longitudinal height equal to the difference between the first distance and the second distance, wherein when the first insert member is coupled to the base member, the first end of the needle member is longitudinally offset the second distance from the portion of the tube.

42. The system of any one of aspects 39 to 41, wherein the offset adjustment assembly includes a second insert member non-movably coupled to the base member, the second insert member having a longitudinal height equal to the difference between the first distance and a third distance, wherein when the second insert member is coupled to the base member, the first end of the needle member is longitudinally offset the third distance from the portion of the tube.

43. The system of any one of aspects 39 to 42, wherein the first insert member has a cylindrical shape having a planar top surface that is longitudinally-offset from a planar bottom surface by the longitudinal height of the first insert member.

44. The system of any one of aspects 39 to 43, wherein an intermediate point of the needle member is disposed between the first end and the second end of the needle member, and wherein the external portion of the needle member extends from the first end to the intermediate portion such that the intermediate point of the needle member is disposed adjacent to the first end of the conduit member.

45. The system of any one of aspects 39 to 44, wherein the base member is a cylindrical flange coupled to the second end of the conduit member.

46. The system of any one of aspects 39 to 45, wherein the base member is integrally formed with the conduit member.

47. The adjustable flow assembly of any one of aspects 1 to 46, wherein the stream of analytes is a core stream of cells, and wherein the adjustable flow assembly is adapted for use in performing flow cytometric sorting of the core stream of cells.

48. The adjustable flow assembly of any one of aspects 16 to 47, wherein the stream of analytes is a core stream of cells, and wherein the adjustable flow assembly is adapted for use in performing flow cytometric sorting of the core stream of cells.

49. The system of any one of aspects 24 to 48, wherein the stream of analytes is a core stream of cells, and wherein the system for use in flow cytometry is a system for performing flow cytometric sorting of the core stream of cells.

50. The system of any one of aspects 39 to 49, wherein the stream of analytes is a core stream of cells, and wherein the system for use in flow cytometry is a system for performing flow cytometric sorting of the core stream of cells.

51. The adjustable flow assembly of any one of aspects 1 to 50, wherein the second insert member has a cylindrical shape having a planar top surface that is longitudinally-offset from a planar bottom surface by the longitudinal height of the second insert member.

52. The adjustable flow assembly of any one of aspects 19 to 51, wherein the second insert member has a cylindrical shape having a planar top surface that is longitudinally-offset from a planar bottom surface by the longitudinal height of the second insert member.

53. The system of any one of aspects 24 to 52, wherein the second insert member has a cylindrical shape having a planar top surface that is longitudinally-offset from a planar bottom surface by the longitudinal height of the second insert member.

54. The system of any one of aspects 39 to 53, wherein the second insert member has a cylindrical shape having a planar top surface that is longitudinally-offset from a planar bottom surface by the longitudinal height of the second insert member.

55. The system of any one of aspects 39 to 54, further comprising: one or more drivers operable to cause adjustment of the offset adjustment assembly in response to respective control signals; and a controller providing the respective control signal to each of the one or more drivers according to a control routine.

56. The system of aspect 55, wherein the control routine generates the respective control signals according to a coefficient of variation signal received from an analysis system.

57. The system of aspect 55, wherein the control routine generates the respective control signals according to a detector signal received from an analysis system.

Nozzle with Complex Curvature

Figure 2A:
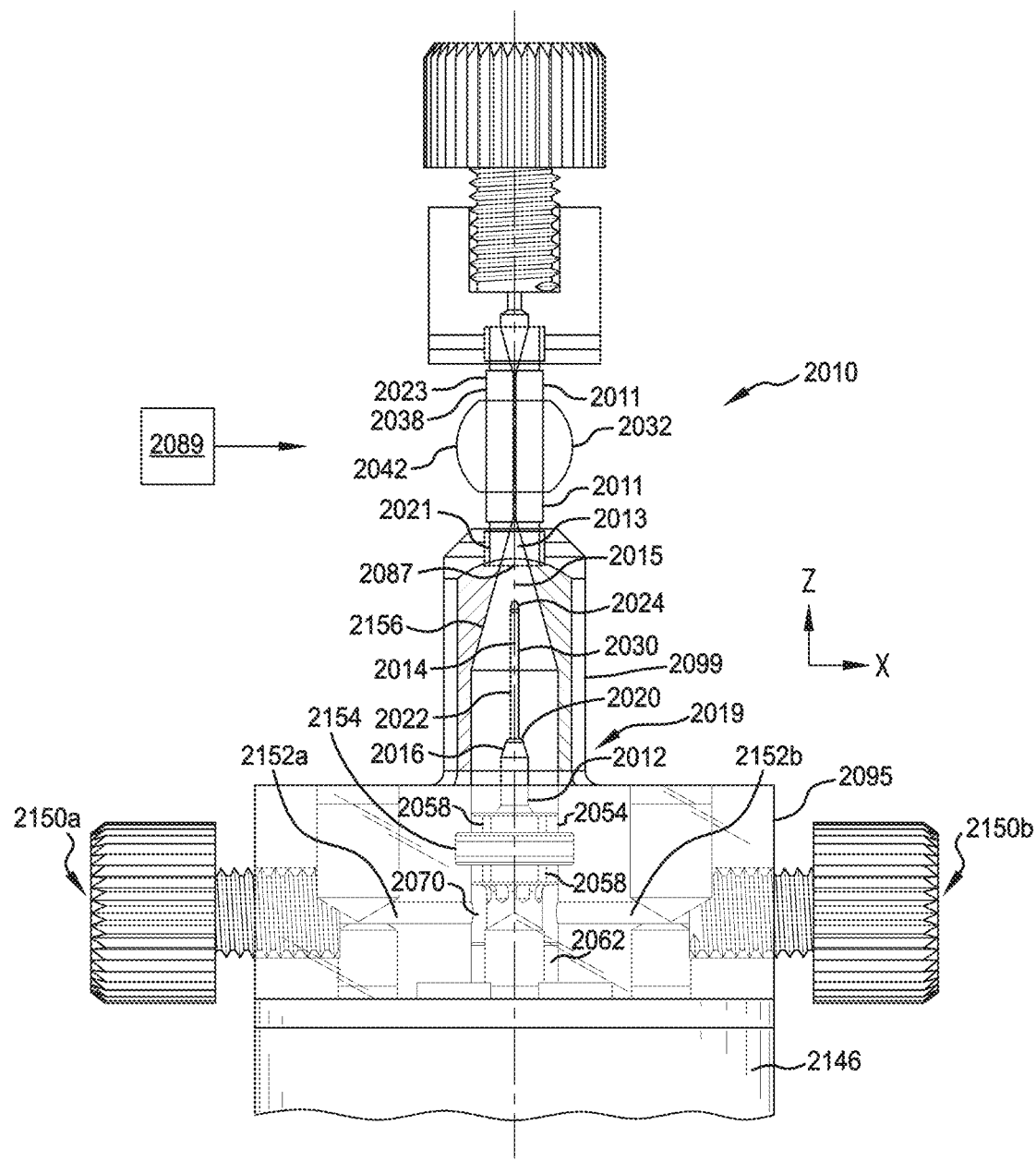
FIG. 2A is a front view of an embodiment of a system for use in performing flow cytometric sorting of cells.

As illustrated in FIG. 2A, a system 2010 for use in flow cytometric applications (e.g., flow cytometry, flow cytometric sorting, etc.) of a stream of analytes (e.g., a stream of cells, such as a stream of non-human sperm cells) includes a tube member 2011 having a tube passageway 2013. The tube member 2011 and tube passageway 2013 include a capillary tube having a very minute or hair-like internal diameter (e.g., less than 1 mm). The tube passageway 2013 may be adapted to receive the stream of analytes and, in embodiments, a sheath flow surrounding the stream, and the tube passageway 2013 may be defined by a passageway surface 2017. The tube passageway 2013 includes a transition portion 2025 and a main portion 2029, and the transition portion has a cross-sectional shape that reduces along a tube axis 2015 to channel the stream of analytes (and the sheath flow, where there is one) into the main portion 2029, which may have a constant diameter. Once within the main portion 2029 of the tube passageway 2013, the stream of analytes may be subjected to flow cytometric processes (e.g., analysis and/or sorting) that will be described in more detail herein. For example, a source 2089 (e.g., a laser) (see FIG. 2A) may generate a light beam that may pass through a lens member 2042 surrounding the tube member 2011 to focus on one of the analytes within the tube passageway 2013 and detect a property of that analyte.

So configured, the system 2010 for use in flow cytometric applications may be adapted to be a portion of a flow cell, and the passageway surface 2017 has a shape (that is, a cross-sectional shape when viewed normal to the tube axis) precisely designed to produce a desired flow characteristic (e.g., to reduce the turbulence energy dissipation rate) in the stream of analytes (e.g., the stream of cells) as the stream of analytes flows through the tube passageway 2013. In many embodiments, the desired flow characteristic includes at least the creation of a core flow surrounded by a sheath flow in such a way that the core is substantially constrained in space and such that the position of the core flow varies only within controlled limits over time. Other flow characteristics that may be produced as a result of the shape of the passageway surface 2017 include, by way of example and not limitation, flow rate, pressure change, pressure gradient over time or distance, acceleration, temperature, temperature change, energy, energy dispersion rate, flow stability, core dimensions, and others. By modeling, calculation, and/or empirical methods, the design of the flow cell can be adapted to improve the characteristics, to produce a flow cell of any desired shape to meet the needs of such a "rational" design approach.

Controlling and/or maintaining the energy dissipation rate of the stream of analytes (which may be surrounded by or mixed with the sheath flow) below a maximum allowable value, for example, reduces turbulence and/or hydrodynamic pressure at or downstream of a first point 2027 and/or a second point 2031 (illustrated in FIG. 2A) of the tube member 2011. This reduced turbulence/hydrodynamic pressure reduces hydrodynamic forces on the analytes comprising the stream of analytes, which in turn may prevent, limit, or reduce damage to the analytes and, in sperm sexing applications, may increase the percentage of desired sells that remain viable, motile, and/or fertile following the sorting procedure. Because the cost of flow cytometric applications (e.g., flow cytometric sorting of analytes) is substantial, preventing damage to the analytes increases the efficiency yield, and profitability of the flow cytometric operation, particularly in applications involving the sex-based sorting of mammalian non-human sperm cells. Though often described in this specification in terms of this objective, through this specification it will come to be recognized that the methods described herein are applicable to achieving many of the potential objectives of precise design of surface geometries in a flow cell.

Figure 2B:
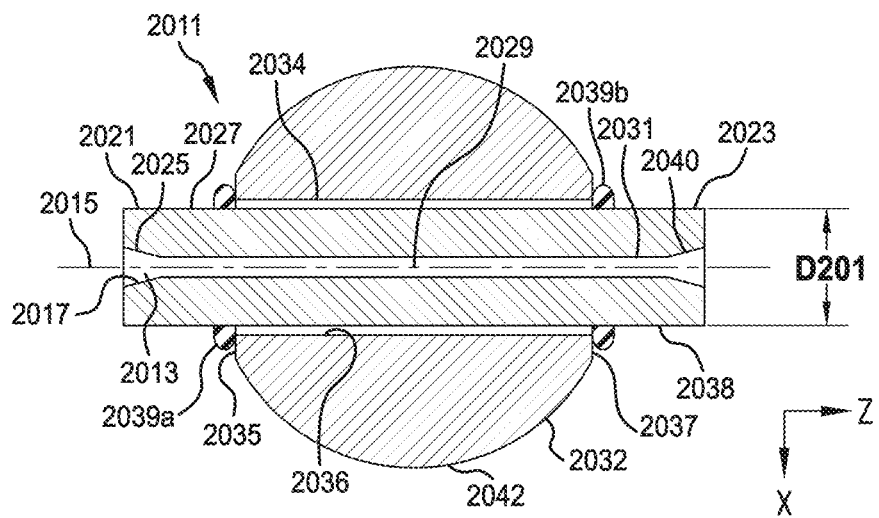
FIG. 2B is a cross-sectional view of an embodiment of a tube member of the embodiment of the system of FIG. 2A.

Turning to the system 2010 in more detail, the tube member 2011 may be elongated and may extend along the tube axis 2015 from the first end 2021 to the second end 2023 of the tube member 2011, as illustrated in FIG. 2A, and the tube member 2011 may have any suitable longitudinal length. As used herein, the term longitudinal refers to a direction along or parallel to the tube axis 2015 and/or the Z-axis of the reference coordinate system of FIG. 2A, and the term radial refers to a direction normal to the tube axis 2015 and/or parallel to the X-axis of the reference coordinate system of FIGS. 2A and 2B. As illustrated in FIG. 2B, the tube member 2011 may include the outer surface 2038, and the outer surface 2038 may have any suitable shape or combination of shapes. For example, all or a portion of the outer surface 2038 may be symmetrical about the tube axis 2015. More specifically, all or a portion of the outer surface 2038 may have circular cross-sectional shape (that may be symmetrical about the tube axis 2015) such that the outer surface 2038 has a cylindrical shape (or a substantially cylindrical shape). In some embodiments, the diameter of the circular cross-sectional shape may be constant from the first end 2021 to the second end 2023 the tube member 2011 such that the outer surface 2038 has a constant diameter D201. However, in other embodiments, the diameter of the circular cross-sectional shape may vary over all or part of the length of the tube axis 2015 from the first end 2021 to the second end 2023 the tube member 2011. In still other embodiments, the tube member 2011 may have an outer surface 2038, and/or and inner surface, that is rectangular (i.e., forming a rectangular prism) and/or may have a cross section that is rectangular.

As illustrated in FIG. 2B, the tube member 2011 includes the passageway surface 2017 disposed radially inward of the outer surface 2038. That is, a first radial distance between the passageway surface 2017 and the tube axis 2015 is less than a second radial distance normal to the tube axis 2015 between the outer surface 2038 and the tube axis 2015. The passageway surface 2017 defines the tube passageway 2013 that extends from the first end 2021 to the second end 2023 of the tube member 2011 in a generally longitudinal direction, and the tube passageway 2013 may be adapted to receive, for example, a stream of the cells to be sorted.

The tube passageway 2013, which includes the transition portion 2025 and the main portion 2029, may have any suitable shape or combination of shapes. As illustrated in FIG. 2B, the transition portion 2025 may have a first shape or combination of shapes and the main portion 2029 may have a second shape or combination of shapes. The transition portion 2025 may extend along the tube axis 2015 between the first end 2021 and the first point 2027 of the tube member 2011 that is offset a longitudinal distance from the first end 2021. The transition portion 2025 may have any suitable normal cross-sectional shape (i.e., a cross-sectional shape as viewed normal to the tube axis 2015) or combination of shapes between the first end 2021 and the first point 2027. For example, as illustrated in FIG. 2B, all or a portion of the transition portion 2025 (or the passageway surface 2017 defining the transition portion 2025 of the tube passageway 2013) may have a circular cross-sectional shape when viewed along the tube axis 2015, and all, none, or a portion of the transition portion 2025 be symmetrical about the tube axis 2015. As illustrated in FIG. 2B, the transition portion 2025 may converge (e.g., gradually converge, continually or discontinuously) from the first end 2021 of the tube member 2011 towards the first point 2027 of the tube member 2011. As such, the transition portion 2025 may have a generally conical or frustoconical shape, may have a curvilinear shape, etc. As previously explained, the shape of the transition portion 2025 (and/or the main portion 2029) is designed to produce a desirable flow characteristic, such as, by way of example, to reduce the energy dissipation rate of the stream of cells as the stream of cells flows through the tube passageway 2013.

To produce the desired properties to the flow of fluids and/or analytes that passes through the tube passageway 2013, for example, to reduce the energy dissipation rate of the stream of cells to a suitable level, or to maintain the energy dissipation rate of the stream of cells below a maximum value, the longitudinal cross-sectional shape (i.e., a cross-section taken an/or viewed normal to the tube axis 2015) of the transition portion 2025 (or the shape of the passageway surface 2017 defining the transition portion 2025) may be precisely determined. For example, the longitudinal cross-sectional shape of the transition portion 2025 may be determined by flow equations or by modeling flow through the tube passageway 2013 (or the transition portion 2025) using computational fluid dynamics ("CFD") methods and/or appropriate software and/or hardware and/or computer devices to simulate, predict, and/or model the properties of fluids and/or cells passing through the passageway. Using CFD software, for example, a first longitudinal cross-sectional shape of the transition portion 2025 may be estimated and may be modeled for use with the CFD software. Flow through the transition portion 2025 (and flow through the main portion 2029, or flow through the entire tube passageway 2013) may then be modeled using the CFD software, and one or more flow parameters (e.g., pressure, fluid temperature, energy dissipation rate) may be determined and analyzed. If one or more of the flow parameters are within a desired range (e.g., the energy dissipation rate is below a maximum value), the first longitudinal cross-sectional shape of the transition portion 2025 may be suitable for the given application. However, if one or more of the flow parameters are outside of a desired range (e.g., the energy dissipation rate is at or above a maximum value), a second longitudinal cross-sectional shape of the transition portion 2025 may be estimated and may be modeled for use with the CFD software. The process may be repeated until a suitable longitudinal cross-sectional shape of the transition portion 2025 is determined.

In some embodiments, all or a portion of the transition portion 2025 may have a linear longitudinal cross-sectional shape when viewed normal to the tube axis 2015 such that the transition portion 2025 has a frustoconical shape. As illustrated in FIG. 2I, all or a portion of the transition portion 2025 may have a non-linear longitudinal cross-sectional shape when viewed normal to the tube axis 2015. For example, as illustrated in FIG. 2I, a portion 2115 (or all) of the non-linear longitudinal cross-sectional shape may be logarithmic In other embodiments, such as that illustrated in FIG. 2J, a portion 2117 (or all) of the non-linear longitudinal cross-sectional shape may be parabolic. As illustrated in FIG. 2K, a first portion 2111 of transition portion 2025 may have a longitudinal non-linear cross-sectional shape when viewed normal to the tube axis 2015, and a second portion 2113 of the transition portion 2025 may have a longitudinal linear cross-sectional shape when viewed normal to the tube axis 2015.

The tube passageway 2013 also includes the main portion 2029 that extends along the tube axis 2015 from the first point 2027 to a second point 2031 of the tube member 2011, and the first point 2027 may be longitudinally offset from the second point 2031 such that the first point 2027 is between the first end 2021 and the second point 2031. The main portion 2029 may have a circular cross-sectional shape between the first point 2027 and the second point 2031, and the circular cross-sectional shape may be constant or substantially constant. The cross-sectional diameter of the main portion 2029 may have any suitable value, such as 1.00 mm to 50 µm (e.g., 200 µm). In some embodiments, the second point 2031 may be at or adjacent to the second end 2023 of the tube member 2011.

Figure 2C:
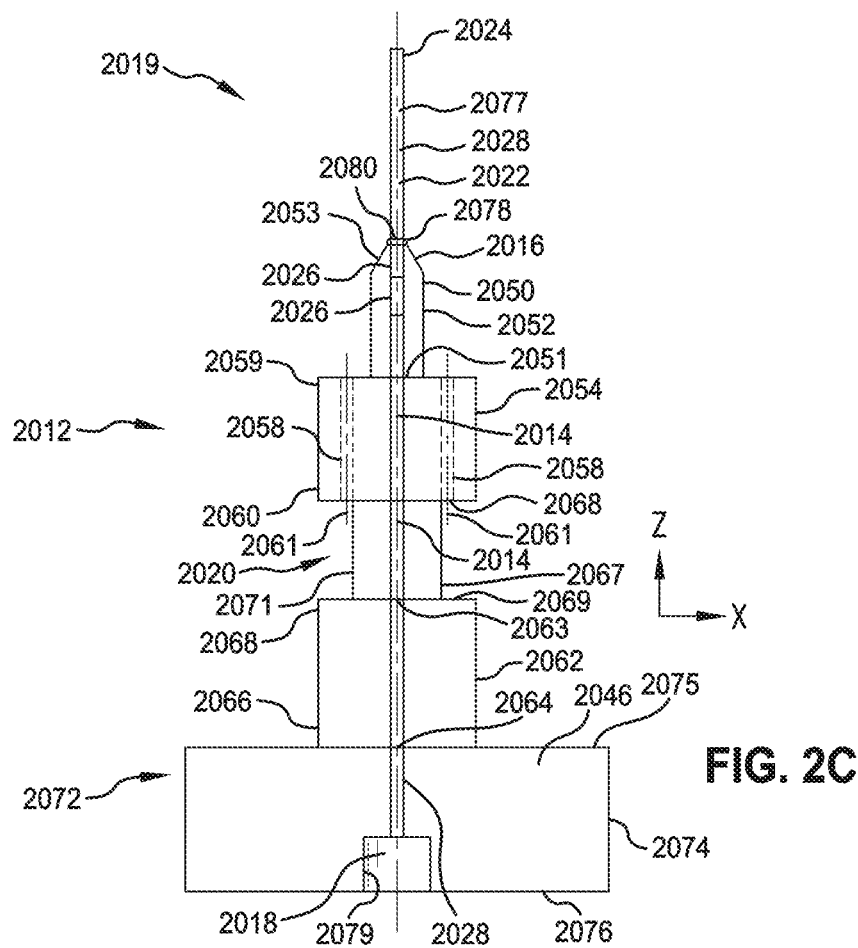
FIG. 2C is a cross-sectional view of an embodiment of a flow assembly of the embodiment of the system of FIG. 2A.
Figure 2D:
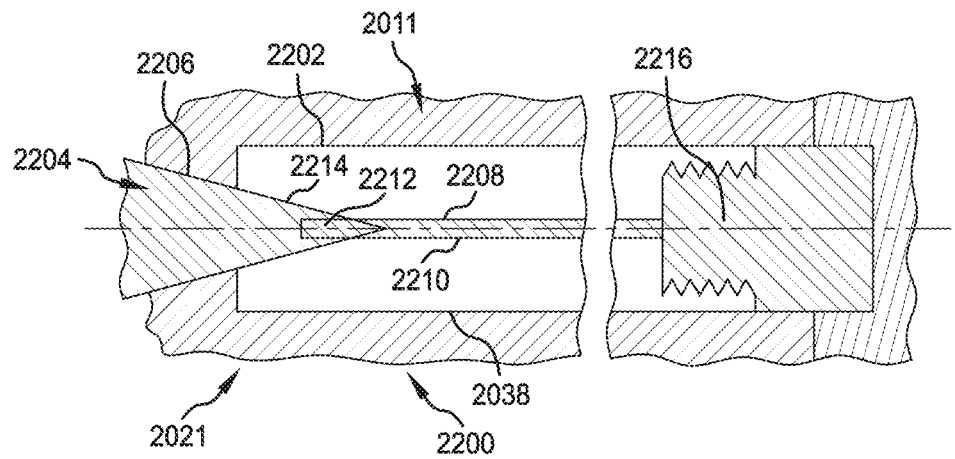
FIG. 2D is a top view of an embodiment of a mold for an embodiment of the tube member.
Figure 7A:
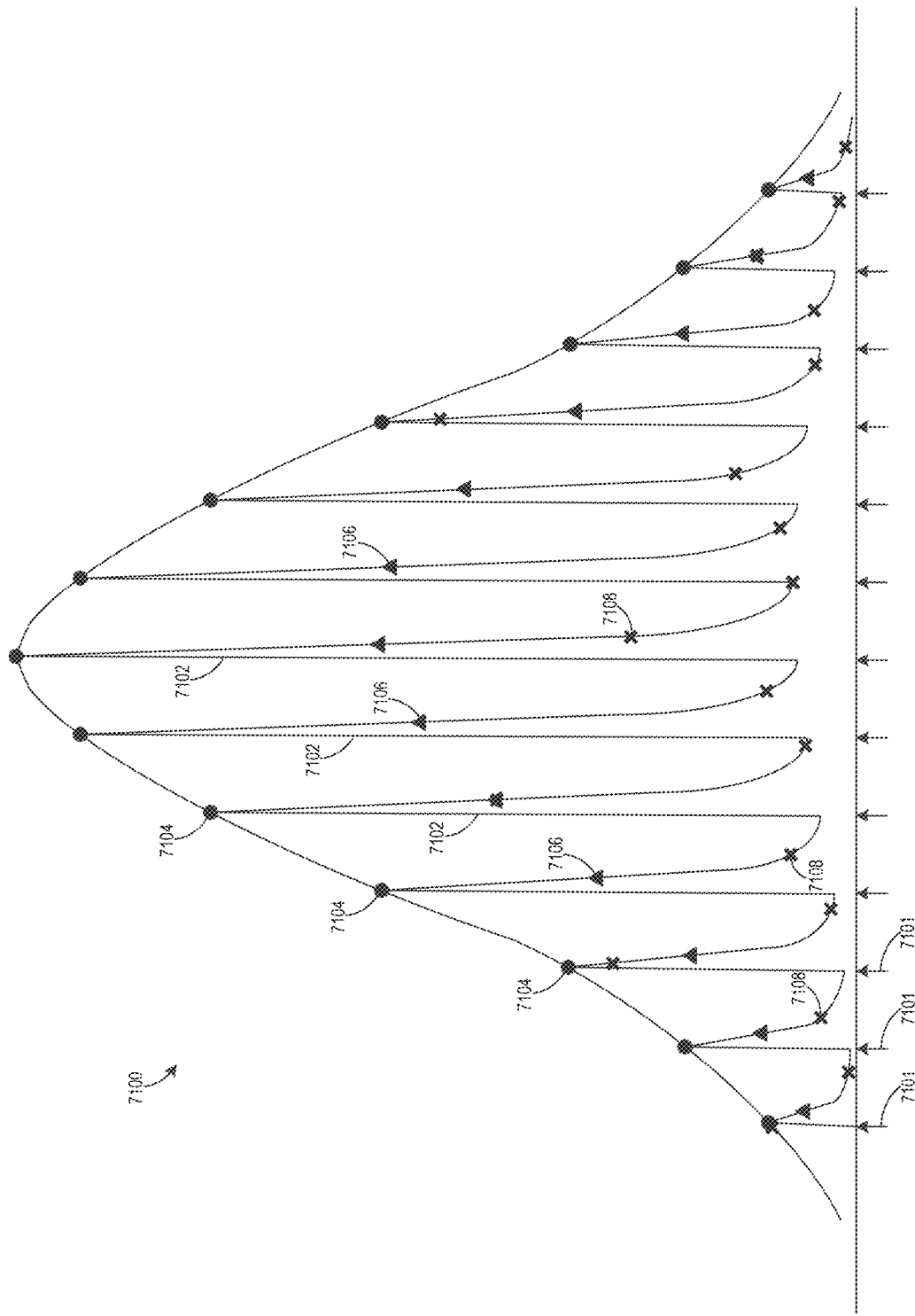
FIG. 7A illustrates an example set of fluorescence signals and the effects of various sampling regimes.
Figure 7B:
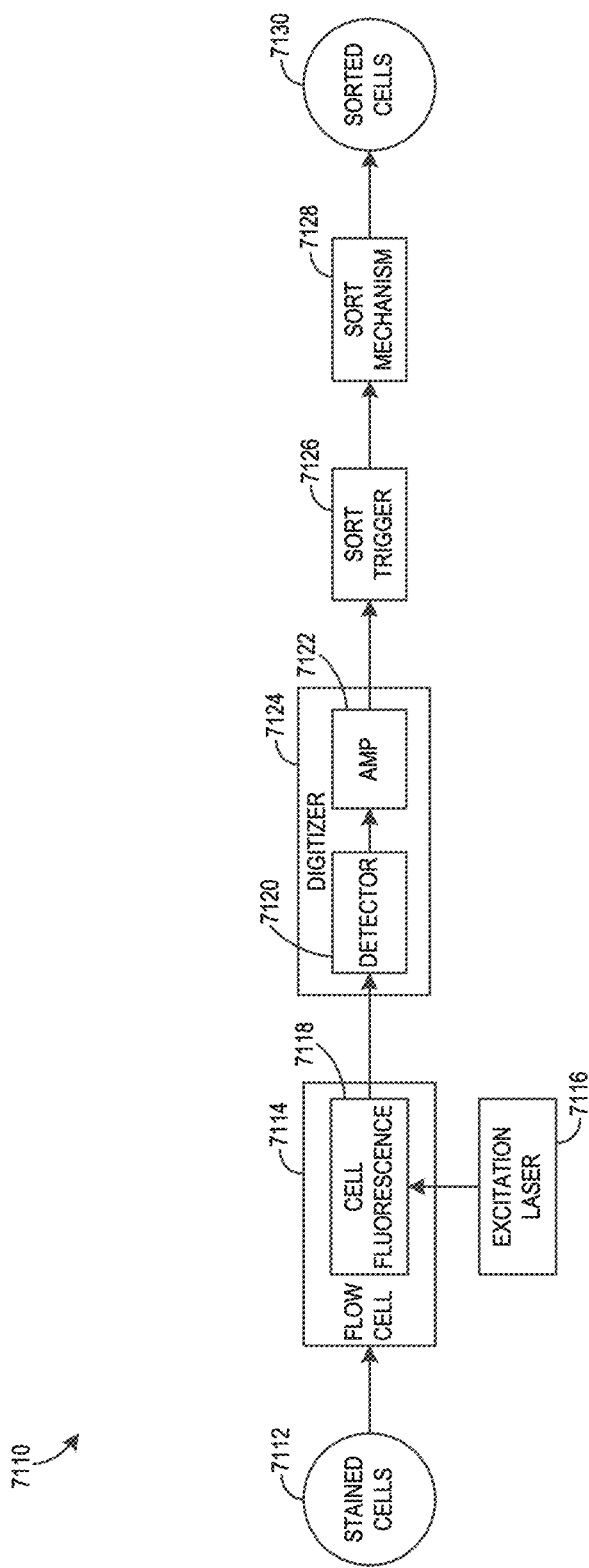
FIG. 7B is a block diagram of an example sorting cell cytometer having a free-running detector.
Figure 7C:
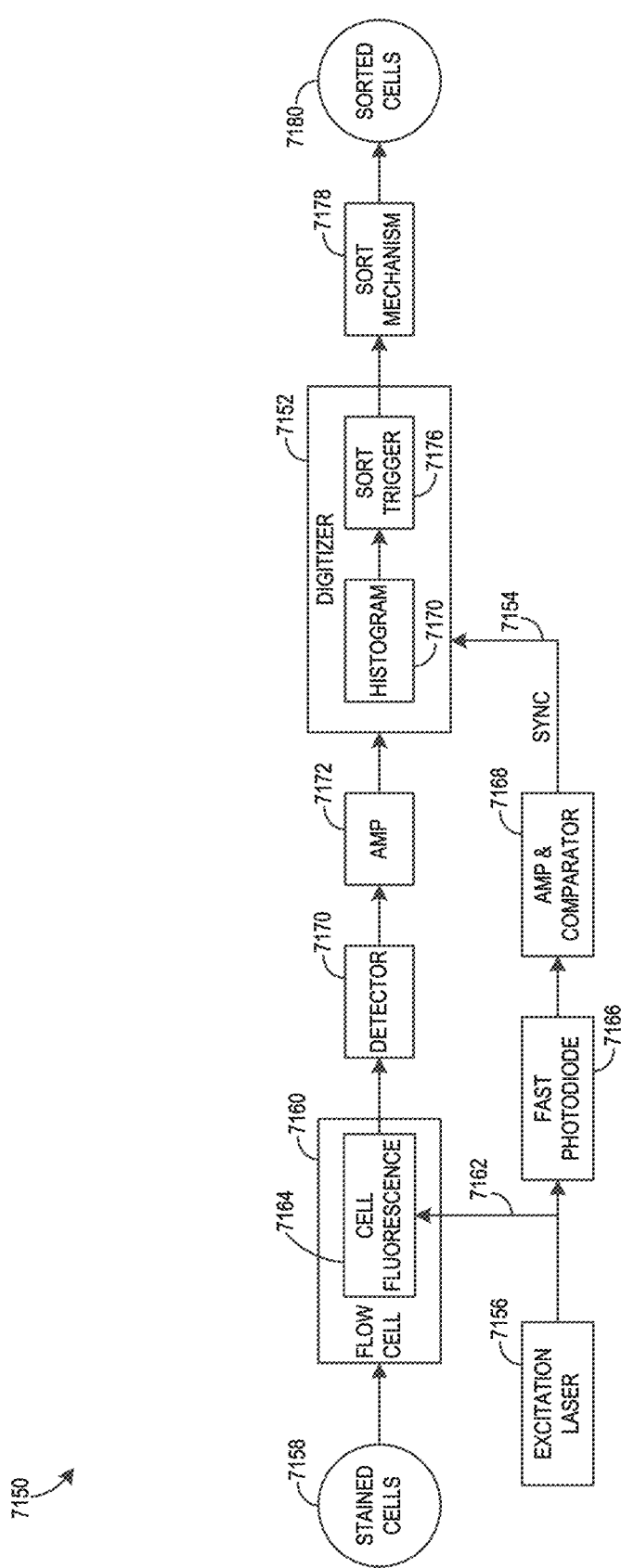
FIG. 7C is a block diagram of an example sorting cell cytometer having synchronized illumination and detection/digitization.
Figure 8A:
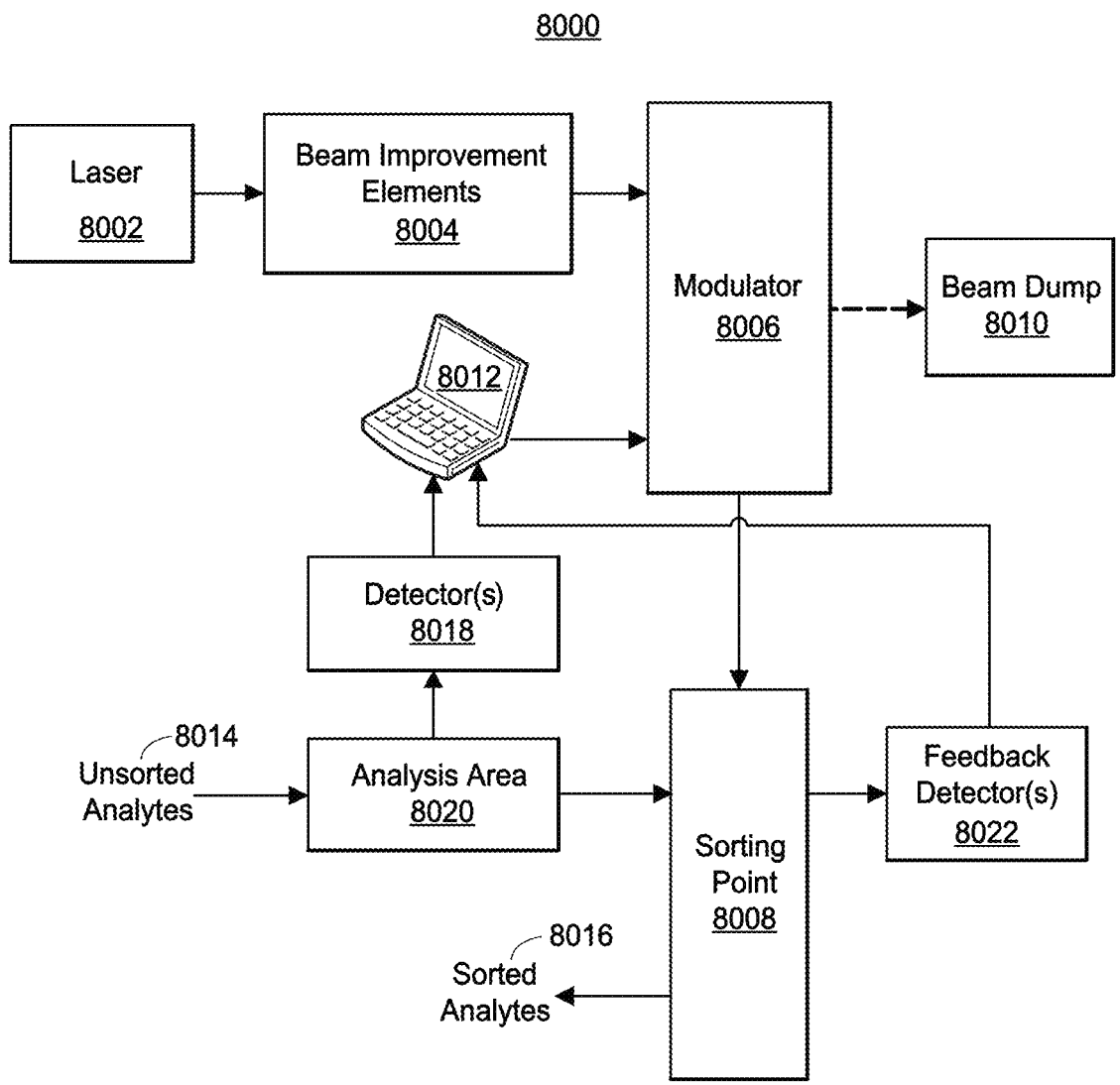
FIG. 8A is a block diagram of an example optical system for sorting analytes with pulses of radiation.
Figure 8C:
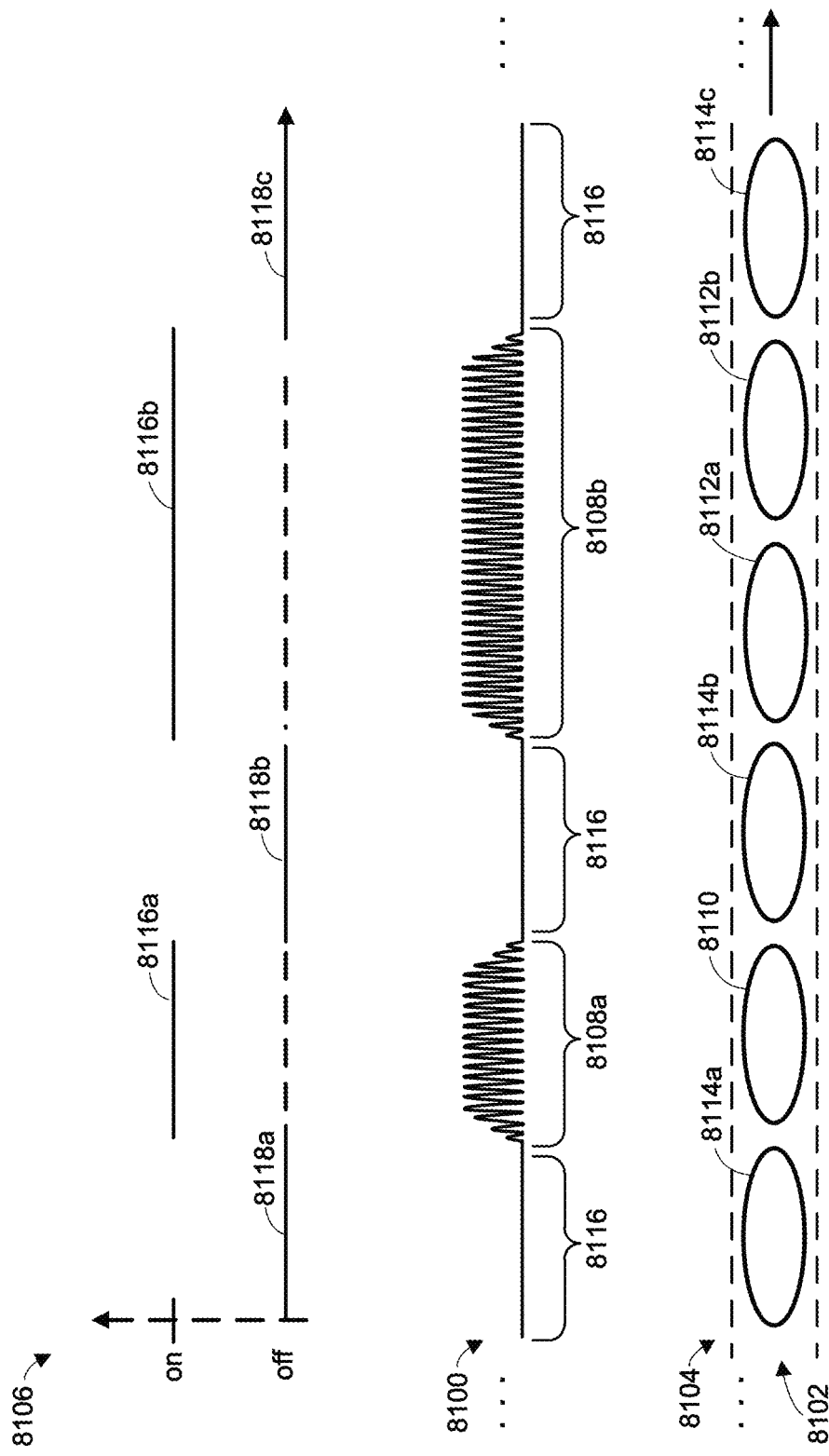
FIG. 8C illustrates example modulated pulses, which modulated pulses may be produced in the optical system of FIG. 8A.

Though illustrated in FIGS. 7A-7C as having various longitudinal cross-sectional shapes viewed normal to the tube axis 2015, in some embodiments the longitudinal cross-sectional shapes of the transition portion 2025 may exhibit asymmetry when viewed from one or more angles normal to the tube axis 2015. Additionally, the longitudinal cross-sectional shapes of the transition portion 2025 may exhibit differing geometries when viewed from different angles normal to the tube axis 2015. That is, the tube passageway 2013 in the transition portion 2025 may exhibit any arbitrary three-dimensional geometry selected to result in the desired flow characteristic(s). FIGS. 8A-8C are illustrative of one such three-dimensional geometry in the transition portion 2025. FIG. 2L depicts an example embodiment of transition portion 2025 of a tube passageway 2013 viewed along the tube axis 2015 (i.e., looking into the end 2021 of the tube passageway 2013).

At the end 2021 of the tube passageway 2013, the three-dimensional shape has a maximum width D202 in a first direction and a maximum width D203 in a second direction generally normal to the first direction. Viewed from the direction "A" normal to the tube axis 2015, the tube member 2011 appears as depicted in FIG. 2M. The tube passageway 2013 has the maximum width D202 at the first end 2021 of the tube passageway 2013. Viewed from the direction "A," the geometry of the tube passageway 2013 in the transition portion 2025 varies along the tube axis 2015 from the first end 2021 to the first point 2027, generally decreasing (in this embodiment) from the maximum width D202 at the first end 2021 to a smaller width at the point 2027 where the transition portion 2025 ends and the main portion 2029 begins. Notably, in the embodiment depicted in FIG. 2M, the transition portion 2025 exhibits minor asymmetry, in that a distance D204 between the tube axis 2015 and the passageway surface 2017 toward the first point 2027 is less than a distance D205 between the tube axis 2015 and the opposite passageway surface 2017'.

Figure 2E:
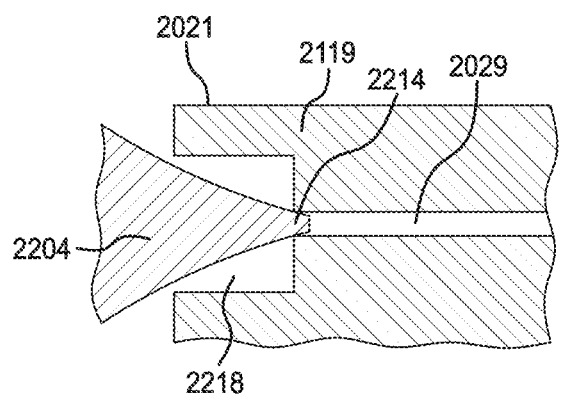
FIG. 2E is a top view of an embodiment of a mold for an embodiment of the tube member.
Figure 2F:
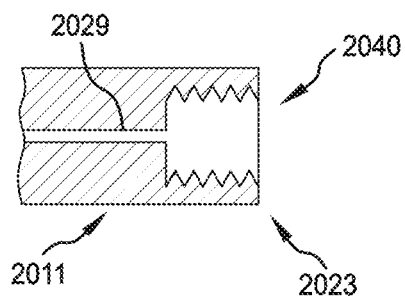
FIG. 2F is a top cross-sectional view of an embodiment of an end portion of an embodiment of the tube member.
Figure 2L:
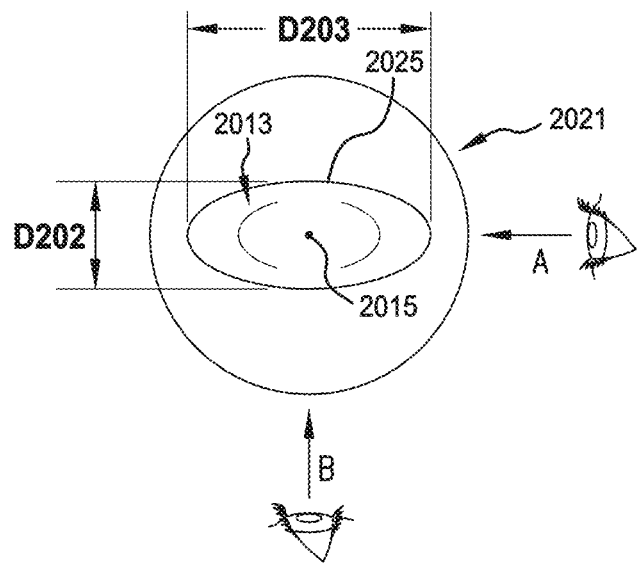
FIG. 2L is a view of an embodiment of a first end of a tube member viewed down an axis of a tube passageway of the tube member.
Figure 2M:
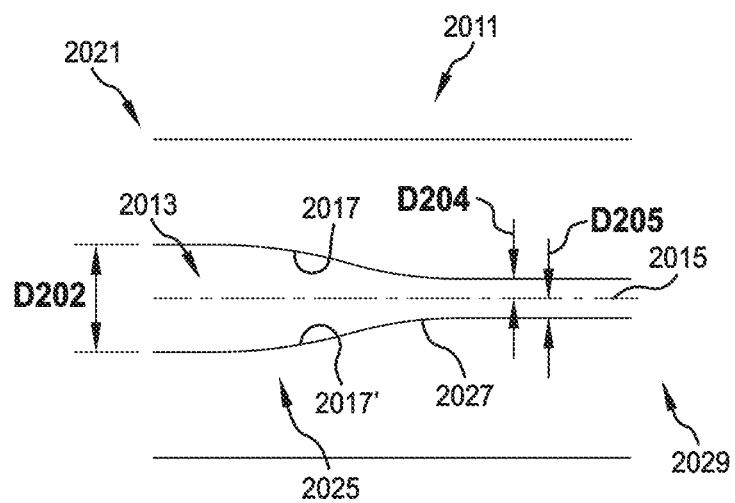
FIG. 2M is a top cross-sectional view of the embodiment of the tube member of FIG. 2L.
Figure 2N:
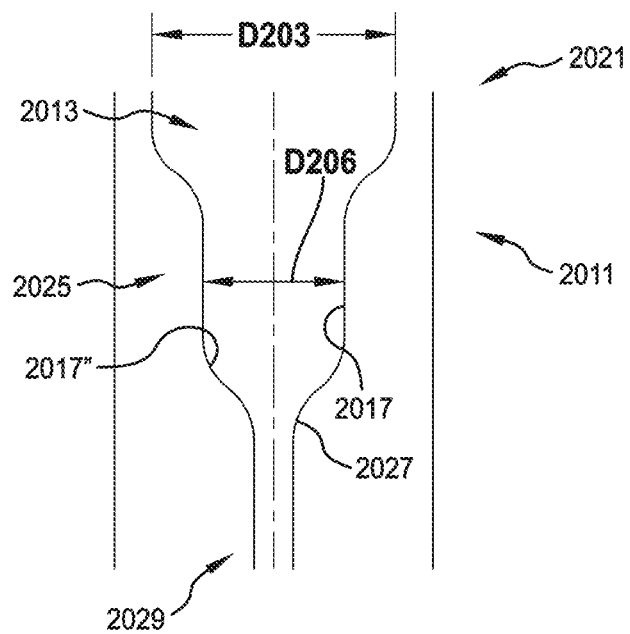
FIG. 2N is a side cross-sectional view of the embodiment of the tube member of FIG. 2L.

FIG. 2N depicts the tube member 2011 viewed from the direction "B" normal to the tube axis 2015 (and to the direction "A"). The tube passageway 2013 has the maximum width D203 at the first end 2021 of the tube passageway 2013. Viewed from the direction "B," the geometry of the tube passageway 2013 in the transition portion 2025 varies along the tube axis 2015 from the first end 2021 to the first point 2027, generally decreasing (in this embodiment) from the maximum width D203 at the first end 2021 to an intermediate width D206 and finally to a smaller width at the point 2027 where the transition portion 2025 ends and the main portion 2029 begins. In the embodiment depicted in FIG. 2N, the cross-section of the transition portion 2025 is symmetrical about the axis 2015.

As should be clear, the three-dimensional geometry of the transition portion 25 of the tube passageway 2013 depicted in FIGS. 8A-8C is provided to illustrate that the three-dimensional geometries employed in practice may have various properties (e.g., symmetry, asymmetry, etc.), and neither to limit the three-dimensional properties to those depicted in the figures nor to suggest that the particular geometries depicted exhibit the flow characteristics that may be desired for any particular application.

Turning back to FIG. 2B, the tube passageway 2013 may include an exit portion 2040 that may extend along the tube axis 2015 from the second point 2031 to the second end 2023 of the tube member 2011, and the second point 2031 may be between the first point 2027 and the second end 2023 of the tube member 2011. The exit portion 2040 may have any suitable normal cross-sectional shape (i.e., a cross-sectional shape as viewed along the tube axis 2015) or combination of shapes between the second end 2023 and the second point 2031. For example, as illustrated in FIG. 2B, all, none, or a portion of the exit portion 2040 (or the passageway surface 2017 defining the exit portion 2040 of the tube passageway 2013) may have a circular cross-sectional shape when viewed along the tube axis 2015, and all, none, or a portion of the exit portion 2040 be symmetrical about the tube axis 2015. As illustrated in FIG. 2B, the transition portion 2025 may diverge (e.g., gradually diverge) from the second point 2031 of the tube member 2011 towards the second end 2023 of the tube member 2011. As such, the transition portion 2025 may have a generally conical or frustoconical shape, may have a curvilinear shape, etc. As previously explained, the shape of the exit portion 2040 (in addition to or conjunction with the transition portion 2025 and/or the main portion 2029) is designed to produce desired flow characteristics of fluid and analytes through the tube passageway 2013, for example reduce the energy dissipation rate of the stream of cells as the stream of cells flows through the tube passageway 2013.

As would be understood by one having ordinary skill in the art, the longitudinal cross-sectional shape (i.e., a cross-section taken an/or viewed normal to the tube axis 2015) of the exit portion 2040 (or the shape of the passageway surface 2017 defining the exit portion 2040) may be precisely determined to produce a desired flow characteristic (e.g., to reduce the energy dissipation rate of the stream of cells traveling through the tube passageway 2013 to a suitable level, or to maintain the energy dissipation rate of the stream of cells below a maximum value). For example, the longitudinal cross-sectional shape of the exit portion 2040 (in conjunction with the longitudinal cross-sectional shape of the transition portion 2025 and/or main portion 2029) may be determined by flow equations or by modeling flow through the tube passageway 2013 in any manner, such as those previously described in the discussion of the transition portion 2025.

In some embodiments, all or a portion of the exit portion 2040 may have a linear longitudinal cross-sectional shape when viewed normal to the tube axis 2015 such that the exit portion 2040 has a frustoconical shape. In other embodiments, all, none, or a portion of the exit portion 2040 may have a non-linear longitudinal cross-sectional shape when viewed normal to the tube axis 2015. For example, all, none, or a portion of the non-linear longitudinal cross-sectional shape may be logarithmic or parabolic. In further embodiments, a first portion of exit portion 2040 may have a longitudinal non-linear cross-sectional shape when viewed normal to the tube axis 2015, and a second portion of the exit portion 2040 may have a longitudinal linear cross-sectional shape when viewed normal to the tube axis 2015. In other embodiments, as shown in FIG. 2F, the exit portion 2040 may have a generally cylindrical shape having a lateral surface that may be threaded and may be adapted to receive a threaded outlet fitting (not shown) that may be secured within the exit portion at or adjacent to the second end 2023 of the tube member 2011. The cylindrical exit portion 2040 may have a diameter greater (e.g., substantially greater) than the diameter of the main portion 2029, and the diameter of the exit portion 2040 may correspond to a size of the corresponding outlet fitting.

The first end 2021 of the tube member 2011 may be configured such that the tube passageway 2013 at the first end 2021 may receive the stream of cells to be sorted. However, the first end 2021 of the tube member 2011 may be coupled to one or more further components, such as a further tube portion (or portions) such that the stream travels through associated passageways of the further tube portion or portions prior to entry into the tube passageway 2013 at the first end 2021 of the tube member 2011.

The second end 2023 of the tube member 2011 may be configured such that the analytes (e.g., the cells) exit the tube passageway 2013 at the second end 2023. The second end 2023 of the tube member 2011 may be coupled to one or more further components, such as a further tube portion (or portions) such that the stream travels through associated passageways of the further tube portion or portions after exiting the tube passageway 2013 at the second end 2023 of the tube member 2011.

The tube member 2011 may be a single unitary part or may be an assembly of subcomponents coupled to form the tube member 2011. The tube member 2011 may be made from or comprise any suitable material or combination of materials, such as, for example only, quartz, glass, silica, fused silica, or plastic.

As illustrated in FIG. 2B, the system 2010 may also include a lens member 2042 disposed around or along a portion of the tube member 2011. The lens member 2042 may have an outer surface 2032, and the outer surface 2032 may have any suitable shape to focus light (from, e.g., a source 2089 as illustrated in FIG. 2A) on one or more of the stream of cells within the tube passageway 2013 to detect a property of the one or more of the cells. For example, the outer surface 2032 may have a spherical or substantially spherical shape. The sphere may have any suitable diameter, so as to subtend the solid angle of the analysis optics. In other embodiments, the outer surface 2032 may have a partially-spherical shape, a cylindrical shape, or an oval cross-sectional (i.e., ovoid) shape.

The lens member 2042 may also have a lens aperture 2034 that extends through the outer surface 2032. More specifically, the lens aperture 2034 may extend from a first portion 2035 of the outer surface 2032 to a second portion 2037 of the outer surface 2032 such that the lens aperture 2034 is a channel or passage that extends through the lens member 2042. The first portion 2035 of the outer surface 2032 may be longitudinally offset from the first end 2021 of the tube member 2011 and the second portion 2035 of the outer surface 2032 may be longitudinally offset from the second end 2023 of the tube member 2011. The lens aperture 2034 may be defined by an inner surface 2036, and the inner surface 2036 may conform in shape to the shape of the outer surface 2038 of the tube member 2011. In some embodiments, the inner surface 2036 and the outer surface 2038 of the tube member 2011 may both be cylindrical. The lens member 2042 may be coupled to the tube member 2011 in any suitable manner, including positioning the lens member 2042 between a pair of annular resilient retainers 2039a, 2039b.

The tube member 2011 may be manufactured in any suitable manner. For example, the tube member 2011 may be molded as a separate and independent component. Specifically, as illustrated in FIG. 2D, the tube member 2011 may be formed by two mold-halves 2200 which may be identical. Each mold half 2200 may have a cavity 2202 that corresponds to the shape of a portion of the outer surface 2038 of the tube member 2011. The transition portion 2025 may be formed by a shaped insert 2204, and a portion of the outer surface 2206 of the shaped insert 2204 may correspond in shape to the passageway surface 2017 defining the transition portion 2025 of the tube passageway 2013. The shape of the portion of the outer surface 2206 of the shaped insert 2204 may be determined by the process previously described, and the shaped insert may be manufactured or formed in any manner known in the art. For example, the shaped insert 2204 may be machined or may be printed using a three-dimensional printer. A main insert 2208 may form the main portion 2029 of the tube passageway 2013. Specifically, an outer surface of the 2210 of the main insert 2208 may correspond to the cylindrical surface defining the main portion 2029. A first end 2212 of the main insert 2208 may disposed or received in a bore an end portion 2214 of the shaped insert 2204. In addition, an end insert 2216 may be disposed in the mold half at a second end of the tube member 2011 to form the threaded exit portion 2040.

In other embodiments, a first portion of the tube member 2011 may be made in a first operation or process and a second portion of the tube member 2011 may be made in one or more subsequent operations or processes. For example, a semi-finished tube member 2011a may be made (e.g., by molding or drawing), and the semi-finished tube member 2011a may have a portion of the main portion 2029 that extends between the first end 2021 and the first point 2027 of the tube member 2011. In a subsequent finishing operation, the transition portion 2025 of the tube passageway 2013 may be formed (e.g., by laser cutting, grinding, etc.) between the first end 2021 and the first point 2027 of the tube member 2011.

In some embodiments, as illustrated in FIG. 2G, the semi-finished tube member 2011*a* may be made in a prior fabrication operation (or operations), and an end portion 2222 of the semi-finished tube member 2011*a* may be disposed at an end portion of the main portion 2029 (e.g., at or adjacent to the first point 2027 of the tube member 2011 of FIG. 2B). The semi-finished tube member 2011*a* may be placed in a mold 2220 (or a mold halt), and the end portion 2222 of the semi-finished tube member 2011*a* may be placed in a cavity 2224 of the mold 2220 (or in each mold-half). The shaped insert 2204 may be inserted into the cavity 2224 such that the end portion 2214 of the shaped insert 2204 is disposed in or adjacent to the end portion of the main portion 2209 (e.g., at or adjacent to the first point 2027 of the tube member 2011 of FIG. 2B) of the tube passageway 2013, and a longitudinal axis of the shaped insert 2204 may be coaxially-aligned with the tube axis 2015. A suitable molding material (e.g., a plastic) may be injected into the cavity 2224, thereby forming an end portion 2119 of the tube member 2011 that includes the transition portion 2025 and the first end 2021 of the tube member 2011, as illustrated in FIG. 2H. The semi-finished tube member 11*a* may extend from the first point 2027 to the second point 2031, for example. That is, the semi-finished tube member 2011*a* may extend from a first end of the main portion 2029 to a second end of the main portion 29. However, the semi-finished tube member 2011*a* may extend from any point of the finished tube member 2011, such as from the first point 2027 to the second end 2023. In still other embodiments, the entire tube member 2011 (with or without the lens member 2042) may be fabricated in one or more three-dimensional printing processes.

In other embodiments, as illustrated in FIG. 2E, the semi-finished tube member 2011*a* may include a cutout 2218 at the first end 2021 of the semi-finished tube member 2011*a*, with the main portion 2029 of the tube passageway 2013 and, if necessary, the exit portion 2040 formed in a first process (e.g., any of the previously-described processes). In a secondary molding operation, the shaped insert 2204 may be inserted into the cutout 2218 such that the end portion 2214 of the shaped insert 2204 is disposed in the main portion 2029 of the tube passageway 2013, as previously described with reference to FIG. 2G. The transition portion 2025 may then be molded in the void of the cutout 2218.

The skilled person would recognize that the exit portion 2040 of the tube passageway 2013 may be formed in a manner identical to that of the transition portion 2025. The skilled person would also recognize that the exit portion 2040 may be formed in a tube member 2011 using any of the techniques previously described, and the transition portion may be formed using a different techniques than the exit portion 2040.

Referring to FIG. 2C, the system 2010 also includes the elongated conduit member 2012 that may extend along the conduit axis 2014 from the first end 2016 to a second end 2018, and the conduit passageway 2020 may extend from the first end 2016 to the second end 2018. The conduit member 2012 may include an end portion 2050 that extends from the first end 2016 of the conduit member 2012 to a first intermediate point 2051 offset downwardly (i.e., towards the second end 2018) along the conduit axis 2014. While terms such as "upward," "upwardly," "down," "downwardly," etc. are used in the present description, the terms are intended to reflect directions relative to the figures and neither to reflect absolute directions nor to suggest that the orientation of the various components cannot be varied. In fact, the system 2010 may be employed in various orientations without adversely affecting the operation of the device. The end portion 2050 may have a cylindrical body 2052 and a tapered or beveled end portion 2053 that gradually decreases in diameter towards the first end 2016 of the conduit member 2012. The cylindrical body 2052 may be symmetrical about the conduit axis 2014. The conduit member 2012 may also include a first collar portion 2054 disposed between the first intermediate point 2051 and a second intermediate point 2055 offset downwardly along the conduit axis 2014. The first collar portion 2054 may be cylindrical and may be symmetrical about the conduit axis 2014. The first collar portion 2054 may have a diameter greater than a diameter of the body 2052 of the end portion 2050. One or more sheath passageways 2058 may extend longitudinally through the first collar portion 2054 from a first end 2059 of the first collar portion 2054 to a second end 2060 of the first collar portion 2054. Each of the one or more sheath passageways 2058 may be have a sheath passageways axis 2061 that extends longitudinally or substantially longitudinally, and each sheath passageways axis 2061 may be parallel to and radially (i.e., in a direction normal to the conduit axis 2014) offset from the conduit axis 2014. In some embodiments, three or more sheath passageways 2058 (e.g., between eight and twelve sheath passageways 2058) may be radially and uniformly arrayed around through the first collar portion 2054.

The conduit member 2012 may further include a second collar portion 2062 disposed between the first collar portion 2054 and the second end 2018 of the conduit member 2012. Specifically, the second collar portion 2062 may be disposed between a third intermediate point 2063 (offset downwardly from the second intermediate point 2055 along the conduit axis 2014) disposed at a first end 65 of the second collar portion 2062 and a fourth intermediate point 2064 (offset downwardly from the third intermediate point 2063 along the conduit axis 2014) disposed at a second end 2066 of the second collar portion 2062. The second collar portion 2062 may be cylindrical and may be symmetrical about the conduit axis 2014. The second collar portion 2062 may have a diameter greater than a diameter of the body 2052 of the end portion 2050. For example, the second collar portion 2062 may have a diameter equal to or approximately equal to the diameter of the first collar portion 2054.

An intermediate portion 2071 may be disposed between the second end 2060 of the first collar portion 2054 and the first end 2065 of the second collar portion 2063 (i.e., between the second intermediate point 2055 and the third intermediate point 2063). The intermediate portion 2071 may be cylindrical and may be symmetrical about the conduit axis 2014. The intermediate portion 2071 may have a diameter smaller (e.g., 5% to 40% smaller) than the diameter of one or both of the first collar portion 2054 and the second collar portion 2062. Accordingly, an outer surface 2067 defining the intermediate portion 2071, a surface 2068 defining the second end 2060 of the first collar portion 2054, and a surface 2069 defining the first end 2065 of the second collar portion 2063 may cooperate to form a circumferential recess 2070.

As illustrated in FIG. 2A, the flow assembly 2019 also includes a base member 2046 rigidly secured to the conduit member 2012, and the base member 2046 may be disposed at or adjacent to the second end 2018 of the conduit member 2012. For example, the base member 2046 may be (and/or have the shape of) a cylindrical flange 2072 coupled to the second end 2018 of the conduit member 2012. The cylindrical flange 2072 may extend longitudinally along the conduit axis 2014 from the fourth intermediate point 2064 to the second end 2018 of the conduit member 2012. The cylindrical flange may have a diameter that is greater (e.g., between two and six times greater) than the diameter of one or both of the first collar portion 2054 and the second collar portion 2062. The cylindrical flange 2072 may have an outer surface 2074 that is symmetrical about the conduit axis 2014. The cylindrical flange 2072 may have a top surface 2075 that may extend normal or substantially normal to the conduit axis 2014, and the top surface 2075 may be planar or substantially planar. The cylindrical flange 2072 may additionally have a bottom surface 2076 that may extend normal or substantially normal to the conduit axis 2014 at or adjacent to the second end 2018 of the conduit member 2012, and the bottom surface 2076 may be planar or substantially planar. A fitting recess 2079 may be disposed partially through the cylindrical flange 2072 and may extend upwardly from the bottom surface 2076 at the second end 2018 of the conduit member 2012 towards the first end 2016 of the conduit member 2012. The fitting recess 2079 may be adapted to receive a fitting or coupling (not shown) that is coupled to a tube or reservoir (not shown) that supplies or provides the stream of cells flowing through the conduit passageway 2020 from the second end 2018 (i.e., the inlet) to (and out of) the first end 2016 of the conduit member 2012.

Still referring to FIG. 2C, the flow assembly 2019 also includes the needle member 2022 extending along the conduit axis 2014, and the needle member 2022 includes the needle passageway 2028 that extending from the first end 2024 to the second end 2026 of the needle member 2022 along a needle axis 2077. The needle member 2022 may be cylindrical and may be symmetrical about the needle axis 2077, and the needle axis 2077 may be coaxially aligned with the conduit axis 2014. The needle member 2022 may be coupled to the conduit member 2012 in any manner that allows the stream of cells flowing upwardly through the conduit passageway 2020 to flow through the needle passageway 2028 from the first end 2024 to (and out of) the second end 2026. Specifically, the needle member 2022 may be coupled to the conduit member 2012 such that an external portion 2030 of the needle member 2022 extends from the first end 2016 of the conduit member 2012. In some embodiments, an intermediate point 2078 of the needle member 2022 may be disposed at or adjacent to the needle axis 2077 between the first end 2024 and the second end 2026, and the external portion 2030 of the needle member 2022 extends from the first end 2024 to the intermediate point 2078 such that the intermediate point 2078 of the needle member 2022 is disposed at or adjacent to the first end 2016 of the conduit member 2012. So disposed, a portion of the needle member 2022 disposed between the second end 2026 and the intermediate point 2078 may be disposed within a portion of the conduit passageway 2020. A seal 2080 may be disposed at or adjacent to the first end 2016 of the conduit member 2012 and/or at or adjacent to the intermediate point 2078 of the needle member 2022 to seal a gap between an exterior surface of the needle member 2022 and an interior surface of the conduit passageway 2022. The seal 2080 may be any suitable material, component, or combination of materials or components, or such as an annular resilient seal (e.g., an o-ring) or a wax or hardening seal, for example.

In use, as illustrated in FIG. 2A, the flow assembly 2019 may be disposed such that the first end 2024 of the needle member 2022 of the flow assembly 2019 is longitudinally offset from a reference point 2087 along the tube axis 2015 at the first end 2021 of the tube member 2011. Sheath fluid may be introduced via sheath inlets 2150a, 2150b through a corresponding sheath passageway 2152a, 2152b that each terminates in the recess 2070 defined between the first collar portion 2054 and the second collar portion 2062. Sheath fluid in the recess 2070 flows upwardly (i.e., towards the first end 2024 of the needle member 2022 of the flow assembly 2019 and/or towards the first end 2021 of the tube member 2011) through the one or more sheath passageways 2058 extending longitudinally through the first collar portion 2054 and into an interior cavity 2096 of an upper portion 2099 of a body 2095, and the upper portion 2099 at least partially surrounds the needle member 2022. Once within the interior cavity 2096, the sheath fluid is smoothly directed by a frustoconical surface 2156 of the body 2095 into the tube passageway 2013, where the sheath flow surrounds and/or mixes with the stream of cells exiting the first end 2024 of the needle member 2022. A seal 2154 may be disposed around the first collar portion 2054 to prevent sheath fluid from flowing through a gap between the outside surface of the first collar portion 2054 and a surface of the body 2095. Once within the tube passageway 2013, a light beam generated by a source 2089 (e.g., a laser beam, as illustrated in FIG. 2A) passes through the lens member 2042 and a portion of the tube member 2011 (between the outer surface 2038 and the passageway surface 2017) and is directed at one of the stream of cells traveling through the main portion 2029 of the tube passageway 2013 to detect a property of the one or more of the cells of the stream, as previously described.

While various embodiments have been described above, this disclosure is not intended to be limited thereto. The system 2010 may employ or be employed in any suitable flow cell configuration including those disclosed throughout this specification.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A system for use in flow cytometry, the system comprising: a tube member having a tube passageway configured to receive a stream of analytes, the tube passageway defined by a passageway surface and extending along a tube axis from a first end of the tube member to a second end of the tube member, and wherein the tube passageway includes a transition portion extending from the first end of the tube member to a first point of the tube member and a main portion of the tube passageway extending from the first point to a second point of the tube member, wherein the first point is disposed between the first end and the second point of the tube member, wherein the transition portion has a normal cross-sectional geometry that varies along the tube axis from the first end of the tube member to the first point of the tube member, and wherein the varying normal cross-sectional geometry is selected according to an energy dissipation rate to which the analytes traversing the transition portion will be exposed.

2. The system of aspect 1, wherein all or a portion of the transition portion has a non-linear longitudinal cross-sectional shape when viewed normal to the tube axis.

3. The system of either aspect 1 or 2, wherein all or a portion of the non-linear longitudinal cross-sectional shape is logarithmic.

4. The system of any one of aspects 1 to 3, wherein all or a portion of the longitudinal non-linear cross-sectional shape is parabolic.

5. The system of any one of aspects 1 to 4, wherein a first portion of transition portion has a longitudinal non-linear cross-sectional shape when viewed normal to the tube axis, and a second portion of the transition portion has a longitudinal linear cross-sectional shape when viewed normal to the tube axis.

6. The system of any one of aspects 1 to 5, wherein less than all of the transition portion has a linear longitudinal cross-sectional shape when viewed normal to the tube axis.

7. The system of any one of aspects 1 to 6, wherein the second point is disposed between the first point and the second end of the tube member.

8. The system of any one of aspects 1 to 7, further comprising: an elongated receiving portion having an interior cavity defined by a cavity surface, wherein the interior cavity receives a first end of a needle member and wherein the interior cavity is in fluid communication with at least one inlet that is adapted to provide a sheath flow into the interior cavity.

9. The system of any one of aspects 1 to 8, wherein a first end of a conduit member is disposed within the interior cavity.

10. The system of any one of aspects 1 to 9, wherein the cavity surface includes a mating portion at or adjacent to the first end of the tube member, and wherein a normal cross-sectional diameter of the mating portion is equal to the normal cross-sectional diameter of the transition portion at the first end of the tube member.

11. The system of any one of aspects 1 to 10, wherein the normal cross-sectional diameter of the mating portion decreases from the normal cross-sectional diameter of the first end of the tube passageway.

12. The system of any one of aspects 1 to 11, wherein the sheath flow flows within the interior cavity along the conduit axis towards the tube member.

13. The system of any one of aspects 1 to 12, wherein the inlet is formed in the body.

14. A method of reducing the energy dissipation rate of a stream of analytes in flow cytometric process, the method comprising: determining a desired maximum energy dissipation rate for the stream of analytes flowing through a tube passageway of a tube member, wherein the tube passageway extends along a tube axis from a first end to a second end, and wherein the tube passageway includes a transition portion extending from the first end to an intermediate point and a main portion extending from the intermediate point to the second end of the tube passageway; determining a three-dimensional shape of the transition portion of the tube passageway, wherein a maximum internal width of the transition portion at the first end is greater than a maximum internal width of the transition portion at the intermediate point, the three-dimensional shape of the transition portion selected to result in an energy dissipation rate less than the desired maximum energy dissipation rate; and constructing the transition portion of the tube passageway to have the determined three-dimensional shape.

15. The method of aspect 14, wherein a portion of the three-dimensional shape of the transition portion is non-linear.

16. The method of either aspect 14 or 15, wherein a portion of the three-dimensional shape of the transition portion is logarithmic 17. The method of any one of aspects 14 to 16, wherein a portion of the three-dimensional shape of the transition portion is parabolic.

18. The method of any one of aspects 14 to 17, wherein a portion of the three-dimensional shape of the transition portion is linear.

19. The method of any one of aspects 14 to 18, wherein a first portion of the three-dimensional shape of the transition portion is linear and a second portion of the three-dimensional shape of the transition portion is non-linear.

20. The method of any one of aspects 14 to 19, wherein constructing the transition portion of the tube passageway to have the determined three-dimensional shape comprises molding the transition portion onto a previously-fabricated main portion.

21. The method of any one of aspects 14 to 20, wherein molding the transition portion onto a previously-fabricated main portion comprises: placing the previously-fabricated main portion into a mold; placing a molding pin into the previously-fabricated main portion at the intermediate point, the molding pin having an external surface corresponding to the negative of the three-dimensional shape; and injecting into the mold, around the molding pin, a molding material to form the transition portion on the previously-fabricated main portion.

22. The method of any one of aspects 14 to 21, wherein the molding pin is fabricated using three-dimensional printing techniques.

23. The method of any one of aspects 14 to 22, wherein the molding pin is fabricated by machining a piece of metal.

24. The method any one of aspects 14 to 23, wherein constructing the transition portion of the tube passageway to have the determined three-dimensional shape comprises laser cutting the three-dimensional shape into the first end of the main portion.

25. The method of any one of aspects 14 to 24, wherein constructing the transition portion of the tube passageway to have the determined three-dimensional shape comprises grinding the three-dimensional shape into the first end of the main portion.

26. A capillary tube for use in flow cytometry, the capillary tube comprising: an outer surface; and a tube passageway disposed radially inward of the outer surface, the tube passageway adapted to receive a stream of analytes, the tube passageway defined by a passageway surface and extending along a tube axis from a first end of the capillary tube to a second end of the capillary tube, wherein the tube passageway includes a transition portion extending from the first end of the capillary tube to a first point of the capillary tube and a main portion of the tube passageway extending from the first point to a second point of the capillary tube, the transition portion having a three-dimensional inner surface shape selected to result in an energy dissipation rate less than the desired maximum energy dissipation rate, wherein the first point is disposed between the first end and the second point of the capillary tube, and wherein the transition portion has a maximum internal width at the first end that is greater than a maximum internal width at the first point.

27. The capillary tube of aspect 26, wherein a portion of the three-dimensional inner surface shape is non-linear.

28. The capillary tube of either aspect 26 or 27, wherein a portion of the three-dimensional inner surface shape is logarithmic 29. The capillary tube of any one of aspects 26 to 28, wherein a portion of the three-dimensional inner surface shape is parabolic.

30. The capillary tube of any one of aspects 26 to 29, wherein a first portion of transition portion has a three-dimensional inner surface shape that is non-linear, and a second portion of the transition portion has a three-dimensional inner surface shape that is linear.

31. The capillary tube of any one of aspects 26 to 30, wherein the tube passageway includes an exit portion extending from the second point of the capillary tube to the second end of the capillary tube, and wherein the exit portion has a maximum internal width at the second point of the capillary tube that is smaller than a maximum internal width at the second end of the capillary tube.

32. The capillary tube of any one of aspects 26 to 31, wherein a three-dimensional shape of the exit portion is selected to result in an energy dissipation rate less than the desired maximum energy dissipation rate.

33. The system of any one of aspects 1 to 13, wherein the transition portion is asymmetrical about the tube axis.

34. A method of manufacturing a capillary tube member for use in flow cytometric processes, the capillary tube member having a tube passageway defined by a passageway surface and extending along a tube axis from a first end of the capillary tube member to a second end of the capillary tube member, the method comprising: printing the capillary tube member using a three-dimensional printer.

35. The method of aspect 34, further comprising: providing a three-dimensional computer model of the capillary tube member to the three-dimensional printer.

36. The method of either aspect 34 or 35, further comprising: determining a desired maximum energy dissipation rate for a stream of analytes adapted to flow through the tube passageway of a capillary tube member, wherein the tube passageway includes a transition portion extending from the first end to an intermediate point and a main portion extending from the intermediate point to the second end of the tube passageway; determining a three-dimensional shape of the transition portion of the tube passageway, wherein a maximum internal width of the transition portion at the first end is greater than a maximum internal width of the transition portion at the intermediate point, the three-dimensional shape of the transition portion selected to result in an energy dissipation rate less than the desired maximum energy dissipation rate; and constructing the transition portion of the tube passageway of the three-dimensional computer model to have the determined three-dimensional shape.

37. The method of any one of aspects 34 to 36, wherein a portion of the three-dimensional shape of the transition portion is non-linear.

38. The method of any one of aspects 34 to 37, wherein a portion of the three-dimensional shape of the transition portion is logarithmic.

39. The method of any one of aspects 34 to 38, wherein a portion of the three-dimensional shape of the transition portion is parabolic.

40. The method of any one of aspects 34 to 39, wherein a portion of the three-dimensional shape of the transition portion is linear.

41. The method of any one of aspects 34 to 40, wherein a first portion of the three-dimensional shape of the transition portion is linear and a second portion of the three-dimensional shape of the transition portion is non-linear.

42. The method of any one of aspects 34 to 41, wherein constructing the transition portion of the tube passageway to have the determined three-dimensional shape comprises molding the transition portion onto a previously-fabricated main portion.

43. The method of any one of aspects 34 to 42, wherein the shape of the passageway of the three-dimensional computer model is determined using computational fluid dynamics software to determine a desired maximum energy dissipation rate for a stream of analytes flowing through the tube passageway.

44. The system of any one of aspects 1 to 13, wherein the stream of analytes is a stream of cells, and wherein the system is adapted for use in performing flow cytometric sorting of the stream of cells.

45. The method of any one of aspects 14 to 24, wherein the stream of analytes is a stream of cells, and wherein the flow cytometric process is a flow cytometric sorting of the stream of cells.

46. The capillary tube of any one of aspects 26 to 32, wherein the stream of analytes is a stream of cells, and wherein the system is adapted for use in performing flow cytometric sorting of the stream of cells.

47. A method of manufacturing a tube member for use in flow cytometric processes, the method comprising: positioning a pre-fabricated portion of the tube member in a mold such that an end portion of the pre-fabricated portion of the tube member is disposed in a cavity of the mold; inserting a shaped insert into the cavity such that an end portion of the shaped insert is disposed in or adjacent to the end portion of the pre-fabricated portion; and injecting a material into the cavity to form an end portion of the tube member that includes the transition portion and the first end of the tube member.

48. The method of aspect 47, wherein the material is a plastic.

49. The method of either aspect 47 or 48, further comprising fabricating the shaped insert using a three-dimensional printer.

50. The method of any one of aspects 47 to 49, wherein a shape of a portion of an outer surface of the shaped insert that corresponds to the transition portion is selected to result in an energy dissipation rate of the stream of analytes that is less than a desired maximum energy dissipation rate.

51. A system for use in flow cytometry, the system comprising: a tube member having a tube passageway configured to receive a stream of analytes, the tube passageway defined by a passageway surface and extending along a tube axis from a first end of the tube member to a second end of the tube member, and wherein the tube passageway includes a transition portion extending from the first end of the tube member to a first point of the tube member and a main portion of the tube passageway extending from the first point to a second point of the tube member, wherein the first point is disposed between the first end and the second point of the tube member, wherein the passageway surface in transition portion of the tube passageway has a transition surface geometry selected to achieve a desired flow characteristic of the fluidic system.

52. The system of aspect 51, wherein the transition surface geometry is selected to result in an energy dissipation rate, to which analytes traversing the transition portion will be exposed, which is lower than a desired threshold.

53. The system of aspect 51 or 52, wherein the transition surface geometry is selected according to a computational modeling process.

54. The system of any one of aspects 51 to 53, wherein the desired flow characteristic is energy dissipation rate.

55. The system of any one of aspects 51 to 54, wherein the desired flow characteristic is flow rate.

56. The system of any one of aspects 51 to 55, wherein the desired flow characteristic is pressure change.

57. The system of any one of aspects 51 to 56, wherein the desired flow characteristic is pressure gradient over time or pressure gradient over distance.

58. The system of any one of aspects 51 to 57, wherein the desired flow characteristic is acceleration.

59. The system of any one of aspects 51 to 58, wherein the desired flow characteristic is temperature.

60. The system of any one of aspects 51 to 59, wherein the desired flow characteristic is temperature change.

61. The system of any one of aspects 51 to 60, wherein the desired flow characteristic is flow stability.

62. The system of any one of aspects 51 to 61, wherein the desired flow characteristic is core dimension.

63. A method of building a flow cell for flow cytometry, the flow cell configured to receive a stream of analytes flowing through a tube passageway of a tube member, wherein the tube passageway extends along a tube axis from a first end to a second end, and wherein the tube passageway includes a transition portion extending from the first end to an intermediate point and a main portion extending from the intermediate point to the second end of the tube passageway, the method comprising: determining, for a fluid or analyte intended to flow through the flow cell, one or more optimizable characteristics of the flow cell; selecting one of the one or more optimizable characteristics of the flow cell as a selected characteristic; modeling the flow cell to derive a shape of the flow cell to affect the selected characteristic; determining a three-dimensional shape of the transition portion of the tube passageway, wherein a maximum internal width of the transition portion at the first end is greater than a maximum internal width of the transition portion at the intermediate point; and constructing the transition portion of the tube passageway to have the determined three-dimensional shape.

64. The method of aspect 63, wherein constructing the transition portion of the tube passageway comprises: positioning a pre-fabricated portion of the tube passageway in a mold such that an end portion of the pre-fabricated portion of the tube passageway is disposed in a cavity of the mold; inserting a shaped insert into the cavity such that an end portion of the shaped insert is disposed in or adjacent to the end portion of the pre-fabricated portion; and injecting a material into the cavity to form an end portion of the tube passageway that includes the transition portion and the first end of the tube member.

Adjustable Collection Optics

An adjustable mirror assembly may be implemented in various applications including, for example, flow cytometric sorting systems and other electromagnetic energy based (e.g., laser-based) detection and/or illumination systems. The adjustable mirror assembly may be configured so that the mirror and its mount are tiltable (e.g., rotatable) about one or more axes transverse to an optical axis of the mirror. Tilting the mirror about one or more axes may help align one or more focal points of the mirror with one or more targets including, for example, an illumination region where a sample is to be illuminated and/or a detector configured to detect a signal generated by a sample in response to illumination. The adjustable mirror assembly may be used in conjunction with one or more translational mounts so that the mirror can be aligned along multiple (e.g., two, three, four, five, six, seven, eight, nine, and/or ten) translational and/or rotational axes. In addition, the suspended configuration of the mirror mount may result in little or no compressive and/or shear forces exerted on the mirror, thereby decreasing the likelihood that the reflective surface of the mirror experiences unintentional deformation.

Figure 3A:
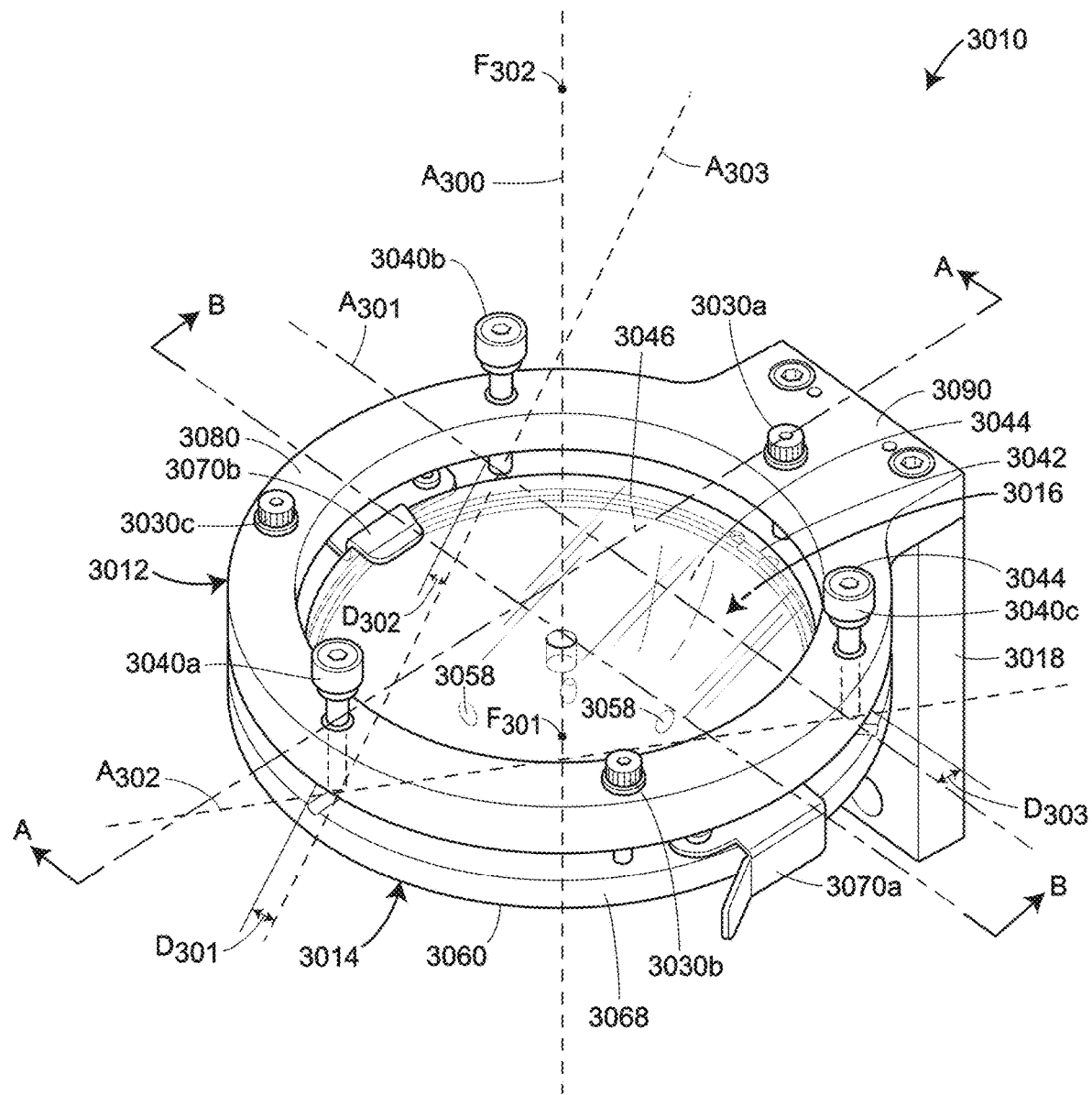
FIG. 3A is a perspective view of one embodiment of an adjustable mirror assembly constructed in accordance with principles of the present disclosure.
Figure 3B:
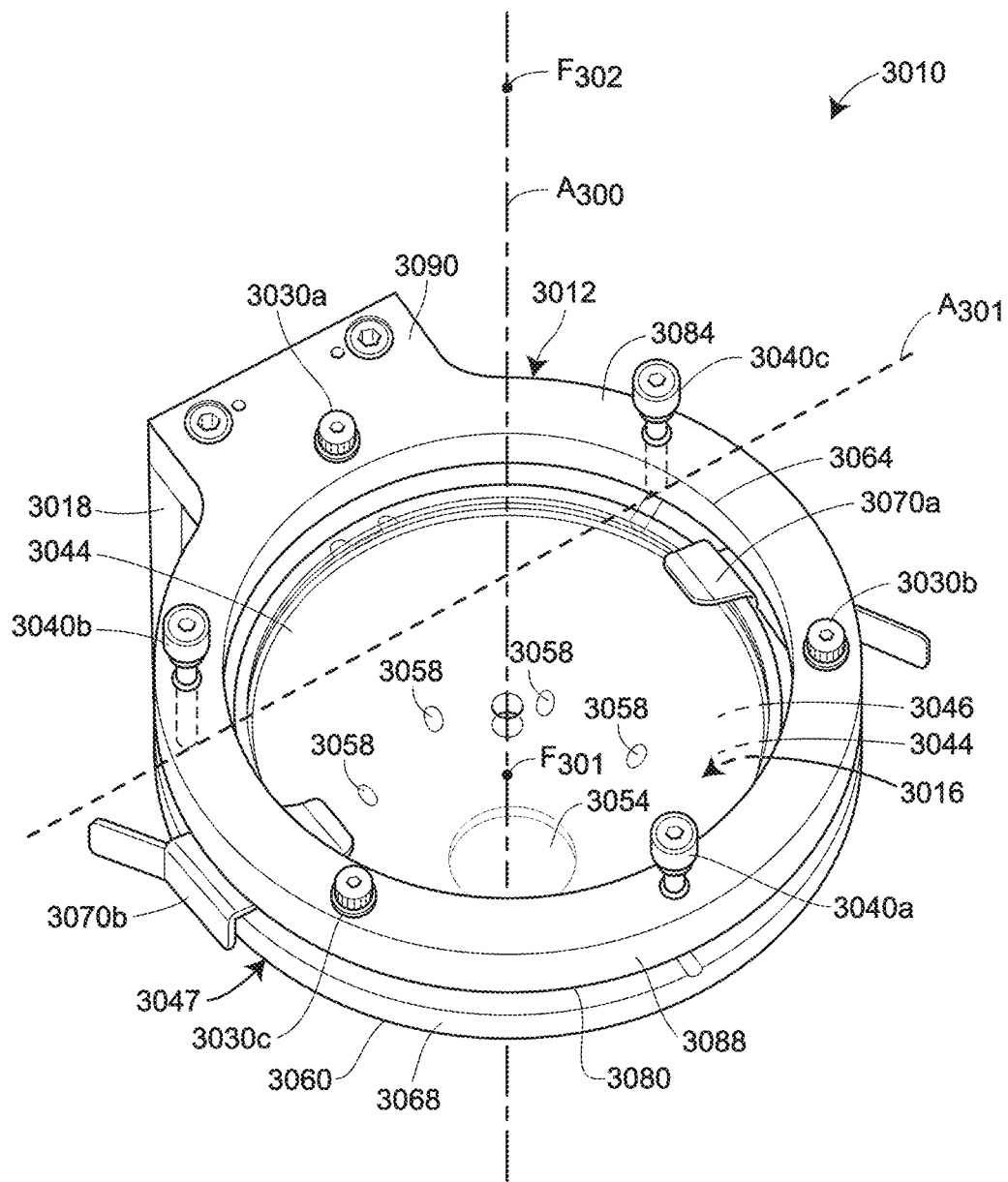
FIG. 3B is another perspective view of the adjustable mirror assembly depicted in FIG. 3A.

FIGS. 3A and 3B depict perspective views of an embodiment of an adjustable mirror assembly 3010 constructed in accordance with principles of the present disclosure. The adjustable mirror assembly 3010 may include a base mount 3012, a mirror mount 3014 suspended below the base mount 3012, and a mirror 3016 suspended below the base mount 3012. The base mount 3012 may be fixed to and movable in one or more linear directions (e.g., an x-direction, a y-direction, and/or a z-direction) by a translational mount 3018. The mirror 3016 may include a concave interior surface 3044, a first focal point $F_{301}$, a second focal point $F_{302}$, and an optical axis $A_{300}$ passing through the first and second focal points $F_{301}$ and $F_{302}$. A plurality of biasing members 3030a, 3030b, and 3030c may extend between and connect the base mount 3012 and the mirror mount 3014. The biasing members 3030a, 3030b, and 3030c may exert a biasing force on the mirror mount 3014 that urges the mirror mount 3014 toward the base mount 3012. Also extending between the base mount 3012 and the mirror mount 3014 is a plurality of adjustable positioning members 3040a, 3040b, and 3040c. The adjustable positioning members 3040a, 3040b, and 3040c may be individually adjusted to tilt the mirror mount 3014 and/or the mirror 3016, respectively, about axes $A_{301}$, $A_{302}$, and $A_{303}$, each of which may be transverse to the optical axis $A_{300}$ of the mirror 3016. Additionally, the adjustable mirror assembly 3010 may optionally include a transparent cover 3042 fixed to the mirror mount 3014 and covering an open end of the mirror 3016.

Each of the foregoing components of the adjustable mirror assembly 3010 will now be described in more detail.

Figure 3C:
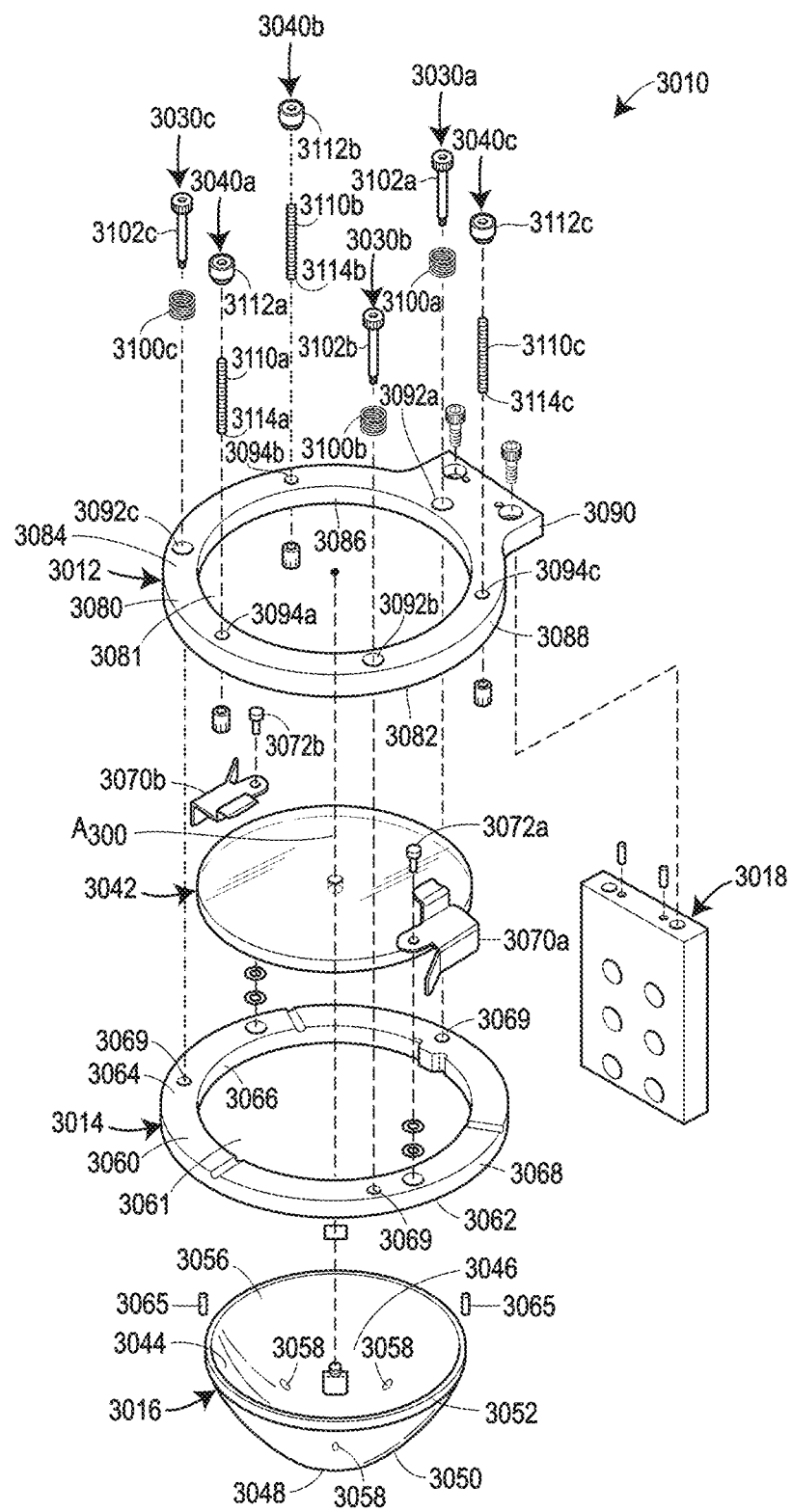
FIG. 3C is an exploded assembly view of the adjustable mirror assembly depicted in FIG. 3A.

Referring to FIG. 3C, the mirror 3016 may include a concave interior surface 3044 that surrounds and defines an internal volume 3046. The concave interior surface 3044 may collect electromagnetic energy emitted or transmitted by and/or from a source (e.g., an analyte at an interrogation region, or a light source) and reflect or transmit the electromagnetic energy at a target (e.g., a detector, or an analyte at an interrogation region). Any number of concave, reflective surface geometries may be employed for the concave interior surface 3044 to collect and/or focus the electromagnetic energy onto a target, including paraboloid geometries, ellipsoid geometries, hyperboloid geometries, spheroid geometries, and/or other geometries, including, but not limited to, some surfaces of or related to the general mathematical form of equations of the second degree in three dimensions (e.g., $f(x,y,z)=ax^2+by^2+cz^2+2fyz+2gxz+2hxy+2px+2qy+2rz+d=0$). It will be understood, herein, that the concave interior surface 3044 may be considered, for example, generally ellipsoid, paraboloid, hyperboloid, spheroid, or otherwise shaped despite disruptions, holes, or gaps in the concave interior surface 3044. For example, in some embodiments, an ellipsoidal concave interior surface 3044 may be truncated at one or both of its vertexes, and yet still be considered ellipsoidal.

The concave interior surface 3044 may correspond to the surface of a truncated ellipsoid that may be formed by revolving an ellipse about its major axis and truncating the resulting three-dimensional shape at both ends. The ellipsoidal shape of the concave interior surface 3044 may impart the mirror 3016 with the first focal point $F_{301}$ and the second focal point $F_{302}$. Electromagnetic energy originating at the first focal point $F_{301}$ may be reflected or transmitted by the concave interior surface 3044 toward the second focal point $F_{302}$, and vice versa. The mirror 3016 may have more than two focal points (e.g., three, four, five, six, seven, eight, nine, or ten), or even a single focal point, depending on the geometry of the concave interior surface 3044. In an embodiment where the concave interior surface 3044 has a paraboloid geometry, the mirror may possess a single focal point on its optical axis.

Referring back to FIGS. 3A and 3B, the first and second focal points $F_{301}$ and $F_{302}$ may be aligned along the optical axis $A_{300}$ of the mirror 3016. The concave interior surface 3044 of the mirror 3016 may be rotationally symmetric about the optical axis $A_{300}$ and/or a major axis of the ellipsoidal shape of the concave interior surface 3044. In some embodiments, a flow cell, which may be a tube containing a core-in-sheath flow such as that formed by a hydrodynamic focusing element, such as described below, may be inserted into the interior volume 3046 of the mirror 3016 substantially along the optical axis $A_{300}$ and/or arranged at the first focal point $F_{301}$.

The mirror 3016 may further possess a vertex 3048. As used herein, "vertex" shall be understood to include those regions of the mirror 3016 corresponding to a vertex regardless of whether the mirror 3016 includes a wall or an opening at the vertex. For example, as shown in FIG. 3A, a mirror 3016 having a truncated shape is considered to have a vertex 3048 where a physical vertex would be located if not for the truncation.

Referring to FIG. 3C, the mirror 3016 may possess a first end 3050 and a second end 3052 spaced from the first end 3050. The first end 3050 and the second end 3052 may form opposite ends of the mirror 3016. The first end 3050 may include the vertex 3048 and a first opening 3054, and the second end 3052 may possess a second opening 3056. The optical axis $A_{300}$ may pass through a center of each of the first and second openings 3054 and 3056. The second opening 3056 may be larger than the first opening 3054. In some embodiments, the first opening 3054 may be formed by truncating the ellipsoidal shape of the mirror 3016 along a plane orthogonal to the optical axis $A_{300}$ between the first focal point $F_{301}$ and a vertex of the ellipsoidal shape closest to the first focal point $F_{301}$. In some embodiments, the second opening 3056 may be formed by truncating the ellipsoidal shape of the mirror 3016 along a minor axis of the ellipsoidal shape, or alternatively, along a plane orthogonal to the optical axis $A_{300}$ and disposed between the minor axis of the ellipsoidal shape and the first focal point $F_{301}$. In some embodiments, the first opening 3054 and/or the second opening 3056 may be circular.

Still referring to FIG. 3C, a plurality of side apertures 3058 may extend through the sidewall of the mirror 3016. The side apertures 3058 may be disposed on a plane which is orthogonal to the optical axis $A_{300}$ and which extends through the first focal point $F_{301}$. In some embodiments, some or all of the side apertures 3058 may be offset from a plane by different distances. During operation, the side apertures 3058 may permit beams of electromagnetic energy, incoming from different directions, to pass through the sidewall of the mirror 3016 and strike a target (e.g., a flow cell) that is positioned within the interior volume 3046 of the mirror 3016 and which may be coincidentally aligned with the first focal point $F_{301}$.

Figure 3D:
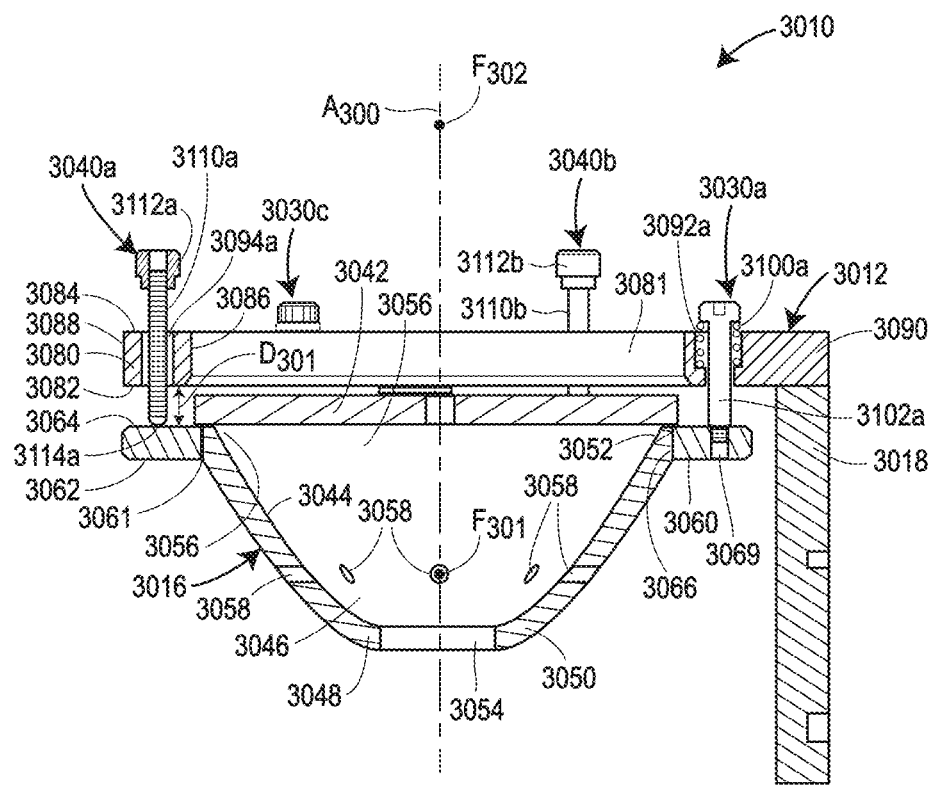
FIG. 3D is a cross-sectional view along line A-A of FIG. 3A.
Figure 3E:
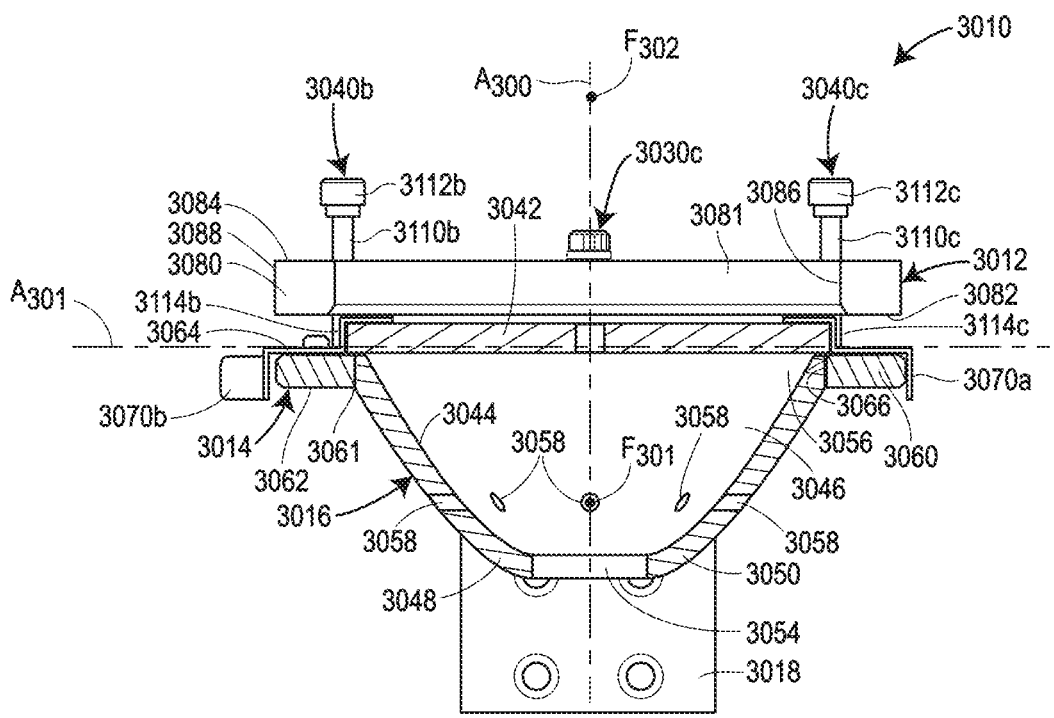
FIG. 3E is a cross-sectional view along line B-B of FIG. 3A.

Referring to the cross-sectional view depicted in FIGS. 3D and 3E, the mirror mount 3014 may be formed by a ring-shaped plate 3060 including a central opening 3061, a first axial end surface 3062 facing in a downward direction, a second axial end surface 3064 faced in an upward direction, an inner circumferential surface 3066 surrounding the central opening 3061, and an outer circumferential surface 3068. The ring-shaped plate 3060 may possess a circular cross-section that extends partially or entirely along a length of the ring-shaped plate 3060. A central axis of the ring-shaped plate 3060 may be aligned with the optical axis $A_{300}$ of the mirror 3016. The ring-shaped plate 3060 may further include one or more holes 3069, which may be threaded or non-threaded, and receive fasteners or other connecting members for connecting the mirror mount 3014 to the mirror 3016, the transparent cover 3042, and/or the base mount 3012.

As illustrated in FIGS. 3D and 3E, the second end 3052 of the mirror 3016 may be fixed to the mirror mount 3014, such that the first end 3050 of the mirror 3016 is positioned below the mirror mount 3014. A rigid connection may be formed between the mirror 3016 and the mirror mount 3014 such that the mirror 3016 does not move relative to the mirror mount 3014, and such that the mirror mount 3014 and the mirror 3016 move together as a single unit. In some embodiments, the exterior surface of the mirror 3016 may be adhered and/or welded to the inner circumferential surface 3066 of the ring-shaped plate 3060 of the mirror mount 3014, thereby avoiding the use of fasteners that may deform the mirror 3016 and interfere with the reflective properties of the concave interior surface 3044. In other embodiments, the second end 3052 of the mirror 3016 may be removably fastened to the first axial end surface 3062 of the ring-shaped plate 3060 of the mirror mount 3014 with a plurality of fasteners. In still further embodiments, the second end 3052 of the mirror 3016 may possess an outwardly extending annular flange that rests against the second axial end surface 3064 of the mirror mount 3014, which may be pressed against the second axial end surface 3064 of the mirror mount 3014 by the transparent cover 3042. Alternatively, the outwardly extending annular flange of the second end 3052 of the mirror 3016 may rest against an inwardly extending annular flange which protrudes from the inner circumferential surface 3066 of the ring-shaped plate 3060 of the mirror mount 3014. In still further embodiments, the second end 3052 of the mirror 3016 may have an outer diameter that is greater than an inner diameter of the inner circumferential surface 3066 of the ring-shaped plate 3060 such that an interference fit or snap fit is formed between the second end 3052 of the mirror 3016 and the inner circumferential surface 3066 of the ring-shaped plate 3060 of the mirror mount 3014.

Referring to FIG. 3C, a potting material 3065 may be positioned at the interface between the mirror mount 3014 and the mirror 3016 to reduce the transmission of mechanical shocks and/or vibrations to the mirror 3016. The potting material 3065 may be made of a shock-absorbing material such as a silicone rubber gel, a thermosetting plastic, or any other suitable material.

Brackets 3070a and 3070b may be used to clamp the transparent cover 3042 against the second axial end surface 3064 of the ring-shaped plate 3060 of the mirror mount 3014 and/or the second end 3052 of the mirror 3016. The brackets 3070a and 3070b may be removably fastened to the ring-shaped plate 3060 by fasteners 3072a and 3072b. The transparent cover 3042 may sealingly engage a rim surrounding the second opening 3056 of the mirror 3016. Accordingly, the transparent cover 3042 may be used to contain a medium (e.g., a gas) within the internal volume 3046 of the mirror 3016. The medium may help mitigate the refractive effects of a flow cell wall/air interface.

The base mount 3012 may be formed by a ring-shaped plate 3080 including a central opening 3081, a first axial end surface 3082 facing in the downward direction, a second axial end surface 3084 facing in the upward direction, an inner circumferential surface 3086 surrounding the central opening 3081, and an outer circumferential surface 3088. The ring-shaped plate 3080 may possess a circular cross-section that extends partially or entirely along a length of the ring-shaped plate 3080. The base mount 3012 may further include a flange 3090 that protrudes outwardly away from the ring-shaped plate 3080 and which can be fixed to the translational mount 3018. A rigid connection may be formed between the flange 3090 and the translational mount 3018 such that the base mount 3012 does not move relative to the translational mount 3018, and such that the translational mount 3018 and the base mount 3012 move together as a single unit. The base mount 3012 may further include a first plurality of holes 3092a, 3092b, and 3092c for receiving, respectively, the biasing members 3030a, 3030b, and 3030c, and a second plurality of holes 3094a, 3094b, and 3094c for receiving, respectively, the adjustable positioning members 3040a, 3040b, and 3040c. Both the base mount 3012 and the mirror mount 3014 may be made of a rigid material such as a metal, an alloy, a thermoplastic, a ceramic, or any other suitable material.

Referring again to FIGS. 3A, 3C, and 3D, the biasing members 3030a, 3030b, and 3030c may extend between and connect the base mount 3012 and the mirror mount 3014. Each of the biasing members 3030a, 3030b, and 3030c may be oriented in a manner parallel, or substantially parallel, to the optical axis $A_{300}$. Each of the biasing members 3030a, 3030b, and 3030c may be formed at least by the combination of a compression spring (e.g., one of compression springs 3100a, 3100b, and 3100c) and a bolt (e.g., one of bolts 3102a, 3102b, and 3102c). As illustrated in FIG. 3D, each of compression springs 3100a, 3100b, and 3100c may be positioned in a corresponding one of the holes 3092a, 3092b, and 3092c and rest against annular protrusion extending inwardly from the corresponding one of the holes 3092a, 3092b, and 3092c. Each of the bolts 3102a, 3102b, and 3102c may extend through the hollow center of its corresponding one of the compression springs 3100a, 3100b, and 3100c and through a corresponding one of the holes 3092a, 3092b, and 3092c. As illustrated in FIG. 3D, each of the bolts 3102a, 3102b, and 3102c may have a threaded tip 3093a, 3093b, or 3093c that threadably engages a threaded hole in the mirror mount 3014, such that the bolts 3102a, 3102b, and 3102c can be fixed to the mirror mount 3014 in a rigid manner. Additionally, the biasing members 3030a, 3030b, and 3030c may be alternatingly arranged, and equally spaced, with the adjustable positioning members 3040a, 3040b, and 3040c in a circle about the ring-shaped plate 3080 of the base mount 3012, as illustrated in FIGS. 3A and 3B. As depicted in FIGS. 3A and 3B, the biasing member 3030a may be diametrically opposed to the adjustable positioning member 3040a, the biasing member 3030b may be diametrically opposed to the adjustable positioning member 3040b, and the biasing member 3030c may be diametrically opposed to the adjustable positioning member 3040c.

Each of the compression springs 3100a, 3100b, and 3100c pushes a head of a corresponding one of the bolts 3102a, 3102b, and 3102c in the upward direction. This causes each of the bolts 3102a, 3102b, and 3102c to exert, respectively, a first biasing force, a second biasing force, and a third biasing force on the mirror mount 3014. Each of the biasing forces urges the mirror mount 3014 in the upward direction toward the base mount 3012. Accordingly, each of the biasing members 3030a, 3030b, and 3030c biases the mirror mount 3014 toward the base mount 3012. In alternative embodiments, each of the biasing members 3030a, 3030b, and 3030c may exert a biasing force on the mirror mount 3014 that urges the mirror mount 3014 away from the base mount 3012.

Still referring to FIGS. 3A, 3C, and 3D, each of the adjustable positioning members 3040a, 3040b, and 3040c may extend between the base mount 3012 and the mirror mount 3014 and may be parallel, or substantially parallel, to the optical axis $A_{300}$. Each of the adjustable positioning members 3040a, 3040b, and 3040c may be formed by the combination of a set screw (e.g., one of set the screws 3110a, 3110b, and 3110c) and a knob (e.g., one of the knobs 3112a, 3112b, and 3112c). Each set screw and its corresponding knob may form a single, unitary structure, or may be separate components that are fixed together. Each of the set screws 3110a, 3110b, and 3110c may extend through a corresponding one of the holes 3094a, 3094b, and 3094c, and have a threaded exterior surface which threadably engages a threaded interior surface of the corresponding one of the holes 3094a, 3094b, and 3094c. A rounded tip 3114a, 3114b, and 3114c of each of the set screws 3110a, 3110b, and 3110c may contact the second axial end surface 3064 of the ring-shaped plate 3060 of the mirror mount 3014. The rounded tips 3114a, 3114b, and 3114c of each of the set screws 3110a, 3110b, and 3110c may stay in contact with the mirror mount 3014 as a result of the biasing members 3030a, 3030b, and 3030c urging the mirror mount 3014 toward the base mount 3012.

The knobs 3112a, 3112b, and 3112c may provide a grip for a user to manually rotate each of the set screws 3110a, 3110b, and 3110c. Alternatively, or additionally, computer-controlled motors or piezoelectric devices may be used to automatically and individually rotate each of the set screws 3110a, 3110b, and 3110c, for example, in response to a feedback signal indicating whether the first focal $F_{301}$ and/or the second focal point $F_{302}$ is aligned with its intended targets. As an example, one such feedback signal may be a signal from an analyte, detected by a detector, which signal can be maximized or otherwise optimized ("peaked") by scanning through positions of the set screws 3110 individually and iteratively. (As is understood, where a maximum is unstable, it may be preferable to "peak" the system at a nearby "shoulder" value that is stable, though not quite the maximum.) In some embodiments, a computer may be used to automatically adjust one or more of the set screws 3110a, 3110b, and 3110c in real-time during a flow cytometric sorting operation to keep the first focal point $F_{301}$ aligned with the core of a core-in-sheath flow as the core fluctuates in the core-and-sheath flow.

Each of the set screws 3110a, 3110b, and 3110c may control, respectively, a first distance $D_{301}$, a second distance $D_{302}$, and a third distance $D_{303}$ between the first axial end surface 3082 of the ring-shaped plate 3080 of the base mount 3012 and the second axial end surface 3064 of the ring-shaped plate 3060 of the mirror mount 3014. Rotating the set screws 3110a, 3110b, and 3110c in the clockwise direction may threadably advance the set screws 3110a, 3110b, and 3110c in the downward direction toward the mirror mount 3014, thereby overcoming the upward biasing force exerted by each of the biasing members 3030a, 3030b, and 3030c and moving the mirror mount 3014 away from the base mount 3012. By contrast, rotating the set screws 3110a, 3110b, and 3110c in the counter-clockwise direction may threadably retract the set screws 3110a, 3110b, and 3110c in the upward direction away from the mirror mount 3014, thereby allowing the upward biasing force exerted by each of the biasing members 3030a, 3030b, and 3030c to move the mirror mount 3014 toward the base mount 3012.

The first distance $D_{301}$ may correspond to the orthogonal distance between the first axial end surface 3082 of the ring-shaped plate 3080 of the base mount 3012 and the second axial end surface 3064 of the ring-shaped plate 3060 of the mirror mount 3014 at the first adjustable positioning member 3040a. The second distance $D_{302}$ may correspond to the orthogonal distance between the first axial end surface 3082 of the ring-shaped plate 3080 of the base mount 3012 and the second axial end surface 3064 of the ring-shaped plate 3060 of the mirror mount 3014 at the second adjustable positioning member 3040b. The third distance $D_{303}$ may correspond to the orthogonal distance between the first axial end surface 3082 of the ring-shaped plate 3080 of the base mount 3012 and the second axial end surface 3064 of the ring-shaped plate 3060 of the mirror mount 3014 at the third adjustable positioning member 3040c.

Adjusting one or more of the first, second, and third distances $D_{301}$, $D_{302}$, and $D_{303}$ has the effect of tilting (e.g., rotating) the mirror mount 3014, and the mirror 3016 by virtue of its rigid attachment to the mirror mount 3014, about a corresponding one of the first, second, and third axes $A_{301}$, $A_{302}$, and $A_{303}$. For example, changing the first distance $D_{301}$, while maintaining the second and third distances $D_{302}$ and $D_{303}$, causes the mirror mount 3014 and the mirror 3016 to tilt about the first axis $A_{301}$. Changing the second distance $D_{302}$, while maintaining the first and third distances $D_{301}$ and $D_{303}$, causes the mirror mount 3014 and the mirror 3016 to tilt about the second axis $A_{302}$. Changing the third distance $D_{303}$, while maintaining the first and second distances $D_{301}$ and $D_{302}$, causes the mirror mount 3014 and the mirror 3016 to tilt about the third axis $A_{303}$.

Tilting the mirror 3016 about one or more of the first, second, and third axes $A_{301}$, $A_{302}$, and $A_{303}$ advantageously allows a user to make small and/or large adjustments to the orientation of the optical axis $A_{300}$, and correspondingly, the locations of the first and second focal points $F_{301}$ and $F_{302}$. This feature may help a user to align the first focal point $F_{301}$ with, for example, an illumination region where a sample including an analyte is to be illuminated, and to align the second focal point $F_{302}$ with, for example, a detector configured to detect a signal generated in response to illumination of an analyte. Also, when the mirror mount 3014 is tilted, the adjustable positioning members 3040a, 3040b, and 3040c, by virtue of their rounded tips 3114a, 3114b, and 3114c, may slide along the second axial end surface 3064 of the mirror mount 3014 without damaging the second axial end surface 3064.

When one of the adjustable positioning members 3040a, 3040b, and 3040c is adjusted, the other two of the adjustable positioning members 3040a, 3040b, and 3040c may remain stationary and provide, either singly or in combination, a fulcrum about which the mirror mount 3014 and the mirror 3016 can tilt. In accordance with this principle, the first axis $A_{301}$ may pass through a point where the rounded tip 3114b of the second adjustable positioning member 3040b contacts the second axial end surface 3064 of the mirror mount 3014 and a point where the rounded tip 3114c of the third adjustable positioning member 3040c contacts the second axial end surface 3064 of the mirror mount 3014, as illustrated in FIGS. 3A and 3E. The axis $A_{301}$ is also illustrated in FIG. 3B to help clarify that the axis $A_{301}$ passes through the contact point between the rounded tip 3114b of the second adjustable positioning member 3040b and the second axial end surface 3064 and the contact point between the rounded tip 3114c of the third adjustable positioning member 3040c and the second axial end surface 3064 of the mirror mount. Similarly, the second axis $A_{302}$ may pass through a point where the rounded tip 3114a of the first adjustable positioning member 3040a contacts the second axial end surface 3064 of the mirror mount 3014 and a point where the rounded tip 3114c of the third adjustable positioning member 3040c contacts the second axial end surface 3064 of the mirror mount 3014, as depicted in FIG. 3A. Similarly, the third axis $A_{303}$ may pass through a point where the rounded tip 3114a of the first adjustable positioning member 3040a contacts the second axial end surface 3064 of the mirror mount 3014 and a point where the rounded tip 3114b of the second adjustable positioning member 3040b contacts the second axial end surface 3064 of the mirror mount 3014, as depicted in FIG. 3A. As a result of this configuration, each of the first, second, and third axes $A_{301}$, $A_{302}$, and $A_{303}$ may be transverse (e.g., orthogonal or otherwise non-parallel) to the optical axis $A_{300}$ of the mirror 3016.

While the adjustable mirror assembly 3010 of the present embodiment is disclosed as having biasing members that pull the mirror mount toward the base mount, the scope of the present disclosure is not limited to this configuration. Rather, alternative embodiments of the adjustable mirror assembly 3010 could be arranged so that the biasing members push the mirror mount away from the base mount. In such alternative embodiments, each of the adjustable positioning members may comprise a screw-and-nut arrangement, with, for example, a head of a screw pressed against the upper surface of the base mount and a nut pressed against the lower surface of the mirror mount.

Additionally, while the present embodiment of the adjustable mirror assembly 3010 includes three biasing members and three adjustable positioning members, fewer or more biasing members and adjustable positioning members may be utilized, depending on the desired number of tilting axes. For example, the adjustable mirror assembly may have a single biasing member and a single adjustable positioning member, thereby providing a single axis for tilting the mirror. Additionally, the adjustable mirror assembly may have two, four, five, six, seven, or eight biasing members and two, four, five, six, seven, or eight positioning members, thereby providing, respectively, two, four, five, six, seven, or eight axes for tilting the mirror.

Also, while the number of biasing members may equal the number of adjustable positioning members, as in the embodiment illustrated in FIGS. 3A-3E, alternative embodiments could have a number of biasing members that differs from the number of adjustable positioning members. For example, the number of biasing members could be greater than the number of adjustable positioning members, or vice versa.

Figure 3F:
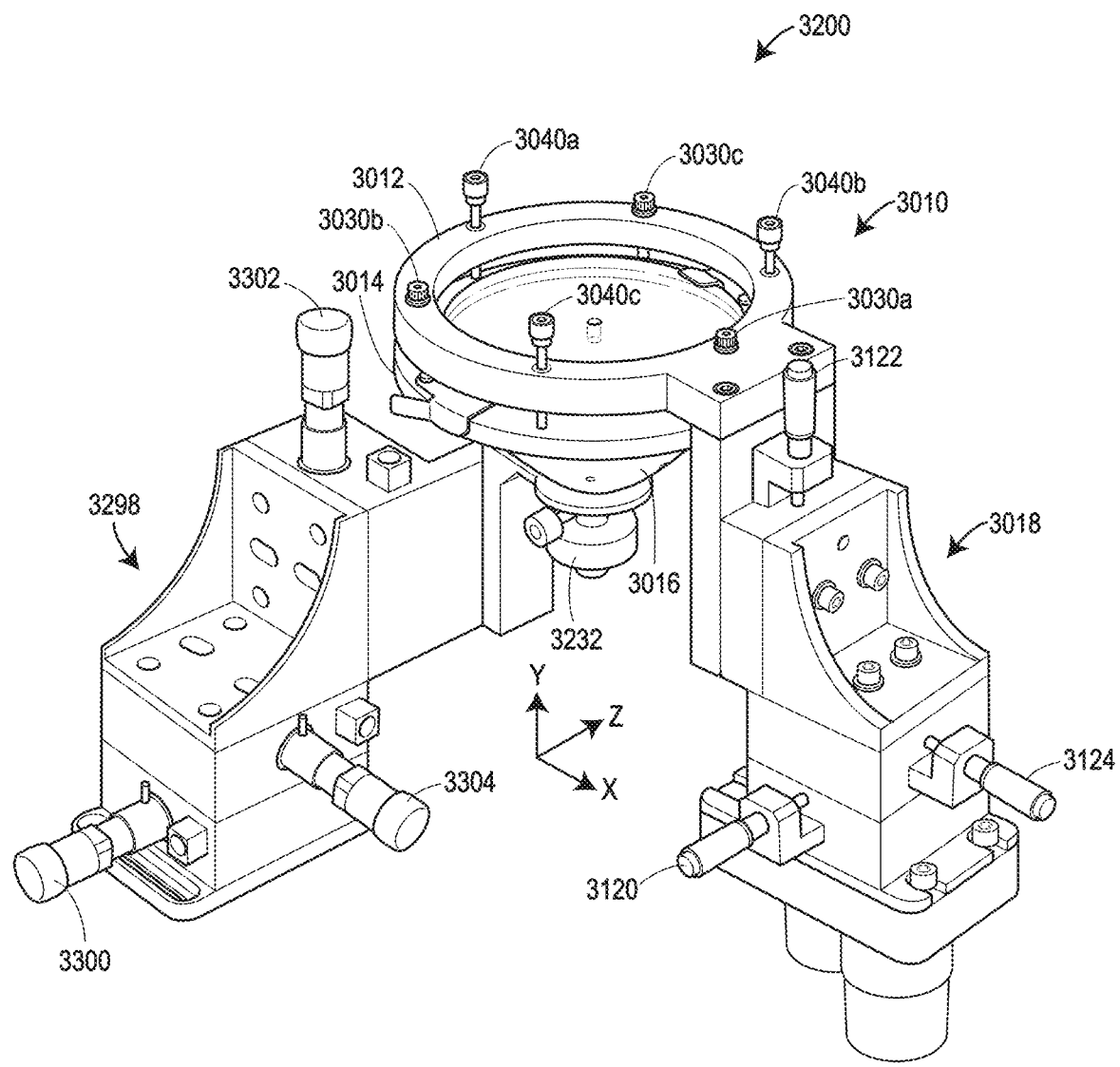
FIG. 3F is a perspective view of one embodiment of a system for detecting an analyte in a fluidic sample in accordance with principles of the present disclosure.

Referring to FIG. 3F, the translational mount 3018 may be fastened to the base mount 3012 and configured to translate the base mount 3012 in one or more linear directions (e.g., the x-direction, the y-direction, and/or the z-direction). By translating the base mount 3012, the mirror 3016 and its optical axis $A_{300}$ may be translated in one or more of the x-direction, the y-direction, and the z-direction to a desired location, for example, such that the first focal point $F_{301}$ is aligned, or substantially aligned, with an illumination region where a sample including an analyte is to be illuminated, and such the second focal point $F_{302}$ is aligned, or substantially aligned, with a detector configured to detect a signal generated in response to illumination of an analyte (or with a pinhole disposed between the detector and the illumination region). The extent of alignment of the second focal point $F_{302}$ with the detector (or with the pinhole) may be determined by adjusting the alignment to maximize the signal received by the detector. A focal point which has been "substantially aligned" by the translational mount 3018 and/or another mechanism with its desired location may be further adjusted by another mechanism (e.g., the first adjustable positioning member 3040a, the second adjustable positioning member 3040b, and/or the third adjustable positioning member 3040c) so that the focal point is moved even closer to, and potentially even aligned coincidentally with, its desired location. The translational mount 3018 may be used as a coarse adjustment mechanism, prior to the use of the adjustable positioning members 3040a, 3040b, and 3040c, to position the first and/or second focal points $F_{301}$ and $F_{302}$ near, but perhaps not precisely at, their desired locations.

The translational mount 3018 may include a first translational adjustment mechanism 3120 configured to translate the base mount 3012 back and forth in the x-direction, a second adjustment mechanism 3122 configured to translate the base mount 3012 back and forth in the y-direction, and a third adjustment mechanism 3124 configured to translate the base mount 3012 back and forth in the z-direction. Each of the translational adjustment mechanisms 3120, 3122, and 3124 may include a rack and pinion mechanism that converts manual rotational movement of a knob into linear motion. Alternatively, or additionally, computer-controlled step motors may be used to automatically and individually adjust each of the adjustment mechanisms 3120, 3122, and 3124, for example, in response to a feedback signal indicating whether the first focal $F_{301}$ and/or the second focal point $F_{302}$ is aligned with its desired location. In some embodiments, a computer may be used to automatically adjust one or more of the adjustment mechanisms 3120, 3122, and 3124 in real-time, for example, during a flow cytometric sorting operation to keep the first focal point $F_{301}$ aligned with the core of a core-in-sheath flow as the core fluctuates in the core-and-sheath flow.

The adjustable mirror assembly 3010 may be implemented in a variety of optical applications benefiting from an adjustable mirror. Such applications include flow cytometric sorting applications such as the flow cytometric sorting of mammalian sperm cells into populations bearing X chromosomes and/or populations bearing Y chromosomes, with the purpose of increasing the probability that fertilization of an egg with the sorted sperm will result in offspring having a desired sex. Dairy farms may employ flow cytometric sorting to sort the sperm of a bull so that bovine embryos may be produced, by artificial insemination, in vitro fertilization, or other means, using a preparation of sperm cells having an increased frequency of X chromosome-bearing sperm cells to produce additional female bovine offspring, or an increased frequency of Y chromosome-bearing cells to produce additional male bovine offspring.

Figure 3G:
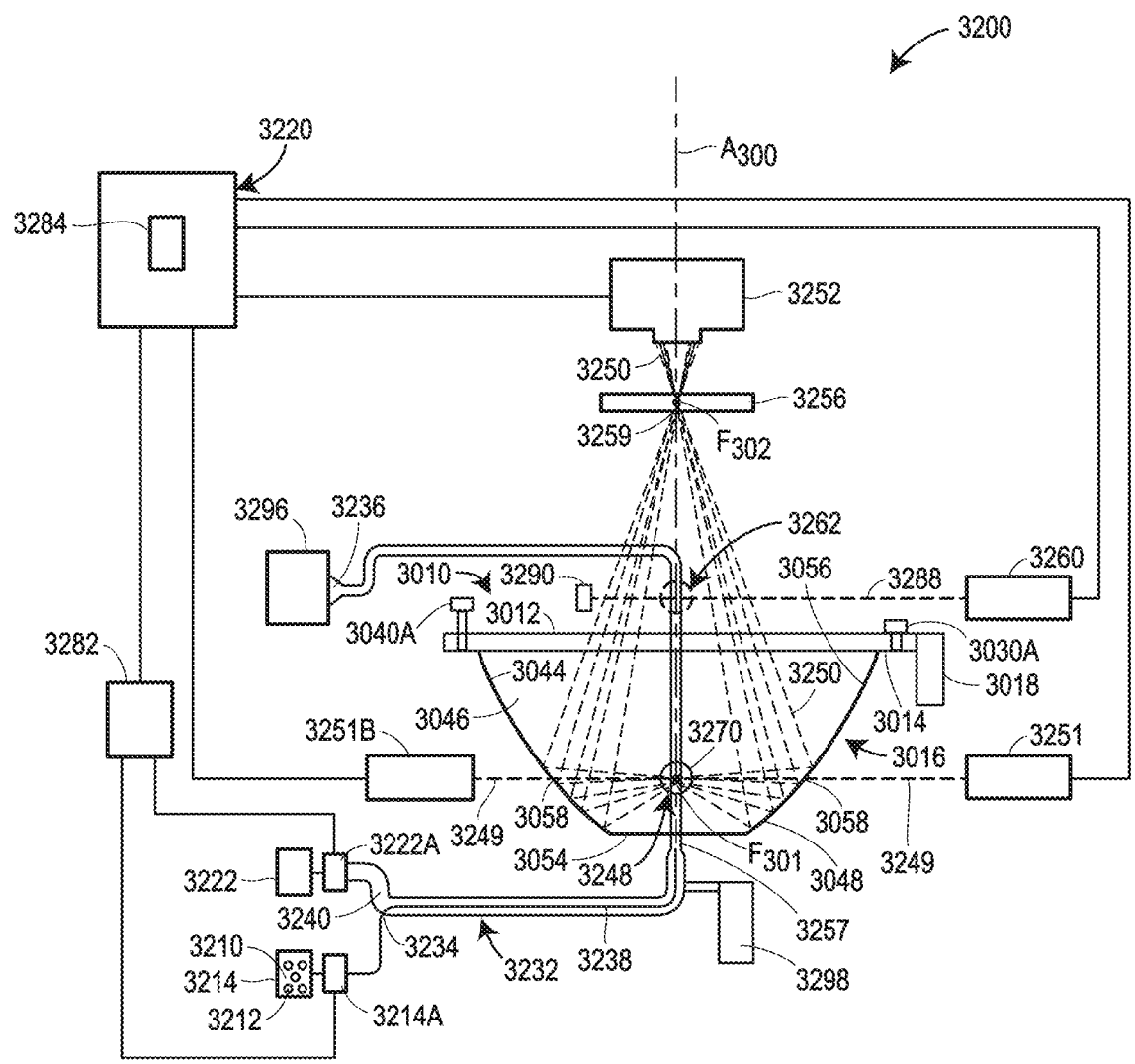
FIG. 3G is a schematic illustration of one embodiment of a system for detecting an analyte in a fluidic sample in accordance with principles of the present disclosure.

FIG. 3G depicts an exemplary embodiment of a system 3200 for performing flow cytometry that incorporates the adjustable mirror assembly 3010 described above. The system 3200 may be used to detect an analyte or analytes in a fluidic sample. The system 3200 may include any combination of features including those described in U.S. Patent Application Publication No. 2014/0030696, which is hereby incorporated by reference in its entirety. The analytes may be cells, proteins, cytokines, hormones, chemical compounds, molecules, or any other human or non-human particles, or even non-biological particles. In some embodiments, the analytes may be non-human cells from an agricultural animal such a bull, cow, pig, chicken, bison, horse, sheep, llama, fish, or any other non-human animal including a honey badger. The system 3200 may employ any suitable flow cell configuration including those disclosed throughout this specification.

The system 3200 may include a flow cell 3232 (e.g., a closed flow cell) having a sample inlet 3234, a sample outlet 3236, and a flow path 3238 extending between the sample inlet 3234 and the sample outlet 3236. The sample inlet 3234 may be supplied with a fluidic sample 3210 (e.g., non-human mammalian semen) including analytes 3212 (e.g., non-human mammalian sperm cells) from a sample fluid supply 3214. A pump 3214A may be configured to move the fluidic sample 3210 from the sample fluid supply 3214 to the sample inlet 3234. The flow cell 3232 may further include a sheath fluid inlet 3240 supplied with a sheath fluid 3220 from a sheath fluid supply 3222. A pump 3222A may be configured to move the sheath fluid 3220 from the sheath fluid supply 3222 to the sheath fluid inlet 3240 for later formation of a core-in-sheath flow.

A portion of the flow cell 3232 may pass through the interior volume 3046 of the mirror 3016. For example, as illustrated in FIG. 3G, the flow cell 3232 may enter the interior volume 3046 through the first opening 3054 located at the vertex 3048 of the mirror 3016, and exit the interior volume 3046 through the second opening 3056.

The system 3200 may also include illumination sources 3251A and 3251B for illumination of the fluidic sample 3210 at an interrogation region 3248. The portion of the flow path 3238 passing through the interrogation region 3248 may be coaxially aligned with the optical axis $A_{300}$ of the mirror 3016. Each of the illumination sources 3251A and 3251B may emit a beam of electromagnetic energy 3249 through a corresponding one of the side apertures 3058 formed in the mirror 3016 and toward the interrogation region 3248. The interrogation region 3248 may be aligned coincidentally with the first focal point $F_{301}$ of the mirror 3016 by tilting the mirror 3016 about one or more of the axes $A_{301}$, $A_{302}$, and $A_{303}$ by way of one or more of the adjustable positioning members 3040a, 3040b, and 3040c and/or by moving the mirror 3016 in one or more of the x-direction, the y-direction, or the z-direction by way of the translational mount 3018.

The flow cell 3232 may include a hydrodynamic focusing element 3257 that creates a core-in-sheath flow of the fluidic sample 3210 within the sheath fluid 3220. The core-in-sheath flow may be stable, or substantially stable, prior to passing through the interrogation region 3248. The flow rate of the core-in-sheath flow may be in a range of approximately (e.g., ±10%) 1 m/s to 100 m/s, or 1 m/s to 80 m/s, or 1 m/s to about 3060 m/s, or 15 m/s to 50 m/s, or 20 m/s to 45 m/s, or 30 m/s to 40 m/s. The analytes 3212 in the core-in-sheath flow may be spaced such that the number of analytes 3212 passing through the interrogation region per second may be in a range of approximately (e.g., ±10%) 100 to 1,000,000 analytes 3212 per second, or 1,000 to 500,000 analytes 3212 per second, or 10,000 to 300,000 analytes 3212 per second, or 10,000 to 200,000 analytes 3212 per second, or 25,000 to 100,000 analytes 3212 per second. The spacing between the analytes 3212 may be adjusted by, for example, adjusting the relative velocities and/or flow rates of the core and sheath flows, which may, in turn, be accomplished by a flow control system adjusting respective signals to pumps connected to the respective supplies of sheath fluid and sample fluid, as discussed below in more detail.

Upon illumination, each analyte 3212 reflects, emits, transmits, or otherwise generates a detectable signal 3250. The concave interior surface 3044 of the mirror 3016 reflects or transmits the detectable signal 3250 at a detector 3252 for detection of the detectable signal 3250, or, as illustrated in FIG. 3G, at a pinhole 3254 formed in a paraxial lens 3256 that focuses the detectable signal 3250 on the detector 3252. The detector 3252 or the pinhole 3254 of the paraxial lens 3251 may be aligned coincidentally with the second focal point $F_{302}$ of the mirror 3016 by tilting the mirror 3016 about one or more of the axes $A_{301}$, $A_{302}$, and $A_{303}$ with one or more of the adjustable positioning members 3040a, 3040b, and 3040c and/or by moving the mirror 3016 in one or more of the x-direction, the y-direction, and the z-direction with the translational mount 3018.

Figure 3H:
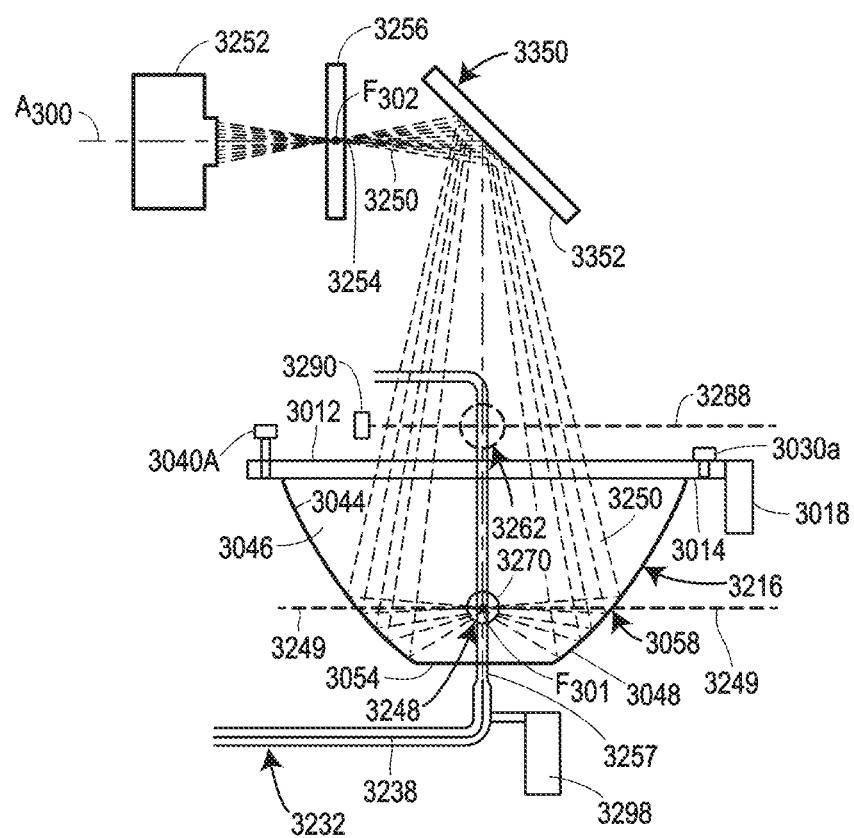
FIG. 3H is schematic illustration of an alternative arrangement of the optical axis of the mirror.

While the optical axis $A_{300}$ of the embodiment illustrated in FIG. 3G is linear and extends, in its entirety, along the major axis of the mirror 3016, alternative embodiments can be arranged with a non-linear optical axis $A_{300}$, for example, by incorporating an optical element such as a mirror to form a bend or turn in the optical axis $A_{300}$. FIG. 3H illustrates such an alternative embodiment. Here, a mirror 3350 having a planar reflective surface 3352 is used to create a ninety degree angle in a portion of the optical axis $A_{300}$ arranged above the mirror 3016. As a result, the second focal point $F_{302}$ is moved to a location that is offset from the major axis associated with the concave interior surface 3044 of the mirror 3016. In operation, the concave interior surface 3044 of the mirror 3016 may reflect or transmit the detectable signal 3250 at the planar reflective surface 3352 of the mirror 3350, which in turn may reflect or transmit the detectable signal 3250 at the second focal point $F_{302}$. Similar to the embodiment illustrated in FIG. 3G, the second focal point $F_{302}$ may be aligned with the pinhole 3254 formed in the paraxial lens 3256, as illustrated in FIG. 3H, or with the detector 3252. Use of the mirror 3350 to change the path of the optical axis $A_{300}$ advantageously allows the detector 3252 to be arranged in various locations based on, for example, space and/or design constraints.

Referring back to FIG. 3G, the flow cell 3232 may have any suitable cross sectional shape, including, but not limited to, a generally circular, elliptical, rectangular, square, or any other polygonal shape. In various embodiments, the portion of the flow cell 3232 passing through the mirror 3016 may be cylindrical having a circular cross-sectional shape. In any of the embodiments described herein, the flow cell 3232 may optionally include a spherical molding 3270 (as shown in FIG. 3G) surrounding the interrogation region 3248. The spherical molding 3270 may be formed of a material having an index of refraction within a suitable tolerance of the index of refraction of the wall of the flow cell 3232 at the interrogation region 3248. The spherical molding 3270 may mitigate or eliminate refractive distortion of the detectable signal 3250 resulting from the flow cell wall-air interface. The tolerance may be for example in a range of approximately (e.g., ±10%) 0 to 0.1.

The system 3200 may optionally include a sorting energy source 3260 for sorting of the analytes 3212 at a sorting region 3262 downstream of the interrogation region 3248.

As used herein, "closed flow cell" refers to an embodiment of the flow cell 3232 wherein at least the portion of the flow path 3238 passing through the interrogation region 3248 and/or passing through the sorting region 3262 is a closed flow path. As used herein, "closed flow path" refers to a flow path having a unitary flow path that is bounded by a flow cell wall and has no division or bifurcation. As used herein, "division" and "bifurcation" refer to any separation of the flow path into two or more separate paths. Accordingly, the flow cell 3232 may include a flow path 3238 between and through the interrogation region 3248 and sorting region 3262 that is completely bounded and undivided. Thus, in the flow cell 3232, sorting at the sorting region 3262 may be effected by a sorting energy focused on the sorting region 3262 and not by physical sorting of the sample into divided flow paths. The flow cell 3232 may advantageously eliminate the undesirable refractive effects on the electromagnetic energy caused by the interface between droplets in the sample and air in conventional, unclosed flow cells. Embodiments of the disclosure may, however, further include a region of physical sorting downstream of the sorting region 3262, for example, at the sample outlet 3236, for physically sorting the sample after application of the sorting energy, and/or for dividing the flowing fluid into separate components, for example and not by way of limitation, for separating some or all of the sheath fluid from the analyte-containing sample. Furthermore, embodiments of the disclosure may include a region of physical sorting downstream of the interrogation region 3248 and upstream of the sorting region 3262, for dividing the flowing fluid into separate components, for example and not by way of limitation, for separating some or all of the sheath fluid from the analyte-containing sample prior to the application of sorting energy at the sorting region 3262.

The system 3200 may also include a computer 3280 configured to control various elements of the system 3200. The computer 3280 receives sensor signals and other information from a flow control subsystem 3282, and sends control signals back to the flow control subsystem 3282. The flow control subsystem 3282 operates in accordance with the signals received from the computer 3280 to control the pump 3222A pumping the sheath fluid 3220 from the sheath fluid supply 3222 and to control the pump 3214A pumping the fluidic sample 3210 from the sample fluid supply 3214. As a result, a flow is created along a flow path 3238. A routine executed by the processor 3284 of the computer 3280 causes the computer 3280 to provide signals to the flow control subsystem 3282 such that the flow control subsystem 3282 maintains and/or adjusts the flows of the sheath fluid 3220 and the fluidic sample 3210 to maintain a stable flow and to optimize the spacing of the analytes 3212 within the core-in-sheath flow.

The computer 3280 is also communicatively coupled to the illumination energy sources 3251A and 3251B, providing to each one or more control signals for selectively energizing the illumination energy source 3251A or 3251B and/or determining a power setting of the illumination energy source 3251A or 3251B. Beams of illumination energy 3249 are projected from each of the illumination energy sources 3251A and 3251B through a corresponding one of the side apertures 3058 in the sidewall of the mirror 3016. The beams of illumination energy 3249 are directed toward the interrogation region 3248 in the flow path 3238. The spherical molding 3270 integrally formed in the flow cell 3232 at the interrogation region 3248 ensures that the illumination energy 3249 is not refracted as it falls incident on the analytes 3212.

As the illumination energy 3249 falls incident on one of the analytes 3212 within the interrogation region 3248, it causes the analyte 3212 to emit the detectable signal 3250 in the form of fluorescence. The spherical molding 3270 integrally formed in the flow cell 3232 at the interrogation region 3248 minimizes refraction of the detectable signal 3250 as it leaves the flow cell 3232. The detectable signal 3250 falls incident on the concave interior surface 3044, which may have its first focal point $F_{301}$ coincidentally aligned with the interrogation region 3248 in the flow path 3238. The concave interior surface 3044 reflects the detectable signal 3250 toward the second focal point $F_{302}$, which second focal point $F_{302}$ may be coincidentally aligned with the location of the pinhole 3254 of the paraxial lens 3254. The detectable signal 3250 passes through the pinhole 3254 and then falls incident on the detector 3252. Alternatively, the paraxial lens 3254 may be omitted, and the detector 3252 may be coincidentally aligned with second focal point $F_{302}$, so that the detectable signal 3250 falls incident directly on the detector 3252 after being reflected by the concave interior surface 3044.

The detector 3252, which may be communicatively coupled to the computer 3280, may send to the computer 3280 a signal corresponding to the detectable signal 3250. The computer 3280 executes a routine operable to receive the signal from the detector 3250, and to determine from the detector 3252 whether the analyte 3212 from which the detectable signal 3250 was emitted is in a desired sub-population (e.g., an X chromosome-bearing sperm cell, or a Y chromosome-bearing sperm cell) or not in the desired sub-population.

The computer 3280 is further communicatively coupled to the sorting energy source 3260. The computer 3280 may send a signal to the sorting energy source 3260 to selectively energize the sorting energy source 3260 at a time when the analyte 3212 from which the detectable signal 3250 was emitted will be in a sorting region 3262, which is disposed in the path of a beam electromagnetic energy 3288 emitted by the sorting energy source 3260. The computer 3280 causes the sorting energy source 3260 to emit electromagnetic energy 3288 when the analyte 3212 is not in the desired sub-population, and causes the sorting energy source 3260 not to emit electromagnetic energy 3288 when the analyte 3212 is in the desired sub-population. A routine executing on the computer 3280 may determine when the analyte 3212 will be in sorting region 3262 according to known parameters of the flow, which are, in any event, also controlled by the computer 3280 via the flow control subsystem 3282. A beam stop 3290 prevents the electromagnetic radiation 3288 from falling incident on other parts of the system 3200.

The system 3200 may also include a collection container 3296 that collects the fluidic sample 3210, after having been sorted, at the end of the flow path 3238.

The system 3200 may also include a translational mount 3298 fixed to the flow cell 3232 and configured to translate the flow cell 3232 in one or more linear directions (e.g., the x-direction, the y-direction, and/or the z-direction). The flow cell 3232 may be translated by the translational mount 3298 in one or more of the x-direction, the y-direction, and the z-direction such that the illumination region 3248 is aligned, or substantially aligned, with the first focal point $F_{301}$.

Figure 3I:
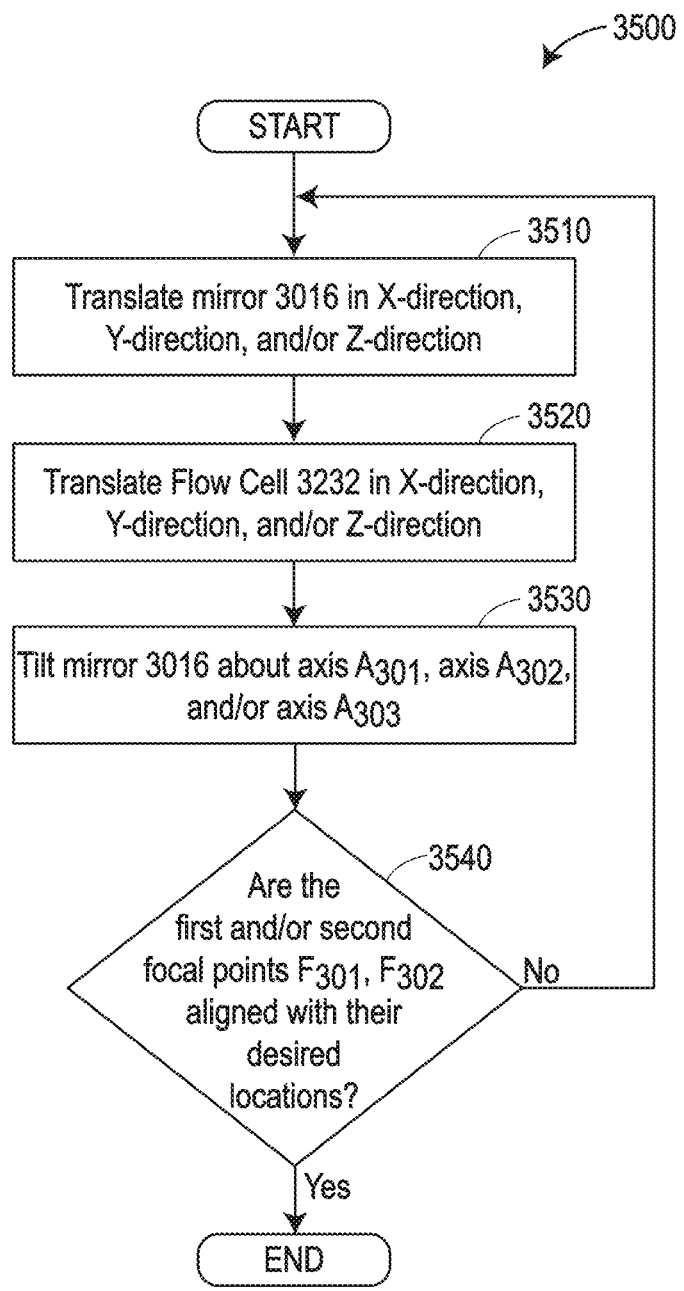
FIG. 3I is flowchart of one embodiment of a method of adjusting a mirror assembly in accordance with principles of the present disclosure.

Referring back to FIG. 3F, the translational mount 3298 may include a first translational adjustment mechanism 3300 configured to translate the flow cell 3232 back and forth in the x-direction, a second adjustment mechanism 3302 configured to translate the flow cell 3232 back and forth in the y-direction, and a third adjustment mechanism 3304 configured to translate the flow cell 3232 back and forth in the z-direction. Each of the translational adjustment mechanisms 3300, 3302, and 3304 may include a rack and pinion mechanism that converts manual rotational movement of a knob into linear motion. Alternatively, or additionally, computer-controlled step motors may be used to automatically and individually adjust each of the adjustment mechanisms 3300, 3302, and 3304, for example, in response to a feedback signal indicating whether the first focal $F_{301}$ is aligned with the illumination region 3248. In some embodiments, a computer may be used to automatically adjust one or more of the adjustment mechanisms 3300, 3302, and 3304 in real-time, for example, during a flow cytometric sorting operation to keep the first focal point $F_{301}$ aligned with the core of a core-in-sheath flow as the core fluctuates in the core-and-sheath flow A method 3500 of operating the adjustable mirror assembly 3010 will now be described. Referring to FIG. 3I, the method may begin at step 3510 with adjusting the translational mount 3018 to move the mirror 3016 in one or more of the x-direction, the y-direction, and the z-direction, with the goal of aligning, or substantially aligning, the first focal point $F_{301}$ with illumination region 3248 and the second focal point $F_{302}$ with the pinhole 3525 or the detector 3252. Next, at step 3520, the translational mount 3298 may be adjusted to move the flow cell 3232 in one or more of the x-direction, the y-direction, and the z-direction, with the goal of aligning, or substantially aligning, the illumination region 3248 with first focal point $F_{301}$. The adjustment of the translational mounts 3018 and 3298 may be a process that is iterative and performed until the first and second focal points $F_{301}$ and $F_{302}$ are aligned, or substantially aligned, with their desired locations. A focal point that has been "substantially aligned" by the translational mount 3018 and/or the second translation mount 3298 with its desired location may be further adjusted by another mechanism (e.g., the first adjustable positioning member 3040a, the second adjustable positioning member 3040b, and/or the third adjustable positioning member 3040c) so that the focal point is moved even closer to, or aligned coincidentally with, its desired location.

Next, at step 3530, to move the first and second focal points $F_{301}$ and $F_{302}$ even closer to their desired locations, one or more of the adjustable positioning members 3040a, 3040b, and 3040c may be adjusted to tilt the mirror 3016 about one or more axes $A_{301}$, $A_{302}$, and $A_{303}$. For example, the adjustable positioning member 3040a may be rotated clockwise or counterclockwise to increase or decrease, respectively, the first distance $D_{301}$ between the base mount 3012 and the mirror mount 3014, thereby tilting the mirror mount 3014 and the mirror 3016 about the first axis $A_{301}$. Additionally, or alternatively, the adjustable positioning member 3040b may be rotated clockwise or counterclockwise to increase or decrease, respectively, the second distance $D_{302}$ between the base mount 3012 and the mirror mount 3014, thereby tilting the mirror mount 3014 and the mirror 3016 about the second axis $A_{302}$. Additionally, or alternatively, the adjustable positioning member 3040c may be rotated clockwise or counterclockwise to increase or decrease, respectively, the second distance $D_{303}$ between the base mount 3012 and the mirror mount 3014, thereby tilting the mirror mount 3014 and the mirror 3016 about the third axis $A_{303}$. Adjusting the one or more of the adjustable positioning members 3040a, 3040b, and 3040c may be a process that is iterative and performed until the first focal point $F_{301}$ is coincidentally aligned with the interrogation region 3248 and/or the second focal $F_{302}$ is coincidentally aligned with the detector 3250 or an optical element leading to the detector 3250 such as the pinhole 3254 of the paraxial lens 3256. This iterative process may also involve further adjusting one or more of the translational mount 3018 and the translational mount 3298. Accordingly, method 3500 may include a step 3540 of evaluating whether the first focal point $F_{301}$ and/or the second focal point $F_{302}$ is properly aligned with its desired location, and if not, then repeating some or all of steps 3510, 3520, and 3530.

From the foregoing, it can be seen that the present disclosure advantageously provides an improved configuration of an adjustable mirror assembly. By providing multiple axes for tilting and/or translating a mirror, the adjustable mirror assembly can be used precisely align one or more focal points of the mirror with one or more desired locations. Furthermore, by suspending the mirror from a mount, the adjustable mirror assembly reduces the risk of deformation to the mirror during mounting and thus helps preserve the reflective properties of the mirror.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. An adjustable mirror assembly, comprising: a base mount; a mirror mount suspended from and movable relative to the base mount; a mirror fixed to the mirror mount, the mirror having a concave interior surface, at least one focal point, and an optical axis passing through the at least one focal point; a first biasing member connected between the base mount and the mirror mount and exerting a first biasing force that urges the mirror mount toward or away from the base mount; and a first adjustable positioning member connected between the base mount and the mirror mount and configured to tilt the mirror mount about at least a first axis transverse to the optical axis of the mirror.

2. The adjustable mirror assembly of aspect 1, comprising a second adjustable positioning member connected between the base mount and the mirror mount and configured to tilt the mirror mount about at least a second axis transverse to the optical axis of the mirror.

3. The adjustable mirror assembly of either aspect 1 or aspect 2, comprising a translational mount fixed to the base mount and configured to translate the base mount in at least one of an x-direction, a y-direction, or a z-direction.

4. The adjustable mirror assembly of any one of the preceding aspects, comprising a second biasing member connected between the base mount and the mirror mount and exerting a second biasing force that urges the mirror mount toward or away from the base mount.

5. The adjustable mirror assembly of aspect 4, wherein the first and second adjustable positioning members are arranged alternatingly with the first and second biasing members in a circle about the base mount.

6. The adjustable mirror assembly of either aspect 4 or aspect 5, the first adjustable positioning member being diametrically opposed to the first biasing member, and the second adjustable positioning member being diametrically opposed to the second biasing member.

7. The adjustable mirror assembly of any one of the preceding aspects, the first adjustable positioning member comprising a first set screw that threadably engages a first hole in the base mount, and the first biasing member comprising a first spring.

8. The adjustable mirror assembly of aspect 7, the first set screw comprising: a first end defining a knob for manual rotation of the first set screw; and a second end spaced from the first end and having a rounded tip that contacts the mirror mount.

9. The adjustable mirror assembly of any one of the preceding aspects, the mirror having at least two focal points aligned along the optical axis of the mirror.

10. The adjustable mirror assembly of any one of the preceding aspects, the mirror including: a first end defining a vertex and having a first opening; and a second end spaced from the first end and including a second opening larger than the first opening, the second end of the mirror being fixed to the mirror mount.

11. The adjustable mirror assembly of any one of the preceding aspects, the mirror including a plurality of side apertures which cooperate to allow a plurality of beams of electromagnetic energy to pass through the concave interior surface of the mirror toward a common point within an interior volume of the mirror.

12. The adjustable mirror assembly of any one of the preceding aspects, the base mount comprising a first ring-shaped plate and the mirror mount including a second ring-shaped plate.

13. The adjustable mirror assembly of any one of aspects 4 to 6, comprising: a third biasing member connected between the base mount and the mirror mount and exerting a third biasing force that urges the mirror mount toward or away from the base mount; a third adjustable positioning member connected between the base mount and the mirror mount and configured to tilt the mirror mount about at least a third axis transverse to the optical axis of the mirror; and wherein the first adjustable positioning member contacts the mirror mount at a first contact point, the second adjustable positioning member contacts the mirror mount at a second contact point, and the third adjustable positioning member contacts the mirror mount at a third contact point.

14. The adjustable mirror assembly of aspect 13, wherein the first axis passes through the second contact point and the third contact point.

15. The adjustable mirror assembly of either aspect 13 or aspect 14, wherein the second axis passes through the first contact point and the third contact point.

16. The adjustable mirror assembly of any one of aspects 13 to 15, wherein the third axis passes through the first contact point and the second contact point.

17. The adjustable mirror assembly of any one of the preceding aspects, at least a portion of the concave interior surface of the mirror having an ellipsoidal geometry.

18. The adjustable mirror assembly of any one of the preceding aspects, the at least a portion of the concave interior surface of the mirror having a major axis and a minor axis, wherein the concave interior surface is rotationally symmetric about the major axis.

19. The adjustable mirror assembly of any one of the preceding aspects, at least a portion of the concave interior surface of the mirror having a paraboloid geometry.

20. The adjustable mirror assembly of any one of the preceding aspects, the optical axis of the mirror being non-linear.

21. A system for detecting an analyte in a fluidic sample, the system comprising: an illumination source configured to generate electromagnetic energy to illuminate the sample at an interrogation region; a flow cell comprising: a sample inlet, a sample outlet, and a flow path defined between the sample inlet and the sample outlet, the flow path passing through the interrogation region; a detector configured to detect a signal generated by the analyte in response to illumination; a base mount; a mirror mount suspended from and movable relative to the base mount; a mirror fixed to the mirror mount, the mirror having a concave interior surface, a first focal point to be coincidentally aligned with the interrogation region, and an optical axis passing through the first focal point; a first biasing member connected between the base mount and the mirror mount and exerting a first biasing force that urges the mirror mount toward or away from the base mount; and a first adjustable positioning member connected between the base mount and the mirror mount and configured to tilt the mirror mount about at least a first axis transverse to the optical axis of the mirror.

22. The system of aspect 21, comprising a first translational mount fixed to the base mount and configured to translate the base mount in at least one of an x-direction, a y-direction, or a z-direction.

23. The system of either aspect 21 or aspect 22, comprising a second translational mount fixed to the flow cell and configured to translate the flow cell in at least one of the x-direction, the y-direction, or the z-direction.

24. The system of any one of aspects 21 to 23, comprising a second adjustable positioning member connected between the base mount and the mirror mount and configured to tilt the mirror mount about at least a second axis transverse to the optical axis of the mirror.

25. The system of any one of aspects 21 to 24, comprising a second biasing member connected between the base mount and the mirror mount and exerting a second biasing force that urges the mirror mount toward or away from the base mount.

26. The system of any one of aspects 21 to 25, the first and second adjustable positioning members being arranged alternatingly with the first and second biasing members in a circle about the base mount.

27. The system of either aspect 25 or aspect 26, the first adjustable positioning member being diametrically opposed to the first biasing member, and the second adjustable positioning member being diametrically opposed to the second biasing member.

28. The system of any one of aspects 25 to 27, comprising: a third biasing member connected between the base mount and the mirror mount and exerting a third biasing force that urges the mirror mount toward or away from the base mount; a third adjustable positioning member connected between the base mount and the mirror mount and configured to tilt the mirror mount about at least a third axis transverse to the optical axis of the mirror; and wherein the first adjustable positioning member contacts the mirror mount at a first contact point, the second adjustable positioning member contacts the mirror mount at a second contact point, and the third adjustable positioning member contacts the mirror mount at a third contact point.

29. The system of aspect 28, wherein the first axis passes through the second contact point and the third contact point.

30. The system of either aspect 28 or aspect 29, wherein the second axis passes through the first contact point and the third contact point.

31. The system of any one of aspects 28 to 30, wherein the third axis passes through the first contact point and the second contact point.

32. The system of any one of aspects 21 to 31, the mirror having a second focal point to be coincidentally aligned with the detector or a lens configured to focus the signal on the detector.

33. The system of any one of aspects 21 to 32, at least a portion of the concave interior surface of the mirror having an ellipsoidal geometry.

34. The system of any one of aspects 21 to 33, the at least a portion of the concave interior surface of the mirror having a major axis and a minor axis, wherein the concave interior surface is rotationally symmetric about the major axis.

35. The system of any one of aspects 21 to 34, at least a portion of the concave interior surface of the mirror having a paraboloid geometry.

36. The system of any one of aspects 21 to 35, the optical axis of the mirror being non-linear.

37. A method of adjusting a mirror assembly comprising a base mount, a mirror mount suspended from and movable relative to the base mount, a mirror fixed to the mirror mount and having a concave interior surface and an optical axis, a first biasing member connected between the base mount and the mirror mount, a first adjustable positioning member connected between the base mount and the mirror mount, and a second adjustable positioning member connected between the base mount and the mirror mount, the method comprising: adjusting the first adjustable positioning member to increase or decrease a first distance between the base mount and the mirror mount, thereby tilting the mirror mount about at least a first axis transverse to the optical axis of the mirror; and adjusting the second adjustable positioning member to increase or decrease a second distance between the base mount and the mirror mount, thereby tilting the mirror mount about at least a second axis transverse to the optical axis of the mirror.

38. The method of aspect 37, the mirror having at least two focal points aligned along the optical axis of the mirror.

39. The method of either aspect 36 or aspect 37, comprising adjusting a third adjustable positioning member, connected between the base mount and the mirror mount, to increase or decrease a third distance between the base mount and the mirror mount, thereby tilting the mirror mount about at least a third axis transverse to the optical axis of the mirror.

40. The method any one of aspects 37 to 39, comprising translating the base mount in at least one of an x-direction, a y-direction, or a z-direction by way of a translational mount fixed to the base mount.

41. The method of either aspect 39, the first adjustable positioning member, the second adjustable positioning member, and the third adjustable positioning member being arranged in a circle about the base mount.

42. The method of either aspect 39 or aspect 41, wherein the first adjustable positioning member contacts the mirror mount at a first contact point, the second adjustable positioning member contacts the mirror mount at a second contact point, and the third adjustable positioning member contacts the mirror mount at a third contact point.

43. The method of aspect 42, wherein the first axis passes through the second contact point and the third contact point, the second axis passes through the first contact point and the third contact point, and the third axis passes through the first contact point and the second contact point.

44. The method of any one of aspects 39 to 43, comprising maintaining the second and third distances while adjusting the first adjustable positioning member to increase or decrease the first distance between the base mount and the mirror mount.

45. The method of any one of aspects 39 to 44, at least a portion of the concave interior surface of the mirror having an ellipsoidal geometry.

46. The method of any one of aspects 39 to 45, the at least a portion of the concave interior surface of the mirror having a major axis and a minor axis, wherein the concave interior surface is rotationally symmetric about the major axis.

47. The method of any one of aspects 39 to 46, at least a portion of the concave interior surface of the mirror having a paraboloid geometry.

48. The method of any one of aspects 39 to 47, the optical axis of the mirror being non-linear.

Ball Lens Construction

Figure 4A:
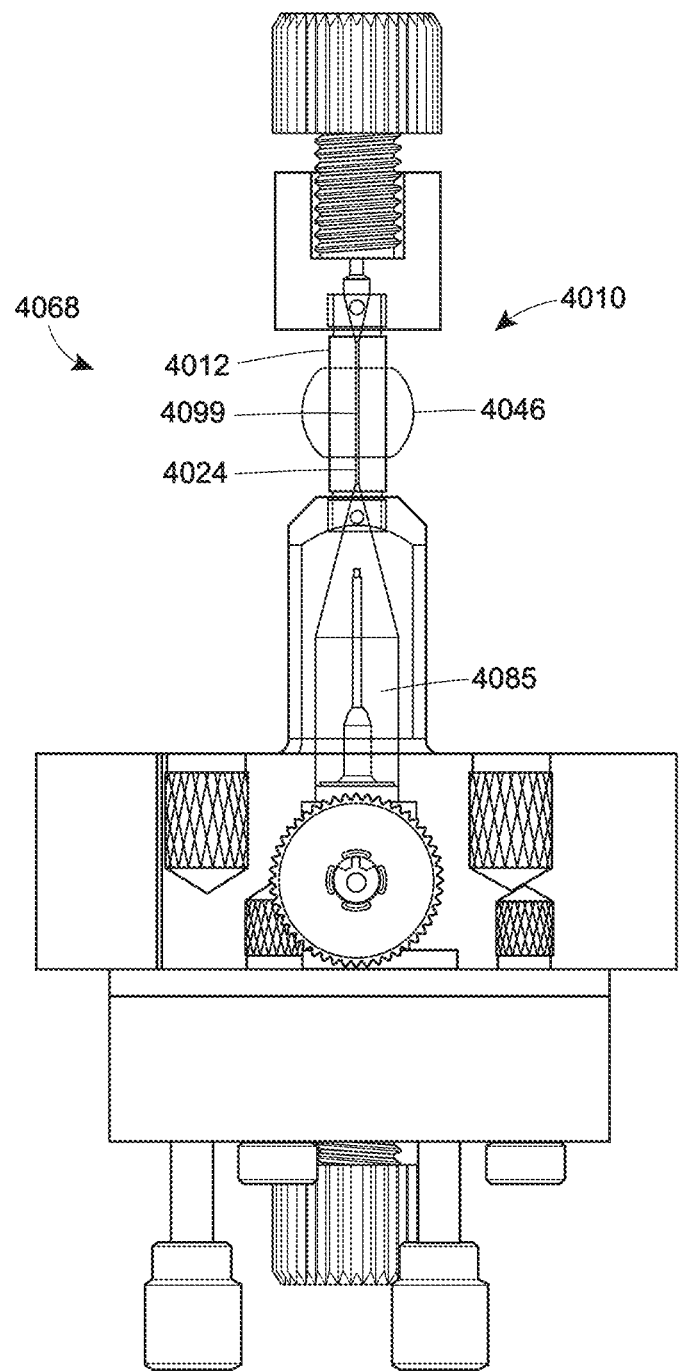
FIG. 4A is a front view of an embodiment of a lens assembly for use in performing flow cytometric sorting of cells.
Figure 4B:
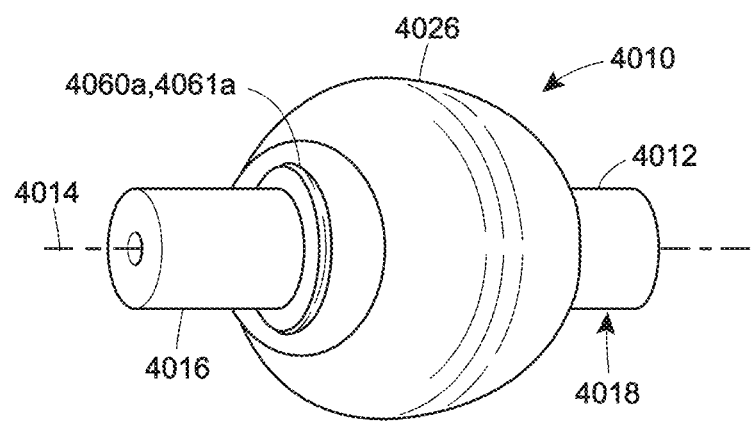
FIG. 4B is a perspective view of the lens assembly of FIG. 4A.
Figure 4C:
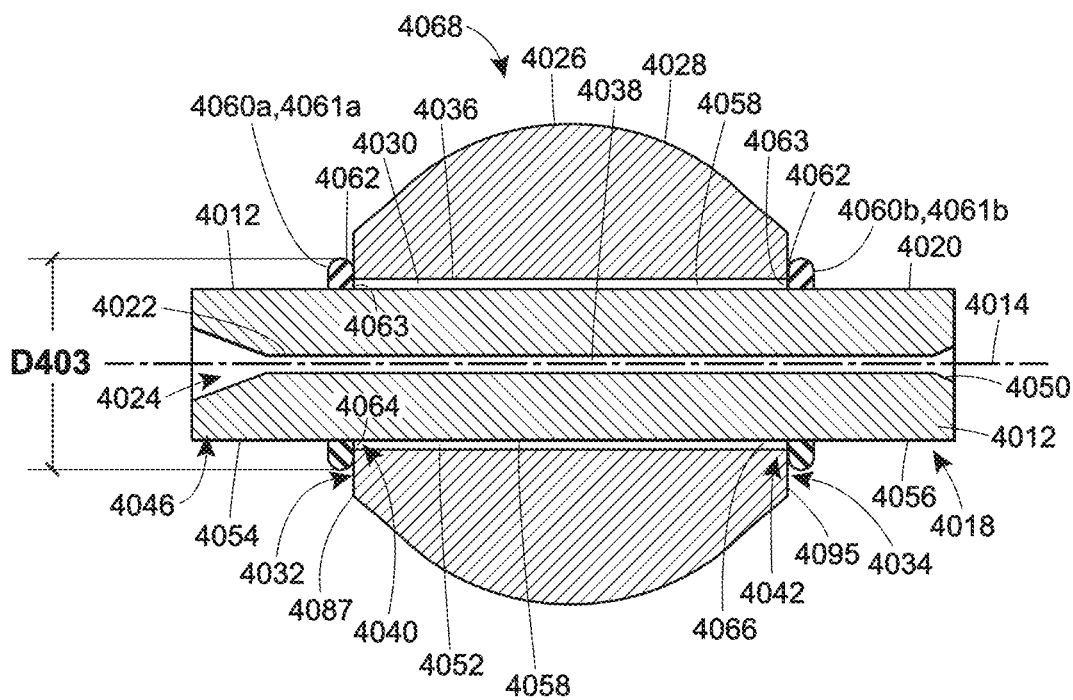
FIG. 4C is a cross-sectional view of the lens assembly of FIG. 4A taken along a longitudinal tube axis.

As illustrated in FIGS. 4B and 4C, a lens assembly 4010 for use in flow cytometry (e.g., performing flow cytometric sorting of analytes, such as mammalian sperm cells and, in particular, non-human sperm cells) includes an elongated tube member 4012 extending along a tube axis 4014 from a first end 4016 to a second end 4018. The tube member 4012 has an outer surface 4020 and an inner surface 4022 disposed radially inward of the outer surface 4020. The inner surface 4022 defines a tube passageway 4024 that extends from the first end 4016 to the second end 4018 of the tube member 4012, and the tube passageway 4024 is adapted to receive a core stream of the cells to be sorted. The lens assembly 4010 further includes a lens member 4026 adapted to focus light used to detect a property of one or more of the cells of the core stream disposed within the tube passageway. The lens member 4026 has an outer surface 4028 and a lens aperture 4030 extending from a first portion 4032 of the outer surface 4028 to a second portion 4034 of the outer surface 4028. The lens aperture 4030 is defined by an inner surface 4036, and the inner surface 4036 extends along a lens axis 4038 from a first end 4040 at or adjacent to the first portion 4032 of the outer surface 4028 of the lens member 4026 to a second end 4042 at or adjacent to the second portion 4034 of the outer surface 4028 of the lens member 4026. At least a portion of the tube member 4012 is disposed within the lens aperture 4030, and a radial gap 4052 extends between the inner surface 4036 of the lens aperture 4030 and the outer surface 4020 of the tube member 4012. A fluid may be disposed within the radial gap 4052, and the fluid may have a refraction index that is equal to or substantially equal (e.g., within a variance range of 0% to 10%) to the refraction index of the materials that comprise the lens member 4026 and the tube member 4012.

So configured, the lens assembly 4010 may be adapted to be a portion of a flow cell, and the lens member 4026 is adapted to collect and focus light (e.g., a laser beam from a source 4068, as shown in FIGS. 4A and 4C and/or light emitted by, transmitted by, or passing through an analyte) about a volume (i.e., a focal volume) that is fully or partially disposed within a detection area 4099 (see FIG. 4A) of the tube passageway 4024 of the tube member 4012. As one or more light beams from the source 4068 passes through the lens member 4026 and the tube member 4012 and into the detection area 4099, the one or more light beams may will not substantially change direction due to refraction when passing through the radial gap 4052 extending between the inner surface 4036 of the lens aperture 4030 and the outer surface 4020 of the tube member 4012. Therefore, the direction of the light beam is not significantly affected when passing from the lens member 4026 to the tube member 4012 or vice versa. In the case of mammalian sperm cells, due to the small size of the cells passing through the detection area 4099, the small diameter of the beam that is focused on each cell, and the speed at which the cells are moving through the detection area 4099, maintaining the trajectory of the light is critical in detecting a property of, or focusing the beam of light on, an individual cell of the core stream.

Moreover, minimizing or eliminating the refraction of light when the light passes through the radial gap 4052 extending between the inner surface 4036 of the lens aperture 4030 and the outer surface 4020 of the tube member 4012 also provides for a consistent and suitable focal volume of the lens member 4026. In the case of mammalian sperm cells, for example, the focal volume of the lens member 4026, which may be partially or completely disposed within the tube passageway 4024, must be sufficiently small as to detect small variances in fluorescence from cells reflecting the percentage difference in DNA content between the X and Y chromosomes within the cells. However, the focal volume of the lens member 4026 must be sufficiently large as to resolve each entire single cell of the core stream of cells it passes through a detection area 4099 (see FIG. 4A) of the tube passageway 4024. Accordingly, by eliminating the change in direction of light as it passes through the radial gap 4052 (illustrated in FIG. 4C) and/or between the tube member 4012 and the lens member 4026, one having ordinary skill in the art would recognize that the focal volume of the lens member 4026 may be maintained at a suitable size.

Figure 4D:
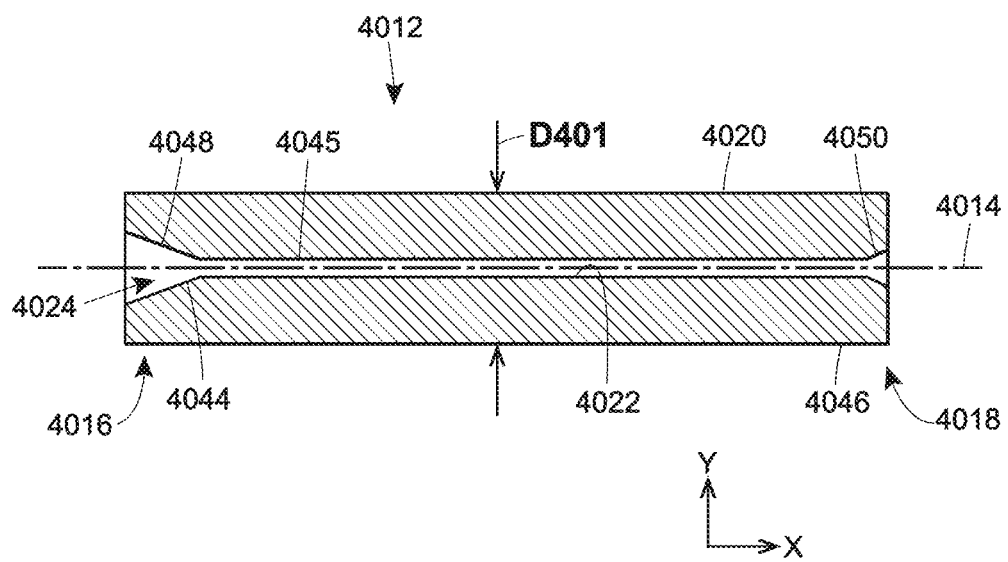
FIG. 4D is a cross-sectional view of an embodiment of a tube member of the lens assembly of FIG. 4A.
Figure 4F:
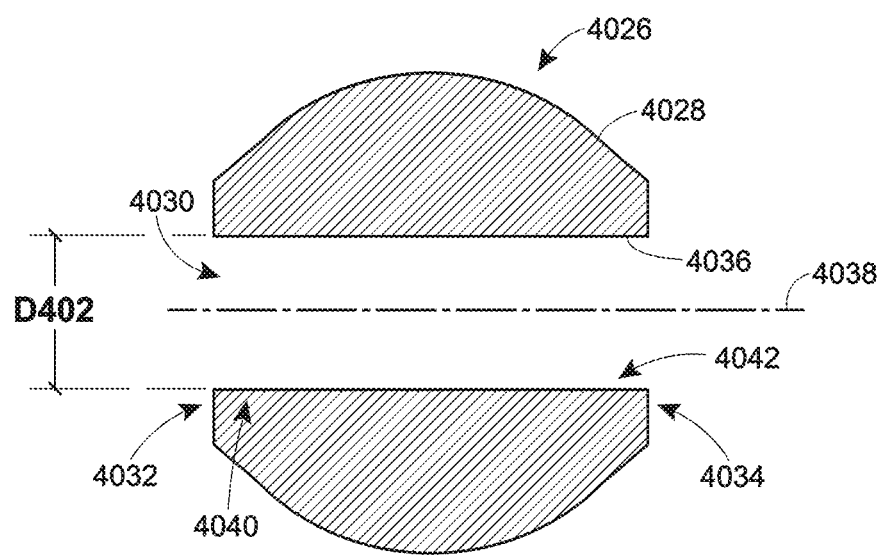
FIG. 4F is a cross-sectional view of an embodiment of a lens member of the lens assembly of FIG. 4A.

Turning to the lens assembly 4010 in more detail, the tube member 4012 may be elongated and extend along the tube axis 4014 from the first end 4016 to the second end 4018, as illustrated in FIGS. 4C and 4D, and the tube member 4012 may have any suitable longitudinal length. As used herein, the term longitudinal refers to a direction along or parallel to the tube axis 4014 and/or the X-axis of the reference coordinate system of FIG. 4D, and the term radial refers to a direction normal to the tube axis 4014 and/or parallel to the Y-axis of the reference coordinate system of FIG. 4D. As illustrated in FIGS. 4B, 4C, 4D, and 4E, the tube member 4012 may include the outer surface 4020, and the outer surface 4020 may have any suitable shape or combination of shapes. For example, all or a portion of the outer surface 4020 may be symmetrical about the tube axis 4014. More specifically, all or a portion of the outer surface 4020 may have circular cross-sectional shape (that may be symmetrical about the tube axis 4014) such that the outer surface 4020 has a cylindrical shape (or a substantially cylindrical shape). In some embodiments, the diameter of the circular cross-sectional shape may be constant from the first end 4016 to the second end 4018 the tube member 4012 such that the outer surface 4020 has a constant diameter D401. However, in other embodiments, the diameter of the circular cross-sectional shape may vary over all or part of the length of the tube axis 4014 from the first end 4016 to the second end 4018 the tube member 4012. In still further embodiments, all or a portion of the outer surface 4020 may have a non-cylindrical shape (e.g., a polygonal cross-sectional shape) that may be constant or vary over the length of the tube axis 4014 from the first end 4016 to the second end 4018 the tube member 4012. The outer surface 4020 may have one or more raised (or recessed) surface features, such as grooves, that are adapted to receive or be received in corresponding raised (or recessed) surface features formed in or along the inner surface 4036 of the lens aperture 4030 of the lens member 4026 when the tube member 4012 is at least partially received in the lens aperture 4030.

As illustrated in FIG. 4D, the tube member 4012 includes the inner surface 4022 disposed radially inward of the outer surface 4020. That is, a first radial distance between the inner surface 4022 and the tube axis 4014 is less than a second radial distance normal to the tube axis 4014 between the outer surface 4020 and the tube axis 4014. The inner surface 4022 defines the tube passageway 4024 that extends from the first end 4016 to the second end 4018 of the tube member 4012 in a generally longitudinal direction, and the tube passageway 4024 is adapted to receive a core stream of the cells to be sorted.

The tube passageway 4024 may have any suitable shape or combination of shapes. For example, all or a portion of the inner surface 4022 defining the tube passageway 4024 may have a circular cross-sectional shape (when viewed along the tube axis 4014) such that the inner surface 4022 has a cylindrical shape. In some embodiments, the entire inner surface 4022 defining the tube passageway 4024 may have a circular cross-sectional shape between the first end 4016 and the second end 4018.

In other embodiments, as illustrated in FIG. 4D, a portion 4045 of the inner surface 4022 defining the tube passageway 4024 may have a circular cross-sectional shape between a first point 4044 and a second point 4046 that is offset a longitudinal distance from the first point 4044, and this circular cross-sectional shape may have a constant diameter between the first point 4044 and the second point 4046. The constant diameter may be within a range of 5 µm to 1000 µm, or within a range of 50 µm to 250 µm, or within a range of 100 µm to 250 µm, or within a range of 150 µm to 250 µm, or within a range of 190 µm to 210 µm, such as 200 µm. As illustrated in FIG. 4D, an entry portion 4048 of the inner surface 4022 between the first end 4016 of the tube member 4012 and the first point 4044 may converge (e.g., gradually converge) from the first end 4016 of the tube member 4012 towards the first point 4044 of the tube passageway 4024.

The entry portion 4048 may have any suitable shape, and the shape may be driven by hydrodynamic parameters. For example, to reduce an energy dissipation rate of the core stream of cells passing through the tube passageway 4024 to a suitable level, or to maintain the energy dissipation rate of the stream of cells below a maximum value, the longitudinal cross-sectional shape (i.e., a cross-section taken an/or viewed normal to the tube axis 15) of the entry portion 4048 (or the shape of the inner surface 4022 defining the entry portion 4048) may be precisely determined. For example, in some embodiments, all or a portion of the entry portion 4048 may have a linear longitudinal cross-sectional shape when viewed normal to the tube axis 4014 such that the entry portion 4048 has a frustoconical shape. In other embodiments, all or a portion of the entry portion 4048 may have a non-linear longitudinal cross-sectional shape (e.g., a logarithmic cross-sectional shape and/or a parabolic cross-sectional shape). Simply put, the entry portion 4048 of the inner surface 4022 may have any desired shape, including complex curvilinear geometries to accomplish a desired flow characteristic, such as flow concentricity, flow width, and flow dynamics.

Still referring to FIG. 4D, an exit portion 4050 of the inner surface 4022 between the second end 4018 of the tube member 4012 and the second point 4046 may diverge (e.g., gradually diverge) from the second point 4046 of the tube passageway 4024 towards the second end 4018 of the tube member 4012. Similar to the entry portion 4048, the shape of the exit portion 4050 may be driven by hydrodynamic parameters (e.g., to reduce an energy dissipation rate of the core stream of cells passing through the tube passageway 4024 to a suitable level, or to maintain the energy dissipation rate of the stream of cells below a maximum value), and the longitudinal cross-sectional shape (i.e., a cross-sectional plane containing the tube axis 15 and/or a cross-section viewed normal to the tube axis 15) of the entry portion 4048 (or the shape of the inner surface 4022 defining the exit portion 4050) may be precisely determined. The longitudinal cross-sectional shape may vary depending on the radial angle the cross-sectional plane forms with a reference plane in which the tube axis 15 is contained (i.e., the entry portion 4048 and/or the exit portion 4050 may be asymmetrical about the tube axis 15). In some embodiments, all or a portion of the exit portion 4050 may have a linear longitudinal cross-sectional shape when viewed normal to the tube axis 4014 such that the exit portion 4050 has a frustoconical shape. In other embodiments, all or a portion of the exit portion 4050 may have a non-linear longitudinal cross-sectional shape (e.g., a logarithmic cross-sectional shape and/or a parabolic cross-sectional shape). Simply put, the exit portion 4050 of the inner surface 4022 may have any desired shape, including complex curvilinear geometries to accomplish a desired flow characteristic, such as flow concentricity, flow width, and flow dynamics.

The first end 4016 of the tube member 4012 may be configured such that the tube passageway 4024 at the first end 4016 may receive the core stream to be sorted. However, the first end 4016 of the tube member 4012 may be coupled to one or more further components, such as a further tube portion (or portions) such that the core stream travels through associated passageways of the further tube portion or portions prior to entry into the tube passageway 4024 at the first end 4016 of the tube member 4012.

The second end 4018 of the tube member 4012 may be configured such that the core stream to be sorted or that has been sorted exits the tube passageway 4024 at the second end 4018. The second end 4018 of the tube member 4012 may be coupled to one or more further components, such as a further tube portion (or portions) such that the core stream travels through associated passageways of the further tube portion or portions after exiting the tube passageway 4024 at the second end 4018 of the tube member 4012.

The tube member 4012 may be a single unitary part or may be an assembly of subcomponents coupled to form the tube member 4012. The tube member 4012 may be made from or comprise any suitable material or combination of materials, such as, for example only, quartz, glass, silica, fused silica, or plastic.

As illustrated in FIGS. 4B, 4C, and 4, the lens assembly 4010 further includes a lens member 4026 having an outer surface 4028, and the outer surface 4028 may have any suitable shape to allow the lens member 4026 to focus light used to detect a property of one or more of the cells of the core stream disposed within the tube passageway 4024. For example, the outer surface 4028 may have a spherical or substantially spherical shape. The spherical shape of the outer surface 4028 may have any suitable diameter, and the skilled person would recognize that the diameter of the sphere may be dependent on one or more of several factors, such as the diameter of the tube passageway 4024. For example, the diameter of the spherical shape of the outer surface 4028 may be within a range of 0.5 mm to 30 mm, or within a range of 1 mm to 20 mm, or within a range of 2 mm to 15 mm, or within a range of 5 mm to 12 mm, such as 8 mm. In other embodiments, the outer surface 4028 may have a partially-spherical shape, a cylindrical shape, or an oval cross-sectional shape. The lens member 4026 may be made from or comprise any suitable material, such as, for example only, quartz, glass, silica, fused silica, or plastic.

The lens member 4026 may also have a lens aperture 4030 that extends through the outer surface 4028. More specifically, the lens aperture 4030 may extend from the first portion 4032 of the outer surface 4028 to a second portion 4034 of the outer surface 4028 such that the lens aperture 4030 is a channel or passage that extends through the lens member 4026. The lens aperture 4030 may be defined by the inner surface 4036, and the inner surface 4036 may extend along the lens axis 4038 from the first end 4040 at or adjacent to the first portion 4032 of the outer surface 4028 of the lens member 4026 to the second end 4042 at or adjacent to the second portion 4034 of the outer surface 4028 of the lens member 4026. The inner surface 4036 of the lens aperture 4030 may have any suitable shape and may generally correspond in shape to the shape of the outer surface 4020 of the tube member 4012. For example, all or a portion of the inner surface 4036 may be symmetrically-formed about the lens axis 4038. More specifically, all or a portion of the inner surface 4036 may have a circular cross-sectional shape (symmetrically-formed about the lens axis 4038) such that the inner surface 4036 has a cylindrical shape. In some embodiments, the circular cross-sectional shape may be constant from the first end 4040 of the inner surface 4036 to the second end 4042 of the inner surface 4036 such that the inner surface 4036 has a constant diameter D402. The constant diameter D402 of the inner surface 4036 may be greater than the constant diameter D401 of the outer surface 4020 of the tube member such that when the tube member 4012 is at least partially received in the lens aperture 4030, a radial gap 4052 is formed between the inner surface 4036 of the lens aperture 4030 and the outer surface 4020 of the tube member 4012. When the tube axis 4014 is coaxially-aligned with the lens axis 4038, the radial gap 4052 may be uniform, and may be within a range of 1 µm and 300 µm, or within a range of 1 µm and 200 µm, or within a range of 3 µm and 100 µm, or within a range of 6 µm and 100 µm.

In other embodiments, the diameter of the circular cross-sectional shape of the inner surface 4036 may vary over all or part of the length of the lens axis 4038 from the first end 4040 to the second end 4042 of the inner surface 4036. In still further embodiments, all or a portion of the inner surface 4036 may have a non-cylindrical shape (e.g., a polygonal cross-sectional shape) that may be constant or vary over the length of the lens axis 4038 from the first end 4040 to the second end 4042 of the inner surface 4036. As previously discussed, the inner surface 4036 may have one or more raised (or recessed) surface features, such as grooves, that are adapted to receive or be received in corresponding raised (or recessed) surface features formed in or along the outer surface 4020 of the tube member 4012 when the tube member 4012 is at least partially received in the lens aperture 4030.

As illustrated in FIGS. 4B and 4C, at least a portion of the tube member 4012 is disposed within the lens aperture 4030. As illustrated in FIGS. 4B and 4C, the tube member 4012 extends through the entire lens aperture 4030. That is, the first end 4016 of the tube member 4012 may extend a first longitudinal distance from the first end 4040 of the inner surface 4036 of the lens aperture 4030 of the lens member 4026 such that a first portion 4054 of the tube member 4012 disposed between the first end 4016 of the tube member 4012 and the first end 4040 of the inner surface 4036 of the lens aperture 4030 is external to (i.e., not disposed within) the lens aperture 4030. In addition, the second end 4018 of the tube member 4012 may extend a second longitudinal distance from the second end 4042 of the inner surface 4036 of the lens aperture 4030 of the lens member 4026 such that a second portion 4056 of the tube member 4012 disposed between the second end 4018 of the tube member 4012 and the second end 4042 of the inner surface 4036 of the lens aperture 4030 is external to (i.e., not disposed within) the lens aperture 4030. So configured, a third portion 4058 of the tube member 4012 is disposed between the first portion 4054 and the second portion 4056, and the entire third portion 4058 is disposed internal to or within the lens aperture 4030. The first longitudinal distance, second longitudinal distance, and third longitudinal distance may have any suitable value.

Figure 4E:
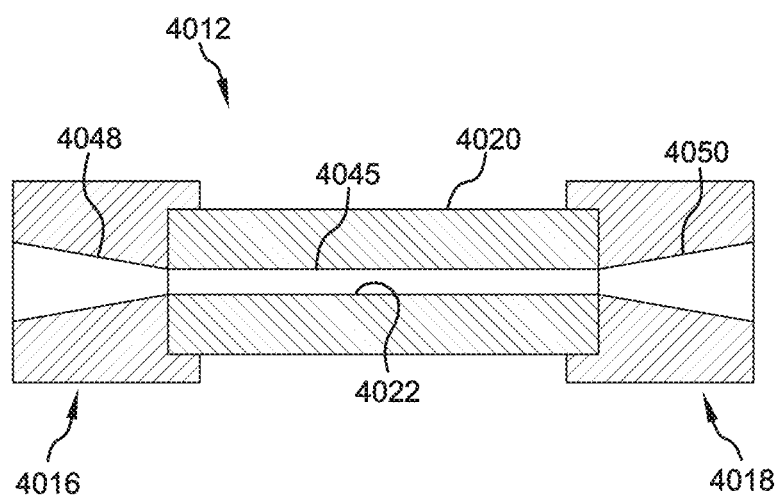
FIG. 4E is a cross-sectional view of another embodiment of a tube member of the lens assembly of FIG. 4A.

In some embodiments, the entry portion 4048 and/or the exit portion 4050 of the tube member 4012 may be attached to the tube member 4012 after formation of the tube member 4012. Specifically, the tube passageway 4024 may be formed separately from the entry portion 4048 and/or from the exit portion 4050. In some embodiments, for example, the entry and/or exit portions 4048 and 4050, respectively, may be formed separately from the tube passageway 4024 and joined to the member comprising the tube passageway 4024. In other embodiments, the entry and/or exit portions 4048 and 4050, respectively, may be molded onto the tube member 4012, as generally depicted in FIG. 4E. In such instances, as well as others, it may be necessary (or merely preferable) to affix the lens member 4026 to the tube member 4012 prior to application of, or attachment to, the entry portion 4048 and/or the exit portion 4050. This may, in some circumstances, require the radial gap 4052.

In any event, as illustrated in FIG. 4C, the lens assembly 4010 may include a first seal 4060a disposed at or adjacent to the first end 4040 of the inner surface 4036 of the lens aperture 4030. More specifically, the first seal 4060a may sealingly engage a portion of the outer surface 4020 of the tube member 4012 and a portion of the first end 4040 of the inner surface 4036 of the lens aperture 4030 and/or a portion of the first portion 4032 of the outer surface 4028 of the lens member 4026. Any suitable seal may be used. For example, referring to FIG. 4C, the first seal 4060a may be a resilient annular seal 4061a, such as an O-ring, disposed around a circumferential portion of the outer surface 4020 of the tube member 4012. The annular seal 4061a may have an outer diameter D403 that is equal to or greater than a diameter (e.g., the diameter D402 illustrated in FIG. 4F) of the inner surface 4036 defining the lens aperture 4030. A lateral circumferential edge 4062 of the annular seal 4061a may sealingly engage a portion (e.g., a circumferential portion) of the first end 4040 of the inner surface 4036 of the lens aperture 4030 and/or a portion (e.g., a circumferential portion) of the first portion 4032 of the outer surface 4028 of the lens member 4026. In addition, an inner circumferential edge 4063 of the annular seal 4061a may sealingly engage a portion (e.g., a circumferential portion) of the outer surface 4020 of the tube member 4012. Accordingly, the lateral circumferential edge 4062 of the annular seal 4061a and the inner circumferential edge 4063 of the annular seal 4061a may cooperate to seal a first end 4064 of the radial gap 4052.

Still referring to FIG. 4C, the lens assembly 4010 may include a second seal 4060b disposed at or adjacent to the second end 4042 of the inner surface 4036 of the lens aperture 4030. More specifically, the second seal 4060b may sealingly engage a portion of the outer surface 4020 of the tube member 4012 and a portion of the second end 4042 of the inner surface 4036 of the lens aperture 4030 and/or a portion of the second portion 4034 of the outer surface 4028 of the lens member 4026. The second seal 4060b may be any suitable seal or combination of seals. For example, referring to FIG. 4C, the second seal 4060b may also be a resilient annular seal 4061b, such as an O-ring, disposed around a circumferential portion of the outer surface 4020 of the tube member 4012, and the resilient annular seal 4061b may be identical in shape and function to the annular seal 4061a previously described. That is, a lateral circumferential edge 4062 of the annular seal 4061a may sealingly engage a portion (e.g., a circumferential portion) of the second end 4042 of the inner surface 4036 of the lens aperture 4030 and/or a portion (e.g., a circumferential portion) of the second portion 4034 of the outer surface 4028 of the lens member 4026. In addition, an inner circumferential edge 4063 of the annular seal 4061b may sealingly engage a portion (e.g., a circumferential portion) of the outer surface 4020 of the tube member 4012. Accordingly, the lateral circumferential edge 4062 of the annular seal 4061b and the inner circumferential edge 4063 of the annular seal 4061b may cooperate to seal a second end 4066 of the radial gap 4052 such that fluid disposed within the radial gap 4052 is maintained within the radial gap 4052.

Figure 4G:
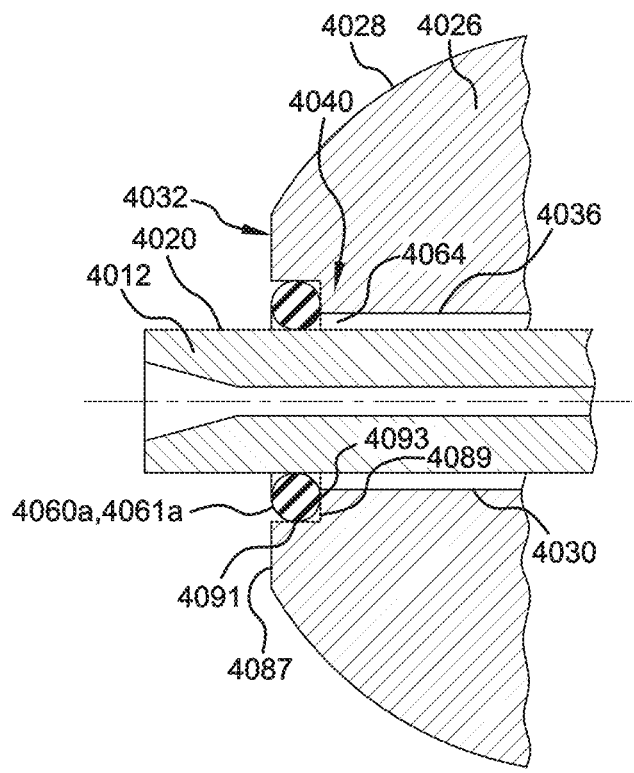
FIG. 4G is a partial cross-sectional view of an embodiment of the lens assembly.

As illustrated in FIG. 4G, the first portion 4032 of the outer surface 4028 of the lens member 4026 may be disposed on a planar portion 4087 of the outer surface 4028 that may be normal to the lens axis 4038 of the lens aperture 4030 and may intersect a point at or adjacent to the first end 4040 of the inner surface 4036 of the lens aperture 4030. A circumferential first recess 4089 may be disposed in the first portion 4032 at or adjacent to the first end 4040 of the inner surface 4036 of the lens aperture 4030. All or a portion of the first seal 4060a may be disposed within the first recess 4089. So positioned, the first seal 4060a may sealingly engage a portion of the outer surface 4020 of the tube member 4012 and a circumferential portion 4091 of the recess 4089 and/or a radial portion 4093 of the first recess 4089 to seal the first end 4064 of the radial gap 4052.

As illustrated in FIG. 4C, the second portion 4034 of the outer surface 4028 of the lens member 4026 may be disposed on a planar portion 4095 (illustrated in FIG. 4C) of the outer surface 4028 that may be normal to the lens axis 4038 of the lens aperture 4030 and may intersect a point at or adjacent to the second end 4042 of the inner surface 4036 of the lens aperture 4030. A circumferential second recess (which is not shown but is identical to the first recess 4089 of FIG. 4G) may be disposed in the second portion 4034 at or adjacent to the second end 4042 of the inner surface 4036 of the lens aperture 4030. All or a portion of the second seal 4060b may be disposed within the second recess. So positioned, one having ordinary skill in the art would recognize that the second seal 4060b may sealingly engage the second recess and tube member 4012 in a manner identical to the way the first seal 4060a sealingly engages the tube member 4012 and the first recess 4089.

In other embodiments, the first seal 4060a and/or the second seal 4060b may be an annular ring of epoxy or other suitable hardening sealant. In such embodiments, the epoxy may be applied around a portion (e.g., a circumferential portion) of the outer surface 4020 of the tube member 4012 and a portion (e.g., a circumferential portion) of the first end 4040 and/or the second end 4042 of the inner surface 4036 of the lens aperture 4030 and/or a portion (e.g., a circumferential portion) of the first portion 4032 and/or the second portion 4034 of the outer surface 4028 of the lens member 4026.

With the first end 4064 and second end 4066 of the radial gap 4052 sealed as described, a fluid may be disposed within the radial gap 4052 between the first seal 4060a and the second seal 4060b. The fluid may have a refractive index (i.e., a measurement of how much light is bent or refracted when entering a material) that is equal to or approximately equal to the refractive index of the material comprising the tube member 4012 and/or the lens member 4026 (for a given wavelength of light transmitted through the fluid). For example, the lens member 4026 may be made from or comprise a first material having a first refractive index (at a first wavelength) and the tube member 4012 may be made from or comprise a second material having a second refractive index (at the first wavelength). The first material may be the same or substantially the same as the second material (e.g., a silica, such as a fused silica) such that the first refractive index may be equal to or substantially equal (e.g., within a variance range of 0% to 10%) to the second refractive index (at the first wavelength of light). The fluid may have a third refractive index (at the first wavelength of light) that may be equal to or substantially equal (e.g., within a variance range of 0% to 10%) to the first refractive index and/or the second refractive index (both at the first wavelength of light). The fluid may be any suitable liquid or gas, such an oil, water (e.g., de-ionized water), air, or gas (e.g., nitrogen or oxygen). One of ordinary skill in the art would recognize that at the second wavelength of light (that is different than the first wavelength of light), the first refractive index of the first material may not be equal (or substantially equal) to the second refractive index of the second material. In addition, one of ordinary skill in the art would recognize that at the second wavelength of light (that is different than the first wavelength of light), the third refractive index of the fluid may not be equal (or substantially equal) to one or both of the first refractive index of the first material or the second refractive index of the second material.

In some embodiments, the index matching fluid (e.g., the index matching oil) is selected so as not to be reactive with the material or materials used to form the lens member 4026, the tube member 4012, and/or the sealing elements 4060a and 4060b. Such reactivity, if not prevented may interfere with molding adhesion. Additionally, in some embodiments, but especially in embodiments employing an annular ring of epoxy or other suitable hardening sealant as or with the sealing elements 4060a and 4060b, the sealing elements may be selected to minimize or eliminate off-gassing. Some adhesives release gas as they cure, for example, which off-gassing can, for example, release gas into the index matching fluid, forming bubbles that may interfere with the light used in the measurements of the analytes.

In addition to sealing the index matching fluid within the radial gap 4052, the sealing elements 4060a and 4060b may also serve to bond the lens member 4026 to the tube member 4012. Achieving a solid bond between the lens member 4026 and the tube member 4012 may, in some embodiments, benefit from solvent rinsing. Solvent rinsing of the surfaces to which an adhesive will be applied (e.g., the outer surface 4020 of the tube member 4012, the inner surface 4036 of the lens member 4026, the outer surface 4028 of the lens member 4026, etc.) can facilitate improved adhesion, but can also affect the index of the index matching oil as the solvent (e.g., methanol, isopropanol, acetone, ethanol, etc.) contaminates the index matching oil.

In other embodiments, the fluid itself may be a fluid that hardens, such as an epoxy or similar material. In such embodiments, the epoxy may be disposed within the radial gap 4052 and a vacuum and/or heat may be applied to the epoxy to harden the epoxy without the creation of bubbles or other blemishes.

In further embodiments, the sealing elements 4060a and 4060b may be employed to separate an adhesive or bonding agent from the index matching fluid, to prevent contamination of the index matching fluid by the bonding agent and/or by the solvent, and/or to prevent off-gassing of the bonding agent into the index matching fluid. That is, the sealing element 4060a may be applied, the index matching fluid introduced into the radial gap 4052, and the sealing element 4060b applied. After each (or both) of the sealing elements 4060a, 4060b is applied, a bonding agent may be applied over the sealing elements 4060a, 4060b in contact with the outer surface 4020 of the tube member 4012, the outer surface 4028 of the lens member 4026, and the sealing element 4060a or 4060b, to secure the assembly.

In some embodiments, vacuum degasification of the index matching oil or fluid may facilitate removal of entrapped air prior to application of the sealing elements 4060a and 4060b and/or of the bonding agent, thus preventing or mitigating formation of bubbles within the index matching fluid after the sealing elements 4060a and 4060b and/or the bonding agent has been applied.

With the first, second, and third refractive indexes matched, a light beam passing through the lens member 4026 and the tube member 4012 (e.g., a laser beam originating from the source 4068 of FIG. 4A) and directed to a particular point in the core stream of cells passing through the tube passageway 4024 will not substantially change direction due to refraction and/or reflection when passing through the radial gap 4052, and therefore the focal point and trajectory of the light beam is maintained. Due to the small size of the cells, the diameter of the beam that is focused on each cell, and the speed at which the cells are moving through the detection area 4099 (illustrated in FIG. 4A), maintaining the trajectory of the beam of light as it travels through and between the lens member 4026 and the tube member 4012 is critical in detecting a property or focusing the beam of light on an individual cell of the core stream, as previously explained. Moreover, as previously explained, minimizing or eliminating the refraction of light when the light passes through the radial gap 4052 extending between the inner surface 4036 of the lens aperture 4030 and the outer surface 4020 of the tube member 4012 also provides for a consistent and suitable focal volume of the lens member 4026.

To further reduce refraction and/or interference of the light beam, the outer surface 4020 of the tube member 4012, the inner surface 4022 of the tube member 4012 defining the tube passageway 4024, the outer surface 4028 of the lens member 4026, and the inner surface 4036 of the lens aperture 4030 may be polished.

Figure 4H:
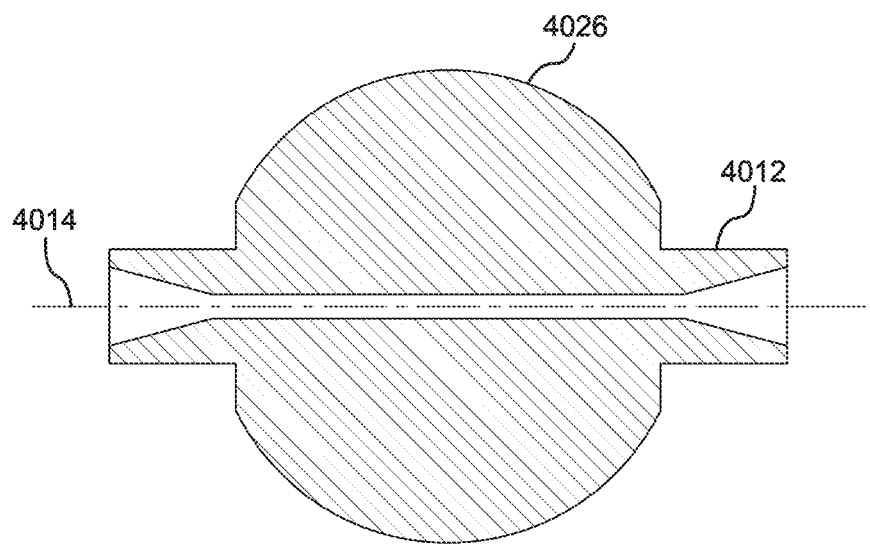
FIG. 4H is a cross-sectional view of an embodiment of the lens assembly.

In some embodiments, the radial gap 4052 may be eliminated or may be negligible. For example, the constant diameter D402 of the inner surface 4036 of the lens aperture 4030 may be equal to or substantially equal to (e.g., within a variance range of 0% to 10%) the constant diameter D401 of the outer surface 4020 of the tube member 4012. In such embodiments, the inner surface 4036 of the lens aperture 4030 may be coupled to or secured to the outer surface 4020 of the tube member 4012. For example, the inner surface 4036 of the lens aperture 4030 may fused to (using, e.g., heat and/or pressure) the outer surface 4020 of the tube member 4012. In some embodiments, the lens member 4026 may be molded over the tube member 4012. That is, the tube member 4012 may be created or fabricated in a first operation (or first process or combination or processes). For example, the tube member 4012 may be fabricated in one or more drawing or extrusion operations. In other examples, the tube member 4012 may be molded. In a subsequent second molding operation, the lens member 4026 may be molded over a portion (i.e., a circumferential portion of the outer surface 4020) of the tube member 4012. In other embodiments, as illustrated in FIG. 4H, the tube member 4012 may be molded and/or machined with the lens member 4026 to form a single, unitary part. In still other embodiments, the tube member 4012 and the lens member 4026 may be rapid prototyped as a single, unitary part using any rapid prototyping process or method (e.g., three-dimensional printing). With the radial gap 4052 eliminated, a light beam (such as that generated by the source 4068 illustrated in FIG. 4A) passing from the lens member 4026 the tube member 4012 will not experience refraction, and the aforementioned problems with refraction are avoided.

In some embodiments, more than one lens member 4026 may be disposed around the tube member 4012. For example, as illustrated in FIG. 4J, a first lens member 4026a may be disposed at, on, or around a first circumferential portion 4101 of the tube member 4012, and a second lens member 4026b may be disposed around a second circumferential portion 4103 of the tube member 4012. The first circumferential portion 4101 may be disposed between the first end 4016 and the second end 4018 of the tube member, and the second circumferential portion 4103 may be disposed between the first circumferential portion 4101 and the second end of the tube member 4012. Each of the first and second lens members 4026a, 4026b may be identical to any of the lens members 4026 previously described. In addition, a radial gap 4052 of any of the first and second lens members 4026a, 4026b may be sealed in any manner previously described. Any additional number of further lens members 4026 (e.g., a third lens member 4026c, a fourth lens member 4026d, etc.) may be disposed at, on, or around a corresponding portion of the tube member 4012.

Figure 4I:
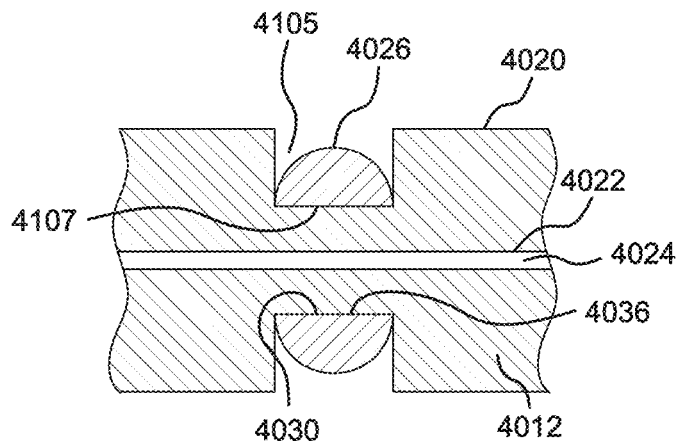
FIG. 4I is a partial cross-sectional view of an embodiment of the lens assembly.
Figure 4J:
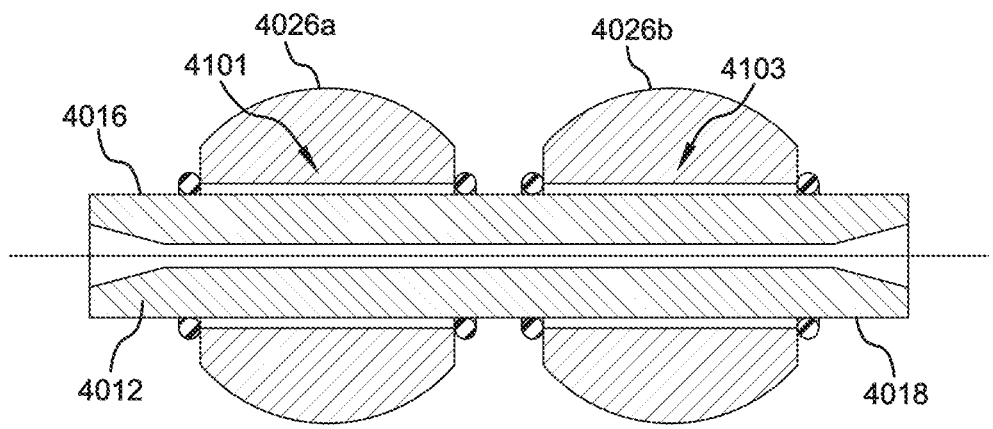
FIG. 4J is a cross-sectional view of an embodiment of the lens assembly.

As illustrated in FIG. 4I, the lens member 4026 may be disposed within a circumferential recess 4105 formed in the tube member 4012. A bottom portion 4107 of the recess 4105 may be radially offset from the inner surface 4022 of the tube member 4012, and (at least) the inner surface 4036 defining the lens aperture 4030 may be disposed within the recess 4105. The lens member 4026 may have a diameter that is less than the diameter of the outer surface 4020 of the tube member 4012, or the lens member 4026 may have a diameter that is greater than or equal to the diameter of the outer surface 4020 of the tube member 4012.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A lens assembly comprising: an elongated tube member extending along a tube axis from a first end to a second end, the tube member having an outer surface and an inner surface disposed radially inward of the outer surface, the inner surface defining a tube passageway that extends from the first end to the second end of the tube member, the tube passageway adapted to receive a stream of analytes; and a lens member adapted to focus light used to detect a property of one or more of the analytes of the stream disposed within the tube passageway, the lens member having an outer surface and a lens aperture extending from a first portion of the outer surface to a second portion of the outer surface, the lens aperture being defined by an inner surface, the inner surface extending along a lens axis from a first end at or adjacent to the first portion of the outer surface of the lens member to a second end at or adjacent to the second portion of the outer surface of the lens member, wherein at least a portion of the tube member is disposed within the lens aperture, wherein a radial gap extends between the inner surface of the lens aperture and the outer surface of the tube member.

2. The lens assembly of aspect 1, further comprising: a first seal disposed adjacent to the first end of the inner surface of the lens aperture; and a second seal disposed adjacent to the second end of the inner surface of the lens aperture.

3. The lens assembly of either aspect 1 or 2, further comprising: a fluid disposed between the first seal and the second seal and within the radial gap.

4. The lens assembly of aspects 1 to 3, wherein the fluid is water.

5. The lens assembly of aspects 1 to 4, wherein the fluid is oil.

6. The lens assembly of aspects 1 to 5, wherein the fluid is air.

7. The lens assembly of aspects 1 to 6, wherein the lens member comprises a first material having a first refractive index at a first wavelength of light, the tube member comprises a second material having a second refractive index at the first wavelength of light, and the fluid has a third refractive index at the first wavelength of light, and wherein the third refractive index is within 10% of each of the first refractive index and the second refractive index at the first wavelength.

8. The lens assembly of aspects 1 to 7, wherein the first material is the same as the second material, and wherein the first refractive index is the same as the second refractive index.

9. The lens assembly of aspects 1 to 8, wherein the first and second material is a fused silica.

10. The lens assembly of aspects 1 to 9, wherein the lens member includes a lens axis, and wherein the lens axis is coaxial with the tube axis.

11. The lens assembly of aspects 1 to 10, wherein the outer surface of the lens member is symmetrical about the lens axis.

12. The lens assembly of aspects 1 to 11, wherein the lens aperture is symmetrical about the lens axis.

13. The lens assembly of aspects 1 to 12, wherein the lens aperture has a circular cross-sectional shape.

14. The lens assembly of aspects 1 to 13, wherein the outer surface of the lens member has a spherical shape.

15. The lens assembly of aspects 1 to 14, wherein the outer surface of the tube member is cylindrical and symmetrical about the tube axis.

16. The lens assembly of aspects 1 to 15, wherein the surface of the lens aperture is cylindrical and symmetrical about the lens axis, and wherein the lens axis is coaxially aligned with the tube axis.

17. The lens assembly of aspects 1 to 16, wherein the outer surface of the lens member has a spherical shape, and the spherical shape is symmetrical about the lens axis.

18. The lens assembly of aspects 1 to 17, wherein the outer surface of the tube member has a circular cross-sectional shape having a first diameter and the inner surface defining the lens aperture of the lens member has a circular cross-sectional shape having a second diameter, wherein the first diameter is smaller than the second diameter to form the radial gap between the inner surface of the lens aperture and the outer surface of the tube member.

19. The lens assembly of aspects 1 to 18, further comprising: a bonding material disposed within the radial gap.

20. A lens assembly comprising: an elongated tube member extending along a tube axis from a first end to a second end, the tube member having an outer surface and an inner surface disposed radially inward of the outer surface, the inner surface defining a tube passageway that extends from the first end to the second end of the tube member, the tube passageway adapted to receive a stream of analytes; and a lens member adapted to focus light used to detect a property of one or more of the analytes of the stream disposed within the tube passageway, the lens member having an outer surface and a lens aperture extending from a first portion of the outer surface to a second portion of the outer surface, the lens aperture being defined by an inner surface, the inner surface extending along a lens axis from a first end at or adjacent to the first portion of the outer surface of the lens member to a second end at or adjacent to the second portion of the outer surface of the lens member, wherein the outer surface of the tube member has a circular cross-sectional shape having a first diameter and the inner surface defining the lens aperture of the lens member has a circular cross-sectional shape having a second diameter, wherein the first diameter is equal to the second diameter such that no radial gap between the inner surface of the lens aperture and the outer surface of the tube member is formed.

21. The lens assembly of aspect 20, wherein the lens member comprises a first material having a first refractive index at a first wavelength of light and the tube member comprises a second material having a second refractive index at the first wavelength of light, and wherein the first refractive index is within 10% the second refractive index at the first wavelength of light.

22. The lens assembly of either aspect 20 or 21, wherein the first material is the same as the second material.

23. The lens assembly of aspects 20 to 22, wherein the first and second material is a fused silica.

24. The lens assembly of aspects 20 to 23, wherein the lens member includes a lens axis, and wherein the lens axis is coaxial with the tube axis.

25. The lens assembly of aspects 20 to 24, wherein the outer surface of the lens member has a spherical shape.

26. The lens assembly of aspects 20 to 25, wherein the outer surface of the tube member is cylindrical and symmetrical about the tube axis.

27. The lens assembly of aspects 20 to 26, wherein the surface of the lens aperture is cylindrical and symmetrical about the lens axis, and wherein the lens axis is coaxially aligned with the tube axis.

28. The lens assembly of aspects 20 to 27, wherein the outer surface of the lens member has a spherical shape, and the spherical shape is symmetrical about the lens axis.

29. A method of manufacturing a lens assembly comprising: molding an elongated tube member in a first molding operation, the tube member extending along a tube axis from a first end to a second end, the tube member having an outer surface and an inner surface disposed radially inward of the outer surface, the inner surface defining a tube passageway that extends from the first end to the second end of the tube member, the tube passageway adapted to receive a stream of analytes; and molding a lens member around the outer surface of the tube member in a second molding operation, the lens member adapted to focus light used to detect a property of one or more of the analytes of the stream disposed within the tube passageway, the lens member having an outer surface and a lens aperture extending from a first portion of the outer surface to a second portion of the outer surface, the lens aperture being defined by an inner surface in contact with the outer surface of the tube member.

30. The method of aspect 29, wherein the second molding operation is performed after the first molding operation.

31. The method of either aspects 29 or 30, wherein the lens member is molded from a first material having a first refractive index at a first wavelength of light and the tube member is molded from a second material having a second refractive index, and wherein the first refractive index is within 10% the second refractive index at the first wavelength of light.

32. The method of aspects 29 to 31, wherein the first material is the same as the second material.

33. The method of aspects 29 to 32, wherein the first and second material is a fused silica.

34. The lens assembly of aspects 29 to 33, wherein the stream of analytes is a core stream of cells, and wherein the assembly is adapted for use in performing flow cytometric sorting of the core stream of cells.

35. The lens assembly of aspects 29 to 34, wherein the stream of analytes is a core stream of cells, and wherein the assembly is adapted for use in performing flow cytometric sorting of the core stream of cells.

36. The method of aspects 29 to 35, wherein the stream of analytes is a core stream of cells, and wherein the assembly is adapted for use in performing flow cytometric sorting of the core stream of cells.

37. The lens assembly of aspects 1 to 18, wherein an index matching fluid is disposed within the radial gap and confined to the radial gap by the first and second seals, and further comprising: a bonding agent applied over the first seal and in contact with the first seal, the outer surface of the lens member, and the outer surface of the tube member; and a bonding agent applied over the second seal and in contact with the second seal, the outer surface of the lens member, and the outer surface of the tube member.

38. A method of manufacturing a flow cell comprising: providing an elongated tube member, the tube member extending along a tube axis from a first end of the tube passage way to a second end of the tube passageway, the tube member having an outer surface and an inner surface disposed radially inward of the outer surface, the inner surface defining a tube passageway that extends from the first end of the tube passageway to the second end of the tube passageway of the tube member, the tube passageway adapted to receive a stream of analytes; providing a lens member, the lens member adapted to focus light used to detect a property of one or more of the analytes of the stream disposed within the tube passageway, the lens member having an outer surface and a lens aperture extending through the lens member from a first aperture opening to a second aperture opening, the lens aperture being defined by an inner surface having a radius greater than a radius of the outer surface of the elongated tube member, a distance between the outer surface of the elongated tube member and the inner surface of the lens aperture defining a radial gap; positioning the elongated tube member through the lens aperture; and filling the radial gap with an index matching fluid.

39. The method of aspect 38, further comprising sealing the index matching fluid within the radial gap.

40. The method of either aspect 38 or 39, wherein sealing the index matching fluid within the radial gap comprises providing a seal that centers elongated tube member in the lens aperture such that an axis of the tube passageway is co-axial with an axis of the lens aperture.

41. The method of aspects 38 to 40, wherein sealing the index matching fluid within the radial gap comprises employing vacuum degasification to remove air from the fluid within the radial gap prior to sealing the index matching fluid within the radial gap.

42. The method of aspects 38 to 41, wherein sealing the index matching fluid within the radial gap comprises placing a flexible sealing element at each of the first aperture opening and the second aperture opening, each flexible sealing element sealingly engaging both the elongated tube member and the lens member to confine the index matching fluid within the radial gap.

43. The method of aspects 38 to 42, further comprising encasing each of the flexible sealing elements in a bonding agent to secure the elongated tube member to the lens member.

44. The method of aspects 38 to 43, further comprising affixing an entry portion to the first end of the tube passageway, the entry portion having an opening extending from a first end of the entry portion to a second end of the entry portion, the opening having at the second end of the entry portion a geometry matching a geometry of the first end of the tube passageway, the entry opening at the second end of the entry portion being smaller than the opening at the first end of the entry portion.

45. The method of aspects 38 to 44, further comprising affixing an exit portion to the second end of the tube passageway, the exit portion having an opening extending from a first end of the entry portion to a second end of the entry portion, the opening having at the second end of the exit portion a geometry matching a geometry of the second end of the tube passageway, the entry opening at the second end of the exit portion being the same as or smaller than the opening at the first end of the exit portion.

46. A lens assembly comprising: an elongated tube member extending along a tube axis from a first end to a second end, the tube member having an outer surface and an inner surface disposed radially inward of the outer surface, the inner surface defining a tube passageway that extends from the first end to the second end of the tube member, the tube passageway adapted to receive a stream of analytes; and a lens member adapted to focus light used to detect a property of one or more of the analytes of the stream disposed within the tube passageway, the lens member having an outer surface extending from a first portion of the outer surface of the tube member to a second portion of the outer surface of the tube member, wherein the outer surface of the tube member has a circular cross-sectional shape having a first diameter and wherein the lens member is integrally formed with the tube member such that the lens member and the tube member form a single, unitary part.

47. The lens assembly of aspect 46, wherein the lens member and the tube member comprise fused silica.

48. The lens assembly of either aspect 46 or 47, wherein the outer surface of the lens member has a spherical shape.

49. The lens assembly of aspects 46 to 48, wherein the spherical outer surface is symmetrical about a point disposed along the tube axis.

50. A method of manufacturing a lens assembly comprising: inserting an elongated tube member into a first cavity of a mold, the tube member extending along a tube axis from a first end to a second end, the tube member having an outer surface and an inner surface disposed radially inward of the outer surface, the inner surface defining a tube passageway that extends from the first end to the second end of the tube member, the tube passageway adapted to receive a stream of analytes, wherein a portion of the outer surface of the tube member is disposed within a second cavity of the mold; and molding a lens member around the portion of the outer surface of the tube member disposed within the second cavity of the mold, wherein the lens member is adapted to focus light used to detect a property of one or more of the analytes of the stream disposed within the tube passageway.

51. The method of aspect 50, wherein the lens member has an outer surface having a spherical shape.

52. The method of either aspect 50 or 51, further comprising: extruding the elongated tube member prior to inserting the tube member into the first cavity of the mold.

53. The method of aspects 50 to 52, wherein the lens member is molded from a first material the tube member comprises a second material that is identical to the first material.

54. The method of aspects 50 to 53, wherein the first and second material is a fused silica.

55. The lens assembly of aspects 1 to 18, further comprising: a second lens member adapted to focus light used to detect a property of one or more of the analytes of the stream disposed within the tube passageway, the second lens member having an outer surface and a lens aperture extending from a first portion of the outer surface to a second portion of the outer surface, the lens aperture being defined by an inner surface, the inner surface extending along a lens axis from a first end at or adjacent to the first portion of the outer surface of the second lens member to a second end at or adjacent to the second portion of the outer surface of the second lens member, wherein at least a second portion of the tube member is disposed within the lens aperture of the second lens member, and wherein a radial gap extends between the inner surface of the lens aperture of the second lens member and the outer surface of the tube member.

56. The lens assembly of aspects 1 to 18, wherein the inner surface of the lens aperture is disposed within a circumferential recess within the tube member.

Optical Saturation

Optical systems and methods for irradiating analytes and, specifically, the configuration, alignment, and operation of optical systems to at least partially "saturate" the analytes with radiation incident on the analytes from multiple directions will now be described. In particular, the described optical systems split light emitted by a source of radiation into multiple beams of lights, each balanced in power, and causes the multiple beams of light to illuminate analytes, such as analytes traveling through a sorting flow cytometer. The number, power, wavelength, etc. of the multiple beams and/or the source of radiation may be selectively configured such that a certain percentage of the carriers of the target analytes are excited, reducing the probability of any given photon of light from the source of radiation exciting another carrier. In this manner, detectable properties of the analytes, such as fluorescence, are primarily dependent on only the quantity of analytes traveling through the flow cytometer, not the orientation or position of the analytes as they are irradiated with the multiple beams.

To achieve and maintain an alignment of the multiple beams and/or a balanced non-spatial property of the multiple beams, optical systems of the present disclosure may include various adjusting and/or aligning components controlled by one or more computing devices to adjust optical elements of the optical system. The computing devices may receive indications of measured or detected properties of irradiated analytes (e.g., measurements of fluorescence) and/or indications of properties of each of the multiple beams (intensities, angles, polarizations, etc.). The computing devices may then analyze the received indications collectively and/or individually to determine proper adjustments for optical elements, such as mirrors or half-wave plates, of the optical systems. The computing devices may trigger the adjusting and/or aligning components to complete the determined adjustments so as to configure or maintain the directionality of the multiple beams and/or the balanced power of the multiple beams.

In some implementations, sorting flow cytometers may utilize optical systems, as discussed herein, to irradiate cells (e.g., sperm cells) passing through the sorting flow cytometers. The description below references various example optical systems utilized in such sorting flow cytometers. However, optical systems of the current disclosure may be utilized in systems other than sorting flow cytometers to irradiate any number analytes other than biological cells. For example, optical systems of the current disclosure may be utilized in quality control devices to irradiate non-biological, manufactured products, in quantum computing devices to irradiate non-biological quantum systems, in detectors configured to detect trace amounts of volatile heavy metals (e.g., mercury), in forensic devices to visualize collected evidence (fibers, fingerprints, etc.), in inspection devices utilized to identify cracks or other defects in mechanical parts or structures, etc. Analytes may include both biological materials, such as cells, and/or non-biological materials, such as plastics, metals, glass, etc. Moreover, analytes may be stationary objects irradiated by optical systems or analytes may be moving with respect to the optical system, such as cells traveling in a stream within a sorting flow cytometer.

By reducing a dependence of measured properties on the orientation and/or position of corresponding analytes, optical systems discussed herein may reduce variation in measured properties due to instabilities in environments of the analytes (e.g., drifts in a core stream), variation in energy or polarization of the irradiation source, or variation of other optical components, such as mirrors or half-wave plates, of optical systems. In the case of sorting flow cytometers, this reduction in variation may allow sorting flow cytometers to more consistently and accurately classify and/or sort cells (e.g., sperm cells having X sex chromosomes from sperm cells having Y sex chromosomes) and/or to less frequently require tedious and costly alignments, adjustments, or other modifications.

For ease of discussion, the below description will utilize many examples in which cells are irradiated causing the cells, and/or dyes within the cells, to detectably fluoresce. However, measured properties of analytes resulting from, or at least dependent on, the irradiation of the analytes may include properties other than and/or in addition to fluorescence. By way of example, devices utilizing optical systems as discussed herein may measure absorbance, light scattering, luminescence, fluorescence, phosphorescence, polarization or depolarization of light, or other properties; properties of electricity including but not limited to inductance, capacitance, potential, current, or resistance of cells or of the surrounding medium; properties of electromagnetism including magnetism, paramagnetism, magnetic resonance, and/or interaction of the cell with or emission of electromagnetic forces and/or waves; imaging, image properties, morphological properties, or related properties derived from the collection and/or analysis of image or image-like properties of analytes. Further, a measure of fluorescence of a cell or other analyte may reflect the intrinsic fluorescence of the analyte or the measure of fluorescence of an analyte may reflect the presence and/or quantity of a fluorochrome or fluorescent particle that binds to or associates with the analyte and directly or indirectly reflects some property of the analyte, or both.

Saturation of Analytes with Multiple Beams

Because the orientation and/or position of analytes, such as cells traveling through a flow cytometer, often remains more or less random (at least about one or more axes), light incident upon the analytes, light emitted from the analytes (e.g., fluorescent light), and light reflected off of the analytes, may be dependent on the orientation or position of the analytes. This dependence, if not mitigated, may confound measurements corresponding to analytes (e.g., prevent sex chromosomes in sperm cells from being distinguished) and, subsequently, one or more operations of devices dependent on these measurements, such as the sorting operations of a sorting flow cytometer.

Optical systems of the current disclosure mitigate irradiation dependencies on analyte orientation and/or analyte position, or "irradiation anisotropy," by: (i) at least partially saturating analytes to reduce numbers of non-excited, or free, carriers; and/or (ii) irradiating analytes from multiple directions (e.g., with multiple beams of light). In some cases, optical systems may rely primarily on saturation of analytes to reduce irradiation anisotropy, and, in other cases, optical systems may rely primarily on irradiation from multiple directions to reduce irradiation anisotropy. Generally, though, optical systems may utilize both saturation (e.g., at least partial saturation, as described below) and irradiation from multiple directions to reduce variation in measured properties and on operations, such as a sorting of cells, that are dependent on measured properties.

With regard to saturation, optical systems may deliver or impart a high enough amount of energy to analytes to excite many or most of the carriers within the analytes. In other words, as the energy delivered to the analytes, or power, increases, a number of excited carriers (e.g., non-free or excited electrons) within the analytes increases, which proportionately decreases the number of free carriers available to absorb the energy. For example, if 90% of the free carriers are excited, an additional photon may have $\frac{1}{10}^{th}$ the probability of exciting a free carrier as a photon incident with 0% of the free carriers excited. To the extreme, when all carriers are excited, the analytes becomes "saturated" such that an increase in energy delivered to the analytes does not produce an increase in light emitted from the analytes (e.g., fluorescent light). Also, because all, or at least many, of the carriers in analytes are excited, the orientation or position of the analytes may not significantly influence measured properties of the analytes resulting from irradiation of the analytes, insofar as the measurement (e.g., detection) is isotropic to analyte orientation.

Figure 5A:
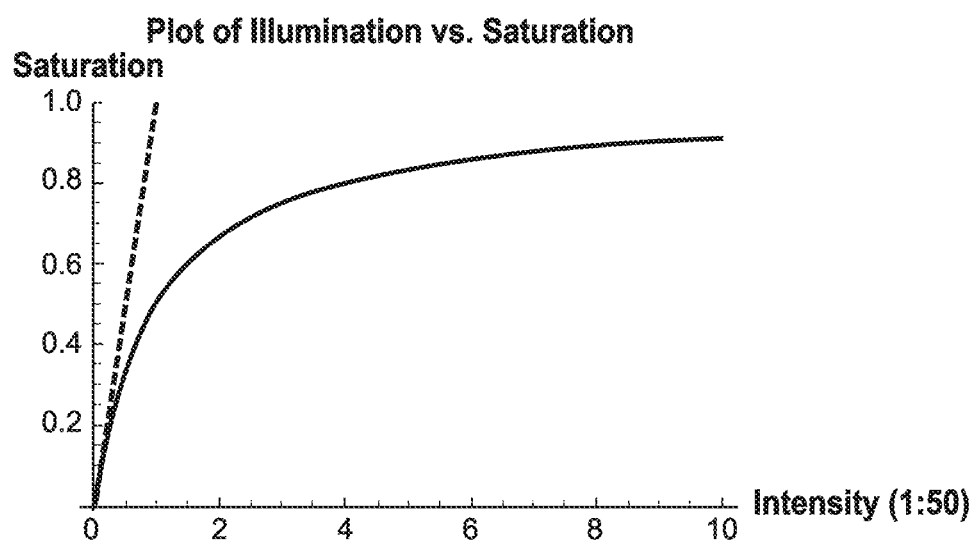
FIGS. 5A and 5B include plots that illustrate saturation of analytes as a function of intensity and pulse energy, respectively.
Figure 5B:
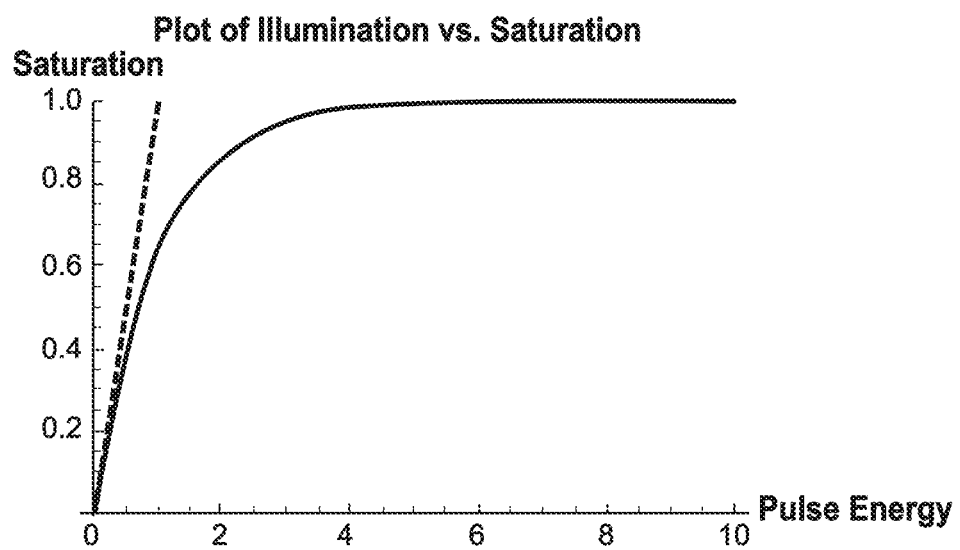

FIGS. 5A and 5B include example plots illustrating saturation of cells (e.g., sperm cells) when irradiated by a continuous wave (CW) laser and a quasi-continuous wave (QCW) laser, respectively. As the intensity, in the case of a CW laser, or energy within a pulse ("pulse energy"), in the case of a QCW laser, of the laser increases, a normalized fluorescence (represented by the solid line in FIGS. 5A and 5B) flattens out such that further increases or decreases in intensity of the lasers do not produce significant changes in fluorescence (e.g., fluorescence of the cells and/or dyes labeling the cells). This saturation behavior is non-linear as visually indicated in FIGS. 5A and 5B by deviations of the actual fluorescence from a normalized linear increase in fluorescence (the dotted lines).

Therefore, optical systems discussed herein may irradiate cells traveling through a flow cytometer, or other analytes, with enough energy to saturate, or at least partially saturate, the analytes. This saturation may occur when analytes are illuminated from one direction with a single beam of light. However, other implementations may utilize multiple beams of light incident on analytes from multiple directions to both partially saturate analytes and to further reduce irradiation anisotropy. Optical systems may utilize these multiple beams of light in addition to a partial or full saturation of analytes, and/or optical systems may utilize these multiple beams of light as an alternative to fully saturating analytes. In some cases, optical systems may even utilize the multiple beams to promote saturation of cells. For example, certain optical systems may reduce variation in measured properties by irradiating analytes from multiple directions without fully saturating the analytes (e.g., without exciting all carriers in the analytes). Generally, both the energy of a source of radiation and a number of beams into which light from the source of radiation are split may be selectively configured to reduce overall variation in measured properties of analytes below a threshold (insofar as the measurement or detection of the properties is isotropic to analyte orientation or position).

Figure 5C:
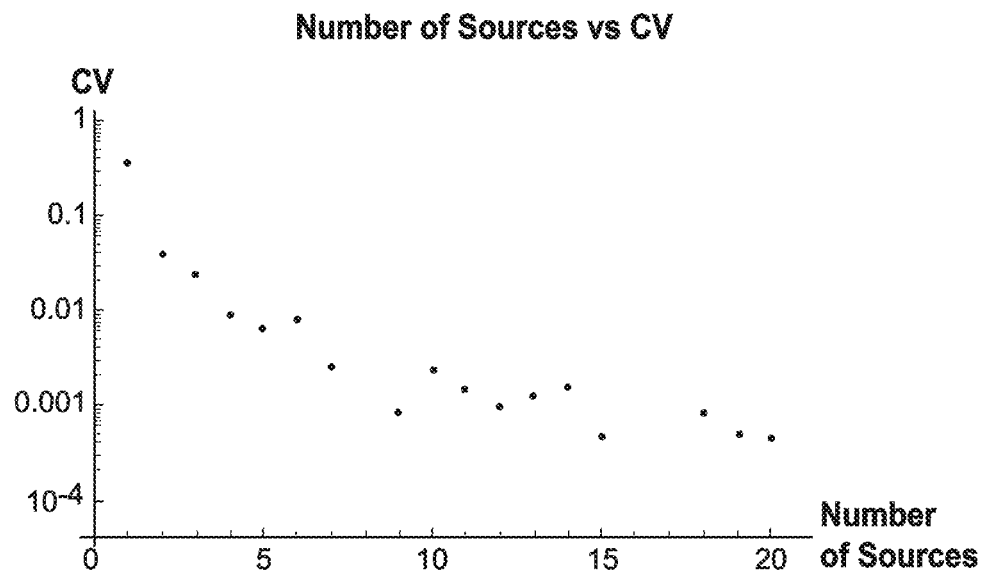
FIGS. 5C and 5D include plots that illustrate the dependence of a variation in measure properties of analytes on a number of beams used to irradiate the analytes and on a saturation level of the analytes.

FIG. 5C includes a plot of measured variation in a sorting flow cytometer (e.g., variation in detected fluorescence of cells), or "coefficients of variation" (CV), vs. a number of beams utilized to irradiate cells in the flow cytometer, each beam irradiating cells from a direction different from the other beams. As the number of beams used to irradiate the cells increases, the variation decreases. Such decreases are at least partially due to the fact that irradiating randomly oriented cells from multiple directions removes some of the irradiation anisotropy from the system. Thus, both irradiation from multiple directions and saturation of analytes may reduce variation of measured or detected properties within a device irradiating analytes.

Figure 5D:
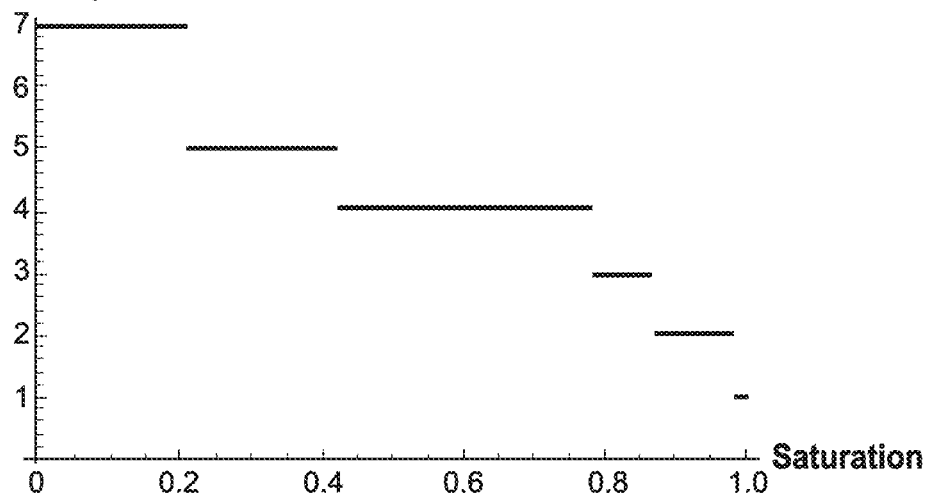

FIG. 5D includes a plot illustrating various combinations of a number of beams and a saturation level (e.g., percentage of saturation or percentage of carriers excited) required to reduce CV in a particular flow cytometer to 0.5% or below. For example, in the particular flow cytometer corresponding to FIG. 5D, four beams of light illuminating cells from four different directions along with a 60% saturation level is sufficient to reduce CV in the flow cytometer to 0.5% or below. That is, configurations of the particular flow cytometer with fewer than four beams and 60% saturation or configurations with less than 60% saturation and four beams are likely to produce a CV above 0.5%. Similar CV values (e.g., less than or equal to 0.5%) may be achieved in the flow cytometer with three beams and 80% saturation, two beams and 90% saturation, five beams and 30% saturation, etc., as indicated in FIG. 5D.

Because multiple combinations of a number of beams and a saturation level may produce desired or acceptable variation in measured properties such as fluorescence, configurations of optical systems may selectively include a certain number of beams and certain non-spatial irradiation properties (intensities, power, phase, timing, power, polarization, etc.) based on design constraints and/or based on desired or acceptable CV values. For example, a certain flow cytometer design may be constrained (e.g., due to space or budget requirements) to only two beams illuminating cells from two directions. In such a case, assuming the flow cytometer behaves in a manner similar to that illustrated in FIG. 5D, an optical system of the flow cytometer may be configured with an source of radiation allowing the two beams to saturate cells at a level of 90% (e.g., exciting 90% of carriers). In other example optical systems, a power or intensity of a source of radiation may be tightly constrained, and, thus, a number of beams may be selected so as to reduce CV, given the constrained power.

Thus, "saturated" as used herein may not refer to an excitation of all carriers of analytes. Rather, saturated may refer to a condition in which a sufficient number or percentage of carriers within analytes are excited to reduce variation in measured properties of the analytes below a threshold, given a certain number of beams irradiating the analytes. This threshold and level of saturation may vary based on the application (certain sorting flow cytometers, certain detectors, certain forensic devices, etc.) and/or based on the type and environment of analytes.

In a scenario in which sperm cells travel in a stream of a certain sorting flow cytometer, a CV value may need to be at or below 0.5% in order to distinguish, based on measured properties of the sperm cells (e.g., fluorescence), sex chromosomes of the sperm cells. Optical systems may achieve such a CV value with various combinations of a number of beams and saturation level (e.g., as illustrated in FIG. 5D) that are specific to this example application. In another example application, a design for a forensic device may require a CV at or below 10% in order to distinguish between types of fibers. Optical systems may achieve a CV within this range via various other combinations of a number of beams and saturation level different from those combinations illustrated in FIG. 5D, because of differences in the analytes, measured properties, required tolerances, detection algorithms, etc.

In another scenario, a distinguishing property of analytes may produce a wider range of measured properties than in the case of fluorescing sperm cells discussed above. That is, a device in which an optical system is implemented may only require a CV value at or below 10%, 20%, 30%, etc. to successfully analyze particular types of analytes. In these cases, a level of saturation of less than 50% (e.g., 30% of carriers excited), given a particular number of beams, may allow an optical system to achieve the required CV, insofar as the CV is dependent on illumination anisotropy. For example, a CV value for a device implementing an optical system may have a value of 1.2 without exploiting saturation of analytes, where a value of one is required for proper operation of the device. In this case, the optical system may only need to achieve a 20% level of saturation to reduce the CV to the acceptable value of one.

In yet another scenario, "saturated" as used herein, may only imply an equivalent saturation of analytes. In other words, to reduce a CV to an acceptable value or range of values, an optical system may only need to saturate each analyte (e.g., cell) being analyzed by a device to a level equivalent to a level of saturation of other of the analytes being analyzed by the device. In these cases, all analytes being analyzed by a device may receive an equivalent amount of radiation from a source of radiation. The equivalent amount of radiation may not necessarily imply a lack of variation in the radiation (e.g., in each of a number of beams), but the equivalent amount of radiation received by each of a plurality of analytes may saturate each of the plurality of analytes at the same level (e.g., 20%) of saturation, within a tolerance.

Further, various coordinates, angles, thresholds, and tolerances are utilized throughout this description (e.g., for a CV or for reference angles and/or positions). These coordinates, angles, thresholds, and tolerances, are given by way of example and without limitation to clarify various portions of the disclosure. Generally, components of optical systems may operate according to and/or be configured according to any suitable number and type of coordinates and angles, such as Cartesian coordinates, polar coordinates, spherical coordinates, angles measured in radians, angles measured in degrees, etc., defined with respect to suitable reference points. Components of optical systems may also operate according to and/or be configured according to any suitable number and type of thresholds and tolerances, such as thresholds and tolerances defined according to normalized values, percentages, raw measured values, averages, etc.

Example Optical System Overview

Figure 5E:
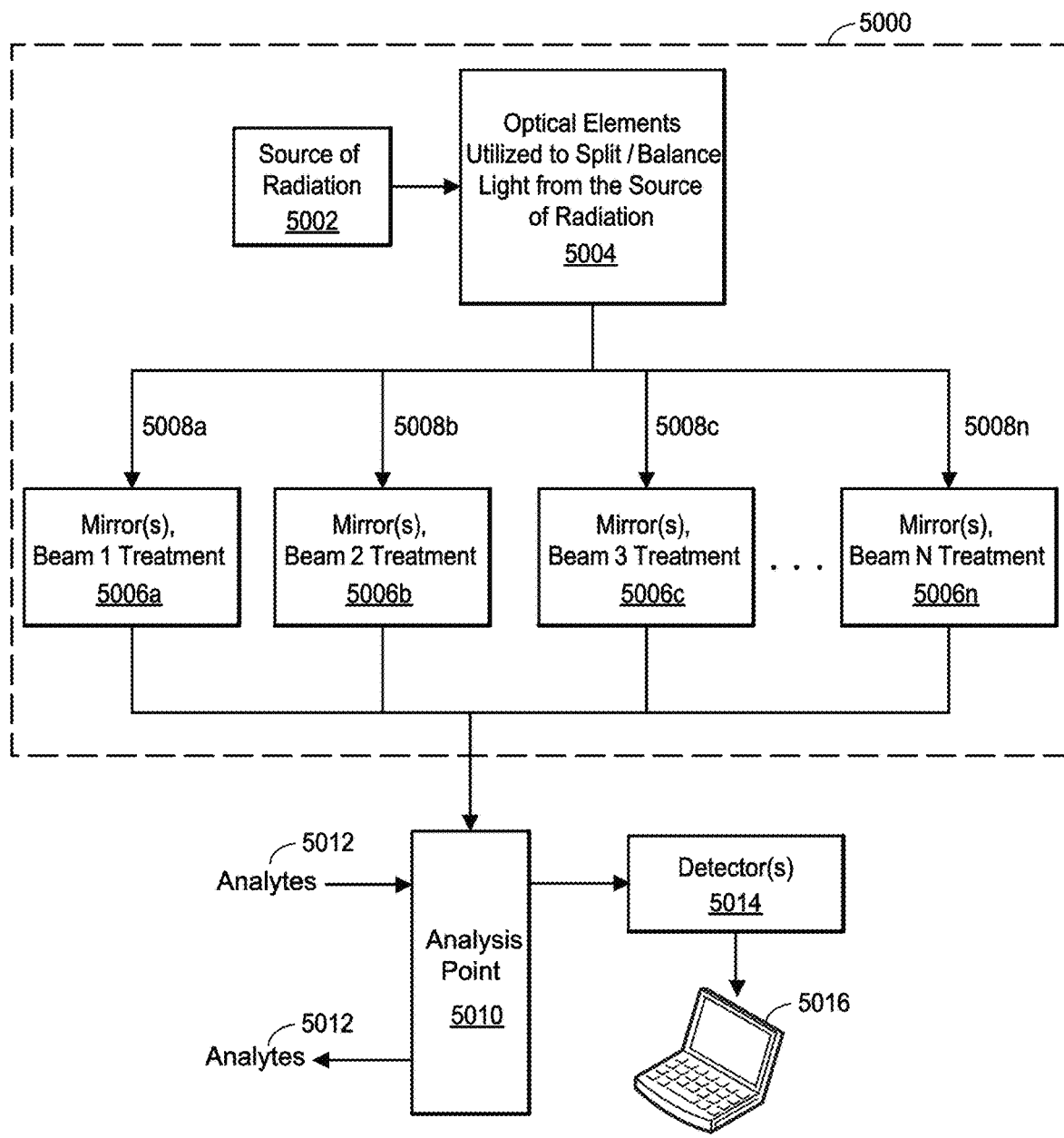
FIG. 5E is a block diagram of an example optical system for at least partially saturating analytes with multiple beams.

FIG. 5E is a block diagram of an example optical system 5000 constructed in accordance with one embodiment of the present disclosure. The example optical system 5000 includes an source of radiation 5002, optical elements 5004 utilized to split/balance light from the source of radiation 5002, and mirrors or other optical treatment elements 5006a-5006n utilized to treat and/or direct multiple beams 5008a-5008n of light. The multiple beams 5008a-5008n of the example optical system 5000 irradiate analytes 5012 at an analysis point 5010 through which the analytes 5012 pass. For example, the analysis point 5010 may be a flow cell of a sorting flow cytometer through which cells pass in a core stream or in droplets.

The analytes traveling through the analysis point 5010 may exhibit detectable properties, such as fluorescence, upon irradiation by the beams 5008a-5008n, and some or all of the detectable properties may be measured by one or more detector(s) 5014. For example, the one or more detector(s) 5014 may include one or more photodiodes, photo-multiplier tubes, charge coupled devices (CCDs), etc. The detector(s) 5014 may be electrically and/or communicatively coupled to a computing device 5016, where the computing device 5016 processes signals from the detector(s) 5014 to determine properties of the analytes and/or to complete one or more corresponding operations. For example, in cases in which the optical system 5000 is part of a flow cytometer, the computer 5016 may determine a sex chromosome of sperm cells passing through the analysis point 5010 based on fluorescence of the cells the computer 5016 may trigger a sorting of the sperm cells into those cells having X chromosomes and those cells having Y chromosomes. In such an example, the computer 5016 may trigger a modulation of a kill laser to sort the sperm cells as further discussed elsewhere in this specification.

Figure 5F:
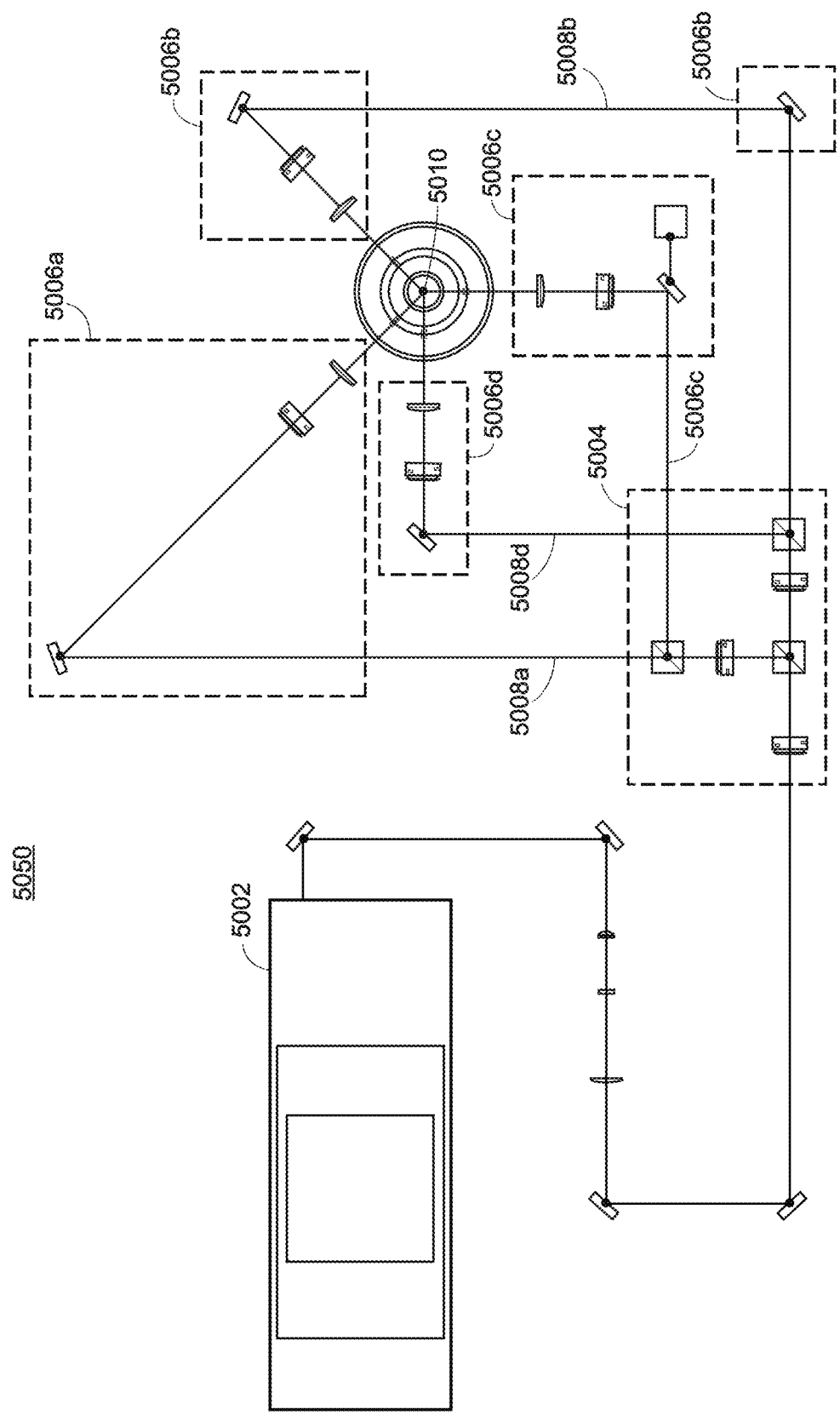
FIG. 5F illustrates an example arrangement of components implementing the optical system of FIG. 5E.

FIG. 5F is a schematic illustrating an example arrangement 5050 of components forming the optical system 5000. For ease of discussion and clarity, certain of the blocks of FIG. 5E, such as detector(s) and a computing device, are not illustrated in FIG. 5F. However, arrangements of optical and other components to form optical systems may include all of the components described with reference to FIG. 5E, or at least a substantially similar set of components. Also, the example arrangement 5050 depicts an implementation in which light from the source of radiation 5002 is split into four beams 5008a, 5008b, 5008c, and 5008d. However, other implementations may split light from sources of radiation into other numbers of beams (three, five, six, seven, etc.), as discussed further with reference to FIGS. 5C and 5D.

The source of radiation 5002 may include one or more lasers, in an implementation. In particular, the source of radiation 5002 may include a laser that emits light at a particular wavelength selectively chosen to excite analytes traveling through the analysis area 5010. For example, biological cells traveling through the analysis area 5010 may be "labeled" to permit identification of the cells by detecting the presence or absence of any number of characteristics (e.g., a desired property). Useful labels include fluorescent dyes, electron-dense reagents, enzymes, biotin-streptavidin, dioxigenin, haptens, proteins for which antisera or monoclonal antibodies are available, or nucleic acid specific dyes. These labels may be excited (e.g., to fluorescence) most easily or primarily at certain wavelengths of light, and the light emitted by the source of radiation 5002 may closely match these certain wavelengths of light.

The light emitted by the source of radiation 5002 may be polarized when emitted by the source of radiation 5002. For example, the source of radiation 5002 may emit linearly or circularly polarized light. However, in these and/or other implementations, the light emitted by the source of radiation 5002 may be polarized after being emitted from the source of radiation 5002 via polarizing wave plates, for example. Similarly, the light emitted by the source of radiation 5002 may exhibit other non-spatial properties, such as coherence, monochromatic composition, polychromatic composition, etc., or the light emitted by the source of radiation 5002 may be manipulated after being emitted by the source of radiation 5002 so as to be coherent, monochromatic, polychromatic, etc.

To split the light emitted by the source of radiation 5002 into the multiple beams 5008a-5008n, the optical elements 5004 may utilize various types and numbers of optical components. In some implementations, the optical elements 5004 may primarily utilize polarizing beam splitters and/or half-wave plates to split the light emitted by the source of radiation 5002 based on polarization directions of the irradiation. Alternatively or additionally, implementations may utilize cube beam splitters formed from two prisms, half-silvered mirrors, dichroic mirrored prisms, physically spliced optical fibers, and/or any other suitable optical elements configured to split, or at least contribute to the splitting of, irradiation from a source of radiation.

In some implementations, instead of splitting the light emitted by the source of radiation 5002 into the multiple beams 5008a-5008n, the optical system 100 may include multiple sources of radiation 5002. In one example, each of the multiple beams 5008a-5008n may include radiation emitted by a different source of radiation (e.g., by a different laser) than sources of radiation emitting radiation included in other of the beams 5008a-5008n. These sources of radiation may include multiple lasers, such as multiple diode lasers, for example. Generally, optical systems may include any suitable number of sources of radiation that generate radiation contributing to the multiple beams 5008a-5008n, such as the same number of sources of radiation as the number of the beams 5008a-5008n, a smaller number of sources of radiation as compared with the number of the beams 5008a-5008n (e.g., where radiation from the sources of radiation is split to form the beams 5008a-5008n), or a greater number of sources of radiation as compared with the number of beams (e.g., where the radiation from the sources of radiation is combined in a suitable manner to form the beams 5008a-5008n).

Figure 5G:
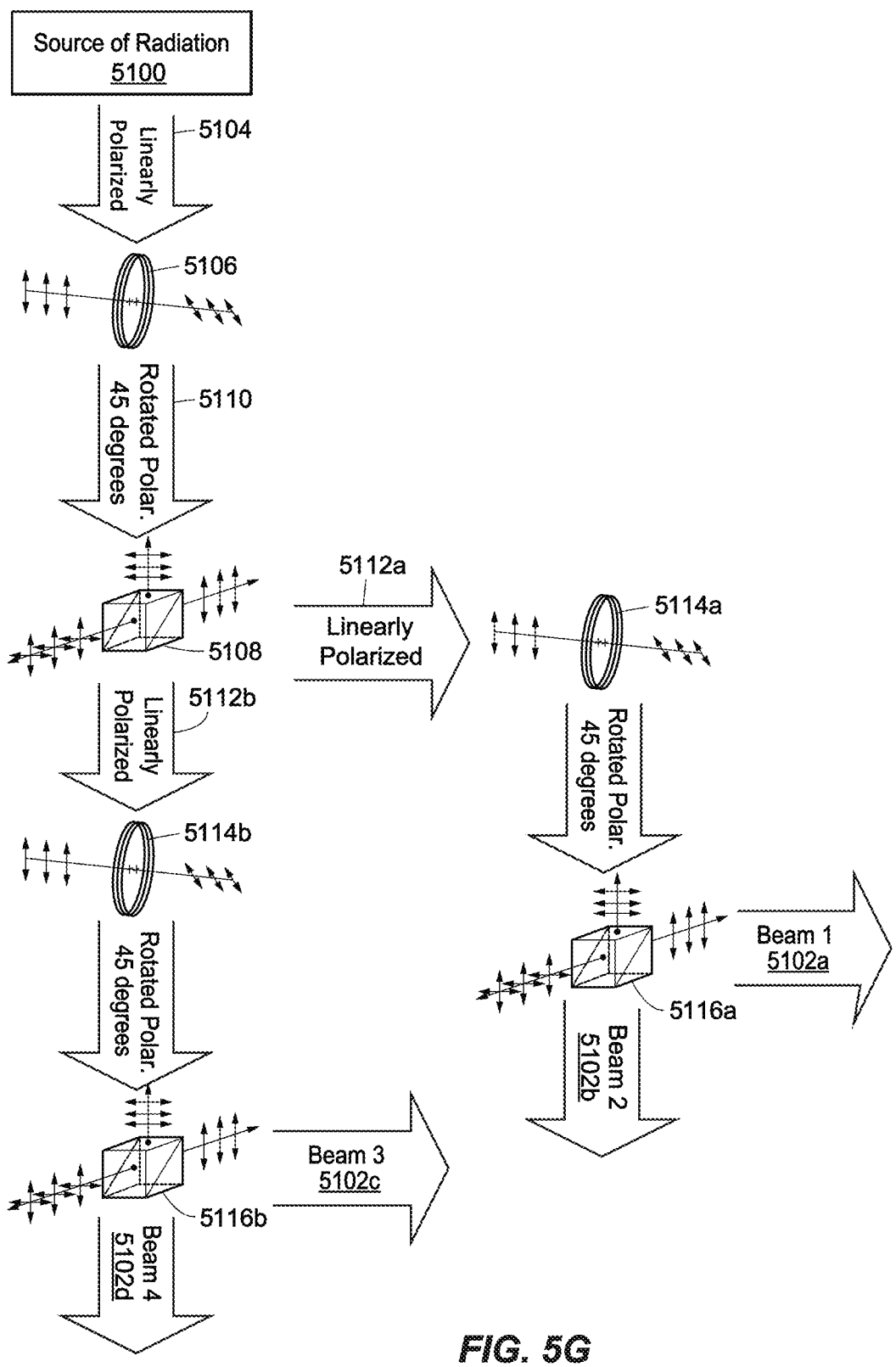
FIG. 5G illustrates an example splitting of light from a source of radiation into multiple beams, such as the multiple beams illustrated in FIGS. 5E and 5F.

FIG. 5G illustrates an example scenario in which light from a source of radiation 5100 is split into four beams 502a, 502b, 502c, and 502d. The source of radiation 5100 may be the source of radiation 5002 and the beams 502a, 502b, 502c, and 502d may be the beams 5008a, 5008b, 5008c, and 5008d, for example. Although FIG. 5G utilizes arrows pointed in various directions illustrating the flow of light through an example arrangement of components, light passing through these and/or other beam splitting components may be directed into any number of directions as the light enters the beam splitting components and/or exits the beam splitting components. That is, the arrows utilized in FIG. 5G to illustrate the passing of light through beam splitting components may only represent a flow a light through the components and not actual directions of propagation of light in optical systems.

In the scenario illustrated in FIG. 5G, linearly polarized light 5104 is emitted from the source of radiation 5100. This linearly polarized light 5104 is then rotated, by a half-wave plate 5106, to forty-five degrees from the initial polarization direction and/or forty-five degrees with respect to a certain axis utilized by a polarizing beam splitter 5108 downstream of the half-wave plate 5106. This rotation produces rotated light 5110 incident on the polarizing beam splitter 5108 at forty-five degrees with respect to an axis of the polarizing beam splitter 5108. The polarizing beam splitter 5108 splits the rotated light 5110 into two intermediate beams 5112a and 5112b of differing linear polarizations. For example, these intermediate beams 5112a and 5112b may have orthogonal polarizations. In other cases, only one of the two intermediate beams 5112a and 5112b is fully polarized in one direction, and the other of the two intermediate beams 5112a and 5112b includes a mixture of polarization states.

Optical systems may repeat the above example procedure of splitting the initial light 5104 into the two intermediate beams 5112a and 5112b a number of times to split the intermediate beams 5112a and 5112b into greater numbers of beams. For example, in the scenario illustrated in FIG. 5G, each of the intermediate beams 5112a and 5112b may pass through another half-wave plate 5114a and 5114b and another polarizing beam splitter 5116a and 5116b, respectively, to be split into four beams 502a, 502b, 502c, and 502d. Because polarizing beam splitters do not absorb or dissipate the energy of the rejected polarization state, this type of arrangement (e.g., utilizing polarizing beam splitters and half-wave plates) may be particularly useful in applications utilizing high intensity beams or in applications in which losses in intensity may prohibit proper functionality. In general, however, optical systems may utilize any suitable combination of polarizing beam splitters and other types of beam splitters, such as cube beam splitters, to split light into multiple beams.

Returning to FIGS. 5E and 5F, the optical treatment elements 5006a-5006n may include various optical elements or components utilized to further manipulate and/or direct the multiple beams 5008a-5008n after light from the source of radiation 5002 is split into the multiple beams 5008a-5008n. In particular, the optical treatment elements 5006a-5006n may include one or more mirrors positioned in the path of one or more of the beams 5008a-5008n. These mirrors may direct each of the beams 5008a-5008n towards the analysis area 5010 from an angle different from that of other of the beams 5008a-5008n. Each of the beams 5008a-5008n may be incident on the analysis area 5010 in the same plane as the other beams 5008a-5008n. Generally, however, each of the beams 5008a-5008n may be incident on the analysis area 5010 from any different angle in three dimensional space from other of the beams 5008a-5008n, including angles that are not orthogonal to a flow of analytes through the analysis point 5010. Also, the optical treatment elements 5006a-5006n may include, for each of the beams 5008a-5008n, one or more quarter wave plates to ensure that the beam is circularly polarized upon irradiating the analytes 5012. Such circular polarization of the beams 5008a-5008n may eliminate, or at least significantly reduce, interference among the beams 5008a-5008n such that a required energy, or power, is delivered to the analytes 5012.

Example Optical Systems Including Alignment/Adjustment Components

As discussed above, both a level of saturation and a number of directions from which analytes are irradiated may contribute to reductions in variation of measured properties (or "CV"). However, in many scenarios, properties of sources of radiation (e.g., lasers), calibrations of optical components (e.g., polarizing beam splitters), and/or properties of analytes (e.g., positions of analytes within an analysis area) may drift over time. This drift may influence levels of saturation and directionality of beams irradiating analytes. As such, devices (e.g., sorting flow cytometers) implementing optical systems, such as the optical system 5000, may include various alignment and/or adjustment components that allow the optical system to achieve and/or maintain alignment and balancing (e.g., in power) of multiple beams. In some implementations, a computing device may automatically control these alignment and/or adjustment components to align and or adjust components, such as polarizing beam splitters and mirrors, of an optical system, thus mitigating drift and maintaining CV below an acceptable level (e.g., a threshold). In other implementations, a suitable combination of automatic actions (e.g., implemented by a computing device) and manual actions (e.g., provided by human operators of an optical system) may align and/or adjust components to mitigate drift and maintain a CV below an acceptable threshold.

"Drift" as utilized herein may refer to a number of different types of slow (e.g., on time scales greater than twenty seconds, greater than thirty seconds, etc.) changes in the components of optical systems and/or in the components of device in which optical systems are implemented. Drift may influence saturation of analytes, directions from which analytes are irradiated, and measured properties (e.g., fluorescence) of analytes. By way of example and without limitation, drift in optical systems or in devices in which optical systems are integrated (e.g., flow cytometers) may include: (i) spatial drifts, such as changes in an angle at which light from a source of radiation is emitted, changes in angles from which multiple beams irradiate analytes and/or positions at which multiple beams irradiate analytes, or changes in the position of analytes within an analysis area (e.g., changes in the position of a core steam within a sheath); or (ii) non-spatial drifts, such as changes in power or polarization of light emitted by a source of radiation, changes in power or polarization of one or more beams of light irradiating analytes, or relative changes in power or polarization between multiple beams irradiating analytes.

To mitigate spatial and non-spatial drifts, adjustments and alignments of optical systems, as discussed below may include one or both of: (i) spatial (e.g., directional or positional) adjustments to components influencing the directions of propagation of light from a source of radiation and the multiple beams into which the light is split; and (ii) non-spatial adjustments to components influencing properties of light other than direction of propagation, such as intensity, polarization, coherence, etc. As discussed further with reference to FIGS. 5J-5Q, methods to align/adjust optical systems may include only spatial adjustments, only non-spatial adjustment (e.g., balancing of power between beam), or combinations of both spatial and non-spatial adjustments.

Figure 5H:
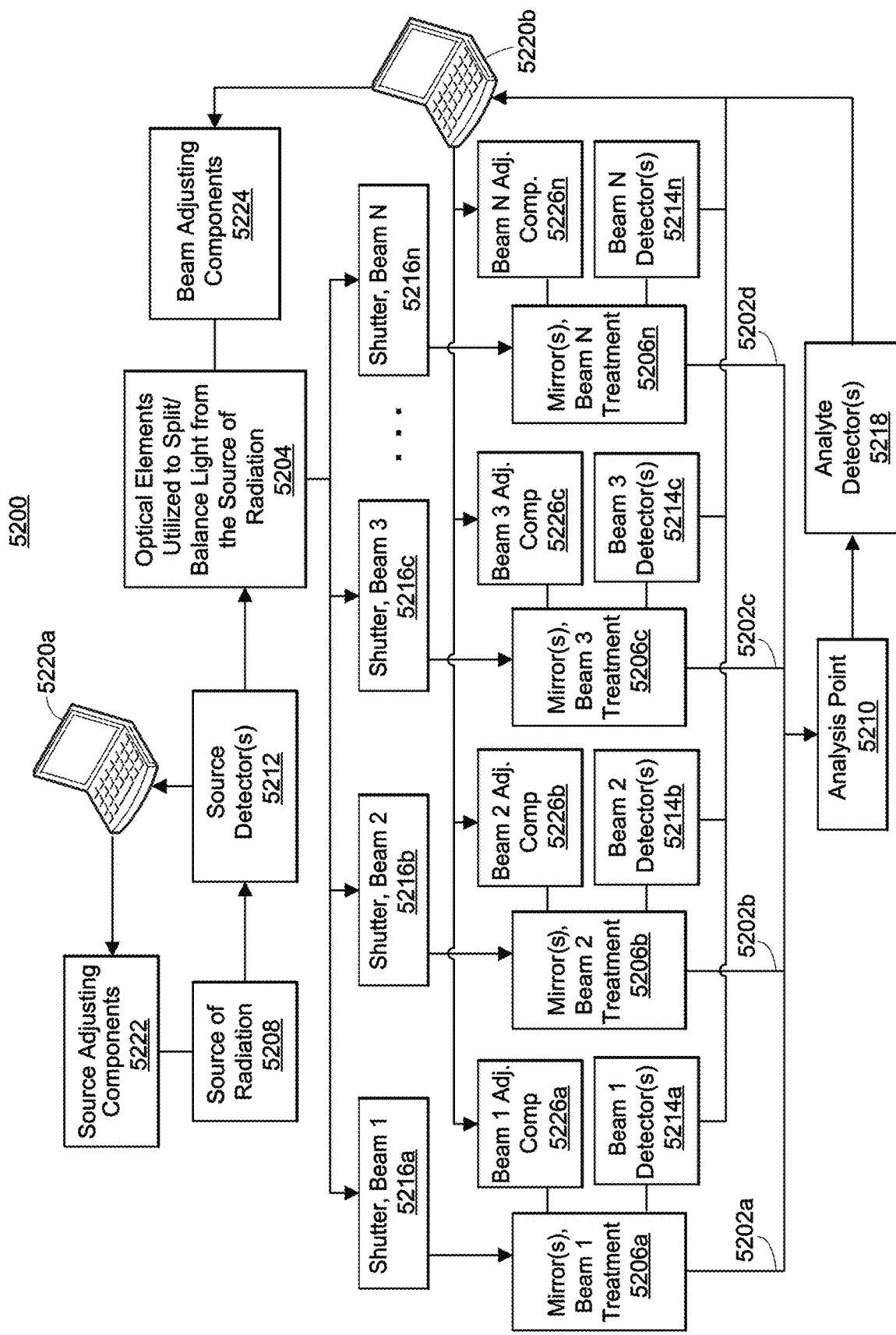
FIG. 5H is a block diagram of another example optical system for at least partially saturating analytes with multiple beams.

FIG. 5H is a block diagram of another optical system 5200 with various adjustable components configured to achieve and/or maintain directionality and balancing of multiple beams 5202a-5202n incident on an analysis area 5210. As with the optical system 5000, the example optical system 5200 includes a source of radiation 5208, optical elements 5204 utilized to split/balance light from the source of radiation 5208, and mirrors or other optical treatment elements 5206a-5206n utilized to treat and/or direct multiple beams 5202a-5202n of light. The multiple beams 5202a-5202n of the example optical system 5200 may irradiate analytes at the analysis point 5210 through which the analytes pass or at which the analytes are disposed. The source of radiation 5208, the optical elements 5204 and 5206a-5206n, the analysis point 5210, and the analyte detector(s) 5218 may be similar to the source of radiation 5002, the optical elements 5004 and 5006a-5006n, the analysis point 5010, and the detector(s) 5014 illustrated in FIGS. 5E and 5F.

The example optical system 5200 also includes one or more source detector(s) 5212 configured to detect properties (power, polarization, directions of propagation, etc.) of light emitted by the source of radiation 5208, a plurality of beam detector(s) 5214a-5214n configured to detect properties (power, polarization, angle, etc.) of each of the beams 5202a-5202n, one or more analyte detector(s) configured to detect properties of irradiated analytes (e.g., fluorescence), and a plurality of shutters 5216a-5216n, each of the shutters 5216a-5216n being configured to selectively block or obstruct one of the beams 5202a-5202n. In some implementations, the optical system 100 may utilize one or more acousto-optic modulators, Pockels cells, beam dumps, etc.

instead of or in addition to the shutters 5216a-5216n (i.e., instead of or in addition to the actual optical shutters as illustrated in FIG. 5I). One or more computing devices 5220a and 5220b may receive signals, such as electronic signals, current signals, or digital signals, from the source detector(s) 5212 and/or the beam detector(s) 5214a-5214n and the analyte detector(s) 5218, respectively. The computing devices 5220a and 5220b may analyze the signals from the detectors 5212, 5214a-5214n, and 5218 to determine adjustments for the source of radiation 5208 and/or the beams 5202a-5202n to achieve and/or maintain directionality and balancing of multiple beams 5202a-5202n incident on an analysis area 5210. Further details of this determination and example computing devices that may be implemented as the computing devices 5220a and 5220d are discussed below and with reference to FIGS. 5J-5Q and 5W.

To adjust and/or align the source of radiation 5208, the computing device 5220a may control one or more source adjusting components 5222 based on signals received from the source detector(s) 5212. Similarly, the computing device 5220b may control one or more beam adjusting components 5224 and 5226a-5226n based on signals received from the beam detector(s) 5214a-5214n and/or signals received from the analyte detector(s) 5218. Although such automatic control of adjusting components is utilized by way of example throughout this description, some or even all of the adjustments and/or alignments of the optical system 5200 may be manually completed by human operators of the optical system 5200. For example, instead of or in addition to automatic manipulations of components via motors, piezo-electric devices, etc., operators of the optical system 5200 may manually adjust (e.g., move) mounts, mirrors, half-wave plates, lenses, etc. of the optical system 5200 to adjust and/or align the optical system 5200.

FIG. 5I is a schematic illustrating an example arrangement 5250 of components in an implementation of the optical system 5200. For ease of discussion and clarity, certain of the blocks of FIG. 5H, such as computing devices and corresponding communicative or electronic connections, are not illustrated in FIG. 5I. However, arrangements of optical and other components to form optical systems may include all of the components described with reference to FIG. 5H, or at least a substantially similar set of components. Also, the example arrangement 5250 depicts an implementation in which light from the source of radiation 5202 is split into four beams 5202a, 5202b, 5202c, and 5202d. However, other implementations may split light from sources of radiation into other numbers of beams (three, five, six, seven, etc.), as discussed further with reference to FIGS. 5C and 5D.

The computing devices 5220a and 5220b may be laptop, desktop, tablet, or other computers, in some implementations. In such implementations, the computing devices 5220a and 5220b may include one or more data acquisition (DAQ) components, such as a DAQ cards, configured to receive analog or digital signals from the source detector(s), the beam detector(s) 5214a-5214n, and/or the analyte detector(s) 5218. The computing devices 5220a and 5220b may process these analog or digital signals, which signals may indicate measured values (e.g., position or intensity values), via one or more computer processors (e.g., CPUs) to determine adjustments for the source of radiation 5208 and/or the beams 5202a-5202n, as further discussed with reference to FIGS. 5J-5Q.

In other implementations, one or both of the computing devices 5220a and 5220b may be computing devices other than laptop, desktop, tablet, or other computers. For example, one or both of the computing devices 5220a and 5220b may be servomechanisms, or servos, configured to receive analog or digital signals from the source detector(s), the beam detector(s) 5214a-5214n, and/or the analyte detector(s) 5218. In response to these signals, rotary encoders or potentiometers within the servos may cause the servos to adjust/align the source of radiation 5208 and/or the beams 5202a-5202n, as discussed further with reference to FIGS. 5J-5Q. In other examples, the computing devices 5220a and 5220b may include single-board computers, embedded processors, digital signal processors (DSPs), field-programmable gate arrays (FPGAs), specialized controllers configured to align/adjust optical components, or any other suitable devices configured to receive electronic signals from detectors and control adjusting components in response to the received electronic signals.

Although illustrated as two separate computing devices 5220a and 5220b in FIGS. 5H and 5I, some implementations of optical systems may include a single computing device to process signals from all or most detectors and to control adjusting components to adjust/align both a source of radiation and multiple beams. In fact, optical systems may include any number (one, two, three, four, etc.) of computing devices (computers, servos, etc.) coupled in a suitable manner to a plurality of detectors and adjusting components. For example, optical systems may include a detector and corresponding computer device to control every adjustable component in the optical system. However, in other examples, optical systems may include a single computing device receiving signals from multiple detectors and controlling multiple adjusting components.

Each of the source adjusting components 5222 and the beam adjusting components 5224 and 5226a-5226n may include various numbers and types of adjustable mounts, motors, actuators, piezo-electric devices, etc. electronically and/or communicatively coupled to the computing device 5220a or 5220b, respectively, via one or more electrical leads or cables, wireless network interfaces, or other suitable wired or wireless connections. The computing devices 5220a and 5220b may communicate electronic signals (e.g., current or voltage signals) to the source adjusting components 5222 or the beam adjusting components 5224 and 5226a-5226n, respectively, to activate or cause the adjustable mounts, motors, actuators, piezo-electric devices, etc. to operate. When the source adjusting components 5222 and the beam adjusting components 5224 and 5226a-5226n operate, the source adjusting components 5222 and the beam adjusting components 5224 and 5226a-5226n cause the source of radiation 5208 and the beams 5202a-5202n, respectively, to be aligned/adjusted.

In some implementations, the beam adjusting components 5224 and 5226a-5226n may include a set of adjusting components 5224 mechanically and/or optically coupled to the optical elements 5204 utilized to split/balance light from the source of radiation 5208 and other sets of adjusting components 5226a-5226n mechanically and/or optically coupled to the optical treatment elements 5206a-5206n utilized to treat and/or direct multiple beams 5202a-5202n. In this manner, the optical system 5200 may provide spatial and/or non-spatial adjustability of components influencing the splitting of light into the multiple beams 5202a-5202n and of components influencing the directionality and/or non-spatial properties of only one of the beams 5202a-5202n.

Specifically, to perform spatial adjustments for the source of radiation 5208, the computing device 5220a may operate one or more motors, actuators, piezo-electric devices, etc. of the source adjusting components 5222 to move one or more mirrors directing light emitted by the source of radiation 5208, in an implementation. For example, the computing device 5220*a* may cause a motor or actuator to rotate and/or translate a mirror, off which mirror light emitted by the source of radiation 5208 reflects, by a certain amount (e.g., a certain number of degrees). This rotation and/or translation of the mirror may align the light emitted by the source of radiation 5208 with a reference position or angle (e.g., programmed into the computing device 5220*a* or determined by the computing device 5220*a*). The computing device 5220*a* may control the source adjusting components 5222 to make any number of such adjustments to align the light emitted from the source of radiation 5208 along more than one axis, in some implementations. For example, the computing device 5220*a* may cause motors or actuators to rotate a mirror about two or more axes to align light emitted from the source of radiation 5208 in three dimensional space.

The computing device 5220*a* may determine how the light emitted from the source of radiation 5208 should be aligned (e.g., by how many degrees one or more mirrors should be rotated about one or more axes) based on the signals received at the computing device 5220*a* from the source detector(s) 5212. In an implementation, the source detector(s) 5212 may include one or more photodiodes, photomultiplier tubes, charge-coupled devices (CCDs), or other suitable detectors disposed behind mirrors, which mirrors are to be adjusted by the source adjusting components 5222. These types of source detector(s) 5212 may generate signals indicative of the position of light emitted by the source of radiation 5208 as the light reflect off the mirrors, because the mirrors may allow a small portion (e.g., 1%) of light to pass through the mirrors. However, in other implementations, the source detector(s) 5212 may include one or more beam splitters or other suitable optical components configured to "pick off" a portion of light from the light emitted by the source of radiation 5208 before the light emitted by the source of radiation 5208 reflect off of mirrors to be adjusted by the source adjusting components 5222. In either of these implementations, the computing device 5220*a* may store one or more reference values for signals from the detectors, where the reference values indicate an aligned position of light emitted by the source of radiation 5208. Upon receiving signals from the source detector(s) different from the reference values, the computing device 5220*a* may cause the source adjusting components 5222 to align, or realign, the light emitted by the source of radiation 5208 to the reference values (e.g., by rotating mirrors, as discussed above).

In some cases, the computing device 5220*a* may only correct, or re-align, light emitted from the source of radiation 5208 for amounts of spatial drift above a threshold. For example, the computing device 5220*a* may be configured to cause an automatic alignment of light emitted from the source of radiation 5208 (e.g., a rotation of one or more mirrors) when an actual position of the light emitted from the source of radiation 5208 deviates from a reference value or position by a certain percentage (e.g., 1% or 5%). In these and other examples, the computing device 5220*a* may also align, or re-align, the light emitted from the source of radiation 5208 at certain pre-determined, or otherwise determined, times and/or when prompted by an operator of the optical system 5200 (e.g., by interacting with the computing device 5220*a*).

Figure 5J:
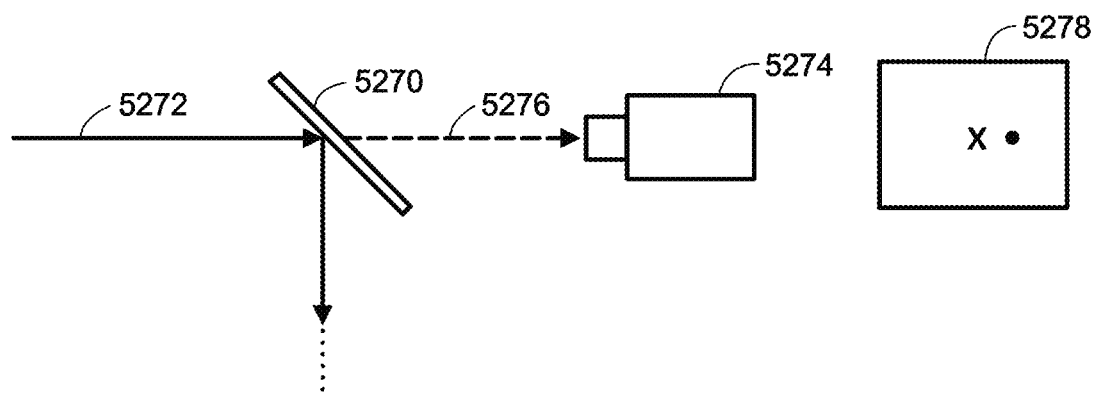
Figure 5K:
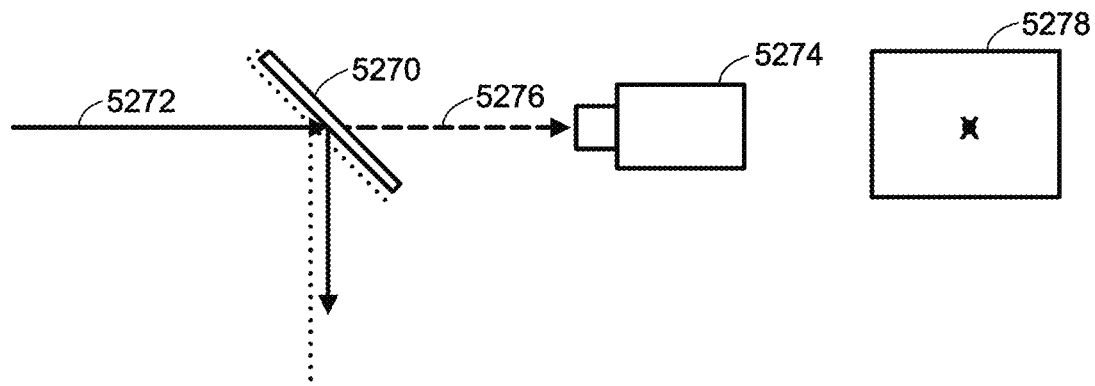

FIGS. 5J, 5K, 5L and 5M illustrate example spatial adjustments using one or more motors or actuators to rotate and/or translate mirrors. Specifically, FIG. 5J illustrates a misaligned mirror 5270 off which radiation 5272 from a source of radiation, such as the source of radiation 5208, reflects. Behind the mirror 5270, a detector 5274 detects portions 5276 of the radiation 5272 that pass through the mirror 5270. The detector 5274 may communicate a position of the radiation 5272 on the mirror 5270 to a computing device, such as the computing device 5220*a*, and the computing device 5220*a* may determine a deviation of the position from a reference value. This deviation is illustrated in FIG. 5J by an area 5278 of the mirror 5270 including the reference position ("X") along with a dot representing the detected position of the radiation 5272. In this example, the computing device 5220*a* may control one or more actuators (e.g., motors or piezo-electric devices) to translate the mirror 5270, such that the mirror 5270 is aligned and such that the reference position matches the detected position, as illustrated in FIG. 5K.

In another example illustrated in FIG. 5L, a first mirror 5280 is misaligned such that radiation 5282 does not reflect off of a second mirror 5284 at a reference position "X," as depicted on an illustrated area 5286 of the second mirror 5284. In this example, instead of receiving detected position values from a detector behind the misaligned first mirror 5280, the computing device 5220*a* may receive detected position values from a detector 5288 behind the second mirror 5284. Based on these received signals, the computing device 5220*a* may control one or more actuators (e.g., motors or piezo-electric devices) to rotate the first mirror 5280 and, hence, correct the deviation at the second mirror 5284, as illustrated in FIG. 5M.

To perform non-spatial adjustments to the source of radiation 5208, the computing device 5220*a* may operate one or more motors, actuators, piezo-electric devices, etc. of the source adjusting components 5222 to move or otherwise alter one or more optical elements in the path of light emitted by the source of radiation 5208, in an implementation. These optical elements may include, by way of example, polarizing plates, optical attenuators, diffusers, lenses, or other optical elements configured to manipulate non-spatial properties of light emitted from the source of radiation 5208. Non-spatial properties may include any suitable number and combination of properties of the light emitted from the source of radiation 5208, such as phase, power, polarization, coherence, collimation, timing (e.g., timings or delays of pulses incident on the analysis point 5210), etc. The computing device 5220*a* may cause a motor or actuator to rotate, translate, or otherwise modify such optical elements so as to adjust a non-spatial property (e.g., power or polarization) of light emitted by the source of radiation 5208 to a reference value. For example, the computing device 5220*a* may cause motors or actuators to rotate or translate a half-wave plate to adjust a polarization direction of light emitted by the source of radiation 5208, or the computing device 5220*a* may cause a motor to adjust a neutral density filter of an optical attenuator so as to adjust the power or intensity of light emitted by the source of radiation 5208. In another example, the computing device 5220*a* may control (e.g., via one or more actuators and/or one or more electrical signals) one or more mirrors, attenuators, modulators, etc. to adjust a timing of pulses in each of the beams 5202*a*-5202*n* (e.g., originally emitted by a quasi-continuous laser implemented as the source of radiation 5208) such that the pulses in each of the beams 5202*a*-5202*n* are incident on the analysis point 5210 at the same time.

Similar to spatial adjustments, the computing device 5220*a* may determine how light emitted from the source of radiation 5208 should be non-spatially adjusted (e.g., by how many degrees polarization plates should be rotated) based on the signals received at the computing device 5220a from the source detector(s) 5212. For example, the computing device 5220a may store one or more reference values for signals from the source detector(s) 5212 (e.g., indicative of power or polarization). Upon receiving signals from the source detector(s) different from the reference values, the computing device 5220a may cause the source adjusting components 5222 to manipulate the light emitted by the source of radiation 5208 to be consistent (e.g., within a tolerance of) the reference values (e.g., by rotating polarizing plates, by adjusting neutral density filters, etc.). The computing device 5220a may perform these adjustments to non-spatial properties of light emitted by the source of radiation 5208 upon detecting deviations from reference values above a threshold (e.g., 1%), at pre-determined or otherwise determined times, or in response to an operator directly interacting with the computing device 5220a, in addition to or instead of modifying an existing optical element, some adjustments may include an operator or a computing device 5220a cause one optical element to be swapped with another optical element or certain optical elements to be selectively placed in the path of radiation from the source of radiation 5208. For example, an operator may utilize a half-silvered mirror to split a certain beam into two equal (e.g., in power) beams, or an operator may utilize one or more diode lasers with equal power or pre-determined powers to generate beams delivering certain amounts of energy.

Figure 5N:
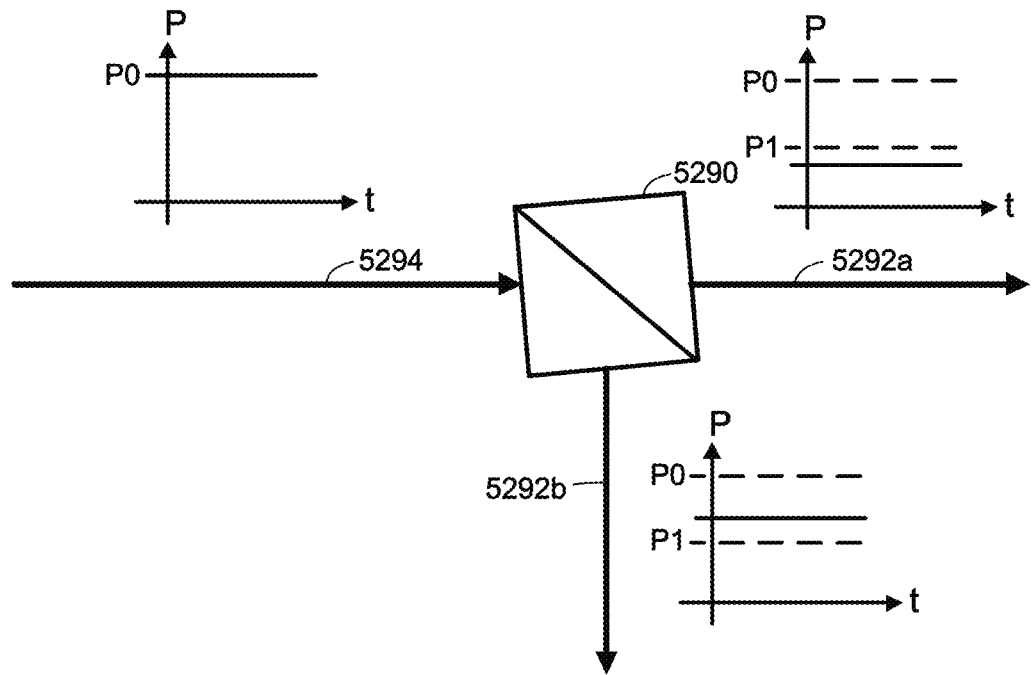
FIGS. 5N and 5O illustrate an example non-spatial adjustment which may be implemented in the optical system of FIGS. 5H and 5I.
Figure 5O:
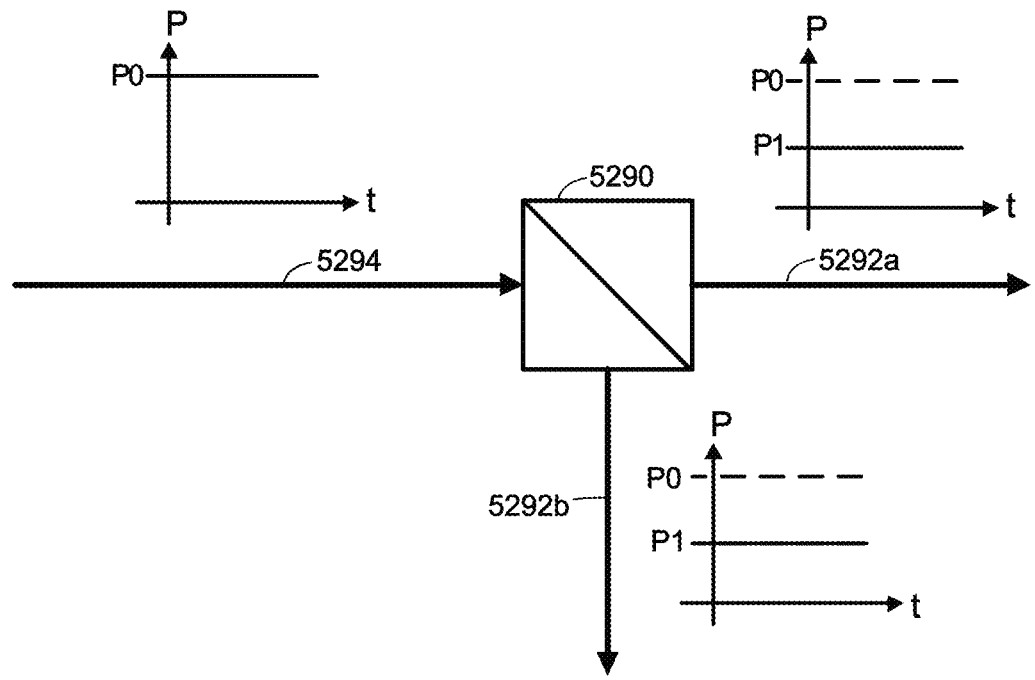

FIGS. 5N and 5O illustrate an example adjustment of a polarizing beam splitter 5290 to adjust a power in each of two beams 5292a and 5292b of radiation split from a source beam 5294 of radiation. As illustrated in FIG. 5N, the polarizing beam splitter 5290 may be misaligned such that a power of each of the beams 5292a and 5292b is not balanced (e.g., the power in each of the beams 5292a and 5292b is different). In the example, the source beam 5294 has a power of "P0" and, if balanced, each of the beams 5292a and 5292b should have a power of "P1." To balance the beams, a computing device, such as the computing device 5220b, may, based on received signals from one or more detectors (e.g., indicating fluorescence of analytes), cause one or more actuators to rotate the polarizing beam splitter 5290 to ensure that the power of each of the beams 5292a and 5292b is within a tolerance of "P1," as illustrated in FIG. 5O. In cases in which multiple sources of radiation are utilized to form the beams 5202a-5202n, a computing device may control an adjustment of more than one polarizing beam splitter in a manner similar to that discussed above, or a computing device may control other optical elements to attenuate, decohere, change the polarization of, etc. each of the 5202a-5202n individually.

Turning now to the multiple beams 5202a-5202n illustrated in FIGS. 5H and 5I, the computing device 5220b may spatially align/adjust each of the multiple beams 5202a-5202n in a substantially similar manner to that discussed above for spatial adjustments of light emitted from the source of radiation 5208. That is, for the beam 5202a, the computing device 5220b may cause an operation of the set of the beam adjusting components 5226a, such as a rotation or translation or one or more mirrors, such that a direction of propagation of the beam 5202a is modified. Likewise, the computing device 5220b may control the set of the beam adjusting components 5226b to adjust the beam 5202b, the computing device 5220b may control the set of the beam adjusting components 5226c to adjust the beam 5202c, etc.

In some scenarios, the computing device 5220b may control these spatial adjustments based on received signals from the beam detector(s) 5214a-5214n. For example, the computing device 5220b may determine deviations from reference values based on signals from the beam detector(s) 5214a-5214n, which beam detector(s) 5214a-5214n may include photodiodes, photomultiplier tubes, etc. disposed behind mirrors directing the beams 5202a-5202n. In response to these deviations growing above one or more threshold values (e.g., for each of the beams 5202a-5202n), the computing device 5220b may cause the adjusting components 5226a-5226n to adjust the position or angle or one or more of the beams 5202a-5202n.

In other scenarios, the computing device 5220b may control spatial adjustments of each of the beams 5202a-5202n based at least partially on received signals from the analyte detector(s) 5218. As discussed with reference to FIG. 5Q, the computing device 5220b may control each set of the beam adjustment components 5226a-5226n to maximize, minimize, or otherwise optimize the signal from the analyte detector(s) 5218 with respect to the direction of propagation of the corresponding beam 5202a-5202n.

To perform non-spatial adjustments to one or more of the beams 5202a-5202n and, in particular, to balance the beams 5202a-5202n (e.g., in power or another non-spatial property of the beams 5202a-5202n), the computing device 5220b may control the beam adjusting components 5224 to adjust the optical elements 5204 utilized to split/balance light from the source of radiation 5208. The computing device 5220b may determine specific adjustments for the optical elements 5204 (e.g., by how much half-wave plates or polarizing beam splitters should be rotated or translated by the beam adjusting components 5224) based on signals received from the beam detector(s) 5214a-5214n, based on signals received from the analyte detectors(s) 5218, or based on both the signals received from the beam detector(s) 5214a-5214n and the signals received from the analyte detectors(s) 5218.

In some implementations, the computing device 5220b may cause the shutters 5216a-5216n to operate such that the computing device 5220b may receive signals from one or both of the beam detector(s) 5214a-5214n and the analyte detectors(s) 5218 while only one of the beams 5202a-5202n is irradiating analytes at the analysis point 5210. The computing device may utilize received signals from the detector(s) 5214a-5214n and 5218 while only one of the beams 5202a-5202n is irradiating analytes and/or received signals while all the beams 5202a-5202n are irradiating analytes to determine adjustments for the optical elements 5204, as further discussed with reference to FIGS. 5P and 5Q. Generally, however, the computing device 5220b may selectively irradiate the analysis point 5210 with any number of the beams 5202a-5202n (e.g., by opening and closing certain of the shutters 5216a-5216n) and retrieve corresponding signals from the detector(s) 5214a-5214n and/or 5218 when determining adjustments for the optical elements 5204.

Although certain arrangements of adjusting components and corresponding adjustments to certain optical elements or components (waveplates, mirrors, etc.) are discussed herein by way of example, implementations of optical systems may include different levels of adjustability. In particular, some optical systems may be pre-configured to saturate analytes with multiple beams and may not need frequent or automatic adjustments. In such cases, the optical system may utilize only some or none of the adjusting components discussed above. However, in other cases, devices in which optical systems are integrated may be extremely sensitive to small spatial and/or non-spatial drifts. For example, sorting flow cytometers configured to sort sperm cells according to detected sex chromosomes may be extremely sensitive to small amounts of spatial and/or non-spatial drift in an integrated optical system. In these cases, optical systems may include all or many of the adjusting components, and corresponding functionality, discussed above. In fact, some optical systems may include adjusting components configured to adjust and/or align even more numerous optical components than discussed in most examples herein. For example, optical systems may include an adjusting component for every optical component (mirror, lens, polarizing plate, etc.) in an optical system and corresponding computing device(s) to control adjustments for all optical components in an optical system.

Methods for Aligning/Adjusting Optical Systems

Figure 5P:
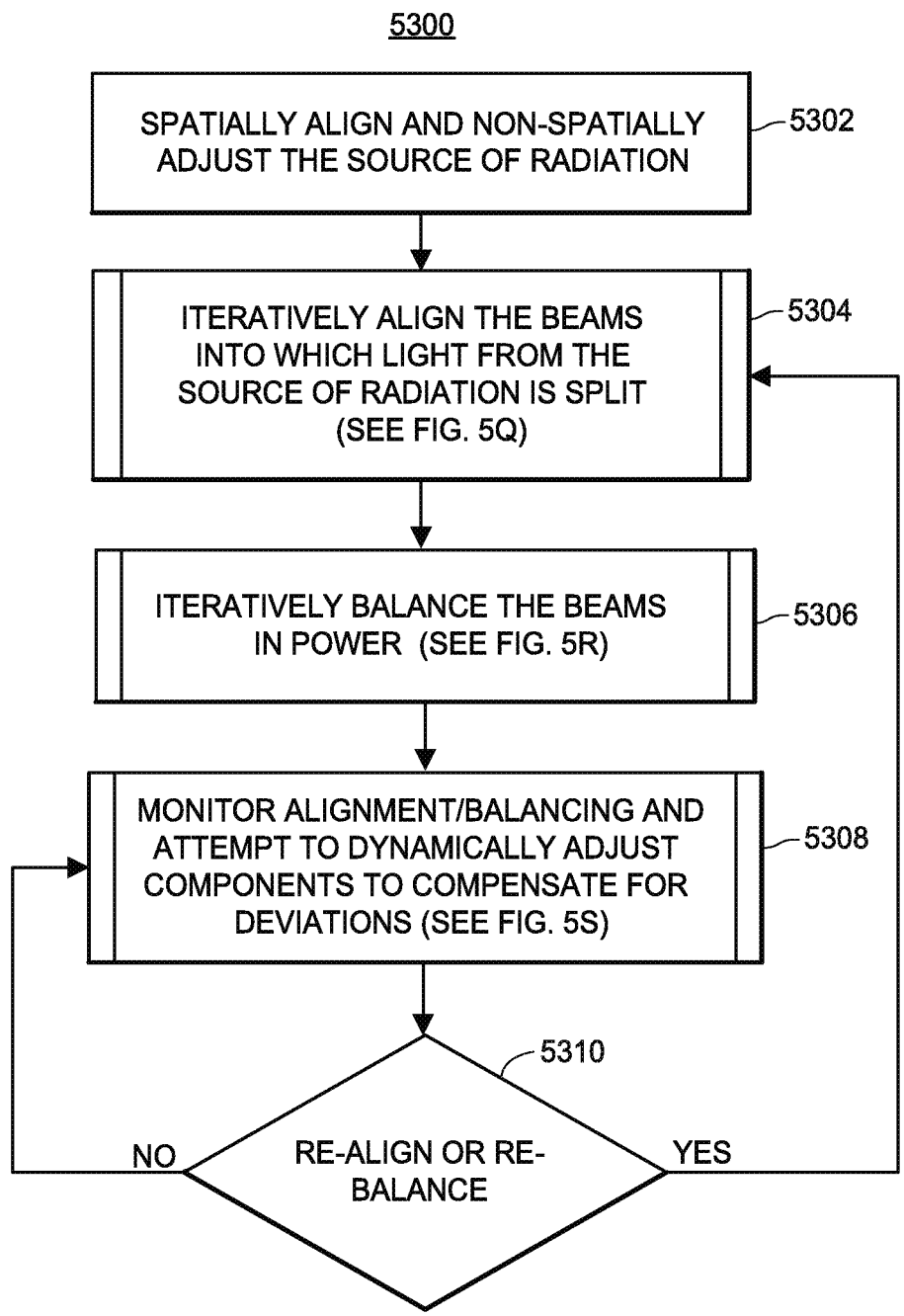
FIG. 5P is a flow diagram of an example method for aligning and/or adjusting the optical system illustrated in FIGS. 5H and 5I.

FIG. 5P is a flow diagram of an example method 5300 for achieving and maintaining an alignment and balancing of an optical system. The method 5300 may be implemented in the example optical system 5200, for example. Specifically, the computing devices 5220a and/or 5220b may implement at least some of the functionality described with reference to method 5300. For ease of discussion, the components of the example optical system 5200 are referenced in the description of the method 5300, but, generally, the method 5300 may be utilized to align/adjust any suitable optical system irradiating analytes with multiple beams.

In the method 5300, the computing device 5220a may spatially align and/or non-spatially adjust the source of radiation 5208 (block 5302). As further discussed with reference to FIGS. 5H and 5I, the computing device 5220a may receive signals indicative of a position (e.g., in Cartesian coordinates) or an angle (e.g., in degrees) of light emitted from the source of radiation 5208 from the detector(s) 5212. Subsequently, the computing device 5220a may determine, based on the received signals: (i) deviations of the source of radiation 5208 from reference values of position/angle and/or intensity, polarization, or other non-spatial properties; and (ii) corresponding adjustments for the source of radiation 5208, such as modifications of a direction of propagation of the light emitted by source of radiation 5208, modifications of an intensity or polarization of the light emitted by source of radiation 5208, etc. To complete such adjustments, the computing device 5220a may control the source adjusting components 5222.

In an example scenario, the computing device 5220a may utilize coordinate values (0,0) to represent a reference position on a mirror, where the reference position (0,0) indicates a point at which light emitted from the source of radiation 5208 should reflect off the mirror when properly aligned. The computing device 5220a may store such a value in a memory of the computing device 5220a. In the scenario, the computing device 5220a may receive, from the detector(s) 5212, a signal indicative of a measured position (0.1, 2.3) of the light emitted by the source of radiation 5208 at the mirror (e.g., as measured in microns, millimeters, etc.). The measured position (0.1, 2.3) represents a deviation from the reference value or a misalignment of the source of radiation 5208. The computing device 5220a may, based on this deviation (0.1, 2.3), control one or more of the source adjusting components 5222 to correct to position of the light from (0.1, 2.3) to at or within a certain tolerance of the reference position (0, 0). For example, the computing device 5220a may control one or more motors, actuators, etc. to rotate and or translate the mirror, or the computing device 5220a may control one or more motors, actuators, etc. to rotate or translate mechanical mounts physically coupled to the source of radiation 5208.

In another example scenario, the computing device 5220a may utilize a value of zero degrees, or 0 to represent a reference angle of a linear polarization, where the reference angle indicates an angle at which light emitted from the source of radiation 5208 should be polarized when the source of radiation 5208 is properly adjusted. In the scenario, the computing device 5220a may receive, from the detector(s) 5212, a signal indicative of a measured angle of three degrees indicating the polarization angle of the light emitted by the source of radiation 5208. Thus, the measured angle of three degrees represents a deviation from the reference value. The computing device 5220a may, based on this deviation of three degrees, control one or more of the source adjusting components 5222 to correct the polarization direction of the light from three degrees to at or within a certain tolerance of the reference angle of zero degrees. For example, the computing device 5220a may control one or more motors, actuators, etc. to rotate and or translate a half-wave plate through which light emitted by the source of radiation 5208 passes.

Returning to the method 5300, the computing device 5220b may spatially align the multiple beams 5202a-5202n into which light emitted from the source of radiation 5208 is split (block 5304). In some implementations, this alignment of the beams 5202a-5202n may be an iterative process, as further described with reference to FIG. 5Q. In any event, the computing device 5220b may control the beam adjusting components 5226a-5226n to align the beams 5202a-5202n onto the analysis area 5210. Specifically, the computing device 5220b may control the beam adjusting components 5226a-5226n to align the beams 5202a-5202n (e.g., by rotating and/or translating mirrors) such that each of the beams 5202a-5202n is incident on a particular point of the analysis area 5210 within a tolerance (e.g., ten microns). For example, when the optical system 5200 is utilized within a sorting flow cytometer, the adjusting components 5226a-5226n may align the beams 5202a-5202n such that each of the beams irradiates a flow cell of the flow cytometer (e.g., through which a stream of cells passes).

The computing device 5220b may also adjust non-spatial properties of the beams 5202a-5202n to balance the beams 5202a-5202n according to a non-spatial property (block 5306), such as power or intensity. In some implementations, this balancing of the beams 5202a-5202n may be an iterative process, as further described with reference to FIG. 5R. The computing device 5220b may control the beam adjusting components 5224 to balance the beams 5202a-5202n. For example, the computing device 5220b may cause the beam adjusting components 5224, some of which may be physically coupled to the optical elements 5204, to rotate, translate, or otherwise manipulate one or more of the optical elements 5204. The beam adjusting components 5224 may rotate a polarizing beam splitter or a half-wave plate included in the optical elements 5204 to adjust the splitting of light into the beams 5202a-5202n (as further discussed with reference to FIG. 5G). By adjusting the splitting of the light, the beam adjusting components 5224 may balance amounts of energy in each of the beams 5202a-5202n, in some implementations.

Also, in the method 5300, the computing device 5220a and/or the computing device 5220b may monitor alignment and balancing of the source of radiation 5208 and the beams 5202a-5202n and may automatically adjust for deviations of the source of radiation 5208 and the beams 5202a-5202n

(block 5308). Further details of an example monitoring and adjustment process are discussed with reference to FIG. 5S. Such monitoring and adjustment may occur during operation of a device in which the optical system 5200 is integrated. In an implementation in which the optical system 5200 is integrated into a sorting flow cytometer, the computing devices 5220a and 5220b and adjusting components 5222, 5224, and 5226a-5226n may execute the functionality of blocks 5302, 5304, and 5306 when the sorting flow cytometer is not operating to sort cells (e.g., sperm cells), and the computing devices 5220a and 5220b and adjusting components 5222, 5224, and 5226a-5226n may execute the functionality of block 5308 while the sorting flow cytometer is operating to sort cells.

In some scenarios, deviations of the beams 5202a-5202n and/or of the source of radiation 5208 may be outside of a range of deviations that can be automatically corrected during operation of a device in which the optical system 5200 is integrated. Further, deviations of analytes, such as spatial deviations of a stream of analytes traveling through a flow cell, may necessitate significant adjustments or alignments that are not practical or feasible during operation of a device in which the optical system 5200 is integrated. As such, in the method 5300, the computing device 5220a and/or 5220b or another suitable computing device may determine if a re-alignment and/or re-balancing of the beams 5202a-5202n and/or the source of radiation 5208 according to blocks 5304 and/or 5306 of the method 5300 is necessary (block 5310). For example, a computing device, such as the computing device 5220b, may determine that, despite the automatic adjustments of block 5308, deviations in positions of the beams 5202a-5202n, balancing of the beams 5202a-5202n, or even in measured values of analytes are steadily increasing. In another example, a computing device, such as the computing device 5220b, may determine that deviations in positions of the beams 5202a-5202n, balancing of the beams 5202a-5202n, or in measured values of analytes are greater than one or more pre-determined threshold values. In these or other examples in which it is determined that a re-alignment or re-balancing is necessary, the flow of method 5300 may revert to one of blocks 5302, 5304, or 5306, such as block 5304 as illustrated in FIG. 5P. Otherwise, the flow may revert to block 5308 where the computing devices 5220a and 5220b continue to monitor and adjust the optical system 5200.

Figure 5Q:
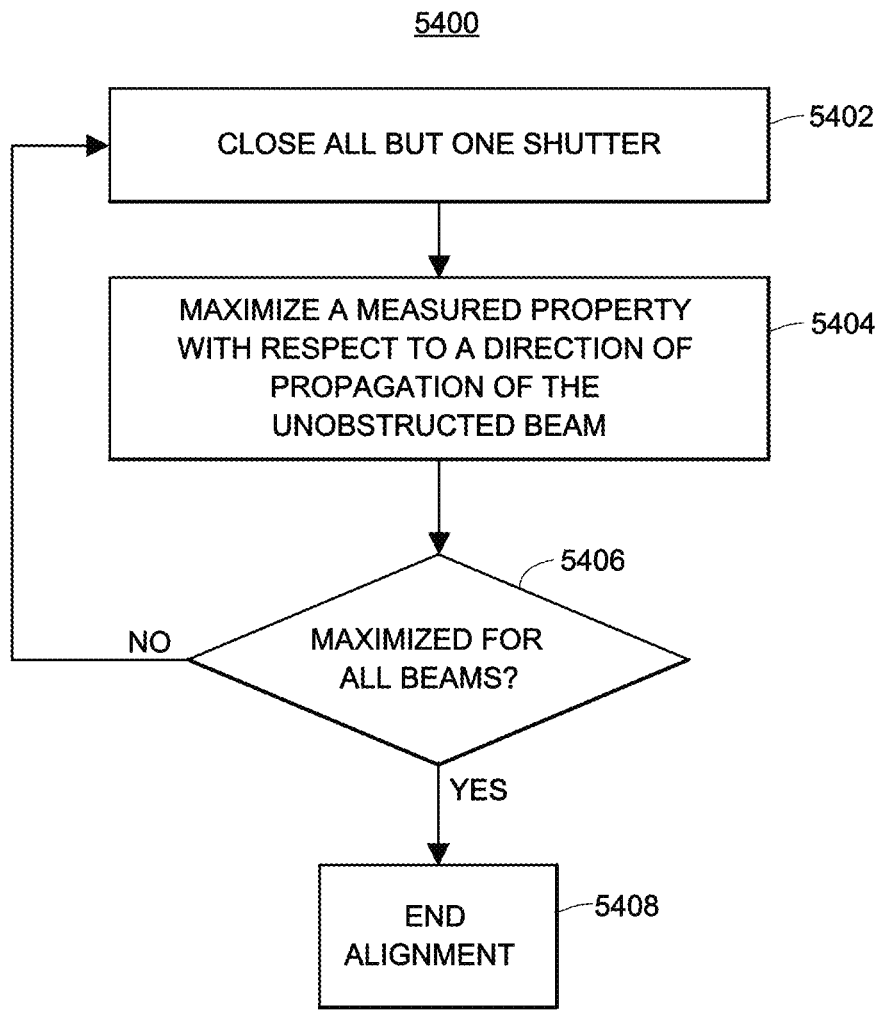
FIG. 5Q is a flow diagram of an example method for iteratively aligning multiple beams which may be implemented in the optical system illustrated in FIGS. 5H and 5I.

FIG. 5Q illustrates an example method 5400 for iteratively aligning multiple beams of an optical system. The method 5400 may be implemented in the example optical system 5200, for example. Specifically, the computing devices 5220a and/or 5220b may implement at least some of the functionality described with reference to method 5400. For ease of discussion, the components of the example optical system 5200 are referenced in the description of the method 5400, but, generally, the method 5400 may be utilized to align multiple beams of any suitable optical system.

In the method 5400, the computing device 5220b may control the shutters 5216a-5216n such that all but one of the shutters 5216a-5216n are closed (block 5402). In this manner, the computing device 5220b may obstruct all but one of the beams 5202a-5202n. For example, the computing device 5220b may cause, via one or more electrical signals, the shutters 5216b-5216n to close, allowing only beam 5202a to irradiate the analysis area 5210.

While all but one of the shutters 5216a-5216n are closed, the computing device 5220b, or other suitable computing device, may maximize a measured property of analytes with respect to the direction of propagation of the unobstructed one of the beams 5202a-5202n (block 5404). The measured property may depend on the application (e.g., within flow cytometry) and may include an absorbance, light scattering, luminescence, fluorescence, phosphorescence, etc. of analytes. In an application in which the optical system is integrated into a sorting flow cytometer, the computing device 5220b may maximize fluorescence of labeled cells (e.g., sperm cells) with respect to a direction of propagation of the unobstructed one of the beams 5202a-5202n. In this manner, the unobstructed one of the beams 5202a-5202n may be aligned with a direction of propagation maximizing the measured property.

In some implementations, to maximize the measured property with respect to the direction of propagation, the computing device 5220b may "sweep" the direction of propagation of the unobstructed one of the beams 5202a-5202n over one or more ranges. That is, the computing device 5220b may cause the set of beam adjusting components 5226a-5226n corresponding to the unobstructed one of the beams 5202a-5202n to adjust the direction of propagation of the unobstructed one of the beams 5202a-5202n over ranges of directions (e.g., defined in x, y coordinates and/or degrees) by rotating and/or translating one or more mirrors. For each of these directions of propagations within the ranges of directions, the computing device 5220b may receive a value of the measured property of the analyte (e.g., fluorescence) from the analyte detector(s) 5218. The maximized measure property may be the maximum or peak value among these received values.

Also in the method 5400, the computing device 5220b, or other suitable computing device, may determine if the measured property (e.g., fluorescence of analytes) has been maximized for all of the beams 5202a-5202n (block 5406). In other words, the computing device 5220b may determine if each of the beams 5202a-5202n has been aligned so as to maximize the measured property. If some of the beams 5202a-5202n have not been aligned to maximize the measure property, the flow may revert to block 5402 where all of the shutters 5216a-5216n but a different one of the shutters 5216a-5216n is closed. Blocks 5402, 5404, and 5406 may repeat until all of the beams 5202a-5202n have been aligned independently. Once all the beams 5202a-5202n have been aligned, the method 5400 may end (block 5408).

Figure 5R:
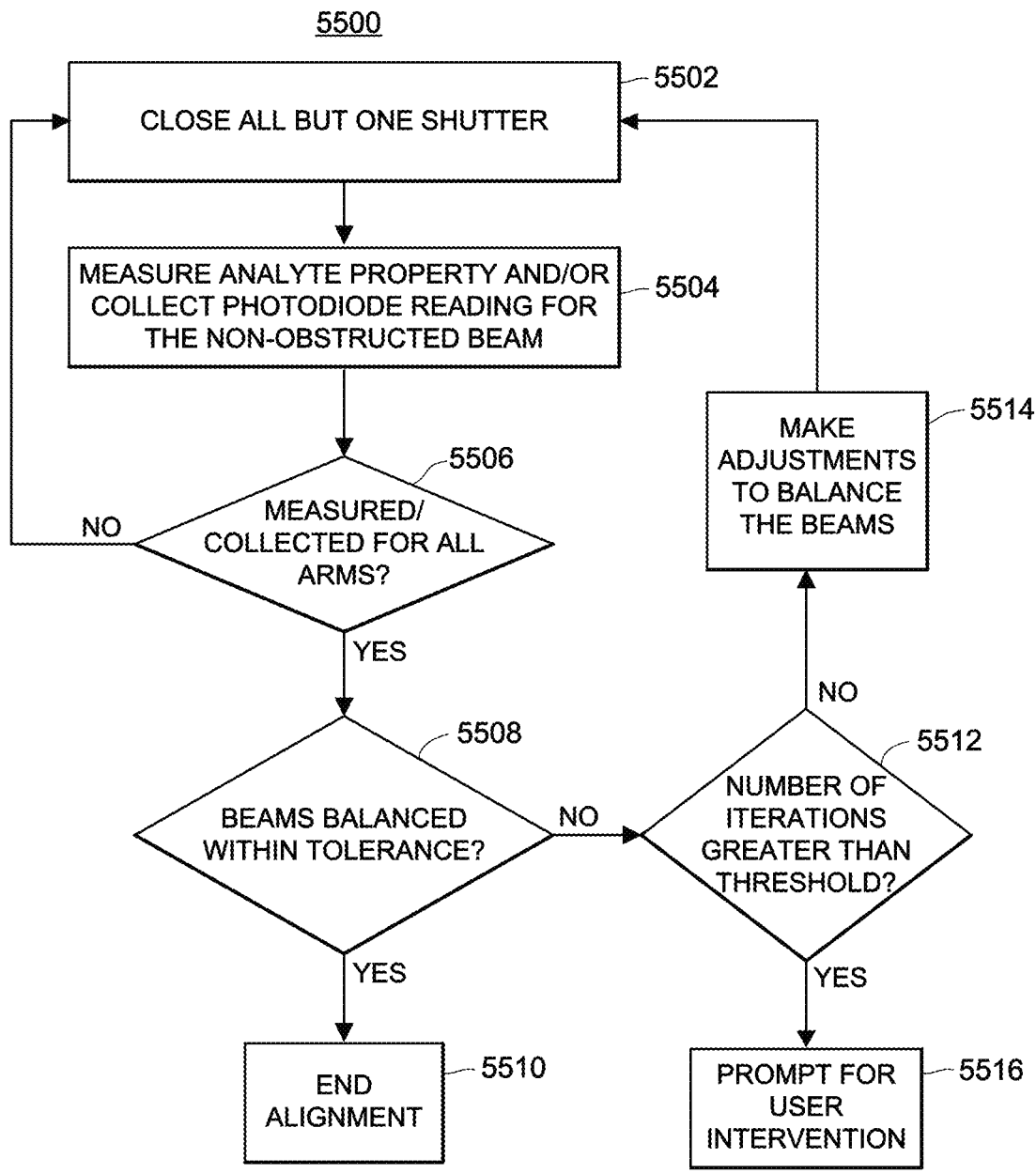
FIG. 5R is a flow diagram of an example method for iteratively balancing multiple beams which may be implemented in the optical system illustrated in FIGS. 5H and 5I.

FIG. 5R illustrates an example method 5500 for balancing a non-spatial property, such as power, of multiple beams of an optical system. The method 5500 may be implemented in the example optical system 5500, for example. Specifically, the computing devices 5220a and/or 5220b may implement at least some of the functionality described with reference to method 5500. For ease of discussion, the components of the example optical system 5200 are referenced in the description of the method 5500, but, generally, the method 5500 may be utilized to balance non-spatial properties of multiple beams of any suitable optical system.

Similar to the method 5400, the computing device 5220b may control the shutters 5216a-5216n such that all but one of the shutters 5216a-5216n are closed in the example method 5500 (block 5502). In this way, the computing device 5220b may obstruct all but one of the beams 5202a-5202n. While all but one of the shutters 5216a-5216n are closed, the computing device 5220b may receive one or more signals from the analyte detector(s) 5218 indicating a measured property (e.g., fluorescence) of analytes irradiated by the unobstructed one of the beams 5202a-5202n (block 5504). The computing device 5220b may also receive one or more signals from the particular set of the beam detector(s) 5214a-5214n corresponding to the unobstructed one of the beams 5202a-5202n, such as a photodiode behind a mirror reflecting the unobstructed one of the beams 5202a-5202n.

The one or more signals from the particular set of the beam detector(s) 5214a-5214n may be indicative of a position of the unobstructed one of the beams 5202a-5202n as it reflects off of a mirror, but the one or more signals may also be indicative of or correlated with the measured property of analytes. At least in some cases, if the energy imparted by the unobstructed one of the beams 5202a-5202n to the analytes increases, the measured property of the analytes, such as fluorescence, will also increase. Also, if the energy imparted by the unobstructed one of the beams 5202a-5202n increases, a signal of a photodiode, or other suitable detector, detecting at least a portion of this energy will increase. Thus, the signals from the particular set of the beam detector(s) 5214a-5214n may be correlated with the measured property of the analytes, as indicated in signals from the analyte detector(s) 5218. This correlation may not be linear, as further discussed with reference to FIGS. 5A and 5B.

Returning to FIG. 5R, the computing device 5220b, or other suitable computing device, may determine if the property of analytes (e.g., fluorescence of analytes) and the signals from the particular set of the beam detector(s) 5214a-5214n have been measured/collected for each of the beams 5202a-5202n (block 5506). That is, the computing device 5220b may determine if the property of analytes and the signals from the particular set of the beam detector(s) 5214a-5214n have been measured/collected while all beams 5202b-5202n but the beam 5202a were obstructed, while all of the beams 5202a and 5202c-5202n but the beam 5202b were obstructed, while all of the beams 5202a, 5202b, and 5202d-5202n but the beam 5202c were obstructed, etc. If the measurements/collections of signals has not been completed for each individual beam 5202a-5202n, the flow of the method 5500 may revert to block 5502. However, if all of the measurements/collections have been made, the flow may continue to block 5508.

At block 5508, the computing device 5220b, or other suitable computing device, may determine if a non-spatial property, such as power, of the beams 5202a-5202n is balanced between the beams 5202a-5202n. For example, if the measured property of the analytes irradiated at the analysis area 5210 is not the same within a tolerance (0.1%, 1%, 10%, etc.) for each individual beam 5202a-5202n, the computing device 5220b may determine that the beams 5202a-5202n are not balanced (e.g., the beams 5202a-5202n require non-spatial adjustments). In another example, if the measured property of the analytes is one value for some of the beams 5202a-5202n while the measured property is another value for another one or more of the beams 5202a-5202n, the computing device 5220b may determine that the beams 5202a-5202n are not balanced. In still another example, if the measured property of the analytes irradiated at the analysis area 5210 is the same within a tolerance (0.1%, 1%, 10%, etc.) for each individual beam 5202a-5202n, the computing device 5220b may determine that the beams 5202a-5202n are balanced (e.g., the beams 5202a-5202n do not require non-spatial adjustments).

If it is determined that the beams 5202a-5202n are balanced within a tolerance, the flow of the example method 5500 may continue to block 5510 where the method 5500 ends. However, if it is determined that the beams 5202a-5202n are not balanced within the tolerance, the flow of the example method 5500 may continue to block 5512. At block 5512, the computing device 5220b may determine if a number of iterations of blocks 5502, 5504, 5506, and 5508 is greater than a threshold. That is, the computing device 5220b may determine if a number of attempts to adjust or balance non-spatial properties of the beams 5202a-5202n is greater than a threshold. If the number of iterations is greater than the threshold, the flow of method 5500 may continue to block 5516 where the computing device 5220b prompts a user (e.g., on a user interface such as an electronic display) to intervene (e.g., make manual adjustments or otherwise diagnose the imbalance between the beams 5202a-5202n) (block 5516). However, if the number of iterations is less than or equal to the threshold, the flow may continue to block 5514.

At block 5514, the computing device 5220b may determine adjustments to the optical elements 5204 to balance the beams 5202a-5202n in a non-spatial property, such as power, and may control the beam adjusting components 5224 to complete the determined adjustments. For example, in a implementation including four beams 5202a, 5202b, 5202c, and 5202d (as illustrated in FIG. 5I) split using half-wave plates and polarizing beam splitters (as illustrated in FIG. 5G), the computing device 5220b may control motors, actuators, etc. of the beam adjusting components 5224 to rotate, translate, or otherwise modify one or more of the half-wave plates and/or polarizing beam splitters. In this manner, the computing device 5220b may balance power or intensity among the beams 5202a, 5202b, 5202c, and 5202d, because the splitting of the beams distributes energy among the beams 5202a, 5202b, 5202c, and 5202d. By rotating or translating a polarizing beam splitter, for example, energy (and hence power) may be taken from one beam exiting the beam splitter and distributed to another beam exiting the beam splitter.

The adjustments to balance the beams 5202a-5202n may be based primarily on the signals from the beam detector(s) 5214a-5214n (e.g., photodiodes), primarily on the signals from the analyte detector(s) 5218, or the adjustments to balance the beams 5202a-5202n may be based on both the signals from the beam detector(s) 5214a-5214n and the signals from the analyte detector(s) 5218. As discussed above, the signals from the beam detector(s) 5214a-5214n and the signals from the analyte detector(s) 5218 are correlated, at least partially. As such, the computing device 5220b may control adjustments to balance the signals from the beam detector(s) 5214a-5214n, in an implementation. However, because of certain non-linearities, adjustments based primarily on the signals from the beam detector(s) 5214a-5214n may not fully balance the beams 5202a-5202n within a tolerance (e.g., 5%). Thus, after adjustments are made to balance the beams 5202a-5202n, the flow of the example method 5500 may revert to block 5502. Blocks 5502, 5504, 5506, and 5508 may iterate until the beams are balanced in a non-spatial property or until the number of iterations exceeds a threshold, as discussed with reference to block 5512.

Although illustrated as separate methods or processes in FIGS. 5J-5P, some implementations of computing devices and optical systems may combine some or all of the functionality of iterative methods to spatially align beams, such as the example method 5400, and iterative methods to non-spatially balance beams, such as the example method 5500. For example, a computing device, such as the computing device 5220b, may both spatially align and measure/collect signals for individual ones of the beams 5202a-5202n when all but one of the shutters 5216a-5216n are closed. However, in other implementations, method 5500 may be implemented only after all of the beams 5202a-5202n and a source of radiation 5208 are spatially aligned.

Figure 5S:
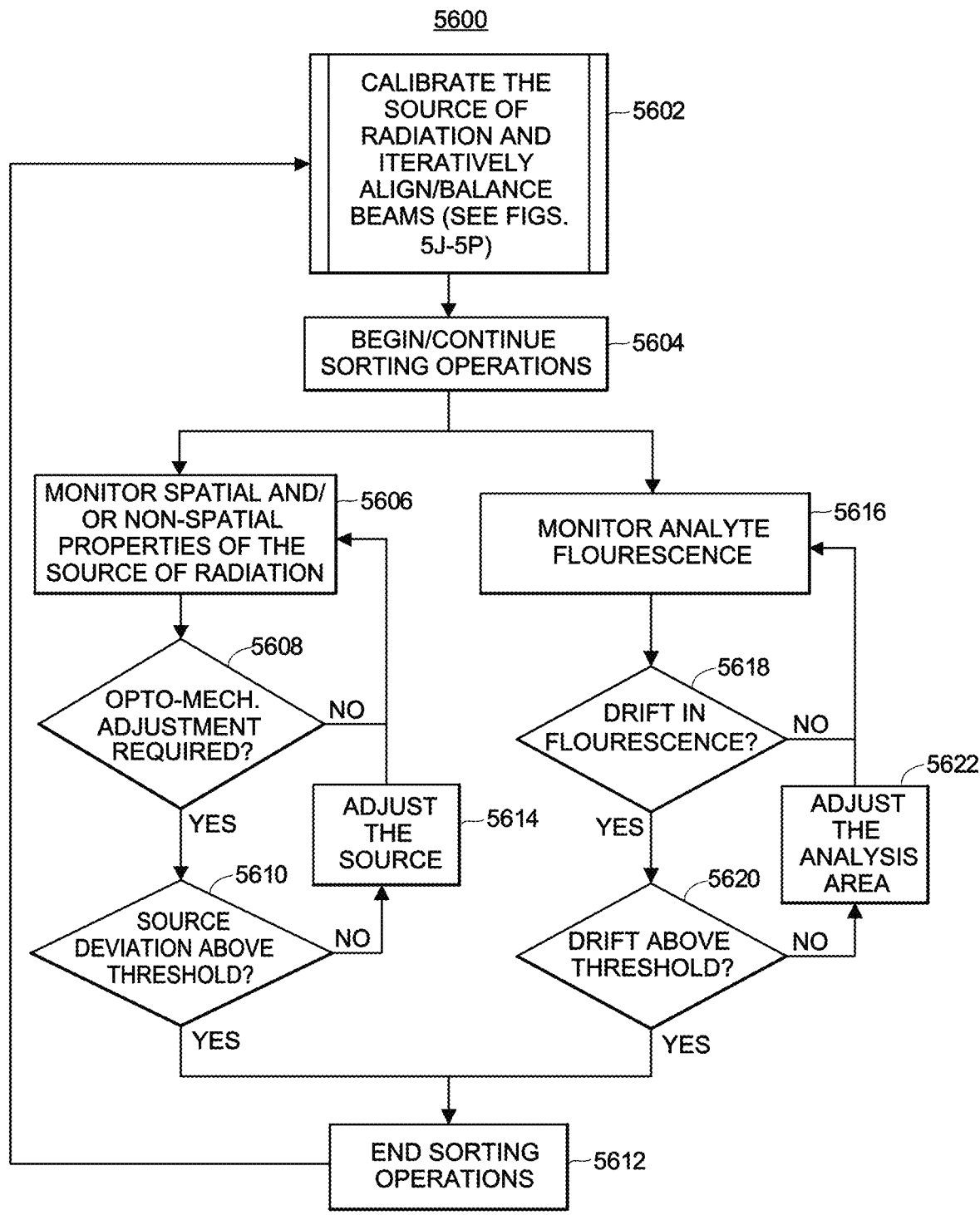
FIG. 5S is a flow diagram of an example method for monitoring and adjusting an optical system which may be implemented in the optical system illustrated in FIGS. 5H and 5I.

In some implementations, computing devices may implement the methods 5400 and 5500 while a device in which the optical system 5200 is integrated is not operating (e.g., as a calibration of the device). For example, computing devices may utilize some or all of the functionality of methods 5400 and 5500 to calibrate a sorting flow cytometer before the sorting flow cytometer operates to sort cells. However, optical systems may also be automatically aligned and/or adjusting during operation of a device in which the optical system 5200 is integrated. FIG. 5S illustrates an example method 5600 for automatically adjusting and/or aligning an optical system during operation of a sorting flow cytometer. One or both of the computing devices 5220a and 5220b may implement at least some of the functionality of method 5600, for example. For clarity and by way of example, alignment and/or adjustment of an optical system during operation of a flow cytometer is discussed with reference to FIG. 5S. However, computing devices may utilize the functionality of method 5600 to automatically align and/or adjust optical systems integrated into devices other than sorting flow cytometers, such as quality control devices, quantum computing devices, forensic devices, etc. Also for ease of discussion, the components of the example optical system 5200 are referenced in the description of the method 5600, but, generally, the method 5600 may be utilized to automatically adjust components of any suitable optical system.

The method 5600 may include an alignment and/or adjustment of the source of radiation (block 5602). In this manner, the sorting flow cytometer in which the optical system 5200 is integrated may, at least initially, include a calibrated source of radiation. For example, prior to implementing the method 5600, the computing device 5220a may spatially align and/or non-spatially adjust the source of radiation 5208, as further discussed with reference to FIGS. 5H, 5I, and 5J-5M.

Also, in the method 5600, computing devices, such as the computing device 5220b, may iteratively align and/or balance the beams 5202a-5202n at block 5602. For example, the computing device 5220b may implement the methods 5400 and/or 5500, as discussed further with reference to FIGS. 5N-5P, to iteratively align and/or balance the beams 5202a-5202n. In this scenario in which the optical system 5200 is integrated in a flow cytometer, the iterative alignment and balancing of the beams 5202a-5202n may result in a calibration of the optical system 5200 such that each of the beams 5202a-5202n is incident on a point intersecting a stream of cells traveling through the flow cytometer, at least within a tolerance (e.g., five microns). The iterative alignment and balancing of the beams 5202a-5202n may also result in a calibration of the optical system 5200 such that each of the beams 5202a-5202n is balanced in power within a tolerance (e.g., 3%).

The flow cytometer may begin a sorting of cells with these calibrated beams 5202a-5202n and the calibrated source of radiation 5208 (block 5604). In the example sorting of cells, each of the beams 5202a-5202n may irradiate cells traveling in a core stream through the flow cytometer, and a computing device, such as the computing device 5220b, may detect fluorescence of the cells (or dyes within the cells) based on signals from the analyte detector(s) 5218. The computing device 5220b, or another suitable computing device, may then cause the cells to be sorted based on the detected fluorescence. For example, the cells may be sorted using pulsed laser methods described elsewhere in this specification.

Also during the sorting of cells, the computing device 5220a and/or the computing device 5220b may monitor a spatial alignment of the source of radiation 5208 and/or one or more non-spatial properties, such as power or polarization, of the source of radiation 5208 (block 5606). The computing device 5220a, for example, may receive, from the source detector(s) 5212, signals indicative of the direction of propagation of light emitted by the source of radiation 5208 and/or signals indicative of non-spatial properties, such as polarization, of light emitted by the source of radiation 5208. The computing device 5220a may monitor these signals so as to determine if the spatial alignment of the source of radiation 5208 and/or non-spatial properties of the source of radiation 5208 have deviated from reference values (at least above a threshold).

The computing device 5220a may determine if adjustments, such as opto-mechanical adjustments carried out by the source adjusting components 5222, are required to correct detected deviations of the source of radiation 5208 (block 5608). In some implementations, the computing device 5220a may determine if errors in the direction of propagation, power, polarization, etc. are outside tolerable ranges. For example, the computing device 5220a may utilize a tolerance of 3% for deviations in an angle of polarization. If the angle of polarization of light emitted from the source of radiation differs by more than 3% from a reference angle in any direction, the computing device 5220a may determine that adjustments are required to correct the deviations of the source of radiation 5208. If adjustments are not required, the flow of method 5600 may revert to block 5606. However, if adjustments are required for the source of radiation 5208, the flow may continue to block 5610.

At block 5610, the computing device 5220a may determine if the one or more deviations of the source of radiation 5208 are above corresponding threshold values. That is, the computing device 5220a may determine if deviations of the source of radiation 5208 are outside of a range of deviations that can feasibly be automatically corrected during operation of the sorting flow cytometer. In one scenario, a computing device 5220a may determine if a polarization angle of light emitted from the source of radiation 5208 deviates more than 20% from a reference value. If the deviation is greater than 20%, the flow of method 5600 may continue to block 5612 where the computing device 5220a may trigger a stop to the sorting operation of the flow cytometer, such that the source of radiation 5208 may be more precisely aligned (e.g., at block 5602). If the deviation of the polarization direction is between 3% and 20%, the flow of method 5600 may continue to block 5614 where the computing device 5220a may automatically adjust/align the source of radiation 5208 during operation of the flow cytometer.

The computing device 5220a may utilize a variety of ranges and/or tolerances in determining if opto-mechanical adjustments to the source of radiation 5208 are required and if these adjustments are to be completed during operation of the flow cytometer. For example, the computing device 5220a may determine that spatial adjustments, or alignments, are required for deviations in the direction of propagation of light emitted by the source of radiation 5208 greater than one micron, greater than five microns, greater than one millimeter, greater than three millimeters, etc. For each of these example tolerances, the computing device 5220b also define a range of deviations for which the source of radiation 5208 should be automatically adjusted during operation of the flow cytometer, such as one to ten microns, five to twenty-five microns, one to seven millimeters, etc.

If the computing device 5220*a* determines that the source of radiation 5208 should be automatically adjusted during operation of the flow cytometer, the computing device 5220*a* may cause the source adjusting components 5222 to adjust/align the source of radiation 5208 in a similar manner to that discussed with reference to FIGS. 5H, 5I, and 5J-5M. The flow of method 5600 may then revert to block 5606 where the computing device 5220*a* continues to monitor the source of radiation 5208.

Still further, during the sorting of cells, the computing device 5220*a* and/or the computing device 5220*b* may monitor a measured fluorescence of analytes as indicated by the analyte detector(s) 5218 (block 5616). For example, the computing device 5220*a* may receive signals from the analyte detector(s) 5218 indicative of the fluorescence of dyes within cells, and/or of the cells themselves, as the cells pass through the analysis area 5210. In monitoring the measured fluorescence, the computing device 5220*a* may identify drifts in the fluorescence (e.g., average increases or decreases) on certain time scales, such as times scales greater than or equal to twenty seconds, thirty seconds, one minute, etc. These drifts in fluorescence may be indicative of misalignments or drifts in components of the optical system 5200 and/or the drifts in fluorescence may be indicative of spatial drifts of the analytes (e.g., cells) within the analysis area 5210. In cases where the analytes are travel through the flow cytometer via a core-in-sheath fluidic mechanism (see FIG. 1A, for example), the core stream including the cells may shift within the sheath producing the drifts in fluorescence.

The computing device 5220*b*, or other suitable computing device, may determine if a drift in fluorescence occurs (block 5618). For example, the computing device 5220*b* may utilize moving window averages of the detected fluorescence to determine if a negative or positive change in fluorescence, on average, drifts past a tolerated level. If no such drift in fluorescence is detected, the flow of method 5600 may revert to block 5616 where the computing device continues to monitor analyte fluorescence. If a drift in fluorescence is detected, the flow continues to block 5620.

At block 5620, the computing device 5220*b* may determine if the detected drift in fluorescence is above a threshold (block 5620). For example, if the fluorescence on average is changing by an amount equal to or below a certain threshold, such as fifty relative fluorescence units (RFU), one hundred RFU, two hundred RFU, etc., in a given time period (e.g., a time period of a moving average), the computing device 5220*b* may determine that automatic adjustments to a flow cytometer are to be completed to mitigate the drift. In such a case, the flow of the method 5600 may continue to block 5622 where components of the flow cytometer, such as an analysis area (e.g., flow cell), may be adjusted to mitigate the drift in fluorescence.

However, if the drift in fluorescence is above the threshold, the flow of method 5600 may continue to block 5612 where the computing device 5220*a* may trigger a stop to the sorting operation of the flow cytometer, such that the source of radiation 5208 and/or the beams 5202*a*-5202*n* may be more precisely aligned (e.g., at block 5602). In some implementations, the ending of sorting operations of a flow cytometer may include ceasing the flow of analytes through the analysis area 5210. In other implementations, the ending of sorting operations of a flow cytometer may include discarding all analytes passing through the analysis area 5210.

In still other implementations, the ending of sorting operations may include introducing a different analyte (e.g., different than the cells sorted by the sorting flow cytometer) into the analysis area 5210. For example, the computing device 5220*a*, the computing device 5220*b*, or another suitable computing device may cause synthetic (e.g., plastic) beads to pass through the analysis area 5210 in place of or in addition to cells to be sorted by the sorting flow cytometer. By introducing different (e.g., synthetic) analytes into the analysis area, the computing devices may increase fluorescence of the irradiated analysis area, improve consistency of measured fluorescence values, or otherwise influence measured fluorescence values such that the alignments and/or adjustments of block 5602 are more efficient and/or more accurate.

In any event, after ending sorting operations of the flow cytometers, the computing devices 5220*a* and 5220*b* may repeat the alignments and/or adjustments of block 5602, and the sorting operations of the flow cytometer may be restarted or continued with a re-calibrated optical system 5200 (block 5604).

Determining Levels of Saturation and/or Numbers of Beams

In some implementations, operators of optical systems, such the optical systems 5000 or 5200, may configure optical systems (e.g., in terms of radiation intensity, number of beams, etc.) based on a model of saturation. In particular, operators or users may utilize a combination of experimental data and computer models to predict necessary levels of saturation and/or necessary numbers of beams to reduce variation (CV) in a device to acceptable levels.

Figure 5T:
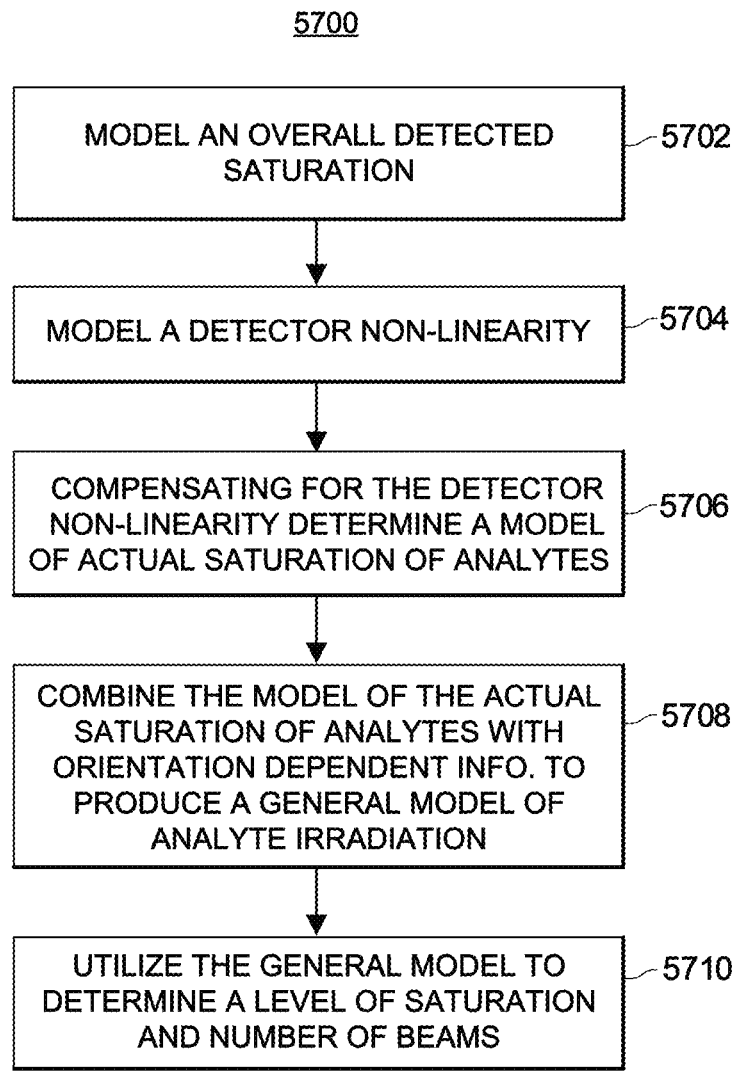
FIG. 5T is a flow diagram of an example method for modeling saturation and multiple beams which may be utilized to configure the optical system illustrated in FIGS. 5H and 5I.

FIG. 5T is a flow diagram of an example method 5700 for determining a saturation level and/or number of beams for an optical system. The computing device 5220*a*, the computing device 5220*b*, or another suitable computing device similar to the computing device illustrated in FIG. 5Y may implement the method 5700, for example.

The method 5700 includes modeling an overall detected saturation of irradiated analytes as a function of one or more properties, such as intensity, of the light irradiating the analytes (block 5702). The modeling of this overall saturation may include fitting measured or detected values of fluorescence to one or more parameterized mathematical formulas modeling saturation. For example, a computing device, such as the computing device 5220*a* or 5220*b*, may generate the curve illustrating saturation in FIGS. 5A and 5B using fitted values of fluorescence (e.g., for sperm cells in a flow cytometer). The fitted values of fluorescence may be fit with a parameterized mathematical formula representing saturation by a continuous wave laser and a parameterized mathematical formula representing saturation by a quasi-continuous wave laser, respectively. In some implementations, computing devices may generate multiple curves of this nature for a variety of properties of the light irradiating analytes. For example, computing devices may fit a curve representing saturation vs. wavelength of light (e.g., at constant intensity and polarization), a curve representing saturation vs. polarization of light (e.g., at constant intensity and wavelength), and a curve representing saturation vs. intensity of light (e.g., at constant wavelength and polarization). Generally, saturation of analytes may be dependent on any number of non-spatial properties of light irradiating the analytes, such as intensity, wavelength, pulse frequency, polarization, etc.

In some cases, overall measurements of saturation based on detected properties (e.g., fluorescence) of analytes may not precisely represent the saturation of the analytes due to artifacts (e.g., nonlinearities) corresponding to detectors utilized in gathering the measurements. For example, materials in the photodiodes, photomultiplier tubes, etc. utilized in the analyte detector(s) 5218 may become saturated apart from the saturation of the analytes. Thus, the method 5700 may also include modeling a background saturation of one or more detectors utilized to measure properties of the analytes (block 5704).

Figure 5U:
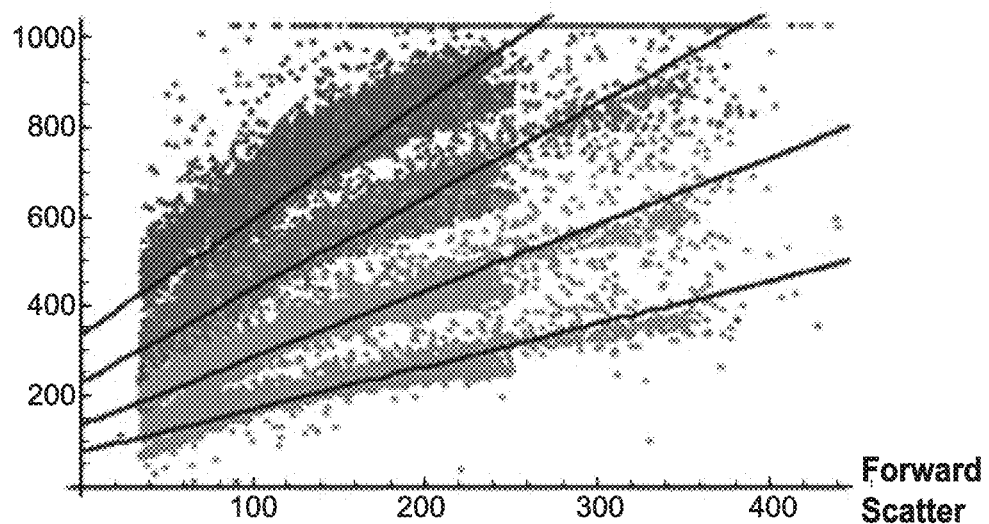
FIG. 5U includes a plot of fluorescence vs. forward scatter that illustrates saturation of one or more detectors.

To model the nonlinearities of one or more detectors utilized to measure analytes, operators of the optical system 5200 may place a variety of filters, such as neutral density filters, in the path of the light irradiating the analytes. Such filters should produce a linear drop in fluorescence, or another measured property, without influencing a forward scatter of the light. FIG. 5U illustrates a plot of example measurements of fluorescence vs. forward scatter of light for various neutral density filters. Because the slopes of these measurements, for each neutral density filter, differ, the plot of FIG. 5U represents a saturation, or other nonlinearity, of the detectors utilized to measure fluorescence. The differences in these slopes may allow a computing device to extract a detector nonlinearity trend or curve from the fluorescence vs. forward scatter data, as illustrated in FIG. 5V.

Figure 5V:
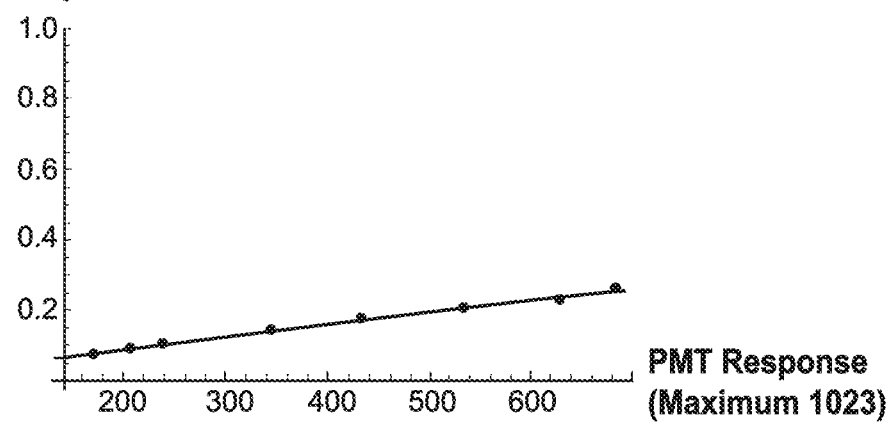
FIG. 5V includes a plot illustrating background saturation due to saturation of one or more detectors.
Figure 5W:
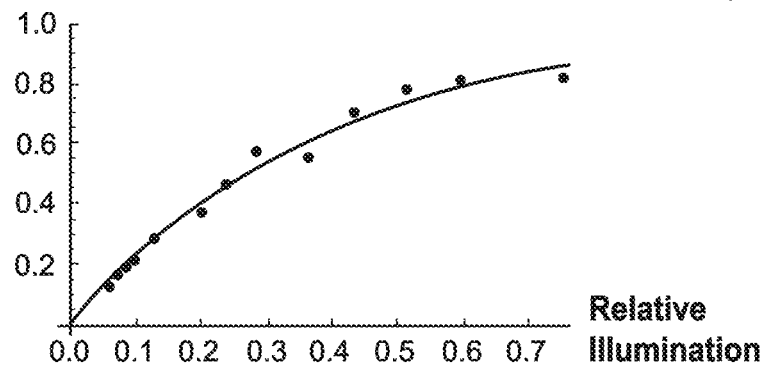
FIG. 5W includes a plot illustrating a model of an actual saturation of analytes which compensates for the background saturation illustrated in FIG. 5V.

Returning to the method 5700, a computing device, such as the computing device 5220b or 5220a, may compensate for the extracted detector nonlinearity (e.g., as illustrated in FIG. 5V) such that a model of the saturation of analytes compensates for the detector nonlinearity. For example, the computing device 5220b may perform one or more transforms or inversions of the detector nonlinearity and/or the overall detected saturation (e.g., as illustrated in one of FIG. 5A or 5B) to remove the effect of the detector nonlinearity from the overall detected saturation (e.g., to compensate for the detector nonlinearity). As discussed above, the resulting model may represent the saturation of analytes as a function of one non-spatial property, such as intensity or power, or the model may represent the saturation of analytes as a function of multiple non-spatial properties. FIG. 5W illustrates an example model (the solid line) produced by subtracting background saturation (associated with one or more detectors, e.g., FIG. 5V) from overall detected saturation.

Figure 5X:
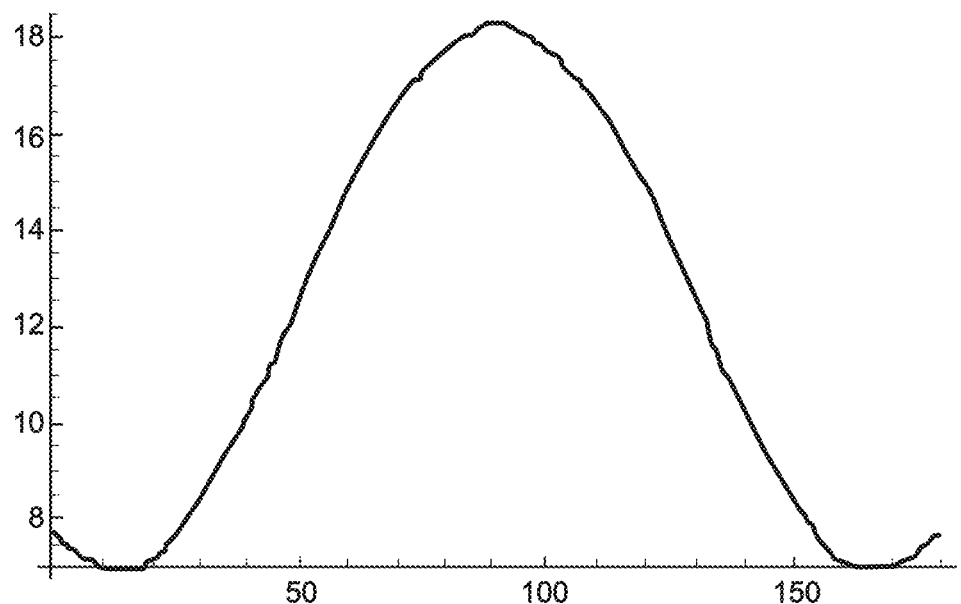
FIG. 5X includes a plot illustrating anisotropic behavior of analytes.

Once the actual saturation of the analytes is modeled, a computing device, such as the computing device 5220a or 5220b, may generate a general model for irradiation of analytes (block 5708). This general model may model irradiation of analytes based on the model of the actual saturation of the analytes (see block 5706) and based on orientation dependent information about the analytes. The orientation dependent information may indicate how light interacts with (e.g., excites) analytes as a function of the orientation of the analytes. FIG. 5X illustrates one example of such orientation dependent information for biological cells. In particular, FIG. 5X includes a plot of an area of interest (AOI), or relevant area interacting with light (e.g., absorbing light), as a function of the relative cross section of certain cells (e.g., sperm cells). A computing device modeling irradiation of analytes may utilize this type of orientation dependent information or other suitable position dependent information in combination with a model of actual saturation of analytes (e.g., FIG. 5W) to produce a general model, such as the model illustrated in FIG. 5D. Such a general model may represent expected variation in measured properties of analytes as a function of both the saturation of analytes and a number of beams irradiating analytes.

Returning again to FIG. 5T, once the general model is generated, an operator may utilize the general model to determine or select a level of saturation and/or number of beams with which to configure an optical system (block 5710). As discussed with reference to FIGS. 5C and 5D, an operator may determine levels of saturation and/or numbers of beams based on design constraints and/or based on desired or acceptable CV value for a certain application.

Example Computing Device

Figure 5Y:
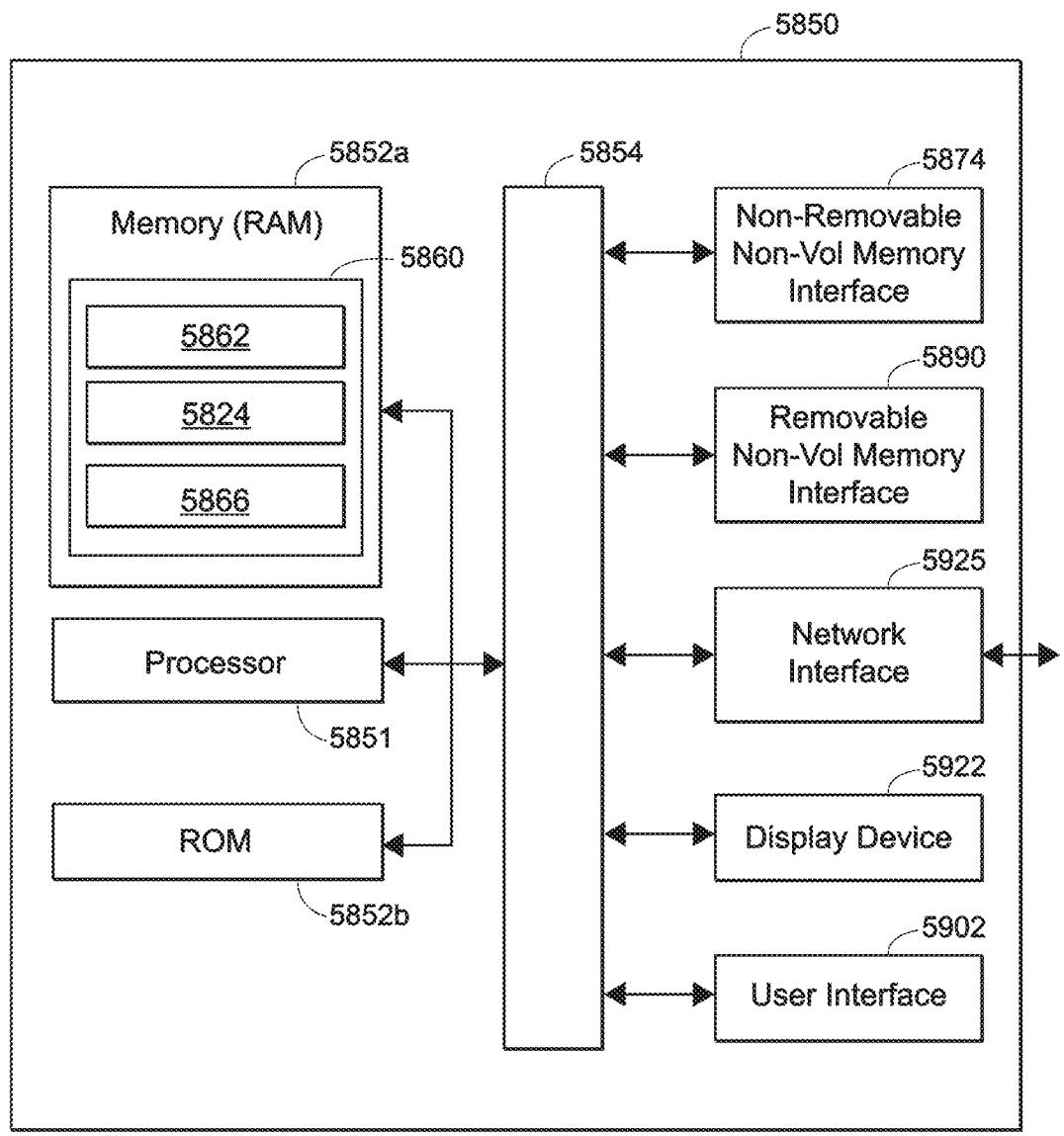
FIG. 5Y is a block diagram of an example computing device that may be implemented in one or both of the optical systems illustrated in FIGS. 5E and 5H.

FIG. 5Y illustrates an example computing device 5850, which computing device 5850 may be implemented as one of the computing devices 5220a, 5220b, or 5016. The computing device 5850 may include one or more central processing units (CPUs) or processing units 5851 (may be called a microcontroller or a microprocessor), a system memory 5852a and 5852b, and a system bus 5854 that couples various system components including the system memory 5852 to the processing units 5851. The system bus 5854 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus, a Media Oriented Systems Transport (MOST) bus, an optical data connection bus, or other bus that is capable of performing the necessary coupling of system components.

The computing device 5850 may include an assortment of computer-readable media. Computer-readable media may be any media that may be accessed by the computing device 5850. By way of example, and not limitation, the computer-readable media may include both volatile and nonvolatile media, removable and non-removable media. Media may also include computer storage media and communication media. The computer-readable media may store information such as computer-readable instructions, program modules, data structures, or other data, such as reference values for the positions and non-spatial properties of light emitted by the source of radiation 5208 and/or of the beams 5202a-5202n. Computer-storage media may include non-transitory media, such as a RAM 5852b, a ROM 5852a, EEPROM, optical storage disks, magnetic storage devices, and any other non-transitory medium that may be used to store computer-accessible information.

In an embodiment, the ROM 5852a and/or the RAM 5852b may store instructions that are executable by the processing unit 5851. For example, a basic input/output system (BIOS), containing algorithms to transfer information between components within the computer 5850, may be stored in ROM 5852b. Data or program modules that are immediately accessible or are presently in use by the processing unit 5851 may be stored in RAM 5852a. Data normally stored in RAM 5852a while the computing device 5850 is in operation may include an operating system, application programs, program modules, and program data. In particular, the RAM 5852a may store one or more applications 5860 including one or more routines 5862, 5864, and 5866 implementing the functionality of the methods 5300, 5400, 5500, 5600, and 5700.

The computing device 5850 may also include other storage media such as a hard disk drive that may read from or write to non-removable, non-volatile magnetic media, a magnetic disk drive that reads from or writes to a removable, non-volatile magnetic disk, and an optical disk drive that reads from or writes to a removable, nonvolatile optical disk. Other storage media that may be used includes magnetic tape cassettes, flash memory cards, digital versatile disks, digital video tape, solid state RAM, and solid state ROM. The hard disk drive may be connected to the system bus 5854 through a non-removable memory interface such as interface 5874. A magnetic disk drive and optical disk drive may be connected to the system bus 5854 by a removable memory interface, such as interface 5890.

A user may interact with the computing device 5850 through input devices such as a keyboard or a pointing device (i.e., a mouse). A user input interface 5902 may be coupled to the system bus 5854 to allow the input devices to communicate with the processing unit 5851. A display device such as a monitor 5922 may also be connected to the system bus 5854 via a video interface (not shown).

The computing device 5850 may operate in a networked environment using logical connections to one or more remote computing devices, for example. The remote computing device may be a personal computer (PC), a server, a router, or other common network node. The remote computing device typically includes many or all of the previously-described elements regarding the computing device 5850. Logical connections between the computing device 5850 and one or more remote computing devices may include a wide area network (WAN). A typical WAN is the Internet. When used in a WAN, the computing device 5850 may include a modem or other means for establishing communications over the WAN. The modem may be connected to the system bus 5854 via the network interface 5925, or other mechanism. In a networked environment, program modules depicted relative to the computing device 5850 may be stored in the remote memory storage device. As may be appreciated, other means of establishing a communications link between the computing device 5850 and a remote computing device may be used.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A method of configuring an optical system to reduce variations in measured properties of an analyte, the method comprising: selecting a number of beams into which radiation from a source of radiation is to be split, wherein, upon irradiating the analyte from a plurality of directions by the number of beams, a variation of a resulting measurement of the analyte is at or below a threshold; aligning the source of radiation and a plurality of optical elements optically coupled to the source of radiation such that the selected number of beams irradiate the analyte upon emission of radiation by the source of radiation.

2. The method of aspect 1, further comprising determining a saturation of the analyte as a function of one or more non-spatial properties of the radiation emitted by the source of radiation.

3. The method of aspect 2, wherein selecting the number of beams includes selecting the number of beams based on the determined saturation of the analyte as a function of the one or more non-spatial properties.

4. The method of aspect 2 or aspect 3, wherein selecting the number of beams includes selecting the number of beams based on the determined saturation of the analyte as a function of the one or more spatial properties and based on an anisotropy of the analyte.

5. The method of any one of aspects 2 to 4, wherein determining the saturation of the analyte includes: determining an overall detected saturation of the analyte, determining a detector nonlinearity corresponding to a detector, wherein the detector is utilized to make the resulting measurement of the analyte, and based on the overall saturation and the detector nonlinearity, determining the saturation of the analyte as a function of the one or more non-spatial properties of the radiation such that the saturation of the analyte compensates for the detector nonlinearity.

6. The method of any one of aspects 2 to 5, wherein determining the saturation of the analyte includes modeling the saturation of the analyte upon irradiation by a continuous wave laser.

7. The method of any one of aspects 2 to 6, wherein determining the saturation of the analyte includes modeling the saturation of the analyte upon irradiation by a quasi-continuous wave laser.

7A. The method of any one of aspects 2 to 6, wherein determining the saturation of the analyte includes modeling the saturation of the analyte upon irradiation by a pulsed laser.

8. The method of any one of the preceding aspects, wherein selecting the number of beams includes selecting the number of beams based on an anisotropy of the analyte.

9. The method of any one of the preceding aspects, wherein the resulting measurement of the analyte includes a measurement of fluorescence of the analyte.

10. The method of any one of the preceding aspects, wherein the resulting measurement of the analyte includes a measurement of absorption by the analyte.

11. The method of any one of the preceding aspects, wherein the resulting measurement of the analyte includes a measurement of phosphorescence of the analyte.

12. The method of any one of the preceding aspects, wherein the resulting measurement of the analyte includes a measurement of light scattering off by the analyte.

13. The method of any one of the preceding aspects, wherein the resulting measurement of the analyte includes a measurement of polarization or depolarization of the radiation by the analyte.

14. The method of any one of the preceding aspects, wherein selecting the number of beams includes: determining the threshold for the variation of the resulting measurement of the analyte based on one or more constraints of a device in which the optical system is integrated, and selecting the number of beams such that irradiation of the analyte from the plurality of directions by the number of beams produces a particular level of saturation of the analyte and produces the variation of the resulting measurement of the analyte at or below the threshold.

15. The method of any one of the preceding aspects, wherein aligning the source of radiation and the plurality of optical elements includes: positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions.

16. The method of aspect 15, wherein positioning the first optical elements includes positioning the first optical elements to split the radiation emitted by the source of radiation into the selected number of beams by iteratively splitting the radiation emitted by the source of radiation using, for each iterative splitting of the radiation emitted by the source of radiation using, a half-wave plate and a polarizing beam splitter.

17. The method of aspect 15 or aspect 16, wherein positioning the first optical elements includes positioning one or more cube beam splitters.

18. The method of any one of aspects 15 to 17, wherein positioning the first optical elements includes positioning one or more spliced fibers.

19. The method of any one of aspects 15 to 18, wherein positioning the first optical elements includes positioning one or more half-silvered mirrors.

20. The method of any one of aspects 15 to 19, wherein positioning the first optical elements includes positioning one or more dichroic mirrored prisms.

21. The method of any one of aspects 15 to 20, wherein, upon splitting the radiation from the source of radiation into the selected number of beams, the first optical elements cause the selected number of beams to be balanced in a non-spatial property.

22. The method of aspect 21, wherein the non-spatial property is power.

23. The method of aspect 21 or aspect 22, wherein the non-spatial property is polarization.

24. The method of any one of aspects 15 to 23, wherein aligning the source of radiation and the plurality of optical elements further includes positioning third optical elements in the paths of the selected number of beams to ensure that each of the selected number of beams is circularly polarized at a point where the selected number of beams irradiate the analyte.

25. The method of any one of aspects 15 to 24, wherein positioning the first optical elements and the second optical elements includes positioning the first optical elements at first positions and positioning the second optical elements at second positions, the method further comprising automatically adjusting at least one of the first positions or the second positions based on measured properties of the analyte.

26. The method of any one of aspects 15 to 25, wherein positioning the first optical elements and the second optical elements includes positioning the first optical elements at first positions and positioning the second optical elements at second positions, the method further comprising automatically adjusting at least one of the first positions or the second positions based on measured properties of the selected number of beams.

27. The method of any one of aspects 15 to 26, wherein positioning the first optical elements and the second optical elements includes positioning the first optical elements at first positions and positioning the second optical elements at second positions, the method further comprising automatically adjusting at least one of the first positions or the second positions based on measured properties of the radiation emitted by the source of radiation.

28. An optical system for saturated irradiation of analytes, the system comprising: a source of radiation; and a plurality of optical elements, wherein at least some of the optical elements are configured to split radiation emitted by the source of radiation into multiple beams, the multiple beams saturating the analytes, and the multiple beams irradiating the analytes from multiple directions, wherein saturating the analytes and irradiating the analytes from multiple directions produces a variation in a measured property of the analytes at or below a predetermined threshold.

29. The optical system of aspect 28, wherein the multiple beams irradiate the analytes from multiple directions at a flow cell of a sorting flow cytometer.

30. The optical system of aspect 29, wherein the measured property is utilized by the sorting flow cytometer to sort the analytes.

31. The optical system of either aspect 29 or aspect 30, wherein the plurality of optical elements includes polarizing optical elements configured to ensure that each of the multiple beams has the same polarization at a point where each of the multiple beams intersects the flow cell.

32. The optical system of any one of aspects 29 to 31, wherein the plurality of optical elements includes balancing optical elements configured to ensure that each of the multiple beams has the same intensity at a point where each of the multiple beams intersects the flow cell.

33. The optical system of any one of aspects 28 to 32, further comprising one or more aligning components physically coupled to the plurality of optical elements, wherein each of the one or more aligning components is configured to: receive signals based on measurements from a detector, the detector detecting at least one of properties of the radiation emitted by the source of radiation, properties of the multiple beams, or the measured property of the analytes, and automatically adjust one or more of the plurality of optical elements based on the signals.

34. The optical system of aspect 33, wherein the one or more aligning components include one or more motors.

35. The optical system of either aspect 33 or aspect 34, wherein the one or more aligning components include one or more piezo-electric devices.

36. The optical system of any one of aspects 33 to 35, wherein automatically adjusting the one or more of the plurality of optical elements based on the received signals includes adjusting positions of one or more mounts of the one or more of the plurality of optical elements.

37. The optical system of aspect 36, wherein adjusting the positions of the one or more mounts of the one or more of the plurality of optical elements causes a rotation of the one or more of the plurality of optical elements.

38. The optical system of either aspect 36 or aspect 37, wherein adjusting the positions of the one or more mounts of the one or more of the plurality of optical elements causes a translation of the one or more of the plurality of optical elements.

39. The optical system of any one of aspects 28 to 38, wherein, to split the radiation emitted by the source of radiation into the multiple beams, the plurality of optical elements sequentially:

modify a polarization of the radiation emitted by the source of radiation, and split the radiation emitted by the source of radiation and having the modified polarization based on polarization directions of the radiation emitted by the source of radiation.

40. The optical system of any one of aspects 28 to 39, wherein the plurality of optical elements are further configured to polarize each of the multiple beams such that each of the multiple beams is circularly polarized upon irradiating the analytes.

41. A method of calibrating components of an optical system having multiple beams, the method comprising: for each of the multiple beams: obstructing all but the beam such that only the beam irradiates analytes, causing the beam to irradiate the analytes from each of a set of directions, detecting a set of measured properties of the analytes corresponding to the set of directions, and aligning the beam to a particular one of the set of directions, the particular one of the set of directions corresponding to an optimum of the set of measured properties.

42. The method of aspect 41, wherein aligning the particular one of the set of directions corresponding to the optimum includes aligning the particular one of the set of directions corresponding to a maximum of the set of measured properties.

43. The method of either aspect 41 or aspect 42, wherein aligning the particular one of the set of directions corresponding to the optimum includes aligning the particular one of the set of directions corresponding to a minimum of the set of measured properties.

44. The method of any one of aspects 41 to 43, further comprising:
determining a variation between the multiple beams in the optimums of the sets of measured properties corresponding to the multiple beams; and based on the variation between the multiple beams, adjusting one or more optical elements to balance, among the multiple beams, the optimums of the sets of measured properties.

45. The method of aspect 44, wherein adjusting the one or more optical elements includes automatically rotating one or more polarizing beam splitters.

46. The method of either aspect 44 or aspect 45, wherein adjusting the one or more optical elements includes automatically rotating one or more half-wave plates.

47. The method of any one of aspects 41 to 46, further comprising: detecting an additional optical property of radiation emitted by a source of radiation, wherein the radiation is split to form the multiple beams; comparing the additional optical property to a reference value for the additional optical property to determine a variation in the additional optical property; and based on the variation in the additional optical property, adjusting one or more optical elements to reduce the variation in the additional optical property.

48. The method of aspect 47, wherein adjusting the one or more optical elements to reduce the variation in the optical property includes rotating or translating one or more mirrors.

49. The method of either aspect 47 or aspect 48, wherein adjusting the one or more optical elements to reduce the variation in the optical property includes rotating or translating one or more mounts physically coupled to the source of radiation.

50. The method of any one of aspects 47 to 49, wherein adjusting the one or more optical elements to reduce the variation in the optical property includes modifying the one or more optical elements to adjust a non-spatial property of the radiation.

51. A method of calibrating components of an optical system having multiple beams, the method comprising: (a) for each of the multiple beams: obstructing all but the beam such that only the beam irradiates analytes, and measuring at least one of: (i) a measured property of the analytes, or (ii) an optical property of the beam; (b) determining a variation between the multiple beams in the at least one of (i) the measured property of the analytes, or (ii) the optical property; and (c) based on the variation between the multiple beams, adjusting one or more optical elements to balance, among the multiple beams, the at least one of (i) the measured property of the analytes, or (ii) the optical property.

52. The method of aspect 51, wherein the optical property is a power.

53. The method of either aspect 51 or aspect 52, wherein the optical property is a polarization.

54. The method of any one of aspects 51 to 53, wherein the measured property is fluorescence.

55. The method of any one of aspects 51 to 54, wherein the measured property is absorption.

56. The method of any one of aspects 51 to 55, wherein the measured property is phosphorescence.

57. The method of any one of aspects 51 to 56, wherein the measured property is indicative of light scattering by the analytes.

58. The method of any one of aspects 51 to 57, wherein the measured property is indicative of a polarization or depolarization of the radiation by the analytes.

59. The method of any one of aspects 51 to 58, further comprising, prior to steps (a), (b), and (c): detecting an additional optical property of radiation emitted by a source of radiation, wherein the radiation is split to form the multiple beams; comparing the additional optical property to a reference value for the additional optical property to determine a variation in the additional optical property; and based on the variation in the additional optical property, adjusting one or more additional optical elements to reduce the variation in the optical property.

60. The method of any one of aspects 51 to 59, further comprising iteratively repeating steps (a), (b), and (c) until the variation in the at least one of (i) the measured property of the analytes, or (ii) the optical property is below a threshold.

61. The method of any one of aspects 51 to 60, wherein adjusting the one or more optical elements includes: determining, by one or more processors, an adjustment for each of the one or more optical elements based on the variation between the multiple beams and based on a model describing correlations between each of the one or more optical elements and the at least one of (i) the measured property of the analytes, or (ii) the optical property, and triggering one or more actuators based on the determined adjustments for the one or more optical elements, wherein the one or more actuators are physically coupled to the one or more optical elements.

62. The method of any one of aspects 51 to 61, wherein measuring at least one of (i) the measured property of the analytes, or (ii) the optical property of the beam includes measuring an emission of radiation from the analytes.

63. The method of aspect 62, wherein the analytes include biological cells.

64. The method of either aspect 62 or aspect 63, wherein the analytes include synthetic particles.

65. The method of aspect 64, wherein the analytes include both the synthetic particles and biological cells.

65A. The method of any one of aspects 51 to 65, wherein the analytes include non-human, mammalian sperm cells.

66. A system for maintaining calibrations of an optical system, the system comprising: one or more source adjustment components at least one of physically or optically coupled to a source of radiation; one or more detectors detecting at least one of (i) a measured property of analytes irradiated by radiation from the source of radiation, or (ii) an optical property of the radiation emitted by the source of radiation; and a computing device at least one of electronically or communicatively coupled to the one or more source adjustment components and the one or more detectors, wherein the computing device is configured to: receive measured values of the at least one of (i) the measured property of analytes irradiated by the radiation from the source of radiation, or (ii) the optical property of the radiation, determine one or more adjustments for the source of radiation based on the received measured values, and trigger at least one of the one or more source adjustment components to complete the determined one or more adjustments for the source of radiation.

67. The system of aspect 66, wherein the analytes are irradiated by the radiation from the source of radiation as the analytes pass through a flow cell of a flow cytometer, and wherein the computing device is further configured to: determine one or more flow cell adjustments for the flow cell based on the received measured values, and trigger one or more flow cell adjustment components to complete the determined one or more flow cell adjustments for the flow cell.

68. The system of either aspect 66 or aspect 67, wherein the one or more adjustments for the source of radiation are adjustments to the direction of propagation of the radiation emitted by the source of radiation.

69. The system of any one of aspects 66 to 68, wherein the one or more adjustments for the source of radiation are adjustments to the non-spatial properties of the radiation emitted by the source of radiation.

70. The system of any one of aspects 66 to 69, wherein the computing device is configured to receive the measured values, determine the one or more adjustments, and trigger the at least one of the one or more source adjustment components while a sorting flow cytometer, in which the optical system is integrated, is operating to sort the analytes.

71. The system of aspect 70, wherein the computing device is further configured to: determine if the measured values represent a variation in at least one of (i) the measured property of analytes, or (ii) the optical property is above a threshold, and one of: if the variation is above the threshold, trigger the sorting flow cytometer to cease operating to sort the analytes, or if the variation is at or below the threshold, continue to receive the measured values, determine the one or more adjustments, and trigger the at least one of the one or more source adjustment components while the sorting flow cytometer is operating to sort the analytes.

72. An apparatus to automatically adjust an optical system of a flow cytometer, the apparatus comprising: an optical element configured to at least one of direct radiation utilized by the flow cytometer or non-spatially manipulate the radiation; an actuator physically coupled to the optical element; a detector to detect at least one of a direction of propagation of the radiation, a non-spatial property of the radiation, or a measured property of analytes analyzed by the flow cytometer; and one or more processors communicatively coupled to the actuator and the detector, the one or more processors configured to: receive, from the detector, an indication of the at least one of the direction of propagation of the radiation, the non-spatial property of the radiation, or the measured property of analytes analyzed by the flow cytometer, and based on the received indication, control the actuator to automatically adjust the optical element.

73. The apparatus of aspect 72, wherein the optical element is a mirror.

74. The apparatus of either aspect 72 or aspect 73, wherein the radiation reflects off the mirror on a first side of the mirror, and wherein the detector is disposed on a second side of the mirror to detect a portion of the radiation that passes through the mirror.

75. The apparatus of any one of aspects 72 to 74, wherein the optical element is a half-wave plate.

76. The apparatus of any one of aspects 72 to 75, wherein the optical element is a polarizing beam splitter.

77. The apparatus of any one of aspects 72 to 76, wherein the actuator is a motor configured to rotate or translate the optical element.

78. The apparatus of any one of aspects 72 to 77, wherein the actuator is a piezo-electric device configured to rotate or translate the optical element.

79. The apparatus of any one of aspects 72 to 78, wherein controlling the actuator to automatically adjust the optical element includes: determining a deviation of the optical element based on a difference between the indicated at least one of the direction of propagation of the radiation, the non-spatial property of the radiation, or the measured property of analytes and a reference value, determining an adjustment of the optical element to correct the deviation, and communicating electrical signals to the actuator to adjust the optical element according to the determined adjustment.

80. The apparatus of aspect 79, wherein the determined adjustment is a rotation of the optical element about one or more axes.

81. The apparatus of either aspect 79 or aspect 80, wherein the determined adjustment is a translation of the optical element in one or more dimensions.

82. The apparatus of any one of aspects 72 to 81, wherein the detector detects two or more of a direction of propagation of the radiation, a non-spatial property of the radiation, or a measured property of analytes analyzed by the flow cytometer.

83. The apparatus of aspect 82, wherein the indication received by the one or more processors indicates the two or more of the direction of propagation of the radiation, the non-spatial property of the radiation, or the measured property of analytes analyzed by the flow cytometer.

Multi-Beam Orientation and Morphology Analysis

As described throughout the present application, flow cytometric methods and other methods relying on irradiation and corresponding measurement of analytes present a number of challenges, particularly with respect to the physical and optical properties of the analytes themselves (e.g., cells). For example, flattened or otherwise asymmetrical cells, such as mammalian epithelial cells, red blood cells, or sperm cells, exhibit anisotropic absorption and emission of energy (e.g., light). The complex geometries of a cell's interior and/or the complex geometries of the cell's boundaries act to refract and/or reflect light in ways that are highly dependent on the orientation or position of the cell with respect to any sources of radiation and/or detectors used to differentiate between cells.

These challenges are at least partially mitigated, in some systems, by the core-in-sheath fluidic mechanism that carries the cells through the detection or analysis region. With appropriate selection of the pressures and consequent velocities of the core suspension and sheath fluid, the core stream is narrowed by hydrodynamic forces exerted by the sheath flow, and the cells in the core stream are distributed longitudinally such that they are carried one by one in the flow. The forces that elongate and narrow the core stream have the additional benefit of orienting the cells such that a long axis of the cell is parallel to the direction of flow of the single file stream. However, the orientation of the cells about the long axis remains more or less random. Thus, as each cell passes through the detection area, light incident upon the cell, light emitted from the cell (e.g., fluorescent light), and light reflected off of the cell, remains dependent on the orientation and/or position of the cells. This is especially true of many types of mammalian sperm cells.

Various methods known previously and/or described herein exist to cope with the unknown orientation of the analyte cells, especially when the cells are sperm cells, about the cells' long axes. For example, in some prior art cytometry systems, a sample tube injecting the analyte sample as a core stream into the sheath flow is shaped (e.g., with an elliptical orifice or as a beveled needle) to attempt to force the analyte sperm cells to have a particular orientation about the long axis. In various embodiments of systems described herein, the optics of the system are configured to irradiate the analyte sperm cells isotropically about the cells' longitudinal axes, and/or to collect a signal (e.g., fluorescence) isotropically about the cells' longitudinal axes. Other (or the same) systems described herein attempt to saturate the fluorescence emitting carriers in the dye to ensure that the emitted fluorescence is proportional to the analyte of interest. Such efforts are, in the broadest sense, undertaken with the desire to minimize the coefficient of variation (CV) of the signal of the characteristic that the system is attempting to measure. In the case of sperm cells being analyzed to identify X- and Y-chromosome bearing cells in the population, for example, as described throughout this disclosure, the fluorescence signal indicates the amount of dye bound to DNA in the cells, with Y-chromosome bearing cells having slightly less DNA and, as a result, slightly less fluorescence due to a lesser amount of dye. However, the difference between the fluorescence signal of X- and Y-chromosome bearing cells is small and, accordingly, small variations in the fluorescence signal, which are the result of various complicating factors, can have an impact big enough prevent or diminish the ability of the system to make a determination of which sex chromosome is present in a cell. The anisotropic nature of the fluorescent signal (i.e., the fact that the signal is different from different angles relative to the cell) is one such complicating factor.

It is advantageous, as should be apparent, to minimize the CV associated with the analysis of the analytes. Accordingly, while each of the methods described above of minimizing the CV of the detected fluorescence signal is advantageous in some regard, each is also imperfect. For example, some sample tubes such as the beveled needle only work at relatively low core stream velocities, and have a tendency to become clogged. Additionally, the use of shaped sample tubes can create forces on the cells that can decrease the continued viability of the cell, which can be critically important when the end goal is sorting of the cells for later use in insemination procedures.

In some embodiments, having combinations of the features described herein, the systems and methods facilitate precise measurement of an optical property, in this case fluorescence, without requiring (but not necessarily without benefiting from) a specific orientation of the cells about the longitudinal axis of each within the core-in-sheath flow and/or isotropic collection or illumination as described above. That objective is accomplished in those systems and methods utilizing multiple beams to illuminate the analyte cells from multiple angles at different times, and determining, for each analyte (whether a cell or other analyte), its orientation by analyzing the signals detected corresponding to each of the respective beams. For example, FIG. 6A depicts an example beam arrangement 6000. In FIG. 6A, in which a flow axis 6002 of the system is orthogonal to the page, an analyte cell 6004 is illuminated by four laser beams 6006a, 6006b, 6006c, 6006d, each of which impinges on the analyte cell 6004 from a different angle and at a time offset slightly from each of the other beams.

The resulting fluorescence emission from the analyte cell 6004 as a result of each of the beams 6006a, 6006b, 6006c, 6006d may be as depicted FIG. 6B, which depicts fluorescence emission pulses 6008a, 6008b, 6008c, 6008d associated, respectively, with each of the beams 6006a, 6006b, 6006c, 6006d. In FIG. 6B, the fluorescence signal 6008a is greatest as a result of beam 6006a, which impinges on the analyte cell 6004 along a flat face 6010, and smallest as a result of beam 6006c, which impinges on the analyte cell 6004 along a narrow edge 6012. Knowing that the morphology of the analyte cell 6004 results in greatest fluorescence emission when the illumination energy (e.g., the energy exciting the carriers in the dye) is directed at the flat face 6010 of the analyte cell 6004, analysis of the signals resulting from the four beams 6006a, 6006b, 6006c, 6006d will provide information about the axial orientation of the cell 6004 about the its lengthwise axis, which is generally coincident with the flow axis 6002.

Knowing, for each cell 6004, which of the signals 6008a, 6008b, 6008c, 6008d represents the signal from the flat face 6010 of the cell 6004 (or any single face of the cell 6004, actually), the signal to be analyzed for each cell 6004 can be selected to be the one that represents illumination of the cell from the same face (e.g., the flat face 6010), which may also be the greatest signal, and which is in any case a consistent signal such that its choice for further analysis has the effect of minimizing the CV between the signals of individual cells 6004. That is, while previous methods and systems seek to control the orientation of the analyte cells 6004 by orienting all of the analyte cells 6004 similarly—with the flat face 6010 facing the detector, the illumination source, or both, for example—or seek to make the orientation of the analyte cells 6004 irrelevant by illuminating and/or detecting from all angles simultaneously, the embodiments described in FIGS. 6A to 6G contribute to minimizing the CV by determining the orientation of each analyte cell 6004 individually, and comparing only signals corresponding to illumination from the optimal (or at least the same) angle.

Figure 6C:
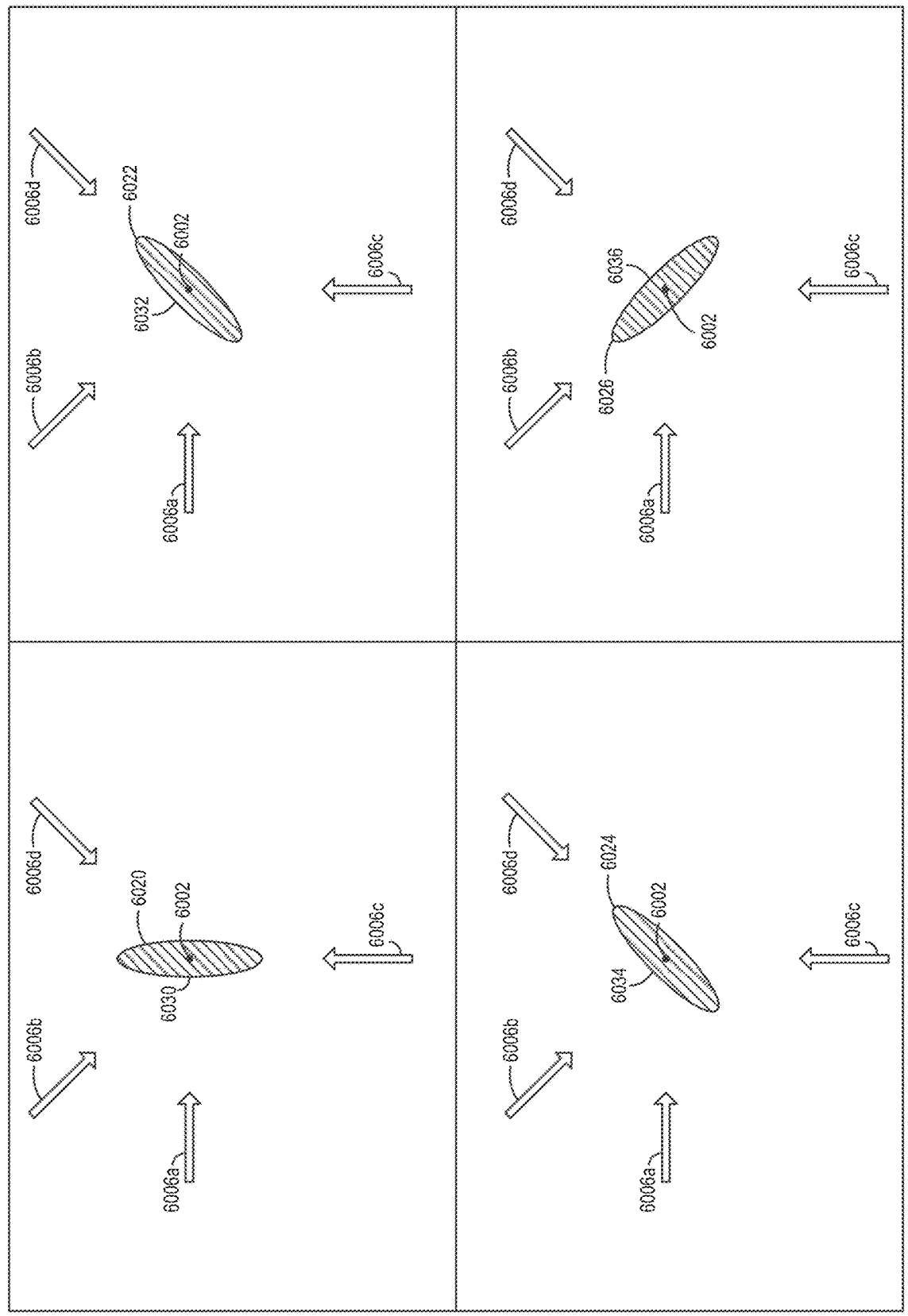
FIG. 6C illustrates examples of analyte cell orientations in the arrangement of energy sources of FIG. 6A.

To illustrate, FIG. 6C depicts four analyte cells 6020, 6022, 6024, and 6026 passing through the interrogation region of a flow cell (at different instances, of course), each having a different orientation about the flow axis 6002. As a result, each of the cells presents a flat face to a different one of the four laser beams 6006a, 6006b, 6006c, 6006d. The cell 6020 presents a flat face 6030 to the beam 6006a; the cells 6022 and 6024 present respective flat faces 6032 and 6034 to the beam 6006b; and the cell 6026 presents a flat face 6036 to the beam 6006d.

Figure 6D:
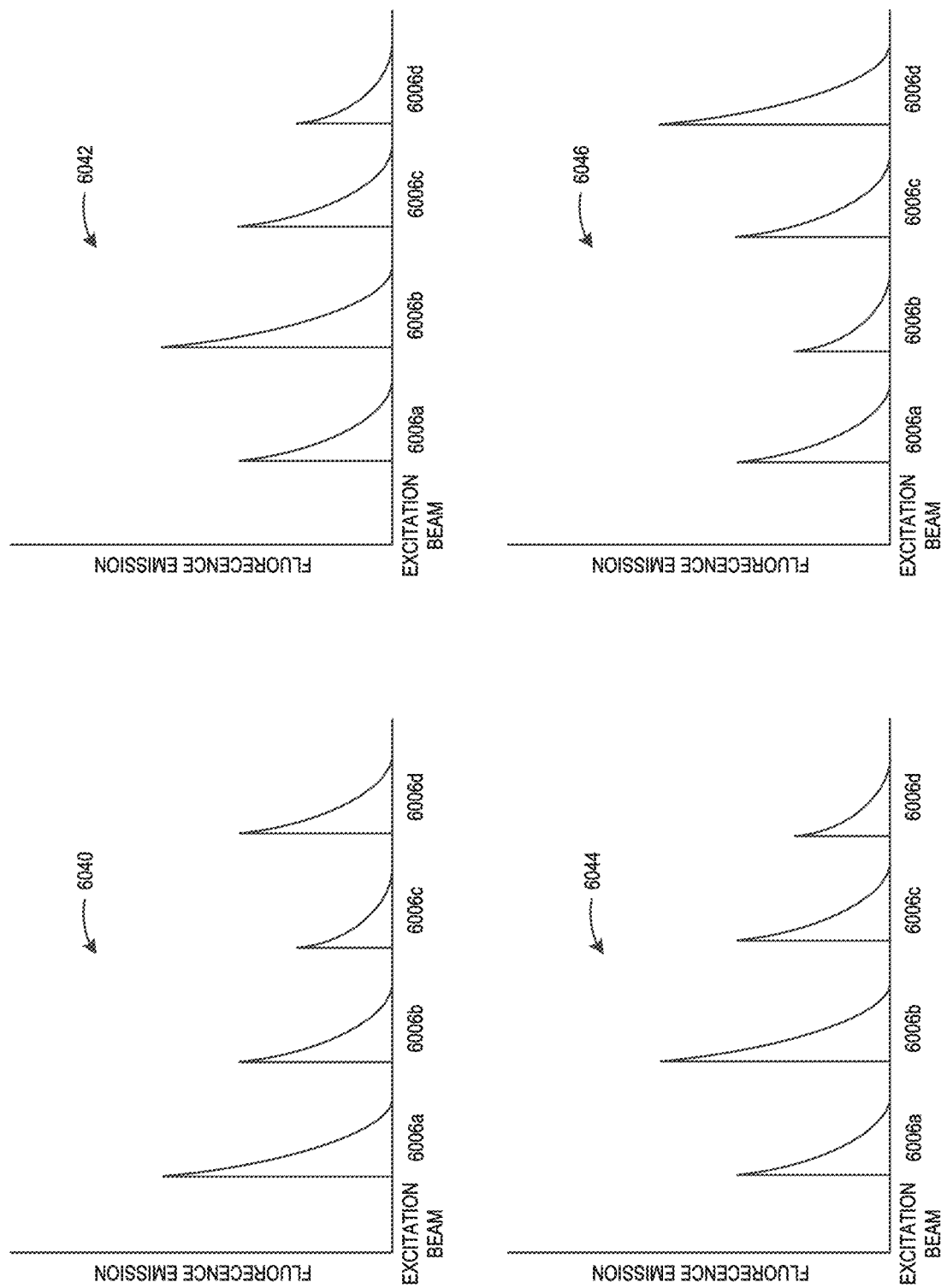
FIG. 6D depicts example signals detected as a result of each of the analyte cell orientations illustrated in FIG. 6C.

FIG. 6D depicts the four sets of fluorescence emission signals that would result from the orientations of the cells 6020, 6022, 6024, and 6026 depicted in FIG. 6C. The pulses represented in chart 6040 represent the fluorescence emission signals corresponding to the cell 6020, and are generally the same as those depicted in FIG. 6B, with the highest pulse being the pulse associated with the laser beam 6006a, which is perpendicular to the surface 6030 of the cell 6020. The pulses represented in the charts 6042 and 6044 represent the fluorescence emission signals corresponding, respectively, to the cells 6022 and 6024, with the highest pulse in each being the pulse associated with the laser beam 6006b, which is perpendicular to the surfaces 6032 and 6034, respectively, of the cells 6022 and 6024. The pulses represented in the chart 6046 represents the fluorescence emission signals corresponding to the cell 6026, with the highest pulse being the pulse associated with the laser beam 6006*d*, which is perpendicular to the surface 6036 of the cell 6026.

Though the signals represented in FIGS. 6B and 6D are not to scale, it should be apparent that the axial orientation of the analyte cells can affect the resultant fluorescence signal at least inasmuch it affects the relative excitation of fluorophores. The differences in fluorophore excitation may affect the fluorescence signal sufficiently to increase the CV, as the differences in fluorescence signal strength may raise the signal to noise ratio (i.e., decrease the magnitude of the noise floor relative to the respective peaks representing the X-chromosome and Y-chromosome bearing cells and, at worse, may overwhelm the signal entirely.

In cases where full saturation of the analyte cells or, more accurately, of the fluorophores in the analyte cells, is achieved, and where collection of the resulting fluorescence signal is isotropic (i.e., orientation independent, as would be the case with an elliptical collection element as used in some embodiments herein described), the effects of the axial orientation of the analyte cells may be minimal. However, saturation is difficult to achieve in some cases, at least due to the complex optical configurations that may be required. The use of multiple laser beam pulses, offset in time in space relative to the orientation of the analyte cell, decreases the dependence of the system on full saturation because, if the analytes are all illuminated on a common face (e.g., the flat face) or, in this case, if the signals considered in determining the relative fluorescence of the analyte cells are all signals from illumination of the common face (e.g., the flat face), then the effects of the orientation of the cell relative to the axis are minimized.

In embodiments, the use of one or more lasers with a high repetition rate (e.g., quasi-continuous wave, QCW, lasers) will excite each cell repeatedly, taking between 10 and 100 samples per cell. For each sample, the system may collect and/or use only the data for the highest detected pulse which, in most cases, would come from a single direction (e.g., from beam 6006*a* in FIG. 6A), because the analyte cells are unlikely to change their axial orientation much during the period in which the analysis takes place. In embodiments, the QCW laser produces very short duration pulses (e.g., picosecond) with a very low duty cycle and a high repetition rate. In some embodiments, the beam pulses are timed such that several fluorescence half-lives elapse between the arrival of each of the separate beam pulses to allow the fluorophores to recover prior to the next beam pulse.

Advantageously, using the methods and systems described herein, the analysis of the analyte cells can be accomplished using less excitation/illumination power than if the saturation of the free carriers is attempted. Additionally, a multi-beam illumination system is easier to configure than a system that illuminates isotropically (i.e., 360 degrees about the cells' long axes). Further, because each of the beams can be a lower power than a single beam intended induce saturation, damage to the flow cell can be reduced (i.e., because a high power laser—such as a 355 nm 150 mW laser—can damage even a quartz flow cell). Still further, the lower power levels that may be used when integrating such analysis of the axial orientation of into cytometry systems and methods result in less damage to the analyte cells which may result in greater viability and/or higher yields.

In some embodiments, the multiple beams that impinge on the analyte cells from multiple directions at offset times are generated from a single laser, as described above with reference to FIGS. 5E, 5F, and 5G. By splitting the laser into multiple beams, each one impinging on the cells from a different angle, the beams will arrive in a staggered fashion due to the finite speed of light, assuming that the optical path distance between the laser 402 and the analysis point 410 is different for each of the beams. In particular, the optical path lengths may be configured such that the difference in the arrival time of each of the beams is determined according to the decay time of the fluorescence signal, to allow the fluorophores to recover before being re-excited. In embodiments, a single detector can be employed (e.g., as described with respect to FIG. 3G), and the detector could be synchronized to the arrival of each sub pulse from each arm. For example, if a 100 MHz QCW laser were split into 4 arms, and the optical paths of the four arms were designed such that the incidence of the light pulses from each arrived at the interrogation point 2.5 ns apart, a detector capturing data at 400 MHz could be set up such that each detector read coincides with a single sub-pulse (i.e., a pulse from a single arm) arriving at the analysis point 410. In an embodiment, such a detector could be configured by synchronizing the pulse from the laser 402 with the detector as described herein, such that every fourth detection is synchronized with pulse from the laser 402 that results in the four sub-pulses arriving at the analysis point 410.

It should also be understood that, while described herein as having four arms, and four sub-pulses impinging on the analytes at the analysis point 410, the system may in various embodiments accomplish the described analysis of the orientation of the cell with fewer or more laser pulses, and there is no requirement that the laser pulses be generated by a single laser. The laser pulses could be generated by different laser devices, and the power of each beam calibrated by optics in the path between the respective laser and the analysis point 410. In any event, in embodiments, for example, two sub-pulses may be sufficient to provide some information about the axial orientation of the cell relative to the flow axis, allowing the system to determine which fluorescence signal to consider for purposes of performing a particular analysis. In such embodiments, depending on the nature of the analysis being performed (i.e., depending on the characteristic being determined), it may be necessary or useful to compare the relative readings of the fluorescence signals generated and detected in response to each pulse. It may also prove useful in embodiments to sum the two pulses, and/or to weight them according to the relative amplitude of each. When the system implements two pulses, separated in time and direction, the general shape of the particles being analyzed may determine the optimal two directions from which the pulses should arrive at the analysis point 410, which directions may be offset by 45 degrees, 60 degrees, 90 degrees, 120 degrees, 135 degrees, 150 degrees, etc. Similarly, three, five, six, seven, eight, nine, ten, or more sub pulses may be optimal, depending on the specificity required and the general shape of the cells. In a particular embodiment, four laser sub pulses are configured to impinge on the analysis point 410 as in FIGS. 6A and 6C, namely, with each beam orthogonal to the flow path at the analysis point 410 and offset from one of the other three beams by 90 degrees, from another of the other three by 135 degrees, and from the last of the other three by either 45 degrees or 135 degrees.

In embodiments, multiple detectors may be used instead of a single detector receiving a signal from a collection mirror having, for example, a first focal point coincident with the analysis point 410 and a second focal point configured to direct the signal to the detector. FIG. 6E depicts one such embodiment 6050. Therein, the laser beams 6006a, 6006b, 6006c, 6006d are each arranged with an associated detector 6052a, 6052b, 6052c, 6052d, respectively, opposite on the opposite side of the cell 6004 from the beam. As in the embodiments that employ a single detector and a collection mirror, embodiments implementing multiple detectors without a collection mirror do not require saturation of the fluorophores, and do not require precise axial orientation of the cells in the flow path. However, unlike the embodiments implementing a single detector and a collection mirror, these embodiments do not require the collector mirror and, advantageously, are compatible with other orthogonal optics arrangements.

In addition to using time- and space-separated laser beams to mitigate effects of axial orientation of analytes in flow (and, hence, decrease the CV of the associated measurements), the embodiments described in this section can also be employed for morphological studies of analytes in flow, providing a depth of live morphological information never before achieved.

In some embodiments, the analyte is examined through laser light by observing the resultant scatter as well as fluorescence. Such scatter is an instantaneous response compared to the fluorescence decay time and may be much more observable, for example brighter in some cases, than fluorescence or other signals.

Figure 6F:
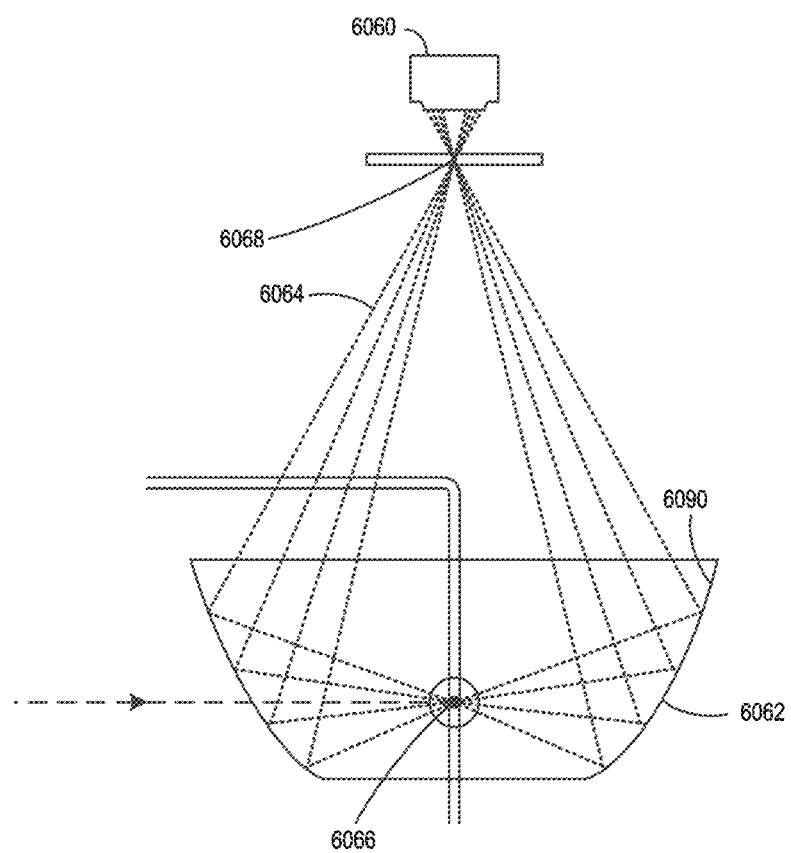
FIG. 6F depicts an embodiment of a detector and mirror setup.
Figure 6G:
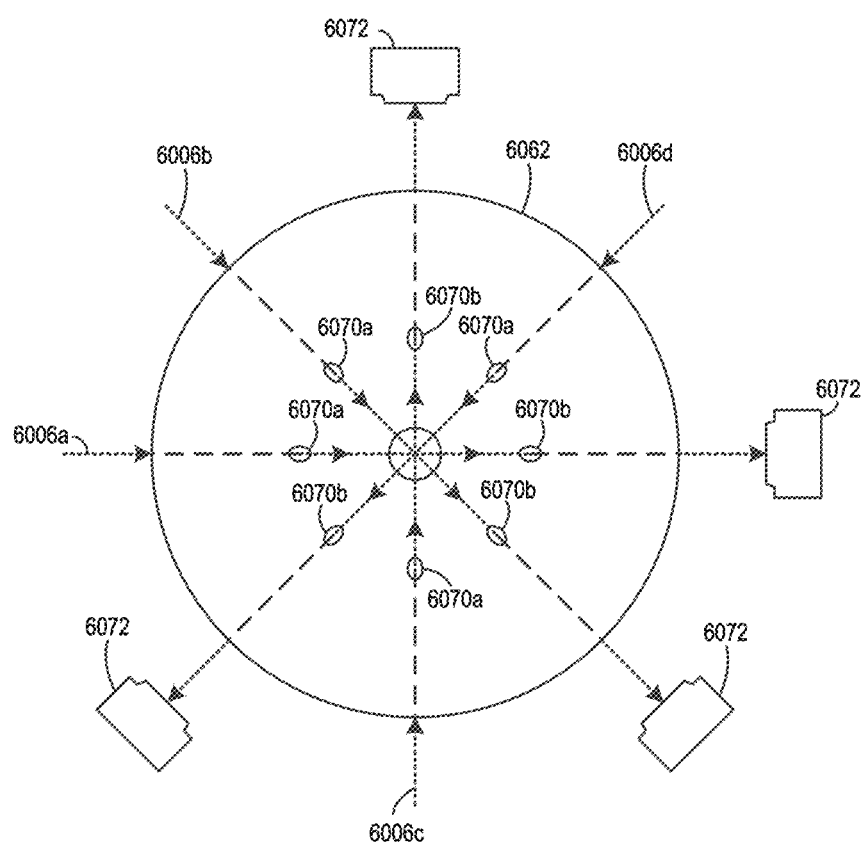
FIG. 6G depicts an embodiment of a detector and mirror setup implementing additional scatter detectors.

With reference to FIG. 6F, which depicts in profile an embodiment of a detector and mirror setup, a cytometry system is configured with a side scatter detector 6060 (by itself or in combination with a fluorescence detector) on the main detection setup, which uses an ellipsoidal mirror 6062 (employed to direct an optical signal 6064 from a first focal point 6066 at the location of the analyte cell to a second focal point 6068 at the location of the detector) for collection. In an embodiment depicted in FIG. 6G, in which the viewpoint is looking down into the mirror 6062 from the direction of the detector 6060, the mirror 6062 includes holes 6070a into which the laser beams 6006a, 6006b, 6006c, 6006d enter the volume defined by the mirror, and holes 6070b opposite each respective hole 6070a, which holes 6070b pass unscattered light. The mirror 6062 forwards scattered light to the detector 6060. In embodiments, a detector 6072 for each arm receives forward scattered light as well, and may be accompanied by an obscuration/blocker bar (not shown) to prevent unscattered light from being detected by the detector 6072 for the arm.

In some embodiments, the incident light beams 6006a, 6006b, 6006c, 6006d (and/or others similar from varying angles) may be linearly or circularly polarized. The detector 6060 may be replaced by two or more detectors detecting light of different polarity. In this way, properties related to the polarity of the scattered light or the fluorescent light (for instance, its depolarization), which is a sensitive measure of both the morphology of the cell overall, as well as of internal components of the cell, can be measured.

In some embodiments of flow cytometric applications, the angular profile of the side scatter from a single beam is observed, potentially with multiple detectors to examine the exitance angular scatter profile. In other embodiments, however, multiple time-separable beams may be used to examine the scatter profile from different incidence angles of light (as described above). While contemplated above as being generally in the same plane (i.e., a plane intersecting the analysis point 410 and orthogonal to the flow axis 6002 at the analysis point 410), in embodiments the laser beams 6006a, 6006b, 6006c, 6006d are not in a plane orthogonal to the flow axis 6002 and/or are not be in a plane at all.

Although one practical embodiment includes the use of a single side scatter detector 6060 (as depicted in FIG. 6F), a surface 6090 of the mirror 6062 can be directly imaged onto an image sensor array (not shown), providing angular scatter profiles for each of the incident beams 6006a, 6006b, 6006c, 6006d. This requires an extremely fast imaging sensor to function properly, or alternatively involves a low resolution array such as a 2×2 PMT array, which can keep up with the high frequency pulse rate of a QCW laser with staggered pulses. Of course, as described above, the high pulse rate and staggered (i.e., time offset) nature of the pulses requires the data collection rate must be higher than would otherwise be the case in order to resolve the effects of each arm of each pulse instead of just each pulse. Additionally, because the QCW laser pulses occur in such quick succession and because each pulse is divided further into time-offset pulses 6006a, 6006b, 6006c, 6006d, the analyte cell 6004 is likely quasi-static during the period over which the time-offset pulses 6006a, 6006b, 6006c, 6006d arrive at the analyte cell 6004. However, over the course of traversing the illumination region, the analyte cell 6004 may rotate or change. Any morphological changes in the analyte cell 6004 would show up in the scatter detector analyses described previously.

Further, any array of detectors, which may be photomultipliers, photodiodes, avalanche photodiodes, etc., can also be set up to filter the incoming light. This could be much like a Bayer filter, multi-pixel photon counter, or any other kind of linear or two-dimensional photosensor array. In some embodiments, each pixel, or selected pixels, has a filter in front of it to select the sensitivity of the photosensor for certain properties of light. For example, such filters might select light with certain polarization properties, or with wavelengths within a selected range. In yet other embodiments, certain elements of the photodetector array, which may be termed 'pixels', are arranged such that each "pixel" splits the beam to two or more detectors for separate analyses. By way of example, and not limitation, such filters could be spectral and/or polarization dependent filters.

Further, the light impinging on any of the said array of detectors may be selected before it impinges on the array of detectors by placing a filter or other optical element in the light path from the analyte, before the array of detectors. In such a way, for example, scattered light and/or fluorescent light may be differentially analyzed by the array of detectors according to the appropriate choice of an optical filter that allows only light of the appropriate wavelength to pass through to the array. For example, and not by way of limitation, the selection of appropriate optical elements in between the sample and the detector array(s) could provide both an angular profile for the polarization and the intensity of the scattered light for each arm, allowing for the motion/alteration of the analyte and any dynamic processes effected by the laser within the analyte to be tracked as the analyte traverses the analysis region or plane.

By way of further example, and not by limitation, forward scatter detectors, with or without blocker bars, could be used on each laser arm and simultaneously with the described system to provide further information on the analytes based on forward scatter properties as well as the amount of light deviated by the analyte.

Overall, the setup described above allows for multiple beams (e.g., the beams 6006a, 6006b, 6006c, 6006d) from the same laser to strike the analyte cell 6004 at different times and at different angles, which may or may not be all in the same plane, and allows the side scatter/fluorescence profiles of the beam interactions to be recorded, providing live morphological information.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A system for performing flow cytometry, the system comprising: a flow cell having an input, an output, and a flow path in fluid communication with the input and the output, the flow cell configured to carry an analyte and having an analysis region disposed along the flow path; an arrangement of optical components configured to deliver to the analysis region two or more beams of pulsed laser energy, each of the two or more beams traveling along a respective optical path and arriving at the analysis region at a time offset from each of the other of the two or more beams, each optical path configured to deliver the beam from the optical path to the analysis region from a different angle relative to the flow path; a detector configured to detect a resultant energy signature occurring in response to each of the two or more beams and to output a signal representative of each of the energy signatures; and an analysis unit configured to receive from the detector each of the signals representative of the energy signals, and to determine from the signals representative of the energy signatures a property of an analyte in the analysis region of the flow cell.

2. A system according to aspect 1, wherein the resultant energy signature occurring in response to each of the two or more beams is a fluorescence signature.

3. A system according to either aspect 1 or aspect 2, wherein the time offset is selected according to a decay time of the resultant energy signature.

4. A system according to any one of aspects 1 to 3, further comprising an elliptical collector element having a first focal point coincident with a center point of the analysis region and a second focal point configured to direct to the detector each of the resultant energy signatures.

5. A system according to any one of aspects 1 to 4, wherein the analyte is a non-human, mammalian sperm cell.

6. A system according to any one of aspects 1 to 5, wherein the arrangement of optical components comprises a QCW laser.

7. A system according to any one of aspects 1 to 6, wherein the arrangement of optical components comprises a laser outputting pulsed laser energy with a wavelength 300 and 400 nm and, preferably, with a wavelength of 355 nm.

8. A system according to any one of aspects 1 to 7, wherein the arrangement of optical components is configured to split pulsed laser energy received from a single laser into the two or more beams of equal power.

9. A system according to any one of aspects 1 to 8, wherein the arrangement of optical components is configured to split pulsed laser energy received from the single laser into four beams of equal power.

10. A system according to either aspect 8 or aspect 9, wherein each of the two or more beams of equal power traverses a different optical path length between the single laser and the analysis region to effect the time offset from each of the other of the two or more beams.

11. A system according to aspect 9, wherein the arrangement of optical components is configured such that the four beams of equal power converge on a center point of the analysis region from different directions, and each beam is orthogonal to the flow path at the analysis point and offset from one of the other three by 90 degrees, from another of the other three by 135 degrees, and from the last of the other three by either 45 degrees or 135 degrees.

12. A system according to any one of aspects 1 to 11, wherein the analyte is a non-human, mammalian sperm cell, and wherein the analysis unit is configured to determine from the signals representative of the energy signals the orientation of the sperm cell by comparing the relative amplitudes of the resultant energy signatures, and selecting the resultant energy signature having the greatest amplitude as representative of a response to an energy beam impinging upon the sperm cell from a direction approximately orthogonal to a flat face of the sperm cell.

13. A system according to any one of aspects 1 to 12, wherein the analysis unit is further configured to determine for the analyte a preferred resultant energy signature and to compare the preferred resultant energy signature to corresponding preferred resultant energy signatures of other analytes to determine a characteristic of the analyte.

14. A system according to aspect 13, wherein the analyte is a non-human, mammalian sperm cell, and wherein the preferred resultant energy signature corresponds to a one of the two or more beams impinging upon the sperm cell from a direction approximately orthogonal to a flat face of the sperm cell.

15. A system according to aspect 1, wherein: the arrangement of optical components is configured to split pulsed laser energy received from a single laser into the two or more beams of equal power, the single laser is a QCW laser emitting pulsed laser energy having a wavelength of 355 nm, the analyte is a non-human, mammalian sperm cell stained with a dye that emits fluorescent energy in response to the pulsed laser energy, the optical paths are configured so that the two or more beams arrive at the analysis region separated in time by an amount determined by the decay time of the fluorescent energy emission, the analysis unit is configured to determine from the signals representative of the energy signatures, which of the optical paths is approximately orthogonal to a flat face of the sperm cell, and the analysis unit is further configured to determine from the signal representative of the energy signal impinging on the sperm cell from the optical path approximately orthogonal to the flat face of the sperm cell whether the sperm cell is X-chromosome bearing or Y-chromosome bearing.

16. A system according to any one of aspects 1 to 15, wherein the detector comprises a separate detector for each of the two or more beams.

17. A system according to any one of aspects 1 to 16, wherein the detector element comprises an array of discrete detectors.

18. A system according to aspect 17, wherein the discrete detectors include optical elements, which discretely select for specified energy states.

19. A system according to aspect 17, wherein the discrete detectors include optical elements, which discretely multiplex for specified energy states.

Illumination/Detection Synchronization

As described above and throughout this specification, flow cytometric methods and other methods relying on irradiation and corresponding measurement of analytes present a number of challenges, particularly with respect to the physical and optical properties of the analytes themselves (e.g., cells). For example, flattened or otherwise asymmetrical cells, such as mammalian epithelial cells, red blood cells, or sperm cells, exhibit anisotropic absorption and emission of energy (e.g., light). The complex geometries of a cell's interior and/or the complex geometries of the cell's boundaries act to refract and/or reflect light in ways that are highly dependent on the orientation or position of the cell with respect to any sources of radiation and/or detectors used to differentiate between cells. This is one source of variation that contributes to the overall CV of the system, increasing the difficulty of measuring the signal of interest.

In the case of sperm cells being analyzed to identify X- and Y-chromosome bearing cells in the population, for example, the fluorescence signal indicates the amount of a dye (Hoechst 33342) bound to DNA in the cells, with Y-chromosome bearing cells having slightly less DNA and, as a result, slightly less fluorescence due to a lesser amount of DNA-bound dye. However, the difference between the fluorescence signal of X- and Y-chromosome bearing cells is small—approximately 3.7% in bovine cells—and, accordingly, small variations in the fluorescence signal, which are the result of various complicating factors, can have an impact big enough prevent the accurate determination of which sex chromosome is present in a cell. The anisotropic nature of the fluorescent signal (i.e., the fact that the detected signal is different from different angles relative to the cell) is one such complicating factor.

The optics of the cytometry system can also contribute to the overall CV of the system. Flow cytometry sorting systems frequently employ a core-in-sheath fluidic mechanism to carry the cells through the detection region. A relatively slow moving stream of an aqueous suspension of cells is injected by a fixed conduit tube into a relatively faster moving flow of sheath fluid. In some embodiments, the stream of the aqueous suspension of cells is injected by the conduit tube at a speed that is equal to the flow of sheath fluid. This arrangement focuses the cells into a stream, referred to as the core stream. With appropriate selection of the pressures, of the shape, dimensions, orientation, and materials of the boundaries and components of the fluidic system, and the consequent velocities and organization of the core suspension and sheath fluid, the core stream is narrowed by hydrodynamic forces exerted by the sheath flow, and the cells in the core stream are distributed longitudinally such that they are carried mostly one by one in the flow. While the detection optics in a flow cytometric system may be optimized to capture as much signal as possible from a sample suspended in a core-in-sheath flow, the optics are frequently tuned so that they are sensitive only to a very small region. Accordingly, even minute movements of the core stream within the core-in-sheath flow can have disproportionate impacts on the signal collected and detected and, in any event, can add to the CV of the system.

An additional set of factors that can contribute negatively to the CV (i.e., cause an increased CV) includes that the decay time of the emitted signal (e.g., the fluorescence signal) may be very short, on the order of a few nanoseconds. The Hoechst 33342 stain used in flow cytometry and sorting of sperm cells, for instance, has a fluorescence lifetime (i.e., the time it takes the fluorescence signal to decay to 36.8%) of 1.05 ns for single stranded DNA and 2.2-2.6 ns for double stranded DNA. This may be important for systems in which elements of the excitation and/or detection systems have time-varying properties. For example, the decay of excited fluorescent light from molecules of a fluorescent analyte in a sample becomes synchronized when the excitation of fluorescence is accomplished by means of an excitation light source that is rapidly switched off. Light sources with such a characteristic include Q-switched lasers, excimer lasers, mode-locked lasers, gain switched lasers, and other kinds of lasers that emit light in pulses that are very brief and/or are switched off in a brief time relative to the fluorescence half time of many fluorescent analytes. The quantity of fluorescence light becomes time-variant when such a source switches off, decaying over time from some initial value, according to the fluorescent half time of the fluorochrome. The fluorescence may thus decay significantly or completely before the next pulse of light excites an increased fluorescence from the analyte. Light detectors, for example photomultiplier tubes, photodiodes, charge coupled devices, phototransistors, and many others, may be used to measure emitted fluorescent light. Such detectors may have time-variant properties as well, for example properties related to the rate at which signals from such detectors are summed and/or the rate at which signals are digitized. It is apparent that even small temporal differences in the detection of a time-variant fluorescent signal by a time-variant detection system may make a significant difference in the quantity of the detected signal. Thus, it turns out that even exceptionally small variations in the detection time relative to the timing of the decay of a fluorescence signal in a system excited by a light source that switches off, can have a large effect on the quantity of the detected fluorescence signal.

FIG. 7A illustrates the issue and depicts an example (though not entirely to scale) set of fluorescence signals. In general, an illumination source (e.g., a laser), if operating at a high enough frequency relative to the movement of the analytes, will emit a number of pulses that will impinge on each of the analytes as each analyte passes through the analysis region. By way of example, for Hoechst 33342 dye bound to DNA in a set of mammalian sperm cells flowing past an analysis point, each pulse of an illumination laser emitting energy with a wavelength of 355 nm will cause the dye to fluoresce. Each of the fluorescence pulses will be characterized by a sharp increase in emitted fluorescence, followed by a peak and an exponential (or near exponential) decay. FIG. 7A illustrates a potential set 7100 of fluorescence pulses 7102 resulting from respective illumination pulses 7101 impinging one or more stained cells passing through the analysis region. If the x-axis of FIG. 7A is time, the set 7100 of pulses 7102 may represent the pulses associated with a single analyte cell moving into and then out of the analysis region, the cytometer configured to maximize collection of the fluorescence from the cell at the center of the analysis region, to prevent fluorescence from other, adjacent analyte cells from causing interference. In FIG. 7A, each of the pulses 7102 is digitized (e.g., using an analog-digital converter receiving a signal from an analog detector) at a point 7104. The point 7104 may in principle be chosen to be the point of peak fluorescence in the event that the detector is synchronized with the laser pulse 7101, or it may be chosen to be another consistent point on the exponential decay curve, or it may be unsynchronized with the laser pulse, depending on the timing of the digitization event.

In this way, it will be appreciated, though, that in a free-running detection system as is typical in cytometry applications, the digitization of the fluorescence pulses 7102 may not occur at the same time for each fluorescence pulse 7102, or may not occur at the peak of each fluorescence pulse 7102. For instance, the illumination source (e.g., the laser) may be triggered using an internal clock signal in the illumination source, running at, for example, 100 MHz. The digitizer (e.g., an analog digital converter) may also be sampling at a rate of 100 MHz on its own 100 MHz clock signal. If the two clock signals have identical frequencies, but are out of phase, the sampling of each fluorescence pulse 7102 may occur at a point 7106 in the fluorescence pulse 7102 that is not at the peak 7104. Appreciating that the fluorescence signal decays rapidly (almost 70% in 2.5 ns), and that there is 10 ns between each pulse at 100 MHz, if the clock signals of the illumination source and the digitizer are out of phase by even a small amount, the sampled pulses 7102 would appear much weaker, as illustrated in FIG. 7A by the set of samples 7106 represented by triangles. In that case, the samples 7106 result in the same general pulse shape, but with a lower overall magnitude. Keeping in mind that the difference between difference between the fluorescence signal emitted by analyte cells bearing X-chromosomes and that emitted by analyte cells bearing Y-chromosomes is marginal—about 3.7%, as mentioned above—a phase difference between the clock signals of the illumination and digitization circuits could make it significantly more difficult to distinguish between the two analyte types.

Further, the illumination source (e.g., the laser) may be triggered using an internal clock signal in the illumination source, running at, for example, 100 MHz. The digitizer (e.g., an analog digital converter) may be sampling at a different frequency, for example a lower or higher frequency, for example 150 MHz. Alternatively, the illumination source and digitizer may have nominal frequencies that are the same (e.g., 100 MHz) but, because each is triggered off its own clock signal, it is possible (and even likely) that the clock signals will not each be precisely the same. When the two clock signals have different frequencies, the collected data will represent sampling at inconsistent points on the fluorescence rise- and decay-curve, as is illustrated in FIG. 7A. In FIG. 7A, the clock associated with the digitizer is operating not at 100 MHz, but at some frequency higher than 100 MHz. (For purposes of illustration, the frequency is significantly higher.) The resulting samples 7108, represented by "x" in FIG. 7A, result in a different pulse shape, and usually a lower overall magnitude. Keeping in mind that the difference between the fluorescence signal 7102 emitted by analyte cells bearing X-chromosomes and that emitted by analyte cells bearing Y-chromosomes is marginal—about 3.7%, as mentioned above—a frequency difference between the clock signals of the illumination and digitization circuits could make it significantly more difficult to distinguish between the two analyte types.

By way of example, FIG. 7B depicts a block diagram of one embodiment of a sorting cell cytometer 7110 having a free-running detector (i.e., a detector that triggers on its own clock cycle at some pre-determined frequency). Generally speaking, in the sorting cell cytometer 7110, stained cells 7112 enter a flow cell 7114. As will be generally understood, the flow cell 7114 has an input, an output, and a flow path in in fluid communication between the input and the output, and is configured to create in the flow path a core-in-sheath flow in which the core carries one or more analytes. An excitation laser 7116 (e.g., a 355 nm laser) provides an illumination energy (also referred to as an excitation energy) that excites fluorophores in the dye and causes the stained cells 7112 and, more specifically, the dye with which the cells are stained, to emit fluorescence 7118. In a digitizer stage 7124, the fluorescence 7118 is detected by a detector 7120, and the detected signal amplified by an amplifier 7122. The detected and amplified signal is used to control a sort trigger 7126 that, in turn, controls a sort mechanism 7128. The sort mechanism performs a sorting operation to yield sorted cells 7130.

Importantly, and as mentioned above, the detector 7120 is free-running in the sorting cell cytometer 7110. As a result, the detector 7120 likely does not detect the fluorescence 7118 at the same point in the decay of the fluorescence signal. This is likely the case, even when the excitation laser 7116 and the detector 7120 are operating at the same nominal frequency (e.g., 100 MHz). For example, as will be understood, if the excitation laser 7116 is operating at a pulse rate of 100 MHz, it will trigger off its own clock signal (i.e., off a clock signal generated by a free-running clock chip associated with the excitation laser 7116). At the same time, if the detector 7120 is operating at a detection rate of 100 MHz, it will trigger off a clock signal associated with the detector 7120. Because the respective clock signals that trigger the pulse of the illumination laser 7116 and the detector 7120 may vary relative to one another, the detection of individual fluorescence pulses emitted by the dye in response to individual pulses of the illumination laser 7116 will vary as well. As a result, the CV of the detected signal is higher than optimal because of the variation in the detected fluorescence signal strength.

Accordingly, a system described in the present embodiments facilitates more precise measurement of an optical property, in this case fluorescence, by triggering the collection of data on the actual light pulses emitted by an illumination laser, thereby resulting in more accurate measurement of the fluorescence signal because the signal will be measured over substantially the same interval of excitation and fluorescence emission decay, resulting in greater consistency and an improved CV. One such embodiment of the presently described system is illustrated in FIG. 7C.

FIG. 7C depicts a block diagram of a system 7150 having synchronized illumination and detection. Broadly speaking, in the system 7150, data acquisition system (e.g., a digitizer 7152) is synchronized to a synchronization signal 7154 from an illumination laser 7156. More specifically, stained cells 7158 enter a flow cell 7160. The flow cell 7160, like the flow cell 7114, includes in input, an output, and a flow path in fluid communication with the input and output, and is configured to create in the flow path a core-in-sheath flow in which the core carries one or more analytes. The excitation laser 7156 provides an illumination energy 7162 (also referred to as an excitation energy) that excites fluorophores in the dye and causes the stained cells 7158 and, more specifically, the dye with which the cells are stained, to emit fluorescence 7164. Of course, it will be understood that the excitation energy is directed at the analytes. At the same time, a synchronization circuit, which may include a fast photodiode 7166, detects a portion of the signal emitted by the excitation laser 7156. The synchronization circuit, which may also include an amplifier and comparator 7168, generates the corresponding synchronization signal 7154. The synchronization circuit generates a synchronization signal in response to each pulse of the illumination energy 7162 generated by the excitation laser 7156. While the wavelength of the beam emitted by excitation laser 7156 is 355 nm in some embodiments (e.g., in embodiments in which the stained cells 7158 are stained with Hoechst 33342 dye), the embodiment depicted in FIG. 7C is not intended to be limited to a particular wavelength, and may, for example, be between 300 and 400 nm, in various embodiments. Likewise, the excitation laser 7156 may, in some embodiments, be a QCW laser and/or the excitation laser 7156 may be operating in a pulsed mode of operation at any of a variety of frequencies. In a specific embodiment, the excitation laser 7156 is a QCW laser operating in pulsed mode at a frequency of 100 MHz, but in general may operate between 75 and 150 MHz. For a laser operating at a pulse frequency of 100 MHz, the synchronization signal 7154 would be a corresponding 100 MHz synchronization signal.

At the same time, a detector 7170 detects the fluorescence 7164, and an amplifier 7172 amplifies the signal output by the detector 7170, and sends the amplified signal to a digitizer circuit 7152 that digitizes the amplified signal for analysis. In specific embodiments, the detector 7170 is an avalanche photodiode. The digitizer 7152 may be a digitizer operable at a frequency higher than that of the excitation laser 7156 and, in embodiments, is operable at frequencies at least twice that of the excitation laser 7156. In an embodiment, the digitizer circuit 7152 operates at 250 MHz. While the digitizer circuit 7152 may be any digitizer operable at a frequency higher than that of the excitation laser 7156 and capable of accepting the external synchronization signal 7154, there is no requirement that the digitizer circuit 7152 be a module discrete from the rest of the system. That is, the digitizer circuit 7152 may be embedded in the system as a whole and, in fact, may be a field programmable gate array (FPGA) programmed to accept the various signals (e.g., the analog signal from the amplifier 7172, the synchronization signal 7154, etc.), perform the various calculations and analysis required (described below), and output signals such as a sort trigger (also described below). The digitizer circuit 7152 may also be an application specific integrated circuit (ASIC), a digital signal processor (DSP), or any other computational device that is specially programmed to receive the inputs, provide the outputs, and perform the functions required of the digitizer circuit 7152.

In some embodiments, a variable delay of up to 10 nS could be incorporated at the output of the comparator 7168, which delay may be used to control exactly where the acquisition window occurs with respect to the output of the detector 7170 by adjusting the precise timing of the synchronization signal 7154. This would allow for, for example, variance in the timing of excitation pulses and fluorescence detection that may occur as a result of the finite speed of light and the time that a fluorescence pulse may take to arrive at the detector 7170, relative to the time of the emission of the excitation pulse by the excitation laser 7156.

In any event, as will be understood, the digitizer circuit 7152 is programmed and/or configured to receive an analog signal (e.g., the analog signal output by the amplifier 7172 and representative of the fluorescence signal 7164 emitted by the dye in the stained cells 7158), and convert the analog signal into a digital value upon which various calculations and/or analysis may be performed. The digitizer circuit 7152 digitizes the analog signal from the amplifier 7172 at a frequency determined according to the synchronization signal 7154 (e.g., according to the frequency of pulses output by the excitation laser 7156 which, in some embodiments, is 100 MHz).

The digitizer circuit 7152 may include a module 7174 for computing histograms representative of the digitized signals. The module 7174 may create a histogram, for example, that includes fluorescence data collected (and digitized) over the course of a specific window of time. The window of time may be a predetermined value, measured in samples (e.g., 10 samples, 50 samples, 100 samples, etc.), measured in absolute time (e.g., 100 ns, 1 ms, 5 ms, 10 ms, etc.), or measured in some other metric or a combination of metrics. As but one example, the window of time corresponding to a particular histogram may include all samples until samples exceed a particular statistical metric (such as mean, standard deviation, etc.), until some number of consecutive samples exceeds a statistical metric, until some number of samples within a period of time exceeds a statistical metric, etc. In any event, when the window of time is exceeded, the module 7174 may begin computing a new histogram, either from new incoming data, or from new incoming data and some amount of data from the previous histogram.

A sort trigger module 7176 in the digitizer circuit 7152 uses the histogram data output by the histogram module 7174 to categorize the analyte and output a sort trigger signal according the determination. The sort trigger module 7176 may use the histogram data by, for example, analyzing a single detected fluorescence signal relative to a distribution of detected fluorescence signal strengths over a number of samples. Thus, if, for a recent window of time, a distribution of detected fluorescence signal samples indicates two distinct peaks in the data (corresponding, in some embodiments, to non-human mammalian sperm cells bearing, respectively, X- and Y-chromosomes, then the sort trigger module 7176 may categorize a most-recently acquired sample according to which population is most resembles, and may output a corresponding signal.

The signal output by the sort trigger module 7176 may control a sort mechanism 7178, and may cause the sort mechanism 7178 to act on an analyte (e.g., a cell) according to whether the cell is in a desired set. By way of example, if the system is set to differentiate X- and Y-chromosome bearing sperm cells, the sort mechanism 7178 may cause the cells to be separated (e.g., by droplet sorting, by fluidic switching, etc.) or may cause a non-selected set to be deactivated and/or destroyed (e.g., using a laser beam to ablate, destroy, or otherwise render unviable and/or immotile).

In particular embodiments, the sort mechanism 7178 comprises a laser configured to selectively target cells in the non-selected set, and the laser triggers on the signal output by the sort trigger module 7176. The beam output by the laser sort mechanism 7178 may be, for example, of a wavelength between 200 and 300 nm and, in specific embodiments, may have a wavelength of 266 nm. In embodiments, the sort mechanism 7178 includes an acousto-optic modulator (AOM) in optical communication with such a laser, and the AOM selectively deflects a laser beam emitted by the laser according to the signal output by the sort trigger module 7176. The selective impingement of the laser (or the selective application of a sorting mechanism other than the laser) on the undesired cells yields a population of sorted cells 7180.

Figure 7D:
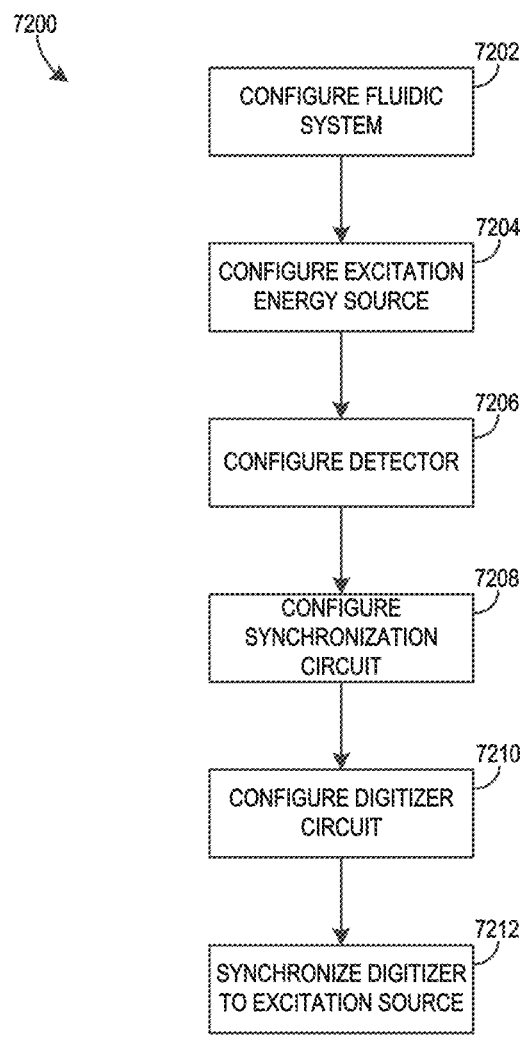
FIG. 7D is a flow chart depicting a method for performing flow cytometry.

Turning now to FIG. 7D, a flow chart depicts a method 7200 for performing flow cytometry. Though the method 7200 depicts a progression of steps, it is not necessary that the steps are performed specifically in the order depicted or described, and those of ordinary skill will understand that the steps of the method may be performed in any suitable order, according to the dependencies that will be evident. In the method 7200, a fluidic system is configured to inject a core flow into a flow of sheath fluid to form a core-in-sheath flow in a flow cell (block 7202). The core flow includes an analyte that may be, for example, a sample containing a train of analytes (e.g., sperm cells) for analysis. The method 7200 also includes configuring an excitation energy source to emit pulsed excitation energy directed to the analyte (block 7204), and configuring a detector to detect from the analyte each of a plurality of signals emitted in response to the pulsed excitation energy (block 7206). The signals emitted in response the pulsed excitation energy are generally indicative of a characteristic of the analyte, such as the amount of DNA carried by a particular cell, whether the cell has an X-chromosome or a Y-chromosome, etc.

Still referring to FIG. 7D, a synchronization circuit is also configured (block 7208) such that the synchronization circuit generates a synchronization signal in response to each pulse of the pulsed excitation energy emitted by the excitation energy source. Configuring the synchronization circuit may include setting up a fast photodiode and, in some embodiments, an amplifier and a comparator, to generate the synchronization signal. A digitizer circuit is configured to digitize a representation of the signals emitted in response to the pulsed excitation energy (block 7210). The digitizer has an input responsive to the synchronization signals and an input coupled to the detector. Using the synchronization signal, the digitizer can synchronize the digitization of the signal output by the detector (block 7212), such that each of the signals emitted in response to the pulsed excitation energy (e.g., each of the fluorescence signals) is digitized at a fixed time relative to the pulse of excitation energy that resulted in the respective signal.

Figure 7E:
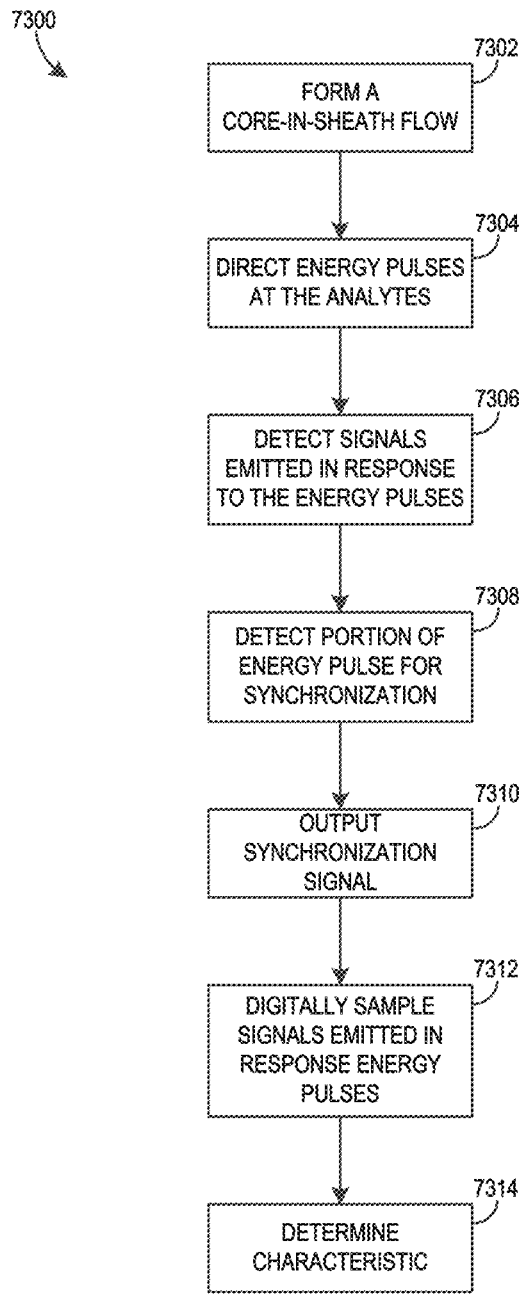
FIG. 7E is a flow chart depicting another method for performing flow cytometry.

In a variation on the method 7200, FIG. 7E depicts a method 7300 of performing flow cytometry. In the method 7300, a core-in-sheath flow is formed in a flow cell by injecting a core flow including a plurality of analytes into a flow of sheath fluid (block 7302). A train of energy pulses emitted by an excitation energy source is directed at the analytes (block 7304). One or more signals emitted from each of the analytes in response to the train of energy pulses is detected (block 7306). Each of the one or more signals emitted from the analytes is indicative of a characteristic of the analyte. The method 7300 also includes detecting a portion of each of the energy pulses emitted by the excitation energy source (block 7308). The detection of the portion of each of the energy sources occurs in a synchronization circuit that includes, in embodiments, a fast photodiode and, in some embodiments an amplifier and a comparator. The synchronization circuit outputs a synchronization signal (block 7310).

The synchronization signal is utilized to trigger digital sampling of the one or more signals emitted in response to the train of energy pulses (block 7312), from which digital samples a characteristic of the analyte is determined (block 7314).

It will be understood that the synchronization methods and systems described in the paragraphs above may have particular application with respect to the synchronization of digitization and illumination in many of the embodiments contemplated throughout this specification and, specifically, in embodiments described under the heading "Multi-Beam Orientation and Morphology Analysis."

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A system for performing flow cytometry, the system comprising: a flow cell having an input, an output, and a flow path in fluid communication with the input and the output, the flow cell configured to create in the flow path a core-in-sheath flow carrying, in a core of the core-in-sheath flow, an analyte; an excitation energy source configured to emit pulsed excitation energy directed to the analyte; a detector configured to detect from the analyte each of a plurality of signals emitted in response to the pulsed excitation energy, the signals emitted in response to the pulsed excitation energy being indicative of a characteristic of the analyte; a synchronization circuit configured to generate a synchronization signal in response to each pulse of the pulsed excitation energy emitted by the excitation energy source; and a digitizer circuit having an input responsive to the synchronization signal and configured to digitize a representation of each signal emitted in response to the pulsed excitation energy.

2. A system according to aspect 1, wherein the analyte comprises non-human, mammalian sperm cells.

3. A system according to aspect 1 or aspect 2, wherein the excitation energy source is a QCW laser.

4. A system according to any one of aspects 1 to 3, wherein the excitation energy source is configured to emit a pulsed laser beam.

5. A system according to claim any one of aspects 1 to 4, wherein the excitation energy source emits energy with a wavelength between 300 and 400 nm and, preferably, with a wavelength of 355 nm.

6. A system according to any one of aspects 1 to 5, wherein the excitation energy source has a pulse frequency of between 75 and 150 MHz and, preferably, a pulse frequency of 100 MHz.

7. A system according to any one of aspects 1 to 6, wherein the detector is an avalanche photodiode.

8. A system according to any one of aspects 1 to 7, wherein the detector is configured to detect from the analyte a fluorescence signal emitted in response to the pulsed excitation energy.

9. A system according to any one of aspects 1 to 8, further comprising an amplifier circuit receiving as an input a signal from the detector.

10. A system according to any one of aspects 1 to 9, wherein the synchronization circuit comprises a fast photodiode optically coupled to the excitation energy source.

11. A system according to any one of aspects 1 to 10, wherein the synchronization circuit comprises an amplifier and a comparator electrically coupled to a fast photodiode optically coupled to the excitation energy source.

12. A system according to any one of aspects 1 to 11, wherein the digitizer circuit has a frequency higher than the pulse frequency of the excitation energy source.

13. A system according to any one of aspects 1 to 12, wherein the digitizer circuit comprises a module configured to generate a histogram representative of a plurality of signals received from the detector.

14. A system according to any one of aspects 1 to 13, wherein the digitizer circuit is configured to determine a characteristic of the analyte according to a plurality of signals received from the detector.

15. A system according to any one of aspects 1 to 14, the system being further operable to perform a sorting function, and further comprising: a sort trigger module that selectively transmits a sort trigger signal according to a plurality of signals received from the detector and analyzed in the digitizer circuit; and a sort mechanism configured to perform a sorting action according to the sort trigger signal.

16. A system according to aspect 15, wherein the sort mechanism comprises an energy source.

16A. A system according to aspect 16, wherein the energy source is a laser.

17. A system according to any one of aspects 15, 16, or 16A wherein the sort mechanism comprises an acousto-optic modulator.

18. A system according to any one of aspects 15 to 17, wherein the sort mechanism comprises a laser outputting energy with a wavelength of 200 to 300 nm and, preferably, with a wavelength of 266 nm.

19. A system according to any one of aspects 1 to 18, wherein the digitizer circuit comprises a field-programmable gate array.

20. A system according to any one of aspects 1 to 19, wherein the analyte is a non-human, mammalian sperm cell, and the characteristic of the analyte is the sex chromosome carried by the analyte.

21. A method for performing flow cytometry, the method comprising: configuring a fluidic system to inject a core flow including an analyte into a flow of sheath fluid to form, in a flow cell, a core-in-sheath flow; configuring an excitation energy source to emit pulsed excitation energy directed to the analyte; configuring a detector to detect from the analyte each of a plurality of signals emitted in response to the pulsed excitation energy, the signals emitted in response to the pulsed excitation energy being indicative of a characteristic of the analyte; configuring a synchronization circuit to generate a synchronization signal in response to each pulse of the pulsed excitation energy emitted by the excitation energy source; configuring a digitizer circuit to digitize a representation of the signals emitted in response to the pulsed excitation energy, the digitizer circuit having an input responsive to the synchronization signals; and synchronizing to the synchronization signal the digitization of each of the signals emitted in response to the pulsed excitation energy, such that each of the signals emitted in response to the pulsed excitation energy is digitized at a fixed time relative to the pulse of excitation energy that resulted in the respective signal emitted in response to the pulsed excitation energy.

22. A method according to aspect 21, wherein the analyte comprises non-human, mammalian sperm cells.

23. A method according to either aspect 21 or aspect 22, wherein the excitation energy source is a QCW laser.

24. A method according to any one of aspects 21 to 23, wherein the excitation energy source is configured to emit a pulsed laser beam.

25. A method according to any one of aspects 21 to 24, wherein the excitation energy source is emits energy with a wavelength between 300 and 400 nm and, preferably, with a wavelength of 355 nm.

26. A method according to any one of aspects 21 to 25, wherein the excitation energy source has a pulse frequency of between 75 and 150 MHz and, preferably, a pulse frequency of 100 MHz.

27. A method according to any one of aspects 21 to 26, wherein the detector is an avalanche photodiode.

28. A method according to any one of aspects 21 to 27, wherein configuring the detector comprises configuring the detector to detect from the analyte a fluorescence signal emitted in response to the pulsed excitation energy.

29. A method according to any one of aspects 21 to 28, further comprising configuring an amplifier circuit to receive as an input a signal from the detector.

30. A method according to any one of aspects 21 to 29, wherein the synchronization circuit comprises a fast photodiode optically coupled to the excitation energy source.

31. A method according to any one of aspects 21 to 30, wherein the synchronization circuit comprises an amplifier and a comparator electrically coupled to a fast photodiode optically coupled to the excitation energy source.

32. A method according to any one of aspects 21 to 31, wherein the digitizer circuit has a frequency higher than the pulse frequency of the excitation energy source.

33. A method according to any one of aspects 21 to 32, further comprising configuring a module of the digitizer circuit to generate a histogram representative of a plurality of signals received from the detector.

34. A method according to any one of aspects 21 to 33, further comprising configuring the digitizer circuit to determine a characteristic of the analyte according to a plurality of signals received from the detector.

35. A method according to any one of aspects 21 to 34, further comprising: configuring the system to perform a sorting function; configuring a sort trigger module to selectively transmit a sort trigger signal according to a plurality of signals received from the detector and analyzed in the digitizer circuit; configuring a sort mechanism to perform a sorting action according to the sort trigger signal; and sorting the analyte.

36. A method according to aspect 35, wherein the sort mechanism comprises a laser.

37. A method according to either aspect 35 or aspect 36, wherein the sort mechanism comprises an acousto-optic modulator.

38. A method according to any one of aspects 35 to 37, wherein the sort mechanism comprises a laser outputting energy with a wavelength of 200 to 300 nm and, preferably, with a wavelength of 266 nm.

39. A method according to any one of aspects 21 to 38, wherein configuring the digitizer circuit comprises programming a field-programmable gate array.

40. A method according to any one of aspects 21 to 39, wherein the analyte is a non-human, mammalian sperm cell, and the characteristic of the analyte is the sex chromosome carried by the analyte.

41. A method for performing flow cytometry, the method comprising: injecting a core flow including a plurality of analytes into a flow of sheath fluid to form, in a flow cell, a core-in-sheath flow; directing at the analytes a train of energy pulses emitted by an excitation energy source; detecting from each analyte one or more signals emitted in response to the train of energy pulses, the one or more signals indicative of a characteristic of the analyte; detecting in a synchronization circuit a portion of each of the energy pulses emitted by an excitation energy source; outputting from the synchronization circuit a synchronization signal in response to each of the energy pulses emitted by the excitation energy source; digitally sampling the one or more signals emitted in response to the train of energy pulses according to the synchronization signal; and determining the characteristic of the analyte according to the digital samples.

42. A method according to aspect 41, wherein the analytes comprise non-human, mammalian sperm cells.

43. A method according to either aspect 41 or aspect 42, wherein the excitation energy source is a QCW laser.

44. A method according to any one of aspects 41 to 43, wherein the excitation energy source is configured to emit a pulsed laser beam.

45. A method according to any one of aspects 41 to 44, wherein the train of energy pulses comprise a train of energy pulses each having a wavelength between 300 and 400 nm and, preferably, each having a wavelength of 355 nm.

46. A method according to any one of aspects 41 to 45, wherein the train of energy pulses comprise a train of energy pulses having a frequency of between 75 and 150 MHz and, preferably, a pulse frequency of 100 MHz.

47. A method according to any one of aspects 41 to 46, wherein detecting from each analyte one or more signals emitted in response to the train of energy pulses comprises detecting the one or more signals using an avalanche photodiode.

48. A method according to any one of aspects 41 to 47, wherein detecting from each analyte one or more signals emitted in response to the train of energy pulses comprises detecting fluorescence signals emitted in response to the energy pulses.

49. A method according to any one of aspects 41 to 48, further comprising amplifying the one or more detected signals.

50. A method according to any one of aspects 41 to 49, wherein detecting a portion of each of the energy pulses comprises detecting the portion of each of the energy pulses in a fast photodiode optically coupled to the excitation energy source.

51. A method according to any one of aspects 41 to 50, further comprising sorting the plurality of analytes according to the determined characteristic.

52. A method according to any one of aspects 41 to 51, further comprising: generating a sort trigger according to the determined characteristic; transmitting the sort trigger to a sort mechanism; and sorting the plurality of analytes according to sort trigger.

53. A method according to aspect 52, wherein the sort mechanism comprises a laser.

54. A method according to either aspect 52 or aspect 53, wherein the sort mechanism comprises an acousto-optic modulator.

55. A method according to any one of aspects 52 to 54, wherein the sort mechanism comprises a laser outputting energy with a wavelength of 200 to 300 nm and, preferably, with a wavelength of 266 nm.

56. A method according to any one of aspects 41 to 55, wherein the plurality of analytes comprise non-human, mammalian sperm cells, and wherein the characteristic of the analyte is the sex chromosome carried by the analyte.

57. A system for performing flow cytometry, the system comprising: a flow cell having an input, an output, and a flow path in fluid communication with the input and the output, the flow cell configured to carry an analyte and having an analysis region disposed along the flow path; an arrangement of optical components configured to deliver to the analysis region two or more beams of pulsed laser energy, each of the two or more beams traveling along a respective optical path and arriving at the analysis region at a time offset from each of the other of the two or more beams, each optical path configured to deliver the beam from the optical path to the analysis region from a different angle relative to the flow path; a detector configured to detect a resultant energy signature occurring in response to each of the two or more beams and to output a signal representative of each of the energy signatures; a synchronization circuit configured to generate a synchronization signal in response to each pulse of the pulsed excitation energy emitted by the excitation energy source; a digitizer circuit having an input responsive to the synchronization signal and configured to sample the output signal from the detector to generate a digital representation of each signal emitted in response to the pulsed excitation energy; and an analysis unit configured to receive from the digitizer each of the digital representations, and to determine from the digital representations a property of an analyte in the analysis region of the flow cell.

58. A system according to aspect 57, further comprising any one of aspects 1 to 20 and/or any one of aspects 2 to 19 under the previous section.

Methods for Balancing Yield and Purity

Optical systems and methods for sorting analytes and, specifically, the configuration and operation of optical systems producing pulsed radiation, which pulsed radiation selectively neutralizes (kills, immobilizes, destroys, etc.) certain analytes traveling in a stream will now be described. In particular, optical systems may modulate a laser to either direct pulses of radiation at the analytes traveling in the stream or direct the pulses of radiation away from the analytes traveling in the stream. The pulses of radiation, when directed at the analytes, irradiate analytes at a sorting point so as to neutralize the analytes. In this manner, optical systems may produce sorted streams of analytes including: (i) desired analytes unaltered by the pulses of radiation (e.g., viable sperm cells possessing X chromosomes); and (ii) undesired analytes neutralized by the pulses of radiation (e.g., killed, immobilized, or otherwise neutralized sperm cells possessing Y chromosomes). A computing device may control the modulation of the laser to produce the pulses of radiation based on dynamically determined properties of the analytes and a pre-determined selection strategies.

In some implementations, the laser may emit radiation in the form of pulses of radiation, where the pulses of radiation have a repetition rate that is similar to or greater than a rate at which analytes pass the sorting point. That is, if directed at the analytes, each analyte may be irradiated by a particular set of pulses (e.g., including one or more pulses) different than sets of pulses that irradiate other analytes. Optical systems may individually determine whether or not to neutralize analytes and selectively modulate pulses based on the determinations for each analyte, in these implementations.

In other implementations, the laser may emit radiation in the form of pulses of radiation, where the pulses of radiation have a repetition rate that is lower than a rate at which analytes pass the sorting point. That is, if directed at the analytes, each analyte may be irradiated by a certain pulse that also irradiates other analytes. Instead of modulating the laser based only on determinations for each analyte, optical systems in these implementations may determine whether or not analytes in certain "swaths" of a stream are to be neutralized based on determined properties of those analytes and one or more pre-determined sorting strategies. The "swaths" of the stream may correspond to certain lengths of the stream of analytes, each length representing a portion of the stream that may be selectively irradiated by one pulse of radiation.

Sorting flow cytometers may utilize optical systems, as discussed herein, to sort cells (e.g., sperm cells) passing through the sorting flow cytometers. The description below references various example optical systems utilized in such sorting flow cytometers. However, optical systems of the current disclosure may be utilized in devices other than sorting flow cytometers to sort any number of analytes other than biological cells. Generally, optical systems as discussed herein may be integrated into any suitable device configured to selectively irradiate biological and/or non-biological particles traveling in a stream, where the irradiation of the particles causes the particles to be modified.

One example modification of selected analytes upon irradiation by pulses of a pulsed laser is a "neutralization" of biological cells. This neutralization of cells will be used by way of example throughout this description and may include an immobilization of cells, a bursting of cell membranes or other components of cells, a detrimental temperature change within the cells or in the environment around the cells, or any number of other modifications of cells to destroy or reduce the viability of the cells. However, modifications to analytes other than biological cells, resulting from a selective irradiation of the analytes, may include modifications other than those associated with neutralization of biological cells. For example, modifications (e.g., to non-biological or synthetic analytes) may include a modification of any suitable combination of the properties of analytes, such as a modification of magnetization, charge, phase, shape, number, temperature, compressive or tensile strength, spectral absorbance, fluorescence emission, etc.

For ease of discussion, the description below will utilize many examples in which cells are selectively irradiated based at least partially on a detected fluorescence of the cells. However, measured properties of analytes forming the basis of selective irradiation by pulses of radiation may include properties other than and/or in addition to fluorescence. By way of example, devices utilizing optical systems as discussed herein may measure optical absorbance, light scattering, luminescence, fluorescence, phosphorescence, polarization or depolarization of light, or other properties; properties of electricity including but not limited to inductance, capacitance, potential, current, or resistance of cells or of the surrounding medium; properties of electromagnetism including magnetism, paramagnetism, magnetic resonance, and/or interaction of the cell with or emission of electromagnetic forces and/or waves; imaging, image properties, morphological properties, or related properties derived from the collection and/or analysis of image or image-like properties of analytes. Further, a measure of fluorescence of a cell or other analyte may reflect the intrinsic fluorescence of the analyte or the measure of fluorescence of an analyte may reflect the presence and/or quantity of a fluorochrome or fluorescent particle that binds to or associates with the analyte and directly or indirectly reflects some property of the analyte, or both.

Example Optical System

FIG. 8A is a block diagram an example optical system 8000 for sorting analytes, such as sperm cells. The optical system 8000 includes a laser 8002 producing a beam of radiation that passes through beam manipulation elements 8004 and a modulator 8006. The modulator 8006 directs the beam of radiation from the laser 8002 at one of a sorting point 8008 or a beam dump 8010 based on signals (e.g., electrical signals) from a computing device 8012, thus generating pulses of radiation irradiating the sorting point 8008. Unsorted analytes 8014, such as sperm cells having both X and Y sex chromosomes, pass through the sorting point 8008, and, depending on the operation of the modulator 8006, the laser 8002 irradiates certain of the unsorted analytes 8014 to produce sorted analytes 8016 (e.g., an enriched population of sperm cells having either an X or a Y sex chromosome).

In some implementations, the laser 8002 may be a mode-locked laser. In these implementations, the laser 8002 may emit radiation including pulses of radiation with a repetition rate up to many gigahertz (GHz). Individual pulses may have durations between five femtoseconds and hundreds of picoseconds. In other implementations, the laser 8002 may utilize Q-switching (otherwise known as "giant pulse formation" or "Q-spoiling"). This Q-switching laser may, as compared with the mode-locked laser, have a low repetition rate on the order of hundreds of hertz to several megahertz (MHz) and a pulse duration on the order of a hundred picoseconds to hundreds of nanoseconds. On the other hand, Q-switching lasers may produce pulses with high peak power (e.g., on the order of a gigawatt). Generally, the laser 8002 may utilize a combination of these and/or other suitable mechanisms to generate radiation. In fact, some optical systems may include laser employing both Q-switching and mode-locking techniques or even continuous wave lasers.

Although particular repetition rates corresponding to certain types of lasers (e.g., Q-switching and mode-locked) are provided by way of example above, implementations of optical systems may include a laser emitting pulses of radiation at one or more other repetition rates. In fact, lasers emitting at one or more repetition rates similar to or dissimilar to the example repetition rates mentioned above may cause analytes, such as mammalian reproductive cells (e.g., sperm), to be selectively modified in any number of specific manners. By way of example, a laser may emit pulses of radiation at a repetition rate greater than 1 MHz, greater than 100 MHz, greater than 250 MHz, greater than 500 MHz, greater than 750 MHz, greater than 1000 MHz (i.e., 1 GHz), less than 250 MHz, less than 500 MHz, less than 750 MHz, or less than 1000 MHz, such as repetition rates in the range 1 to 250 MHz, 1 to 500 MHz, 1 to 750 MHz, 1 to 1000 MHz, 250 to 500 MHz, 250 to 750 MHz, 250 to 1000 MHz, 500 to 750 MHz, 500 to 1000 MHz, 750 MHz to 1000 MHz, 1 GHz to 5 GHz, 100 MHz to 120 MHz, or 90 MHz to 130 MHz, to cause analytes, such as mammalian reproductive cells (e.g., sperm), to be selectively modified. In other examples, a laser may emit pulses of radiation at a repetition rate greater than 1 Hz, greater than 500 Hz, greater than 1000 Hz (i.e., 1 kHz), greater than 500 kHz, greater than 1000 kHz (i.e., 1 MHz), less than 1 Hz, greater than 500 Hz, less than 1000 Hz, less than 500 kHz, or less than 1000 kHz, such as repetition rates in the range 1 Hz to 500 Hz, 1 Hz to 1 kHz, 1 Hz to 500 kHz, 1 Hz to 1000 kHz, 500 Hz to 1 kHz, 500 Hz to 500 kHz, 500 Hz to 1000 kHz, 1 kHz to 500 kHz, 1 kHz to 1000 kHz, 1 kHz to 50 kHz, or 20 kHz to 40 kHz, to cause analytes, such as mammalian reproductive cells (e.g., sperm), to be selectively modified.

Further, although particular pulse durations corresponding to certain types of lasers (e.g., Q-switching and mode-locked) are provided by way of example above, implementations of optical systems may include a laser emitting pulses of radiation having one or more other pulse durations. In fact, lasers emitting pulses having one or more pulse durations similar to or dissimilar to the example pulse durations mentioned above may cause analytes, such as mammalian reproductive cells (e.g., sperm), to be selectively modified in any number of specific manners. By way of example, a laser may emit pulses of radiation having a pulse duration greater than 1 femtosecond (fs), greater than 250 fs, greater than 500 fs, greater than 750 fs, greater than 750 fs, greater than 1000 fs (i.e., 1 ps), less than 250 fs, less than 500 fs, less than 750 fs, less than 750 fs, or less than 1000 fs, such as a pulse duration in the range 1 fs to 250 fs, 1 fs to 500 fs, 1 fs to 750 fs, 1 fs to 1000 fs, 250 fs to 500 fs, 250 fs to 750 fs, 250 fs to 1000 fs, 500 fs to 750 fs, 500 fs to 1000 fs, or 750 fs to 1000 fs, to cause analytes, such as mammalian reproductive cells (e.g., sperm), to be selectively modified. In other examples, a laser may emit pulses of radiation having a pulse duration greater than 1 picosecond (ps), greater than 250 ps, greater than 500 ps, greater than 750 ps, greater than 1000 ps, less than 250 ps, less than 500 ps, less than 750 ps, or less than 1000 ps, such as a pulse duration in the range 1 ps to 250 ps, 1 ps to 500 ps, 1 ps to 750 ps, 1 ps to 1000 ps, 250 ps to 500 ps, 250 ps to 750 ps, 250 ps to 1000 ps, 500 ps to 750 ps, 500 ps to 1000 ps, 750 ps to 1000 ps, to cause analytes, such as mammalian reproductive cells (e.g., sperm), to be selectively modified. In still other examples, a laser may emit pulses of radiation having a pulse duration greater than 1 nanosecond (ns), greater than 250 ns, greater than 500 ns, greater than 750 ns, greater than 1000 ns, less than 250 ns, less than 500 ns, less than 750 ns, or less than 1000 ns, such as a pulse duration in the range 1 ns to 250 ns, 1 ns to 500 ns, 1 ns to 750 ns, 1 ns to 1000 ns, 250 ns to 500 ns, 250 ns to 750 ns, 250 ns to 1000 ns, 500 ns to 750 ns, 500 ns to 1000 ns, 750 ns to 1000 ns, to cause analytes, such as mammalian reproductive cells (e.g., sperm), to be selectively modified.

The radiation emitted by the laser 8002 may include any number of suitable wavelengths (one, two, three, etc.). In some cases, however, the laser 8002 may emit monochromatic radiation with a wavelength selectively chosen to affect in some way analytes traversing the sorting point 8008. For example, certain structures or chromophores within biological cells traveling through the sorting point 8008 may absorb, or otherwise be excited by, radiation at the wavelength of the monochromatic radiation emitted by the laser 8002. Thus, by utilizing a selected wavelength of radiation, the optical system may "target" biological cells or certain structures or chromophores within biological cells (otherwise known as "photothermolysis" or "selective photothermolysis"). For example, the laser 8002 may emit radiation at or near a wavelength of 266 nm to target proteins within sperm cells, and, when irradiated by the 266 nm radiation at a certain power (see FIGS. 8S, 8T, and 8U and the corresponding description), the sperm cells may be immobilized (e.g., significantly reducing the probability of fertilization of an egg with the irradiated sperm).

Although a particular wavelength of 266 nm is provided by way of example above, implementations of optical systems may include a laser emitting radiation at one or more other wavelengths. In fact, lasers emitting at one or more wavelengths including a wavelength of 266 nm and/or other wavelengths may cause analytes, such as mammalian reproductive cells (e.g., sperm), to be selectively modified in any number of specific manners. By way of example, a laser may emit radiation at one, two, three, four, etc. ultraviolet or visible wavelengths greater than 10 nm, greater than 100 nm, greater than 200 nm, greater than 300 nm, greater than 400 nm, greater than 500 nm, greater than 600 nm, or greater than 700 nm, less than 100 nm, less than 200 nm, less than 300 nm, less than 400 nm, less than 500 nm, less than 600 nm, less than 700 nm, less than 800 nm, such as wavelengths in the ranges 10 nm to 800 nm, 10 nm to 700 nm, 10 nm to 600 nm, 10 nm to 500 nm, 10 nm to 400 nm, 10 nm to 300 nm, 10 nm to 200 nm, 10 nm to 100 nm, 100 nm to 800 nm, 100 nm to 700 nm, 100 nm to 600 nm, 100 nm to 500 nm, 100 nm to 400 nm, 100 nm to 300 nm, 100 nm to 200 nm, 200 nm to 800 nm, 200 nm to 700 nm, 200 nm to 600 nm, 200 nm to 500 nm, 200 nm to 400 nm, 200 nm to 300 nm, 250 nm to 280 nm, 260 nm to 270 nm, 300 nm to 800 nm, 300 nm to 700 nm, 300 nm to 600 nm, 300 nm to 500 nm, 300 nm to 400 nm, 400 nm to 800 nm, 400 nm to 700 nm, 400 nm to 600 nm, 400 nm to 500 nm, 500 nm to 800 nm, 500 nm to 700 nm, 500 nm to 600 nm, 600 nm to 800 nm, 600 nm to 700 nm, or 700 nm to 800 nm, to cause analytes, such as mammalian reproductive cells (e.g., sperm), to be selectively modified. In other examples, a laser may emit radiation at one, two, three, four, etc. infrared wavelengths greater than 1 μm, greater than 20 μm, greater than 40 μm, greater than 60 μm, greater than 80 μm, greater than 100 μm, greater than 120 μm, greater than 140 μm, less than 20 μm, less than 40 μm, less than 60 μm, less than 80 μm, less than 100 μm, less than 120 μm, or less than 140 μm, such as wavelengths in the ranges 1 μm to 20 μm, 1 μm to 40 μm, 1 μm to 60 μm, 1 μm to 80 μm, 1 μm to 100 μm, 1 μm to 120 μm, 1 μm to 140 μm, 20 μm to 40 μm, 20 μm to 60 μm, 20 μm to 80 μm, 20 μm to 100 μm, 20 μm to 120 μm, 20 μm to 140 μm, 40 μm to 60 μm, 40 μm to 80 μm, 40 μm to 100 μm, 40 μm to 120 μm, 40 μm to 140 μm, 60 μm to 80 μm, 60 μm to 100 μm, 60 μm to 120 μm, 60 μm to 140 μm, 80 μm to 100 μm, 80 μm to 120 μm, 80 μm to 140 μm, 100 μm to 120 μm, 100 μm to 140 μm, or 120 μm to 140 μm, to cause analytes, such as mammalian reproductive cells (e.g., sperm), to be selectively modified. In still other examples, a laser may emit radiation at one, two, three, four, etc. extremely high frequency, super high frequency, ultra high frequency, very high frequency, high frequency, medium frequency, low frequency, or very low frequency wavelengths greater than 1 mm, greater than 1 cm, greater than 1 dm, or greater than 1 m, such as wavelengths in the ranges 1 mm to 1 cm, 1 mm to 1 dm, 1 mm to 1 m, 1 cm to 1 dm, 1 cm to 1 m, or 1 dm to 1 m, to cause analytes, such as mammalian reproductive cells (e.g., sperm), to be selectively modified. In still other examples, a laser may emit radiation at one, two, three, four, etc. X-ray or gamma ray wavelengths greater than 1 pm, greater than 250 pm, greater than 500 pm, greater than 750 pm, greater than 1 nm, or greater than 5 nm, less than 250 pm, less than 500 pm, less than 750 pm, less than 1 nm, less than 5 nm, or less than 10 nm, such as wavelengths in the ranges 1 pm to 250 pm, 1 pm to 500 pm, 1 pm to 750 pm, 1 pm to 1 nm, 1 pm to 5 nm, 1 pm to 10 nm, 250 pm to 500 pm, 250 pm to 750 pm, 250 pm to 1 nm, 250 pm to 5 nm, 250 pm to 10 nm, 500 pm to 750 pm, 500 pm to 1 nm, 500 pm to 5 nm, 500 pm to 10 nm, 750 nm to 1 nm, 750 nm to 5 nm, 750 nm to 10 nm, 1 nm to 5 nm, 1 nm to 10 nm, or 5 nm to 10 nm, to cause analytes, such as mammalian reproductive cells (e.g., sperm), to be selectively modified. In still other examples, a laser may emit radiation at two, three, four, etc. wavelengths including a suitable combination of the gamma ray, X-ray, ultraviolet, visible, infrared, or other wavelengths represented by the above ranges of wavelengths.

In other examples, the laser 8002 may emit radiation with a wavelength selectively chosen to heat an environment around analytes, as opposed to or in addition to targeting certain structures within analytes. For example, in cases in which the analytes travel in a stream at least partially composed of water, the laser 8002 may emit infrared radiation to selectively heat the water surrounding certain of the analytes. This temperature change in the environment around analytes may result in a neutralization of the analytes.

Generally, the laser 8002 may emit radiation at any number of wavelengths to damage or otherwise modify selected analytes via any number of mechanisms. These mechanisms may include, by way of example, single-photon mechanisms (e.g., photothermolysis) and mutli-photon mechanisms (light induced optical breakdown, phase explosion, normal boiling, lattice heating, subsurface heating, etc.).

The radiation emitted by the laser 8002 may have certain spatial and/or non-spatial properties upon emission by the laser 8002, such as beam shape, coherence, collimation, and polarization. Alternatively or additionally, the radiation may be spatially and/or non-spatially manipulated by the beam manipulation elements 8004 after being emitted by the laser 8002. The beam manipulation elements 8004 may include any suitable numbers and types of optical elements to spatially and/or non-spatially manipulate the radiation from the laser 8002 to produce radiation having desired characteristics for a certain application (e.g., a sorting flow cytometer). By way of example, the beam manipulation elements 8004 may include filters, beam reducers, line generators, mirrors, condensers, beam dumps, lenses, magnification devices, collimation adjusting devices, beam profilers, mechanical slits, etc. configured to focus, spread, cohere, decohere, shape, direct, polarize, etc. the radiation emitted by the laser 8002.

The modulator 8006 may be configured to selectively (e.g., based on signals from the computing device 8012) cause the radiation emitted by the laser 8002 to be directed to one of the beam dump 8010 or the sorting point 8008. Specifically, the modulator 8006 causes the radiation emitted by the laser 8002 to irradiate only certain of the unsorted analytes 8014 so as to sort the unsorted analytes 8014 (or produce the sorted analytes 8016). The modulator 8006 may be an acousto-optic modulator (AOM) having an "on" state and an "off" state, in some implementations. In the "on" state, the AOM may direct radiation emitted by the laser 8002 at one of the sorting point 8008 and the beam dump 8010, and, in the "off" state, the AOM may direct radiation emitted by the laser 8002 at the other of the sorting point 8008 and the beam dump 8010. These "on" and "off" states may be triggered by signals from the computing device 8012 communicated via one or more wired or wireless connections (e.g., electrical leads). Some implementations may utilize the AOM "off" state (e.g., when the AOM is not active) to direct radiation to the beam dump 8010. This configuration may minimize unwanted irradiation of certain of the unsorted analytes 8014. Other implementations may utilize the AOM "off" state (e.g., when the AOM is not active) to direct radiation to the sorting point 8008. This example configuration may maximize a power of the radiation delivered to certain of the unsorted analytes 8014.

The modulator 8006 may include Pockels cells instead of or in addition to an AOM. The Pockels cells may receive variable electric voltages from the computing device 8012 (e.g., via one or more electrical leads), and, based on these variable electric voltages, the Pockels cells may modify one or more non-spatial properties of the radiation emitted by the laser 8002. In particular, implementations of the optical system 8000 may include combinations of the Pockels cells with one or more polarizing plates for modifying the polarization state of the radiation and converting the change in polarization into a change in transmitted optical amplitude and power.

In some implementations, the optical system 8000 may utilize a "controllable" laser as the laser 8002 instead of or in addition to utilizing the modulator 8006 to modulate radiation emitted by the laser 8002. The "controllable" laser may be any suitable laser that is configured to only emit pulses of radiation when triggered by signals (e.g., "trigger signals") from a device controlling the controllable laser, such as the computing device 8012. For example, the computing device 8012 may selectively communicate signals (e.g., current or voltage signals) to the laser 8002, in these implementations, to cause the laser 8002 to emit pulses of radiation at specific times. In this manner, the computing device 8012 may cause only certain ones of the unsorted analytes 8014 to be irradiated.

As mentioned above, signals (e.g., current or voltage signals communicated via electrical leads or wires) from the computing device 8012 may cause a controllable laser or the modulator 8006 to selectively direct radiation emitted by the laser 8002 at the sorting point 8008 creating modulated radiation, or pulses, irradiating the sorting point 8008. The computing device 8012 may also set certain values that one or more separate devices (e.g., operating separately from the computing device 8012) utilize to control the modulator 8006, instead of or in addition to communicating signals directly to the modulator 8006. For example, the computing device 8012 may set one or more values utilized by a separate device, such as an analogue decision circuit/comparator. Based on these one or more values and signals from the detector(s) 8018, the separate device may control the modulator 8006 to direct radiation from the laser 8002 at or away from the unsorted analytes 8014.

The computing device 8012 may be a laptop, desktop, tablet, or other computer, in some implementations. In such implementations, the computing device 8012 may include one or more data acquisition (DAQ) components, such as a DAQ cards, configured to receive analog or digital signals from one or more detector(s) 8018. The computing devices 8012 may process these analog or digital signals, which signals may indicate measured properties of the unsorted analytes 8014, via one or more computer processors (e.g., CPUs) to determine how to control (e.g., when and how to trigger) the modulator 8006, as further discussed with reference to FIGS. 8D and 8R.

In other implementations, the computing device 8012 may be a computing device other than a laptop, desktop, tablet, or other computer. For example, the computing device 8012 may include single-board computers, analogue decision circuits/comparators including optical comparators, embedded processors, servos, digital signal processors (DSPs), field-programmable gate arrays (FPGAs), specialized controllers configured to control the modulator 8006, or any other suitable devices configured to receive electronic signals from the detector(s) 8018 and control the modulator 8006 in response to the received electronic signals.

The detector(s) 8018 may include photodiodes, avalanche photodiodes, photomultiplier tubes, charge coupled-devices (CCDs), etc. configured to detect properties of each of the unsorted analytes 8014. When the optical system 8000 is implemented in a sorting flow cytometer, the detector(s) 8018 may detect a fluorescence of each of the unsorted analytes 8014 as the unsorted analytes 8014 travel through an analysis area 8020 of the flow cytometer, as discussed elsewhere in this specification. The detector(s) 8018 may communicate an indication of this fluorescence, or other suitable property of each of the unsorted analytes 8014, to the computing device 8012. Based on these indications, the computing device 8012 may control the modulator 8006. For example, if the detector(s) 8018 indicated that a certain unsorted analyte 8014 has an undesired property (e.g., an unwanted sex chromosome), the computing device 8012 may trigger the modulator 8006 to direct the radiation emitted by the laser 8002 at the certain unsorted analyte 8014. In other implementations, the computing device 8012 may trigger the modulator 8006 to direct the radiation emitted by the laser 8002 at multiple of the unsorted analytes 8014 based on multiple indications from the detector(s) 8018. Methods utilizing this functionality are further discussed with reference to FIG. 8R.

In some implementations, the optical system 8000 may also include one or more feedback detector(s) 8022 detecting one or more properties of irradiated analytes at the sorting point 8008. The feedback detector(s) 8022 may also include photodiodes, photomultiplier tubes, charge coupled-devices (CCDs), etc. to detect properties of the unsorted analytes 8014, such as fluorescence. However, in contrast to the detector(s) 8018, the feedback detector(s) may detect properties of the analytes 8014 upon irradiation by the laser 8002 when the radiation emitted by the laser 8002 is directed at the sorting point 8008 by the modulator 8006. The feedback detector(s) 8022 may communicate (e.g., via one or more electronic leads) indications of the measured properties of the unsorted analytes 8014 to the computing device 8012. The computing device 8012 may then utilize the indications from the feedback detector(s) 8022 to adjust timings of modulated pulses, throughput rates of analytes traversing the sorting point 8008, or other timings or rates influencing the sorting of the unsorted analytes 8014.

The unsorted analytes 8014 may travel through the analysis area 8020 and/or the sorting point 8008 in a stream. In particular, a device in which the optical system 8000 is integrated may employ a core-in-sheath fluidic mechanism to carry the unsorted analytes 8014 through the analysis area 8020 and/or the sorting point 8008. As depicted in FIGS. 1A and 1B, a relatively slow moving stream of an aqueous suspension of analytes (e.g., sperm cells) may be injected into a relatively faster moving flow of sheath fluid. This example arrangement focuses the cells into a stream, referred to as the "core stream." With appropriate selection of the pressures and consequent velocities of the core suspension and sheath fluid, the core stream may be narrowed by hydrodynamic forces exerted by the sheath flow, and the analytes in the core stream may be distributed longitudinally such that they are predominantly carried one by one in the flow.

Sorting of Individual Analytes with Pulses of Radiation

In cases in which the laser 8002 emits pulses of radiation with a repetition rate that is on the same order of magnitude as or greater than a rate at which the unsorted analytes 8014 pass the sorting point 8008, the optical system may sort the unsorted analytes 8014 (e.g., selectively irradiate at least some of the unsorted analytes 8014) on an analyte by analyte basis. That is, each pulse emitted by the laser 8002 may only irradiate one particular analyte, and thus, if directed at the particular analyte, the pulse may neutralize the individual analyte. Further, the computing device 8012 may process indications from the detector(s) 8018 on an analyte by analyte basis. For each of the unsorted analytes 8014, the detector(s) 8018 may indicate a property of the analyte (e.g., fluorescence) to the computing device 8012. Based on this indication, the computing device 8012 may determine whether or not to neutralize the analyte and, thus, determine how to control the modulator 8006.

FIG. 8B illustrates a timing of emitted pulses 8050 emitted by a laser, a modulated version 8052 of the emitted pulses 8050 from the laser, and analytes 8054 traveling in a stream 8056. The emitted pulses 8050 may be emitted by the laser 8002 in an implementation in which the laser 8002 is a mode-locked laser, for example. As depicted by the width of the emitted pulses 8050 and of each of the analytes 8054, each of the analytes 8054 may be irradiated by multiple of the emitted pulses 8050. Each analyte 8054 may be irradiated by approximately twenty pulses in this example scenario, but, in other scenarios, analytes may be irradiated by one, two, three, . . . , fifteen, sixteen, . . . , thirty, thirty-one, etc. pulses from a laser, such as the laser 8002.

To selectively irradiate only selected ones of the analytes 8054, an optical system, such as the optical system 8000, utilizing the emitted pulses 8050 may modulate the emitted pulses 8050 to produce the modulated version 8052 of the emitted pulses 8050. Instead of all of the analytes 8054 being irradiated by the emitted pulses 8050, the analytes 8054 may be irradiated by the modulated version 8052 of the emitted pulses 8050. The example modulated version 8052 of the emitted pulses 8050 may include portions (e.g., subsets) of the emitted pulses 8050 that are directed at the analytes, as illustrated in the area 8058, and other portions of the emitted pulses 8050 that are directed elsewhere (e.g., a beam dump), as illustrated in the areas 8060. The modulator 8006 may produce the modulated version 8052 of the emitted pulses 8050 in response to signals from the computing device 8012, for example.

Each subset of the emitted pulses 8050 that is directed at the analytes may include certain pulses on the leading and trailing ends of the subset of the emitted pulses 8050 that are attenuated due to a switching, activation, deactivation, etc. of a modulator, such as the modulator 8006. These attenuated pulses on the leading end, as illustrated in the area 8062 in FIG. 8B, may be attenuated over a "rise time," and the attenuated pulses on the trailing end, as illustrated in the area 8064 in FIG. 8B, may be attenuated over a "fall time." The rise and fall times of subsets of the emitted pulses 8050 directed at the analytes 8054 may differ for various types of modulators, such as AOMs and Pockels cells, and the rise and the fall times may differ from one another. However, because the analytes 8054 are each irradiated by multiple of the emitted pulses 8050 including many that are not attenuated, at least in some implementations, the multiple emitted pulses 8050 may still neutralize the selected analytes 8054. Further details regarding power requirements to neutralize analytes are discussed with reference to FIGS. 8S, 8T, and 8U.

FIG. 8C illustrates another timing of modulated pulses 8100 formed from radiation emitted by a laser by modulating the radiation emitted by the laser. FIG. 8C also illustrates timings of analytes 8102 traveling in a stream 8104 and states 8106 of a modulator used to generate the modulated pulses 8100. The laser 8002 may emit pulses of radiation included in the modulated pulses 8100 and the modulator 8006 may modulate the emitted pulses emitted by the laser 8002, for example.

The modulated pulses 8100 include a first subset of pulses 8108a irradiating a selected analyte 8110 and a second subset of pulses 8108b irradiating other selected analytes 8112a and 8112b. Outside of these subsets of pulses 8108a and 8108b, the analytes 8114a, 8114b, and 8114c may not be irradiated by pulses, as illustrated by the flat lines 8116. Thus, the selected analytes 8110, 8112a, and 8112b are neutralized (e.g., immobilized) by the first subset of pulses 8108a and the second subset of pulses 8108b, respectively, leaving the analytes 8114a, 8114b, and 8114c unaltered (e.g., viable).

In this example scenario, an AOM may generate the modulated pulses 8100 using an "on" state and an "off" state of the AOM. In particular, in an "off" state, the AOM may allow radiation emitted by a laser to propagate to a beam dump, such as the beam dump 8010. In an "on" state, the AOM may direct the radiation emitted by the laser towards the analytes 8102 traveling in the stream 8104 (e.g., at the sorting point 8008). The states 8106 illustrate such operations of the AOM to generate the modulated pulses 8100. Various "on" states 8116a and 8116b of the AOM may direct the subsets of pulses 8108a and 8108b towards the selected analytes 8110, 8112a, and 8112b. Various "off" states 8118a, 8118b, and 8118c may allow radiation from a laser to propagate to a beam dump, instead of irradiating the analytes 8114a, 8114b, and 8114c. Pockels cells, or other types of modulators, may produce similar modulations of pulses, although signals delivered to the Pockels cells (e.g., varying voltage values) and states of the Pockels cells may differ from those illustrated in FIG. 8C.

The depiction of pulses, analytes, and on/off states of a modulator are given by way of example and for further clarification in FIGS. 8B and 8C. The actual widths, heights, times, spacings, amplitudes, shapes, etc. of the pulses, stream, and analytes may be different from those illustrated in FIGS. 8B and 8C. Further, in some implementations, computing devices may control modulators to turn "on" or "off" a certain amount of time before and/or after times at which analytes pass through a sorting point due to path length differences, speeds of propagation, interference, etc. The computing device 8012 or operators of the computing device 8012 may determine these certain amounts of time by an analysis of signals from the feedback detector(s) 8022, in some implementations. For example, when each of the analytes 8110, 8112a, and 8112b is irradiated by the subsets of pulses 8108a and 8108b, the analytes 8110, 8112a, and 8112b may fluoresce. The feedback detector(s) 8022 may detect this fluorescence, and based on a presence or absence of this fluorescence for each of the analytes 8110, 8112a, and 8112b, based on an inconsistent amount of fluorescence for each of the analytes 8110, 8112a, and 8112b, or based on other suitable metrics derivable from the detected fluorescence, the computing device 8012 and/or operators of the computing device 8012 may adjust the timing of signals (e.g., such as the signals 8106) communicated to the modulator 8006.

Figure 8D:
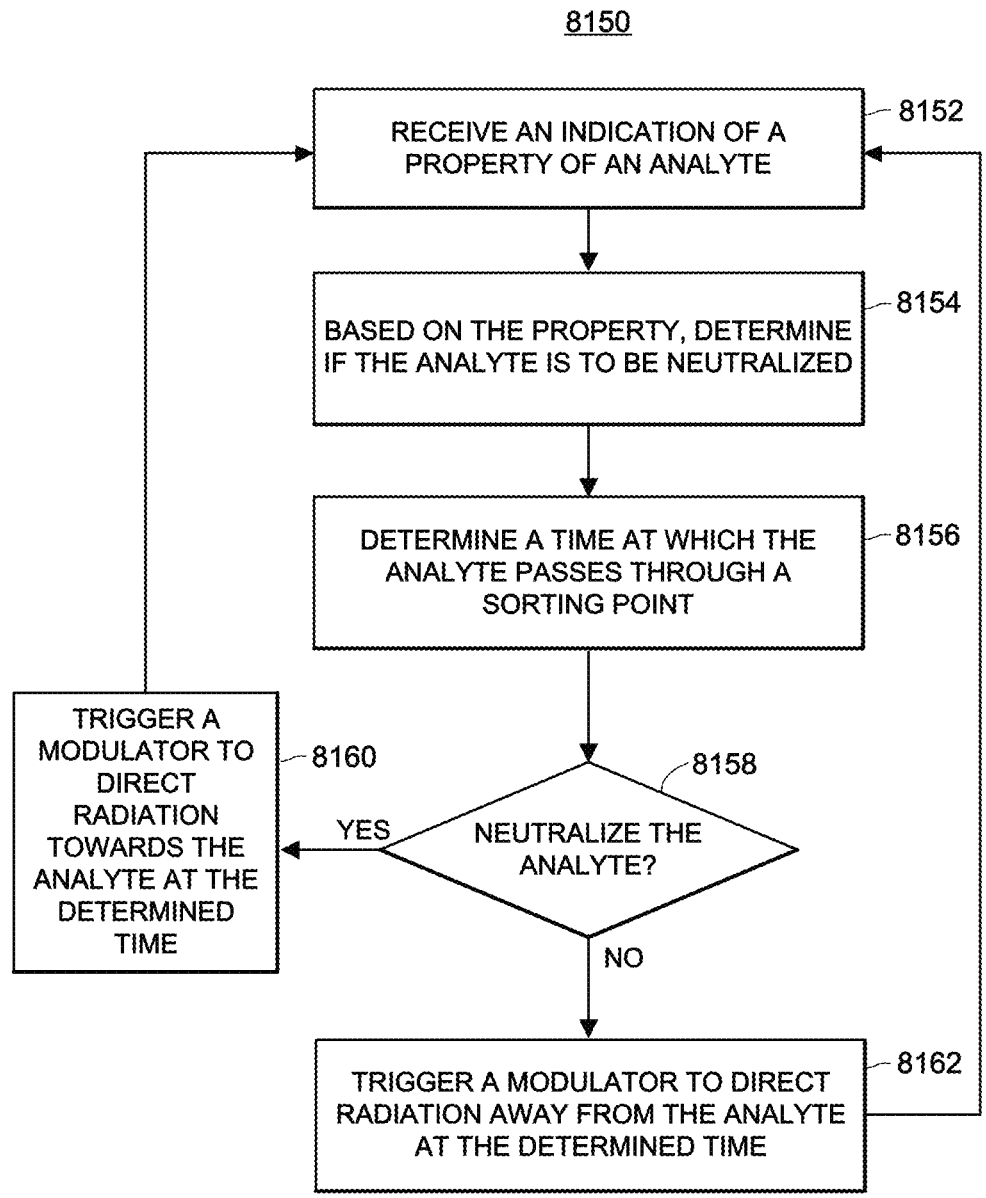
FIG. 8D is a flow diagram of an example method for sorting analytes on an analyte by analyte basis which may be implemented in the optical system of FIG. 8A.

FIG. 8D is a flow diagram of an example method 8150 for sorting analytes on an analyte by analyte basis. The method 8150 may be implemented in the optical system 8000, for example, in cases in which the laser 8002 emits pulses of radiation with a repetition rate that is similar to or greater than a rate at which the unsorted analytes 8014 pass the sorting point 8008. In particular, the computing device 8012 may implement at least some of the functionality discussed with reference to the method 8150. For ease of discussion, the method 8150 is described below with reference to a laser emitting pulses of radiation with a certain repetition rate. However, optical systems utilizing continuous wave lasers instead of lasers emitting pulses (e.g., mode-locked lasers) may also implement the method 8150, where the radiation emitted by the continuous wave lasers is modulated (e.g., by an AOM or Pockels cell) to generate pulses of radiation.

In the method 8150, the computing device 8012 may receive an indication of a property (e.g., fluorescence) of a particular one of the unsorted analytes 8014 (block 8152). For example, the detector(s) 8018 may communicate (e.g., via one or more analog or digital signals) an indication of fluorescence of one of the unsorted analytes 8014 to the computing device 8012, where the fluorescence of the unsorted analyte 8014 was detected at the analysis area 8020. In some implementations, the detector(s) 8018 may communicate multiple indications of a property of the unsorted analyte 8014 to the computing device 8012. That is, the detector(s) 8018 may detect the property of the particular one of the unsorted analytes 8014 at multiple times as the unsorted analytes 8014 passes through the analysis area 8020.

Based on the indicated property of the unsorted analyte 8014, the computing device 8012 may determine if the analyte is to be neutralized (block 8154). In making this determination, the computing device 8012 may employ one or more thresholds, reference values, models, averages, etc. which are compared with the indicated property of the unsorted analyte 8014. In one scenario in which the unsorted analytes 8014 are sperm cells and the optical system 8000 is sorting the sperm cells by sex chromosomes to produce a population of sperm cells with only X chromosomes, the computing device 8012 may determine if a fluorescence of the particular one of the unsorted analytes 8014 (e.g., a single sperm cell) is at, below, or above a threshold or reference value. A sperm cell (or dyes within the a cell) fluorescing at or below this threshold fluorescence (e.g., measured in relative fluorescence units) indicates a cell having an X chromosome and sperm cell fluorescing above this threshold fluorescence indicates a cell having an Y chromosome. The computing device 8012 may determine that if the particular one of the unsorted analytes 8014 fluoresces above the threshold, the particular one of the unsorted analytes 144 is to be neutralized (killed, immobilized, destroyed, etc.).

The computing device 8012 also determines a time, or range of times, at which the particular one of the unsorted analytes 8014 passes through the sorting point 8008 (block 8156). As discussed throughout this specification, a core stream may carry the unsorted analytes 8014 to and through the sorting point 8008, which core stream has a corresponding velocity. Based on the velocity of the core stream, the time at which the detector(s) 8018 indicated the property of the unsorted analyte 8014 to the computing device 8012, and the size of the unsorted analyte 8014, the computing device may determine the time, or a range of times, at which the unsorted analyte 8014 will be deposed at the sorting point 8008. In one scenario, the computing device 8012 may determine: (i) a range of times, $\Delta t_{detected}$, during which the unsorted analyte 8014 passed through the analysis area 8020 at a first point in space, $d_1$, based on the times at which the detector(s) indicated the property (e.g., fluorescence) of the unsorted analyte 8014 to the computing device 8012; (ii) a time, $t_{travel}$, it will take unsorted analyte 8014 to travel from $d_1$ to the sorting point 8008 at a second point in space, $d_2$, based on the velocity of the core steam; and (iii) a range of times, $\Delta t_{sorted}$, during which the unsorted analyte 8014 will be at the sorting point 8008 based on $t_{travel}$, $\Delta t_{detected}$, and an approximate size of the unsorted analyte 8014 (e.g., determined from $\Delta t_{detected}$ or stored in the computing device 8012 as a reference value).

In some implementations, the determining of the time, or range of times, at which the particular one of the unsorted analytes 8014 passes through the sorting point 8008 may be a pre-determining of the time before operating a device to sort unsorted analytes. That is, for a given device (e.g., sorting flow cytometer), the computing device 8012 may determine or be configured to utilize (e.g., via specialized programming) a time, or range of times, based on a known, averaged, predicted, modeled, etc. value of the time. For example, the computing device 8012 may determine that the time at which the unsorted analyte 8014 passes through the sorting point 8008 is a time when the property of the analyte was detected pulse a pre-determined time.

If the particular one of the unsorted analytes 8014 is to be neutralized (block 8158), the flow continues to block 8160. At block 8160, the computing device 8012 may trigger or control the modulator 8006 to direct radiation from the laser 8002 to the sorting point 8008 at the determined time or range of times (e.g., $\Delta t_{sorted}$). As discussed further with reference to FIGS. 8A, 8B, and 8C, the computing device 8012 may send analog or digital signals (e.g., via one or more wired or wireless connections) to the modulator 8006 such that the modulator 8006 directs pulses from the laser 8002 at the sorting point 8008 at the determined time(s), which determined time(s) indicate when the particular one of the unsorted analyte 8014 is passing through the sorting point 8008. In some implementations, the computing device 8012 may account for certain latencies, path length differences, etc. when triggering the modulator 8006. For example, the computing device 8014 may cause an AOM to switch states slightly before (e.g., a pre-determined time before) the time period $\Delta t_{sorted}$ begins and again slightly before the time period $\Delta t_{sorted}$ ends to compensate for path length differences, latencies, etc.

If it is determined that the particular one of the unsorted analytes 8014 should not be irradiated by the laser 8002 (block 8158), the flow may continue to block 8162. At block 8162, the computing device 8012 may trigger or control the modulator 8006 to direct radiation from the laser 8002 towards the beam dump 8010 such that no, or only a tolerated amount of, radiation is incident on the unsorted analyte 8014 at the determined time or range of times (e.g., $\Delta t_{sorted}$).

The steps of the method 8150 may iterate for each of the unsorted analytes 8014. Thus, utilizing the method 8150, the optical system 8000 may sort the unsorted analytes 8014 on an analyte by analyte basis to produce the sorted analytes 8016. The sorted analytes 8016 may include the particular analytes that were neutralized (killed, immobilized, destroyed, etc.) at block 8160 of the method 8150 and other analytes that were unaltered by radiation from the laser 8002.

Sorting of Swaths with Pulses of Radiation

In cases in which the laser 8002 emits pulses of radiation with a repetition rate that is on the same order of magnitude as or lower than a rate at which the unsorted analytes 8014 pass the sorting point 8008, the optical system may sort the unsorted analytes 8014 (e.g., selectively irradiate at least some of the unsorted analytes 8014) based on "swaths" of a stream (e.g., core stream) in which the unsorted analytes 8014 travel. If directed at the unsorted analytes 8014, each of the unsorted analytes 8014 may be irradiated by a certain pulse that also irradiates other of the unsorted analytes 8014. Instead of modulating the laser 8002 based only on determinations for each of the unsorted analytes 8014, the optical system 8000 may determine whether or not a subset of the unsorted analytes 8014 in a certain "swath" of a stream is to be neutralized (e.g., immobilized) based on determined properties of the unsorted analytes 8014 in the subset and based on one or more pre-determined sorting strategies.

FIG. 8E illustrates another timing of emitted pulses 8200 of radiation and analytes 8202 traveling in a stream 8204. The emitted pulses 8200 may be emitted by the laser 8002 in an implementation in which the laser 8002 utilizes Q-switching, for example. As depicted by the width of the emitted pulses 8200 and of each of the analytes 8204, each of the emitted pulses 8200 may irradiate multiple of the analytes 8202. Each of the emitted pulses 8200 may irradiate, on average, zero to three of the analytes 8202 this example scenario, but, in other scenarios, pulses may irradiate one, two, three, . . . , fourteen, fifteen, sixteen, etc., analytes passes through the sorting point 8008.

Each area of the stream 8204 that is irradiated by a single of the emitted pulses 8200 may be referred to as a "swath" ("swath 1," "swath 2," etc.). These swaths may contain different numbers of the analytes 8202, as mentioned above. The length, L, of a swath may be a pre-determined value utilized by the computing device 8012, or the computing device 8012 may dynamically determine the length, L, based on the velocity of the stream 8204 and the repetition rate of the laser 8002.

Figure 8F:
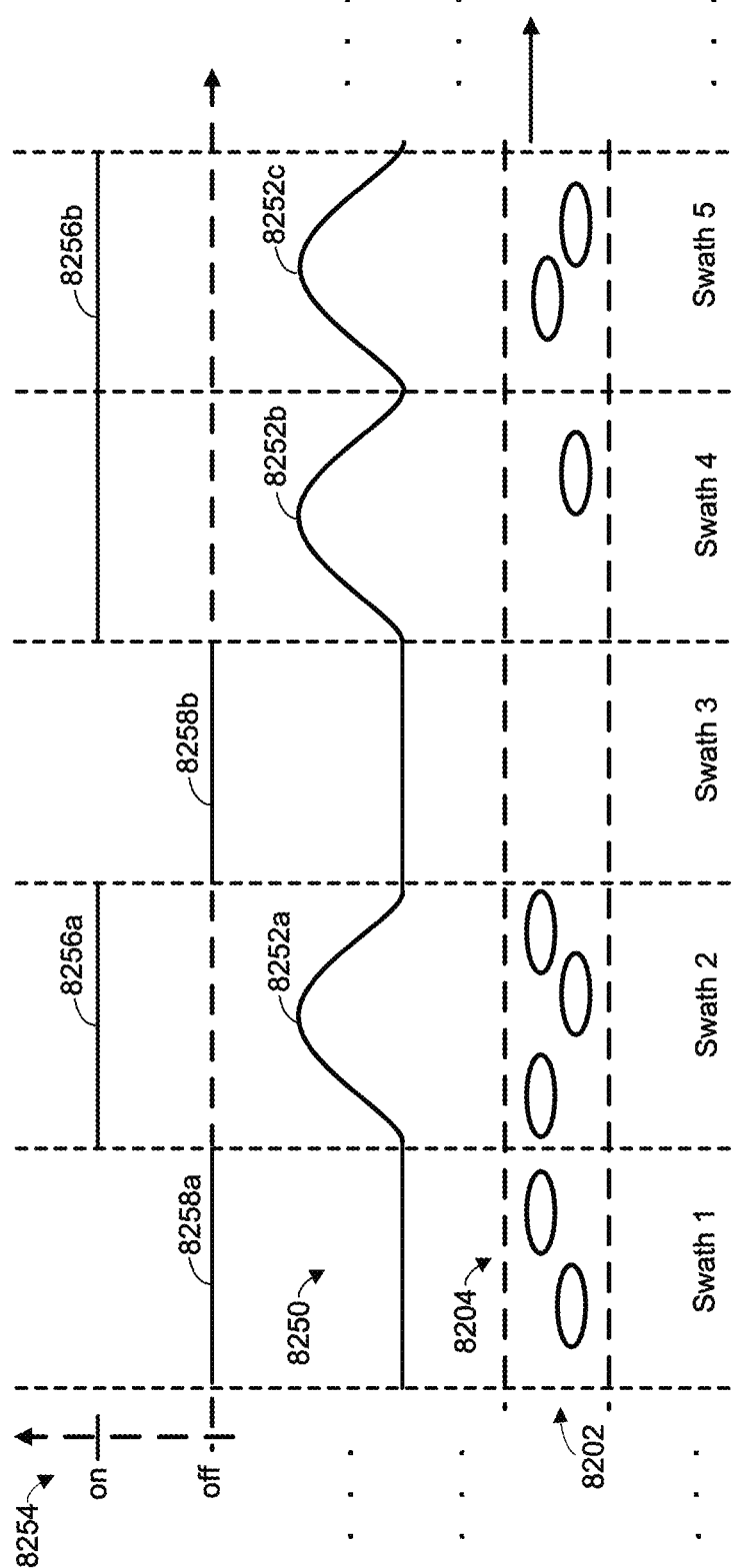
FIG. 8F illustrates other modulated pulses, which modulated pulses may be produced in the optical system of FIG. 8A.

To selectively irradiate only selected ones of swaths, an optical system, such as the optical system 8000, utilizing the emitted pulses 8200 may modulate the emitted pulses 8200 to produce the modulated version 8250 of the pulses 8200, as illustrated in FIG. 8F. Instead of all of the swaths being irradiated by the emitted pulses 8200, the swaths may be irradiated by the modulated version 8250 of the pulses 8200. The example modulated version 8250 of the emitted pulses 8200 may include certain pulses 8252a, 8252b, and 8252c of the emitted pulses 8200 that are directed at the analytes 8202 and may not include other of the emitted pulses 8200 that are directed elsewhere (e.g., a beam dump).

FIG. 8F further illustrates timings of states 8254 of a modulator used to generate the modulated pulses 8250. Similar to the scenario depicted in FIG. 8C, an AOM may generate the modulated pulses 8250 using an "on" state and an "off" state of the AOM. In particular, in an "off" state, the AOM may allow radiation emitted by a laser to propagate to a beam dump, such as the beam dump 8010. In an "on" state, the AOM may direct the radiation emitted by the laser towards the analytes 8202 traveling in the stream 8204 (e.g., at the sorting point 8008). Various "on" states 8256a and 8256b of the AOM may direct the pulses 8252a, 8252b, and 8252c towards "Swath 1," "Swath 4," and "Swath 5," respectively. Various "off" states 708a and 708b may allow radiation from a laser to propagate to a beam dump, instead of irradiating the "Swath 1" and "Swath 3," respectively. Pockels cells, or other types of modulators, may produce similar modulations of pulses, although signals delivered to the Pockels cells (e.g., varying voltage values) and states of the Pockels cells may differ from those illustrated in FIG. 8F.

Similar to FIGS. 8B and 8C, the depiction of pulses, analytes, swaths, and on/off states of a modulator are given by way of example and for further clarification in FIGS. 8E and 8F. The actual widths, heights, times, spacings, amplitudes, shapes, etc. of the pulses, stream, swaths, and analytes may be different from those illustrated in FIGS. 8E and 8F.

Also, in some implementations, computing devices may control modulators to turn "on" or "off" a certain amount of time before and/or after times at which swaths pass through a sorting point due to path length differences, speeds of propagation, interference, etc.

Figure 8G:
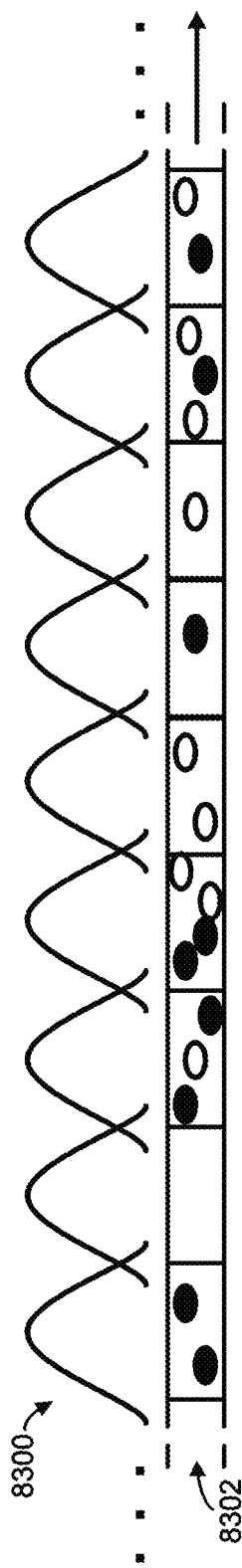
FIG. 8G illustrates example overlapping pulses of radiation, which overlapping pulses may be utilized in the optical system of FIG. 8A.

Although not illustrated in FIG. 8F, each of the pulses 8252a, 8252b, and 8252c that is directed at the analytes 8202 may include attenuated portions due to a switching, activation, deactivation, etc. of a modulator, such as the modulator 8006. For this reason and/or because of other design constraints of devices in which an optical system in integrated, the computing device 8012 may define swaths and/or synchronize swaths with modulated radiation from a laser such that a pulse of radiation corresponding to a first swath overlaps with pulses corresponding to neighboring swaths. FIG. 8G illustrates such a scenario in which each of a plurality of pulses 8300 overlap with neighboring pulses corresponding to other swaths 8302. In some cases, a model based on such overlapping of pulses along with amplitudes, wavelengths, shapes, etc. of pulses may be utilized to determine a minimum or desired power, or power density, to neutralize analytes. Such models and determinations are further discussed with reference to FIGS. 8S, 8T, and 8U.

Figure 8H:
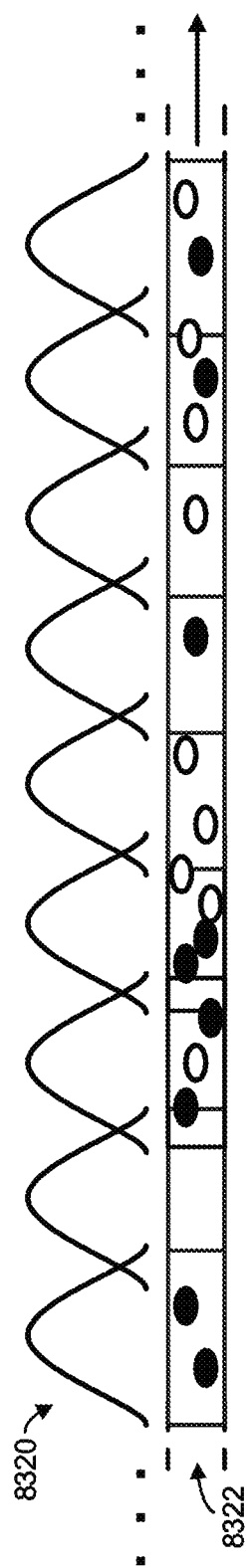
FIG. 8H illustrates example overlapping swaths, which overlapping swaths may be utilized by the optical system of FIG. 8A.
Figure 8I:
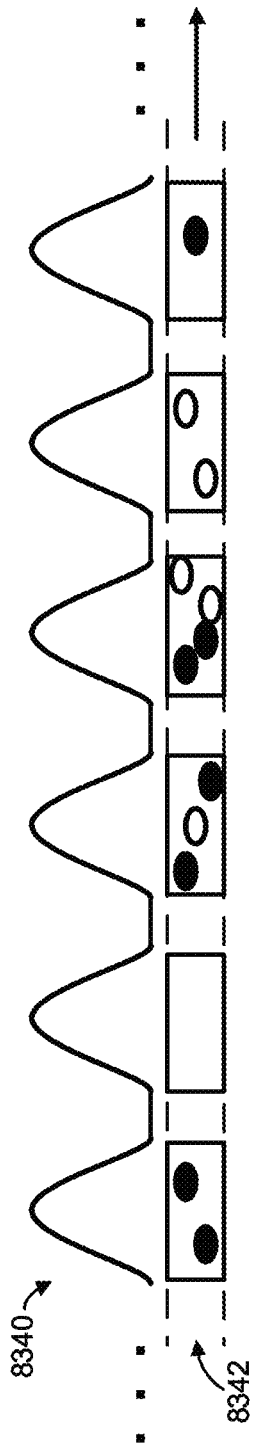
FIG. 8I illustrates example spaced apart pulses and corresponding swaths, which spaced apart pulses and swaths may be utilized in the optical system of FIG. 8A.
Figure 8J:
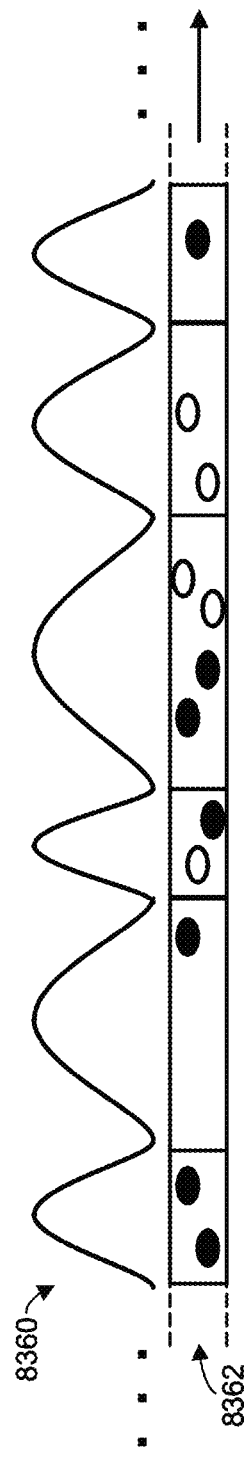
FIG. 8J illustrates example non-periodic swaths and pulses, which swaths and pulses may be utilized in the optical system of FIG. 8A.
Figure 8K:
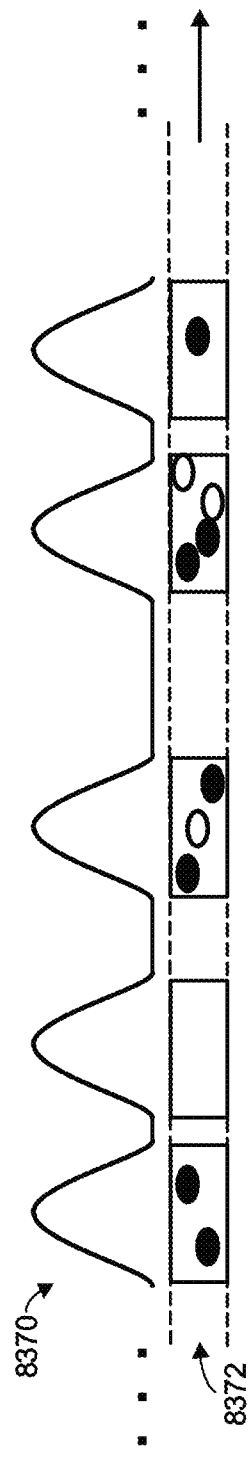
FIG. 8K illustrates both non-periodic and spaced apart swaths and pulses, which swaths and pulses may be utilized in the optical system of FIG. 8A.

Generally, swaths and/or corresponding pulses irradiating the swaths need not repeat periodically in space or time or be literally adjacent to one another in space or time. A swath may correspond to any suitable portion of a stream of analytes that may be selectively irradiated by one pulse of radiation, regardless of the timing or spatial relationship of that swath or pulse to other swaths or pulses. For example, the swaths 8302 discussed with reference to FIG. 8G may be defined in terms of the pulses 8300 that overlap in space and/or time. In other examples illustrated in FIGS. 8H and 8I, a plurality of swaths 8322 may overlap so as to correspond with overlapping pulses 8320, and another plurality of swaths 8342 may be spaced apart (i.e., may have gaps) and may correspond to pulses 8340 that are also spaced apart (e.g., in time and/or space) from one another. In still other example illustrated in FIGS. 8J and 8K, a plurality of swaths 8362 may have various lengths to correspond to pulses 8360 having various pulse durations and/or shapes, and another plurality of swaths 8372 may be unevenly spaced and may correspond to unevenly spaced (e.g., non-periodically repeating) pulses 8370. Implementations of optical systems may utilize any combination of these types of swaths.

Because each swath in a stream may include multiple unsorted analytes, swaths may include analytes that should be irradiated by a laser (i.e., undesired analytes), analytes that should not be irradiated by the laser (i.e., desired analytes), a mix of analytes that should and should not be irradiated by the laser, or no analytes at all (e.g., an empty swath). Thus, the computing device 8012 may utilize one of many sorting strategies to determine which of the swaths should be neutralized. FIGS. 8L, 8M, 8N, 8O, 8P, and 8Q illustrate example sorting strategies, which example sorting strategies may be utilized by the computing device 8012 in a sorting of the unsorted analytes 8014. These sorting strategies are given by way of example, and some implementations of optical systems may utilize other suitable sorting strategies that define which swaths in a stream are to be neutralized (killed, immobilized, etc.).

Figure 8L:
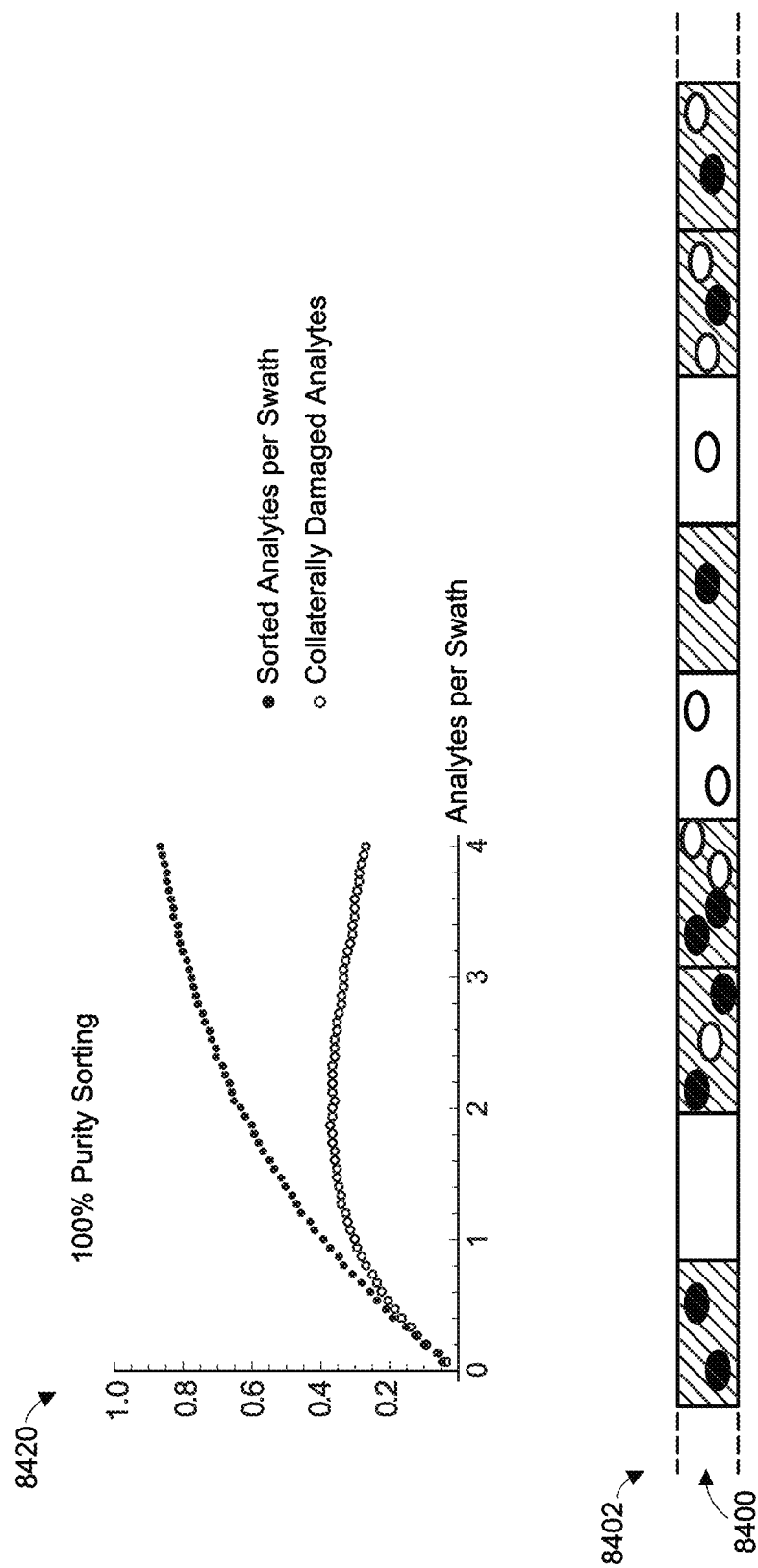
FIGS. 8L and 8M illustrate an example sorting strategy which may be utilized in the optical system of FIG. 8A.

FIG. 8L illustrates an example sorting strategy in which every swath in a stream 8402 including "undesired" (e.g., to be irradiated) analytes is neutralized. "Desired" analytes, in this scenario and the scenarios illustrated in FIGS. 8N, 8O, 8P, and 8Q, may be defined as analytes that, if disposed in a swath without any other analytes, are to be irradiated, and "undesired" analytes may be analytes that, if disposed in a swath without any other analytes, are not to be irradiated. In FIG. 8L, filled ovals represent undesired analytes and unfilled ovals represent desired analytes. The analytes (desired and undesired) are disposed in the stream 8402 having various swaths 8400, where the swaths 8400 may include various numbers of analytes.

Figure 8M:
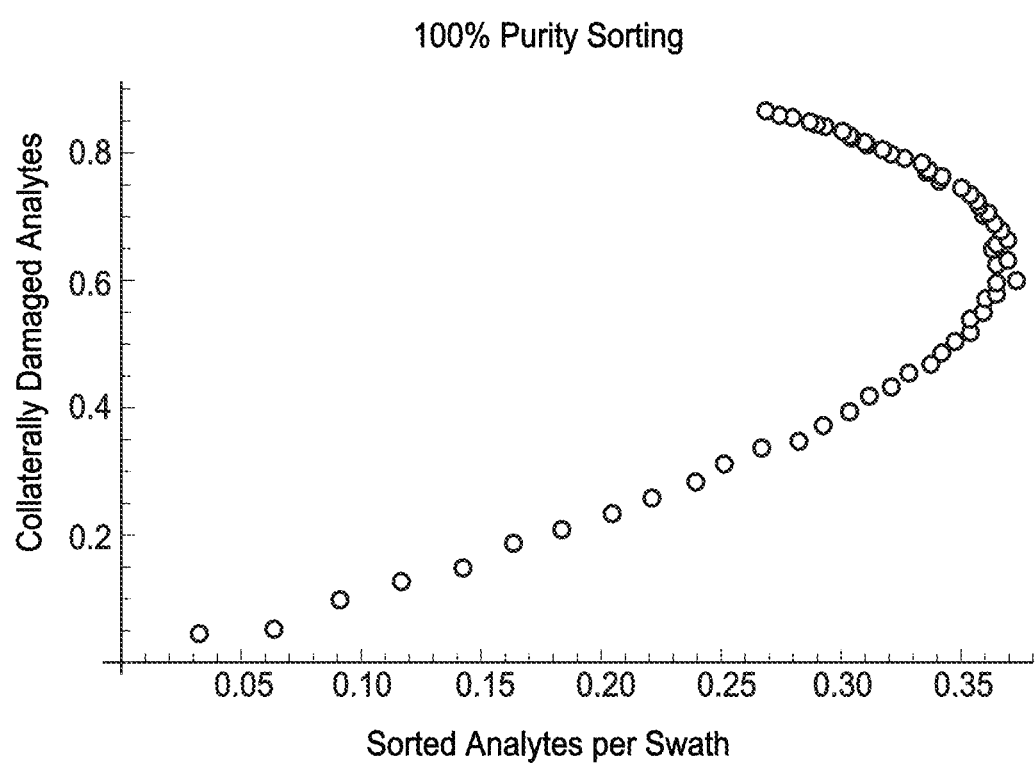

In the sorting strategy illustrated in FIG. 8L, each of the swaths 8400 that has at least one undesired analyte is neutralized (e.g., killed or immobilized), as illustrated by the shaded areas of the stream 8402 in FIG. 8L. In other words, only those of the swaths 8400 including desired analytes and no undesired analytes or those of the swaths 8400 including no analytes at all are left unaltered (e.g., not irradiated). This sorting strategy may be referred to herein as "100% Purity Sorting." The "100% Purity Sorting" strategy may produce a number of sorted analytes per swath as a function of a number of analytes per swath and a number of collaterally damaged analytes (e.g., desired analytes neutralized in swaths having both desired and undesired analytes) as a function of a number of analytes per swath as illustrated in the plot 8420 of FIG. 8L, in an implementation. FIG. 8M includes parametric plot further illustrating a relationship between the a number of sorted analytes per swath and the number of collaterally damaged analytes for this "100% Purity Sorting" strategy. Although this strategy is referred to herein as "100% Purity Sorting," the strategy may not yield 100% purity in sorted analytes due to various effects, such as incorrect determinations (e.g., false positives), misalignments, etc. Thus, "100% Purity Sorting" may refer to a sorting strategy based on an attempted neutralization of all undesired analytes, but optical systems implementing "100% Purity Sorting" may not always produce 100% pure results.

Figure 8N:
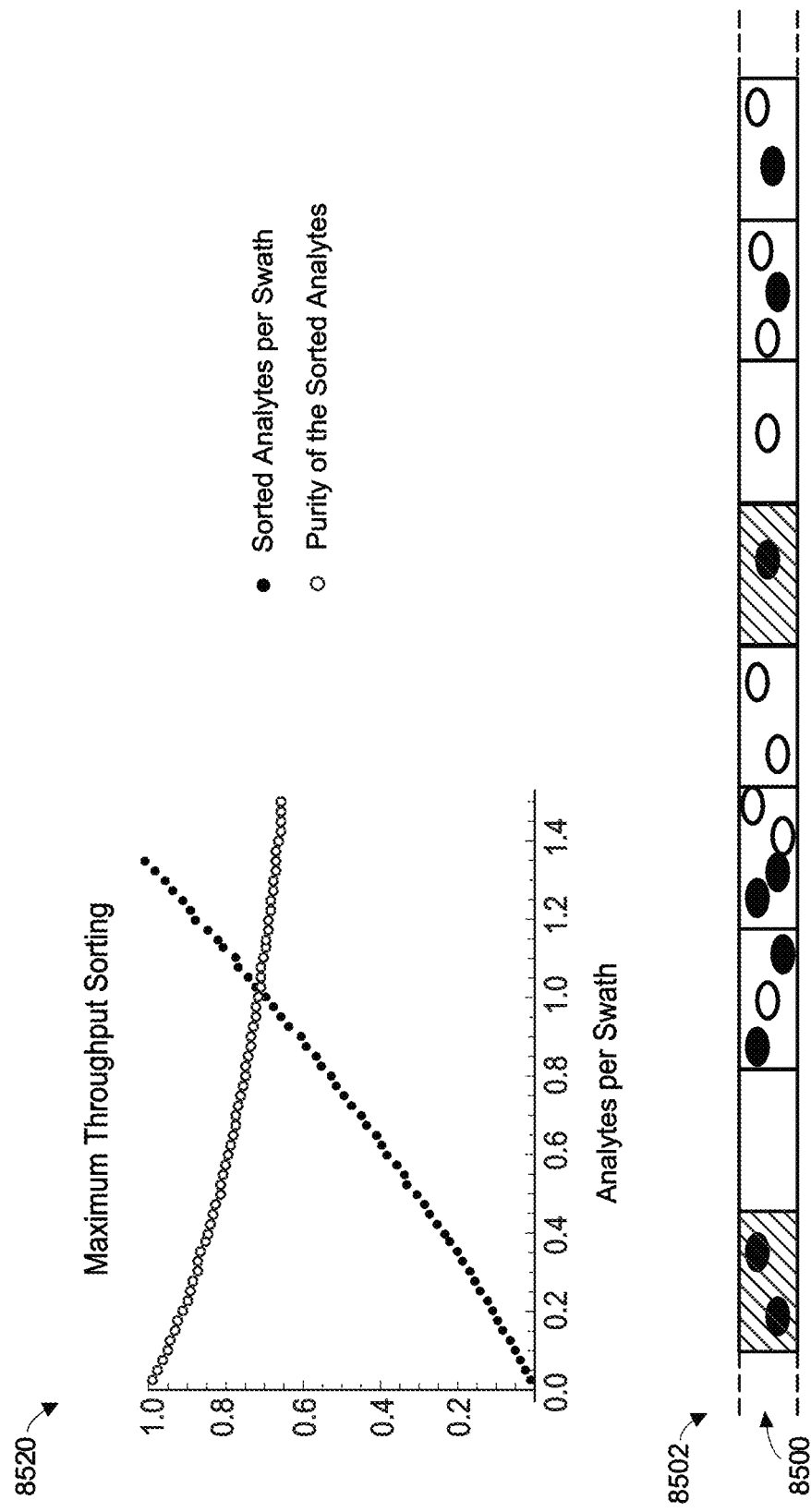
Figure 80:
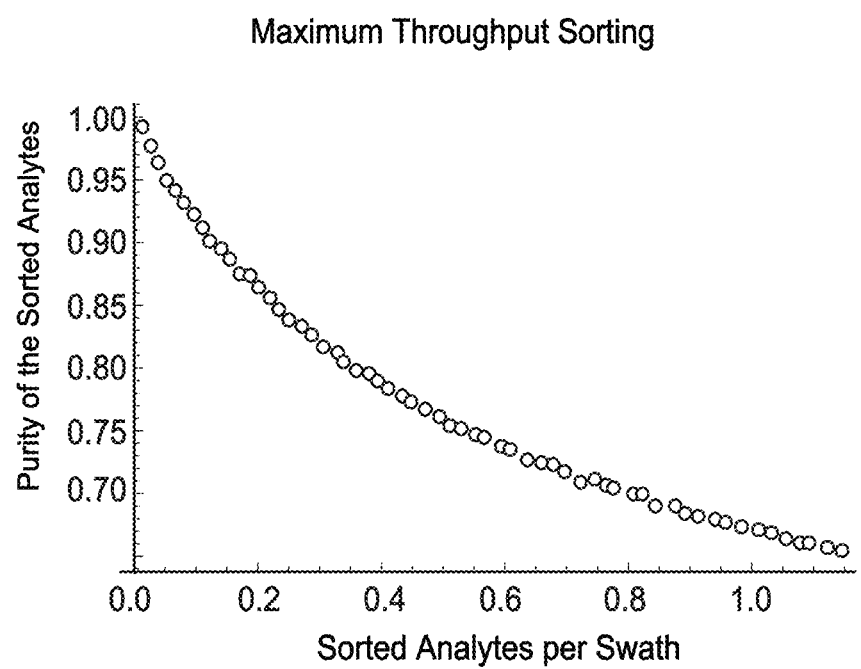

FIG. 8N illustrates another example sorting strategy in which particular ones of the swaths 8500 in a stream 8502 including only "undesired" analytes are neutralized. Those of the swaths 8500 including no analytes, including a mix of desired and undesired analytes, or including only desired analytes are left unaltered (e.g., are not irradiated), and those of the swaths 8500 including only undesired analytes are irradiated, as illustrated by the shaded areas of the stream 8502. This sorting strategy may be referred to herein as "Maximum Throughput Sorting." The "Maximum Throughput Sorting" strategy may produce a number of sorted analytes per swath as a function of a number of analytes per swath and a purity of sorted analytes as a function of a number of analytes per swath as illustrated in the plot 8520 of FIG. 8N, in an implementation. FIG. 8O includes parametric plot further illustrating a relationship between the number of sorted analytes per swath and the purity of sorted analytes for this "Maximum Throughput Sorting" strategy.

Figure 8P:
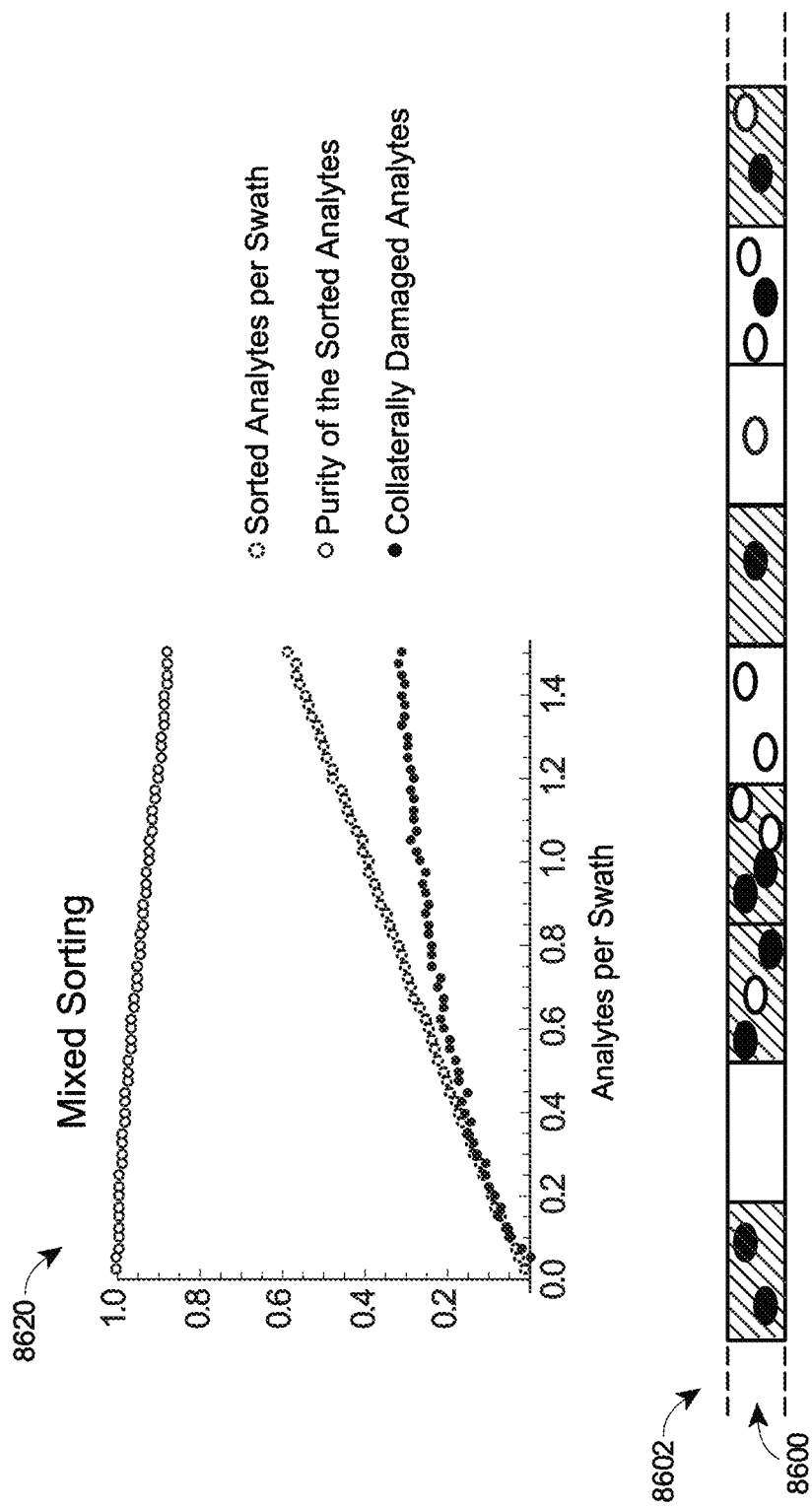
FIGS. 8P and 8Q illustrate yet another example sorting strategy which may be utilized in the optical system of FIG. 8A.
Figure 8Q:
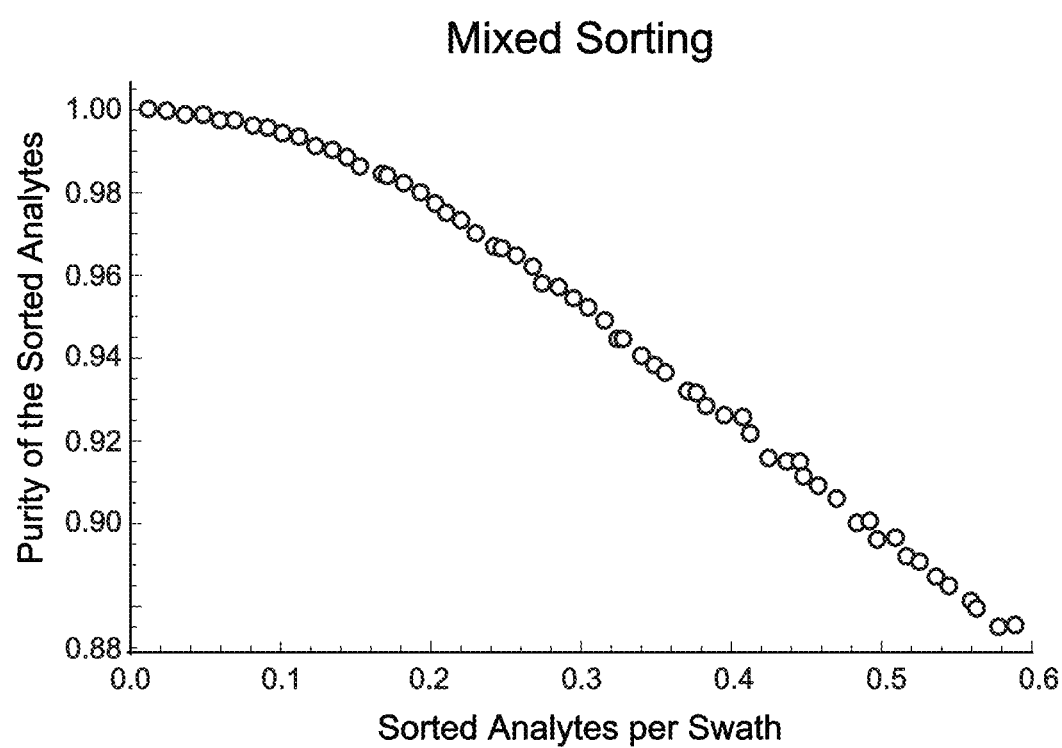

FIG. 8P illustrates yet another example sorting strategy in which particular ones of the swaths 8600 in a stream 8602 are neutralized. These particular ones of the swaths 8600 include the same number of "undesired" analytes as "desired" analytes or include more "undesired" analytes than "desired" analytes. Those of the swaths 8600 including more desired analytes than undesired analytes, including only desired analytes, or including no analytes are left unaltered (e.g., are not irradiated), and those of the swaths 8600 including more undesired analytes than desired analytes or including the same number of undesired and desired analytes are irradiated, as illustrated by the shaded areas of the stream 8602. This sorting strategy may be referred to herein as "Mixed Sorting." The "Mixed Sorting" strategy may produce a number of sorted analytes per swath as a function of a number of analytes per swath, a number of collaterally damaged analytes as a function of a number of analytes per swath, and a purity of sorted analytes as a function of a number of analytes per swath as illustrated in the plot 8620 of FIG. 8N, in an implementation. FIG. 8Q includes parametric plot further illustrating a relationship between the number of sorted analytes per swath and the purity of sorted analytes for this "Mixed Sorting" strategy.

Operators configuring the optical system 8000 may configure the computing device 8012 to control the modulator 8006 according to one of these, or another suitable, sorting strategy. The operators may choose the sorting strategy based on purity requirements of the sorted analytes 8016, design constraints of a device (e.g., flow cytometer) in which the optical system 8000 is integrated, throughput requirements of a device in which the optical system 8000 is integrated, cost constraints, etc. In particular, operators configuring the optical system 8000 may "dial in" (i.e., adjust and/or optimize for a particular need) the optical system 8000 to achieve a near maximum sorting rate, or throughput, given a required or desired yield and/or purity of sorted analytes. This dialing in may include selecting one of the strategies discussed above, selecting and modifying one of the strategies above, or implementing a sorting strategy specifically relevant to a particular application, desired yield and/or purity, and/or throughput.

In an example scenario, operators configuring the optical system 8000 may desire to achieve a maximum or optimized throughput (e.g., rate of analytes through the sorting point 8008) while maintaining a purity of 80% in the sorted analytes 8016. That is, the operators may require that at least 80% of the sorted analytes 8016 are desired analytes. As illustrated in FIG. 8N, the operators may achieve at least 80% purity by selecting the "Maximum Throughput Sorting" strategy and adjusting a velocity of the flow of analytes and/or repetition rate of the laser 8002 such that an average of 0.5 or fewer analytes are disposed in a swath. On the other hand, as illustrated in FIG. 8P, the operators may achieve at least 80% purity by selecting the "Mixed Sorting" strategy and adjusting a velocity of the flow of analytes and/or repetition rate of the laser 8002 such that an average of greater than 0.5 analytes (e.g., 1.4 or more) are disposed in a swath. As such, the operators may select the "Mixed Sorting" strategy to maximize or optimize a throughput analytes given the requirement of 80% purity, because the "Mixed Sorting" strategy allows more analytes to be disposed in a given swath (i.e., allows a rate of flow of analytes to be increased in comparison to a scenario in which the "Maximum Throughput Sorting" strategy is utilized).

In another example scenario, operators configuring the optical system 8000 may desire to achieve an average of maximum or optimized throughput (e.g., rate of analytes through the sorting point 8008) while maintaining a percentage of collaterally damaged analytes at or below of 20%. As illustrated in FIG. 8P, the operators may achieve at or below 20% collaterally damaged analytes by selecting the "Mixed Sorting" strategy and adjusting a velocity of the flow of analytes and/or repetition rate of the laser 8002 such that an average of one or fewer analytes are disposed in a swath. On the other hand, as illustrated in FIG. 8L, operators may achieve at or below 20% collaterally damaged analytes by selecting the "100% Purity Sorting" strategy and adjusting a velocity of the flow of analytes and/or repetition rate of the laser 8002 such that an average of greater than 0.5 analytes (e.g., 1, 2, 3, 4, or more) are disposed in a swath. As such, the operators may select the "100% Purity Sorting" strategy to maximize or optimize a throughput analytes given the requirement of at or below 20% collaterally damaged analytes, because the "100% Purity Sorting" strategy allows more analytes to be disposed in a given swath (i.e., allows a rate of flow of analytes to be increased in comparison to a scenario in which the "Mixed Sorting" strategy is utilized).

Although particular examples of configurations of optical systems are described above, operators may configure optical systems according to the "100% Purity Sorting" strategy, "Maximum Throughput Sorting" strategy, "Mixed Sorting" strategy, or other suitable sorting strategies similar or dissimilar to these sorting strategies to optimize one or more properties of the sorted analytes 8016 while maintaining one more constraints. For example, operators may select and/or modify a sorting strategy to achieve, by way of example, an average number of analytes per swath of greater than 0.1, greater than 1, greater than 2, greater than 3, greater than 4, greater than 5, greater than 6, greater than 7, greater than 8, greater than 9, greater than 10, less than 1, less than 2, less than 3, less than 4, less than 5, less than 6, less than 7, less than 8, less than 9, or less than 10, such as numbers of analytes per swath in the range 0.1 to 1, 0.1 to 2, 0.1 to 3, 0.1 to 4, 0.1 to 5, 0.1 to 6, 0.1 to 7, 0.1 to 8, 0.1 to 9, 0.1 to 10, 1 to 2, 1 to 3, 1 to 4, 1 to 5, 1 to 6, 1 to 7, 1 to 8, 1 to 9, 1 to 10, 2 to 3, 2 to 4, 2 to 5, 2 to 6, 2 to 7, 2 to 8, 2 to 9, 2 to 10, 3 to 4, 4 to 5, 3 to 6, 3 to 7, 3 to 8, 3 to 9, 3 to 10, 4 to 5, 4 to 6, 4 to 7, 4 to 8, 4 to 9, 4 to 10, 5 to 6, 5 to 7, 5 to 8, 5 to 9, 5 to 10, 6 to 7, 6 to 8, 6 to 9, 6 to 10, 7 to 8, 7 to 9, 7 to 10, 8 to 9, 8 to 10, or 9 to 10. In other examples, operators may select and/or modify a sorting strategy to achieve, by way of example, a rate or frequency of analytes passing through the sorting point 8008 greater than 1 MHz, greater than 100 MHz, greater than 250 MHz, greater than 500 MHz, greater than 750 MHz, greater than 1000 MHz (i.e., 1 GHz), less than 250 MHz, less than 500 MHz, less than 750 MHz, or less than 1000 MHz, such as a frequency of analytes passing through the sorting point 8008 in the range 1 to 250 MHz, 1 to 500 MHz, 1 to 750 MHz, 1 to 1000 MHz, 250 to 500 MHz, 250 to 750 MHz, 250 to 1000 MHz, 500 to 750 MHz, 500 to 1000 MHz, 750 MHz to 1000 MHz, 1 GHz to 5 GHz, 100 MHz to 120 MHz, or 90 MHz to 130 MHz. In still other examples, operators may select and/or modify a sorting strategy to achieve, by way of example, a rate or frequency of analytes passing through the sorting point 8008 greater than 1 Hz, greater than 500 Hz, greater than 1000 Hz (i.e., 1 kHz), greater than 500 kHz, greater than 1000 kHz (i.e., 1 MHz), less than 1 Hz, greater than 500 Hz, less than 1000 Hz, less than 500 kHz, or less than 1000 kHz, such as frequencies of analytes passing through the sorting point 8008 in the range 1 Hz to 500 Hz, 1 Hz to 1 kHz, 1 Hz to 500 kHz, 1 Hz to 1000 kHz, 500 Hz to 1 kHz, 500 Hz to 500 kHz, 500 Hz to 1000 kHz, 1 kHz to 500 kHz, 1 kHz to 1000 kHz, 1 kHz to 50 kHz, or 20 kHz to 40 kHz.

In still other examples, operators may select and/or modify a sorting strategy to achieve, by way of example, purities of the sorted analytes 8016 greater than 1%, greater than 20%, greater than 40%, greater than 60%, greater than 80%, less than 20%, less than 40%, less than 60%, less than 80%, or less than 100%, such as purities in the range 1% to 20%, 1% to 40%, 1% to 60%, 1% to 80%, 1% to 100%, 20% to 40%, 20% to 60%, 20% to 80%, 20% to 100%, 40% to 60%, 40% to 80%, 40% to 100%, 60% to 80%, 60% to 100%, or 80% to 100%. In still further examples, operators may select and/or modify a sorting strategy to achieve, by way of example, percents of collaterally damaged analytes greater than 1%, greater than 20%, greater than 40%, greater than 60%, greater than 80%, less than 20%, less than 40%, less than 60%, less than 80%, or less than 100%, such as purities in the range 1% to 20%, 1% to 40%, 1% to 60%, 1% to 80%, 1% to 100%, 20% to 40%, 20% to 60%, 20% to 80%, 20% to 100%, 40% to 60%, 40% to 80%, 40% to 100%, 60% to 80%, 60% to 100%, or 80% to 100%.

Figure 8R:
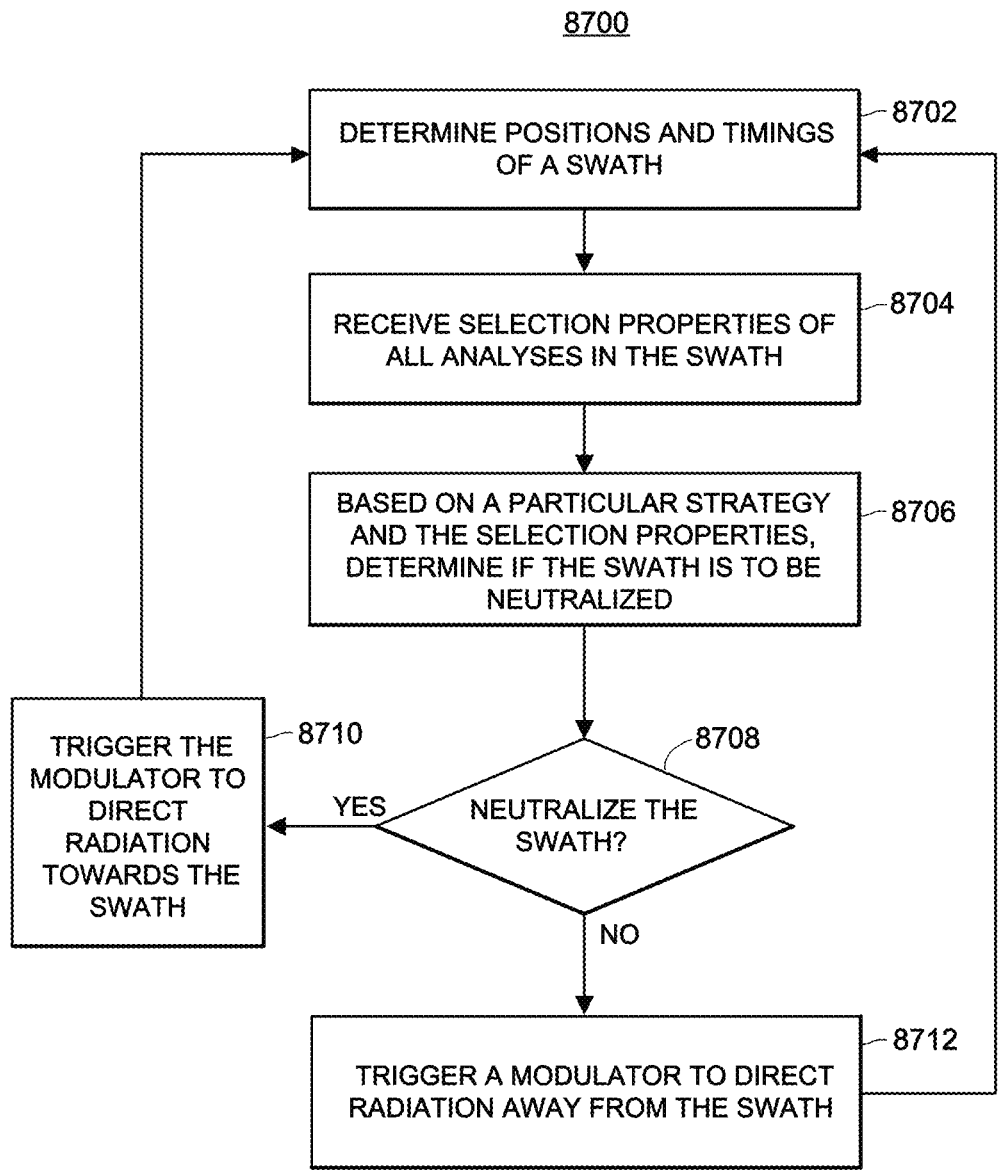
FIG. 8R is a flow diagram of an example method for sorting analytes on an swath by swath basis which may be implemented in the optical system of FIG. 8A.

FIG. 8R is a flow diagram of an example method 8700 for sorting analytes based on properties of analytes in "swaths" of a stream and based on a sorting strategy. The method 8700 may be implemented in the optical system 8000, for example, in cases in which the laser 8002 emits pulses of radiation having a repetition rate that is less than a rate at which the unsorted analytes 8014 pass the sorting point 8008. In particular, the computing device 8012 may implement as least some of the functionality discussed with reference to the method 8700. For ease of discussion, the method 8700 is described below with reference to a laser emitting pulses of radiation with a certain repetition rate. However, optical systems utilizing continuous wave lasers instead of lasers emitting pulses (e.g., lasers employing Q-switching) may also implement the method 8700, where the radiation emitted by the continuous wave lasers is modulated to generate pulses of radiation.

In the method 8700, the computing device 8012 may determine positions and timings of a particular swath of a stream (block 8702), such as swath of a core stream including unsorted sperm cells. The computing device 8012 may utilized a pre-determined reference length of the swath stored on or accessible by the computing device 8012, or the computing device may determine a length of a swath based on a velocity of a stream in which the unsorted analytes 8014 travel, a repetition rate of the laser 8002, and/or distances between the analysis area 8020 and the sorting point 8008. Also, based on the velocity of the stream and a size (e.g., length) of the swath, the computing device 8012 may determine a range of times, $\Delta t_{sorted}$, during which the particular swath will be passing through the sorting point 8008.

The computing device 8012 also receives, for each of the unsorted analytes 8014 disposed in the particular swath, indications of a property of the unsorted analyte 8014 (block 8704). For example, the detector(s) 8018 may communicate (e.g., via one or more analog or digital signals) an indication of fluorescence, for each of the unsorted analytes 8014 disposed in the particular swath, to the computing device 8012. In some implementations, the detector(s) 8018 may communicate multiple indications of the property (e.g., fluorescence) for each of the unsorted analytes 8014 disposed in the particular swath.

Based on the indicated properties of all of the analytes within the particular swath and based on a sorting strategy, the computing device 8012 may determine whether or not the particular swath is to be neutralized (block 8706). In one scenario, the computing device 8012 may be configured based on the "100% Purity Sorting" strategy. In this scenario, the computing device 8012 may determine if the particular swath includes an undesired analyte (e.g., a sperm cell having an undesired sex chromosome). If the particular swath does have an undesired analyte, the computing device 8012 may determine that the particular swath is to be neutralized. In another scenario, the computing device 8012 may be configured based on the "Maximum Throughput Sorting" strategy. In this scenario, the computing device 8012 may determine if the particular swath includes a desired analyte (e.g., a sperm cell having a desired sex chromosome). If the particular swath does include a desired analyte, the computing device 8012 may determine that the particular swath is to be left unaltered (e.g., not irradiated).

In yet another scenario, the computing device 8012 may be configured based on the "Mixed Sorting" strategy. In this scenario, the computing device 8012 may determine if the particular swath includes more desired analytes than undesired analytes. If the particular swath does include more desired analytes than undesired analytes, the computing device 8012 may determine that the particular swath is to be left unaltered (e.g., not irradiated).

If the particular swath is to be neutralized (block 8708), the flow of the method 8700 continues to block 8710. At block 8710, the computing device 8012 may trigger or control the modulator 8006 to direct radiation from the laser 8002 at the sorting point 8008 at the determined time or range of times (e.g., $\Delta t_{sorted}$). As mentioned with reference to the method 8150, the computing device 8012 may account for certain latencies, path length differences, etc. when triggering the modulator 8006, in some implementations.

If it is determined that the particular swath should not be irradiated by the laser 8002 (block 8708), the flow may continue to block 8712. At block 8712, the computing device 8012 may trigger or control the modulator 8006 to direct radiation from the laser 8002 at the beam dump 8010 such that no, or a tolerated amount of, radiation is incident on the particular swath at the determined time or range of times (e.g., $\Delta t_{sorted}$).

The steps of the method 8150 may iterate for each swath in a stream. Thus, utilizing the method 8700, the optical system 8000 may sort the unsorted analytes 8014 on a swath by swath basis to produce the sorted analytes 8016. The sorted analytes 8016 may include the particular analytes that were neutralized (killed, immobilized, destroyed, etc.) at block 8710 of the method 8700 and other analytes that were unaltered by radiation from the laser 8002. Depending on the sorting strategy, the sorted analytes 8016 may include both undesired and desired analytes, where the undesired analytes are a minority in the population of the sorted analytes 8016 (e.g., the undesired analytes are at or below a threshold purity as required by a certain application).

Required Power to Neutralize Analytes

In some scenarios, operators of optical systems, such as the optical system 8000, may perform various experiments and utilize various models to determine a range of powers, or power densities, required to neutralize analytes. For example, in an optical system utilized to sort biological cells, operators may perform experiments and utilize one or more models to determine an amount of power, or a power density, required to immobilize (or decrease the motility of), damage (e.g., burst cell membranes), or otherwise neutralize the biological cells. The operators may then configure lasers and/or beam manipulation elements to achieve the determined power. This configuration may include selecting appropriate lasers, adjusting a beam shape, modifying non-spatial properties of radiation (e.g., polarization), etc.

Figure 8S:
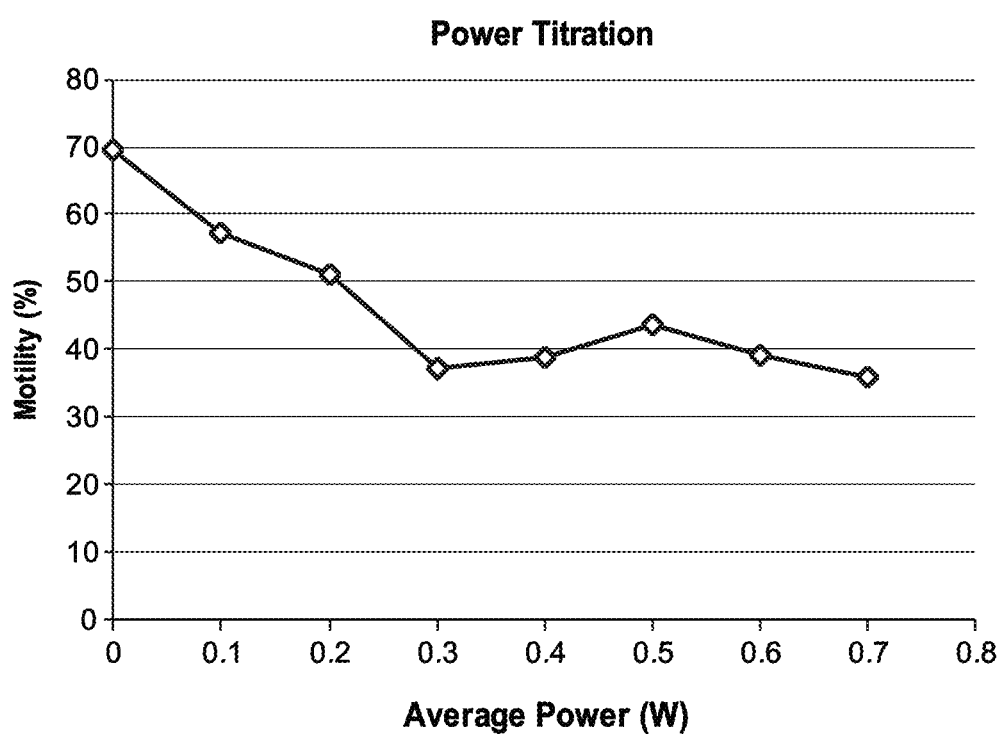
FIG. 8S is a plot illustrating a series of experiments utilized to determine a necessary power, or power density, for neutralizing sperm cells.

FIG. 8S includes a plot of data from an example series of experiments utilized to determine a necessary average power to decrease the motility of sperm cells. In the experiments, a modulator, such as an AOM, titrates the power of a laser such that the average power delivered to sperm cells is varied. As the average power increases, a measured motility of the sperm cells decreases. For an application in which sperm cells are being sorted according to sex chromosomes, a neutralization of the sperm cells may correspond to a motility of at or below 40%.

Figure 8T:
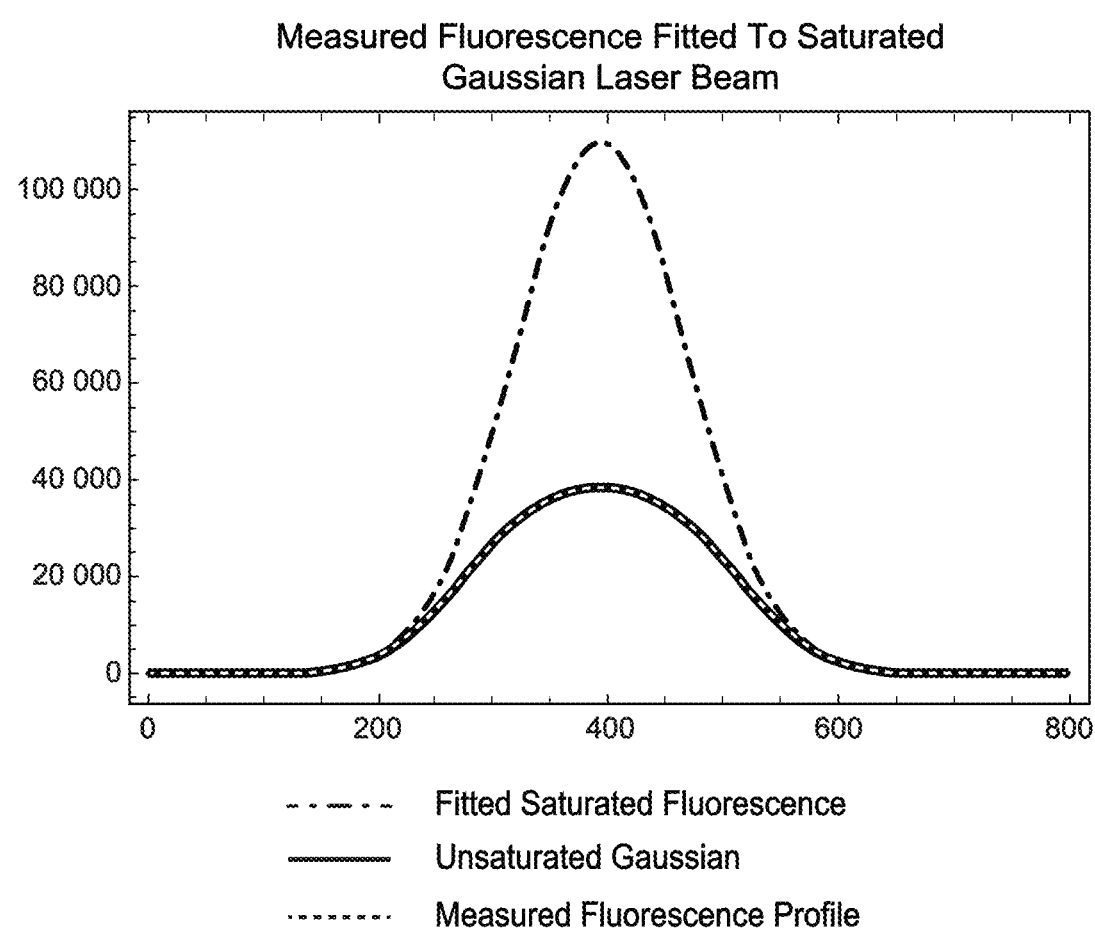
FIG. 8T illustrates an example modeled beam shape.
Figure 8U:
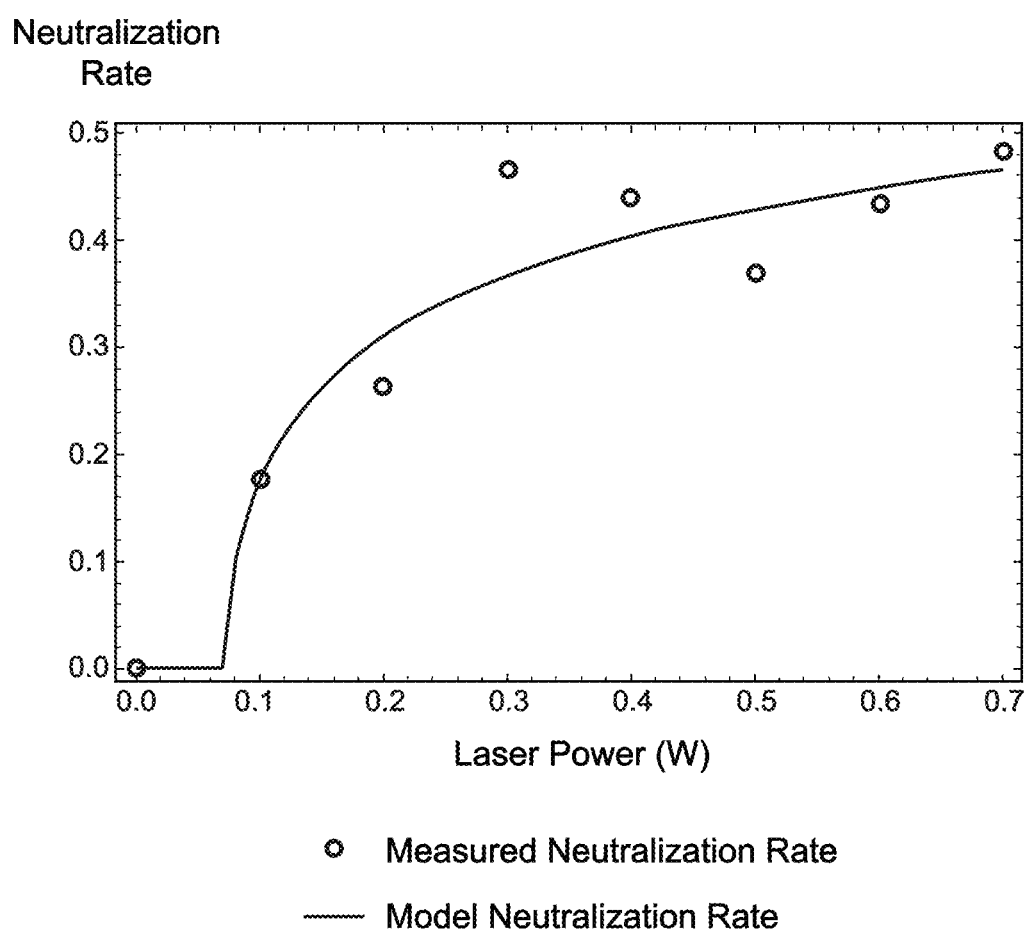
FIG. 8U illustrates a measured and modeled neutralization rate of sperm cells as a function of laser power.

Further, operators may utilize one or more models along with such experiments to determine necessary powers, or power densities, to neutralize analytes. For example, models utilized by operators in determinations of necessary power may model pulse shapes, overlaps between pulses (see FIG. 8G), repetition rates, saturation in a beam profile, etc. FIG. 8T illustrates a fitted (e.g., modeled) beam profile compensating for saturation in the beam profile. A model may utilize this beam profile to model irradiation of a sperm cell or multiple sperm cells in a swath as a function of energy delivered by the modeled pulse. FIG. 8U includes a plot of a modeled neutralization rate of sperm cells (e.g., based on the modeled beam shape of FIG. 8T) as a function of laser power and a measured neutralization rate of sperm cells as a function of laser power.

Operators of the optical system 8000 may utilize these types of experiments and models for various types of lasers, various configurations of the lasers (wavelength, repetition rate, etc.), various configuration of analytes (speeds, numbers, etc.), etc. to determine a power, or power density required to neutralize analytes for a particular application. For example, in the case of sperm cells irradiated by certain lasers as illustrated in FIGS. 8T and 8U, operators may determine that a threshold of energy delivered to the sperm cells sperm cells is 128 µJ/mm$^2$. For that combination of laser and analytes, sperm cells receiving less than 128 µJ/mm$^2$ are likely to be insufficiently neutralized (e.g., maintain a certain percentage of motility), and sperm cells receiving equal to or more than 128 µJ/mm$^2$ are likely to be sufficiently neutralized for the application.

Although a particular energy density, delivered by a laser of an optical system, of 128 µJ/mm$^2$ is provided by way of example above, implementations of optical systems may include a laser emitting radiation such that other energy densities are supplied to (e.g., and at least partially result in an excitation of) analytes. In fact, lasers having powers which result in energy densities equal to or different than 128 µJ/mm$^2$ may cause analytes, such as mammalian reproductive cells (e.g., sperm), to be selectively modified in any number of specific manners. By way of example, a laser may irradiate analytes with an energy density of greater than 1 µJ/mm$^2$, greater than 20 µJ/mm$^2$, greater than 40 µJ/mm$^2$, greater than 60 µJ/mm$^2$, greater than 80 µJ/mm$^2$, greater than 100 µJ/mm$^2$, greater than 120 µJ/mm$^2$, greater than 140 µJ/mm$^2$, greater than 160 µJ/mm$^2$, less than 20 µJ/mm$^2$, less than 40 µJ/mm$^2$, less than 60 µJ/mm$^2$, less than 80 µJ/mm$^2$, less than 100 µJ/mm$^2$, less than 120 µJ/mm$^2$, less than 140 µJ/mm$^2$, or less than 160 µJ/mm$^2$, such as energy densities in the range 1 to 20 µJ/mm$^2$, 1 to 40 µJ/mm$^2$, 1 to 60 µJ/mm$^2$, 1 to 80 µJ/mm$^2$, 1 to 100 µJ/mm$^2$, 1 to 120 µJ/mm$^2$, 1 to 140 µJ/mm$^2$, 1 to 160 µJ/mm$^2$, 20 to 40 µJ/mm$^2$, 20 to 60 µJ/mm$^2$, 20 to 80 µJ/mm$^2$, 20 to 100 µJ/mm$^2$, 20 to 120 µJ/mm$^2$, 20 to 140 µJ/mm$^2$, 20 to 160 µJ/mm$^2$, 40 to 60 µJ/mm$^2$, 40 to 80 µJ/mm$^2$, 40 to 100 µJ/mm$^2$, 40 to 120 µJ/mm$^2$, 40 to 140 µJ/mm$^2$, 40 to 160 µJ/mm$^2$, 60 to 80 µJ/mm$^2$, 60 to 100 µJ/mm$^2$, 60 to 120 µJ/mm$^2$, 60 to 140 µJ/mm$^2$, 60 to 160 µJ/mm$^2$, 80 to 100 µJ/mm$^2$, 80 to 120 µJ/mm$^2$, 80 to 140 µJ/mm$^2$, 80 to 160 µJ/mm$^2$, 100 to 120 µJ/mm$^2$, 100 to 140 µJ/mm$^2$, 100 to 160 µJ/mm$^2$, 120 to 140 µJ/mm$^2$, 120 to 160 µJ/mm$^2$, 140 to 160 µJ/mm$^2$, or 160 to 1000 µJ/mm$^2$, to cause analytes, such as mammalian reproductive cells (e.g., sperm), to be selectively modified. In other examples, a laser may irradiate analytes with an energy density of greater than 1 nJ/mm$^2$, greater than 250 nJ/mm$^2$, greater than 500 nJ/mm$^2$, greater than 750 nJ/mm$^2$, greater than 1000 nJ/mm$^2$, less than 250 nJ/mm$^2$, less than 500 nJ/mm$^2$, less than 750 nJ/mm$^2$, or less than 1000 nJ/mm$^2$, such as energy density in the range 1 to 250 nJ/mm$^2$, 1 to 500 nJ/mm$^2$, 1 to 750 nJ/mm$^2$, 1 to 1000 nJ/mm$^2$, 250 to 500 nJ/mm$^2$, 250 to 750 nJ/mm$^2$, 250 to 1000 nJ/mm$^2$, 500 to 750 nJ/mm$^2$, 500 to 1000 nJ/mm$^2$, or 750 to 1000 nJ/mm$^2$, to cause analytes, such as mammalian reproductive cells (e.g., sperm), to be selectively modified. In still other examples, a laser may irradiate analytes with an energy density of greater than 1 mJ/mm$^2$, greater than 250 mJ/mm$^2$, greater than 500 mJ/mm$^2$, greater than 750 mJ/mm$^2$, greater than 1000 mJ/mm$^2$, less than 250 mJ/mm$^2$, less than 500 mJ/mm$^2$, less than 750 mJ/mm$^2$, or less than 1000 mJ/mm$^2$, such as energy densities in the range 1 to 250 mJ/mm$^2$, 1 to 500 mJ/mm$^2$, 1 to 750 mJ/mm$^2$, 1 to 1000 mJ/mm$^2$, 250 to 500 mJ/mm$^2$, 250 to 750 mJ/mm$^2$, 250 to 1000 mJ/mm$^2$, 500 to 750 mJ/mm$^2$, 500 to 1000 mJ/mm$^2$, 750 to 1000 mJ/mm$^2$, to cause analytes, such as mammalian reproductive cells (e.g., sperm), to be selectively modified.

Example Computing Device

Figure 8V:
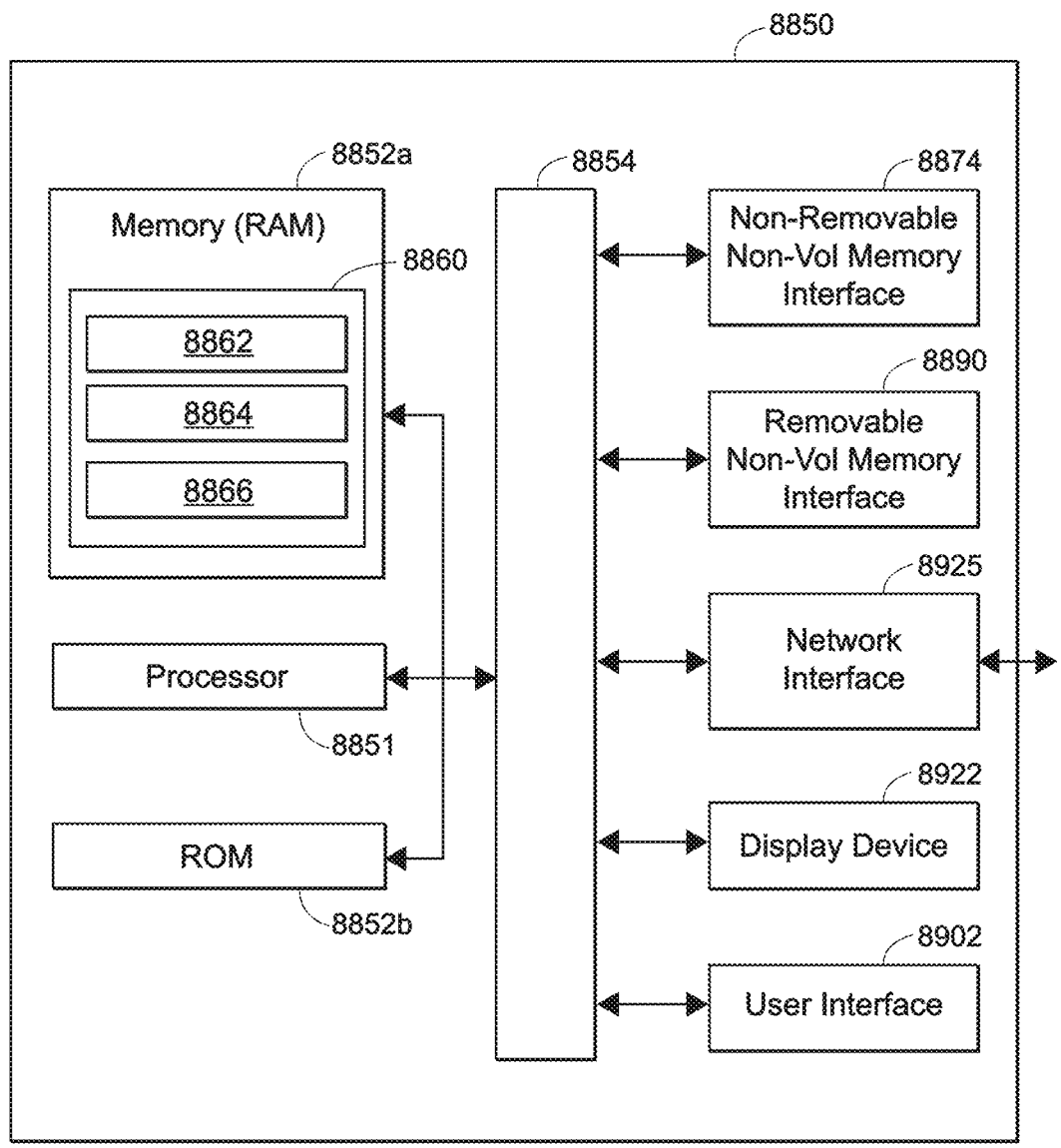
FIG. 8V is a block diagram of an example computing device that may be implemented in the optical system illustrated in FIG. 8A.

FIG. 8V illustrates an example computing device 8850, which computing device 8850 may be implemented as one of the computing device 8012. The computing device 8850 may include one or more central processing units (CPUs) or processing units 8851 (may be called a microcontroller or a microprocessor), a system memory 8852a and 8852b, and a system bus 8854 that couples various system components including the system memory 8852 to the processing units 8851. The system bus 8854 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The computing device 8850 may include an assortment of computer-readable media. Computer-readable media may be any media that may be accessed by the computing device 8850. By way of example, and not limitation, the computer-readable media may include both volatile and nonvolatile media, removable and non-removable media. Media may also include computer storage media and communication media. The computer-readable media may store information such as computer-readable instructions, program modules, data structures, or other data, such as reference values for the length of swaths and indications of sorting strategies. Computer-storage media may include non-transitory media, such as a RAM 8852b, a ROM 8852a, EEPROM, optical storage disks, magnetic storage devices, and any other non-transitory medium that may be used to store computer-accessible information.

In an embodiment, the ROM 8852a and/or the RAM 8852b may store instructions that are executable by the processing unit 8851. For example, a basic input/output system (BIOS), containing algorithms to transfer information between components within the computer 8850, may be stored in ROM 8852b. Data or program modules that are immediately accessible or are presently in use by the processing unit 8851 may be stored in RAM 8852a. Data normally stored in RAM 8852a while the computing device 8850 is in operation may include an operating system, application programs, program modules, and program data. In particular, the RAM 8852a may store one or more applications 8860 including one or more routines 8862, 8864, and 8866 implementing the functionality of the example methods 8150 and 8700.

The computing device 8850 may also include other storage media such as a hard disk drive that may read from or write to non-removable, non-volatile magnetic media, a magnetic disk drive that reads from or writes to a removable, non-volatile magnetic disk, and an optical disk drive that reads from or writes to a removable, nonvolatile optical disk. Other storage media that may be used includes magnetic tape cassettes, flash memory cards, digital versatile disks, digital video tape, solid state RAM, and solid state ROM. The hard disk drive may be connected to the system bus 8854 through a non-removable memory interface such as interface 8874. A magnetic disk drive and optical disk drive may be connected to the system bus 8854 by a removable memory interface, such as interface 8890.

A user or operator may interact with the computing device 8850 through input devices such as a keyboard or a pointing device (i.e., a mouse). A user input interface 8902 may be coupled to the system bus 8854 to allow the input devices to communicate with the processing unit 8851. A display device such as a monitor 8922 may also be connected to the system bus 8854 via a video interface (not shown).

The computing device 8850 may operate in a networked environment using logical connections to one or more remote computing devices, for example. The remote computing device may be a personal computer (PC), a server, a router, or other common network node. The remote computing device typically includes many or all of the previously-described elements regarding the computing device 8850. Logical connections between the computing device 8850 and one or more remote computing devices may include a wide area network (WAN). A typical WAN is the Internet. When used in a WAN, the computing device 8850 may include a modem or other means for establishing communications over the WAN. The modem may be connected to the system bus 8854 via the network interface 8925, or other mechanism. In a networked environment, program modules depicted relative to the computing device 8850, may be stored in the remote memory storage device. As may be appreciated, other means of establishing a communications link between the computing device 8850 and a remote computing device may be used.

While various embodiments have been described above, this disclosure is not intended to be limited thereto. Variations can be made to the disclosed embodiments that are still within the scope of the appended claims. Though claimed below as specific combinations of features, any combination of features in the claims below is contemplated and may form the basis for a further claim or amendment.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present disclosure. It is to be understood that other variations and modifications of the embodiments of the present disclosure described and illustrated herein are possible in light of the teachings herein and are to be considered part of the spirit and scope of the present disclosure. As previously noted, any of the various embodiments of hydrodynamic focusing, illumination, flow cells, mirrors, mirror adjustment mechanisms, flow cell adjustment mechanisms, sorting, and sample collection may be used in any combinations. By way of example, and not limitation, the present disclosure contemplates at least the following aspects:

1. A method of selecting analytes for irradiation, the method comprising: for each of a plurality of analytes traveling in a stream: receiving an indication of a measured property of the analyte, and determining a swath of a stream in which the analyte is disposed, the swath of the stream being one of a plurality of swaths; and for each of the plurality of swaths: determining, based on the measured properties of a subset of the plurality of analytes disposed in the swath, if the swath is to be irradiated by one or more pulses emitted by a source of radiation.

2. The method of aspect 1, wherein determining if the swath is to be irradiated includes: analyzing the measured properties of the subset of the plurality of analytes to determine if the subset of the plurality of analytes includes an undesired analyte, if the subset of the plurality of analytes includes an undesired analyte, determining that the swath is to be irradiated, and if the subset of the plurality of analytes does not include an undesired analyte, determining that the swath is not to be irradiated.

3. The method of either aspect 1 or aspect 2, wherein determining if the swath is to be irradiated includes: analyzing the measured properties of the subset of the plurality of analytes to determine if the subset of the plurality of analytes includes a desired analyte, if the subset of the plurality of analytes includes a desired analyte, determining that the swath is not to be irradiated, and if the subset of the plurality of analytes does not include a desired analyte, determining that the swath is to be irradiated.

4. The method of any one of the preceding aspects, wherein determining if the swath is to be irradiated includes: analyzing the measured properties of the subset of the plurality of analytes to determine if the subset of the plurality of analytes includes more desired analytes than undesired analytes, if the subset of the plurality of analytes includes more desired analytes than undesired analytes, determining that the swath is not to be irradiated, and if the subset of the plurality of analytes does not include more desired analytes than undesired analytes, determining that the swath is to be irradiated.

5. The method of any one of the preceding aspects, wherein determining if the swath is to be irradiated includes: analyzing the measured properties of the subset of the plurality of analytes to determine if the subset of the plurality of analytes includes a desired analyte, if the subset of the plurality of analytes includes a desired analyte, determining that the swath is not to be irradiated, and if the subset of the plurality of analytes does not include a desired analyte and includes at least one undesired analyte, determining that the swath is to be irradiated.

6. The method of any one of the preceding aspects, wherein determining if the swath is to be irradiated includes: analyzing the measured properties of the subset of the plurality of analytes to determine if the subset of the plurality of analytes includes more desired analytes than undesired analytes, if the subset of the plurality of analytes includes more desired analytes than undesired analytes, determining that the swath is not to be irradiated, and if the subset of the plurality of analytes includes at least one of the plurality of analytes and does not include more desired analytes than undesired analytes, determining that the swath is to be irradiated.

7. The method of any one of the preceding aspects, wherein determining if the swath is to be irradiated includes: analyzing the measured properties of the subset of the plurality of analytes to determine if the subset of the plurality of analytes includes more desired analytes than undesired analytes or an equal number of desired analytes and undesired analytes, if the subset of the plurality of analytes includes more desired analytes than undesired analytes or the equal number of desired analytes and undesired analytes, determining that the swath is not to be irradiated, and if the subset of the plurality of analytes does not include more desired analytes than undesired analytes or the equal number of desired analytes and undesired analytes, determining that the swath is to be irradiated.

8. The method of any one of the preceding aspects, wherein determining if the swath is to be irradiated includes: analyzing the measured properties of the subset of the plurality of analytes to determine if the subset of the plurality of analytes includes more desired analytes than undesired analytes or an equal number of desired analytes and undesired analytes, if the subset of the plurality of analytes includes more desired analytes than undesired analytes or the equal number of desired analytes and undesired analytes, determining that the swath is not to be irradiated, and if the subset of the plurality of analytes includes at least one of the plurality of analytes and does not include more desired analytes than undesired analytes or the equal number of desired analytes and undesired analytes, determining that the swath is to be irradiated.

9. The method of any one of the preceding aspects, further comprising, for each of the plurality of swaths, one of: if it is determined that the swath is to be irradiated, controlling a modulator to direct the one or more pulses emitted by the source of radiation towards the swath at a sorting point, or if it is determined that the swath is not to be irradiated, controlling the modulator to direct the one or more pulses emitted by the source of radiation away from the swath.

10. The method of aspect 9, wherein directing the one or more pulses emitted by the source of radiation away from the swath includes directing the one or more pulses emitted by the source of radiation towards a beam dump.

11. The method of either aspect 9 or aspect 10, wherein controlling the modulator to direct the one or more pulses emitted by the source of radiation towards the swath includes triggering an acousto-optic modulator to switch from one state to another state.

12. The method of any one of aspects 9 to 11, wherein controlling the modulator to direct the one or more pulses emitted by the source of radiation towards the swath includes providing voltage signals to a Pockels cell.

13. The method of any one of the preceding aspects, wherein receiving the indication of the measured property of the analyte includes receiving an indication of a fluorescence of the analyte.

14. The method of any one of the preceding aspects, wherein receiving the indication of the measured property of the analyte includes receiving an indication of an optical absorbance of the analyte.

15. The method of any one of the preceding aspects, wherein receiving the indication of the measured property of the analyte includes receiving an indication of phosphorescence of the analyte.

16. The method of any one of the preceding aspects, wherein receiving the indication of the measured property of the analyte includes receiving an indication of light scattering off of the analyte.

17. The method of any one of the preceding aspects, wherein receiving the indication of the measured property and determining the swath of the stream for each of the plurality of analytes traveling in the stream includes receiving the indication of the measured property and determining the swath of the stream for each of a plurality of biological cells traveling in the stream.

18. The method of aspect 17, wherein determining if the swath is to be irradiated includes determining a sex chromosome corresponding to each of the subset of the plurality of analytes based on the measured properties of a subset of the plurality of analytes.

19. The method of any one of the preceding aspects, wherein receiving the indication of the measured property and determining the swath of the stream for each of the plurality of analytes traveling in the stream includes receiving the indication of the measured property and determining the swath of the stream for each of a plurality of non-biological analytes traveling in the stream.

20. The method of any one of the preceding aspects, wherein determining the swath of the stream includes estimating a time at which the analyte will pass through a sorting point, wherein the one or more pulses emitted by the source of radiation intersect the stream at the sorting point.

21. The method of any one of the preceding aspects, further comprising: selecting a sorting strategy, wherein, for each of the plurality of swaths, determining if the swath is to be irradiated includes determining if the swath is to irradiated based on the measured properties of the subset of the plurality of analytes disposed in the swath and based on the sorting strategy; and for each of the plurality of swaths, one of: if it is determined that the swath is to be irradiated, controlling a modulator to direct the one or more pulses emitted by the source of radiation towards the swath at a sorting point, or if it is determined that the swath is not to be irradiated, controlling the modulator to direct the one or more pulses emitted by the source of radiation away from the swath.

22. The method of aspect 21, wherein the plurality of analytes includes desired analytes and undesired analytes, and wherein selecting the sorting strategy includes selecting the sorting strategy such that, when the modulator is controlled to direct the one or more pulses, less than 80% of the desired analytes are irradiated by the one or more pulses emitted by the source of radiation.

23. The method of either aspect 21 or aspect 22, wherein selecting the sorting strategy includes selecting the sorting strategy such that, when the modulator is controlled to direct the one or more pulses, less than 60% of the desired analytes are irradiated by the one or more pulses emitted by the source of radiation.

24. The method of any one of aspects 21 to 23, wherein selecting the sorting strategy includes selecting the sorting strategy such that, when the modulator is controlled to direct the one or more pulses, less than 40% of the desired analytes are irradiated by the one or more pulses emitted by the source of radiation.

25. The method of any one of aspects 21 to 24, wherein selecting the sorting strategy includes selecting the sorting strategy such that, when the modulator is controlled to direct the one or more pulses, less than 20% of the desired analytes are irradiated by the one or more pulses emitted by the source of radiation.

26. The method of any one of aspects 21 to 25, wherein the plurality of analytes includes desired analytes and undesired analytes, and wherein selecting the sorting strategy includes selecting the sorting strategy such that, when the modulator is controlled to direct the one or more pulses, greater than 20% of the undesired analytes are irradiated by the one or more pulses emitted by the source of radiation.

27. The method of any one of aspects 21 to 26, wherein selecting the sorting strategy includes selecting the sorting strategy such that, when the modulator is controlled to direct the one or more pulses, greater than 40% of the undesired analytes are irradiated by the one or more pulses emitted by the source of radiation.

28. The method of any one of aspects 21 to 27, wherein selecting the sorting strategy includes selecting the sorting strategy such that, when the modulator is controlled to direct the one or more pulses, greater than 60% of the undesired analytes are irradiated by the one or more pulses emitted by the source of radiation.

29. The method of any one of aspects 21 to 28, wherein selecting the sorting strategy includes selecting the sorting strategy such that, when the modulator is controlled to direct the one or more pulses, greater than 80% of the undesired analytes are irradiated by the one or more pulses emitted by the source of radiation.

30. The method of any one of aspects 21 to 29, wherein selecting the sorting strategy includes selecting the sorting strategy such that, when the modulator is controlled to direct the one or more pulses towards the swath, an average number of greater than or equal to 0.1 of the plurality of analytes in the swath are irradiated by the one or more pulses.

31. The method of any one of aspects 21 to 30, wherein selecting the sorting strategy includes selecting the sorting strategy such that, when the modulator is controlled to direct the one or more pulses towards the swath, an average number of greater than or equal to one of the plurality of analytes in the swath are irradiated by the one or more pulses.

32. The method of any one of aspects 21 to 31, wherein selecting the sorting strategy includes selecting the sorting strategy such that, when the modulator is controlled to direct the one or more pulses towards the swath, an average number of greater than or equal to two of the plurality of analytes in the swath are irradiated by the one or more pulses.

33. The method of any one of aspects 21 to 32, wherein selecting the sorting strategy includes selecting the sorting strategy such that, when the modulator is controlled to direct the one or more pulses towards the swath, an average number of greater than or equal to three of the plurality of analytes in the swath are irradiated by the one or more pulses.

34. The method of any one of aspects 21 to 33, wherein selecting the sorting strategy includes selecting the sorting strategy such that, when the modulator is controlled to direct the one or more pulses towards the swath, an average number of greater than or equal to four of the plurality of analytes in the swath are irradiated by the one or more pulses.

35. The method of any one of aspects 21 to 34, wherein selecting the sorting strategy includes selecting the sorting strategy such that, when the modulator is controlled to direct the one or more pulses towards the swath, an average number of greater than or equal to five of the plurality of analytes in the swath are irradiated by the one or more pulses.

36. An optical system for selectively irradiating analytes, the optical system comprising: a source of radiation emitting pulses of radiation; a modulator through which the pulses of radiation pass, the modulator operating to selectively direct the pulses of radiation; a detector; and a computing device at least one of electrically or communicatively coupled to the modulator and to the detector, the computing device configured to: receive indications of a property of each of a plurality of analytes from the detector, and control, based on the received indications of the properties of the plurality of analytes, the modulator to direct certain of the pulses of radiation towards selected subsets of the plurality of analytes and to direct the remaining of the pulses of radiation away from the plurality of analytes.

37. The optical system of aspect 36, wherein the modulator is an acousto-optic modulator.

38. The optical system of aspect 37, wherein the acousto-optic modulator has an on state and an off state, and wherein the acousto-optic modulator directs the pulses of radiation towards the selected subsets of the plurality of analytes in the on state.

39. The optical system of either aspect 37 or aspect 38, wherein the acousto-optic modulator has an on state and an off state, and wherein the acousto-optic modulator directs the pulses of radiation towards the selected subsets of the plurality of analytes in the off state.

40. The optical system of any one of aspects 36 to 39, wherein the modulator includes one or more Pockels cells.

41. The optical system of any one of aspects 36 to 40, wherein the source of radiation is a laser utilizing Q-switching.

42. The optical system of any one of aspects 36 to 41, wherein the source of radiation is a mode-locked laser.

43. The optical system of any one of aspects 36 to 42, wherein each of the selected subsets of the plurality of analytes corresponds to one of a plurality of swaths of a stream in which the plurality of analytes are disposed.

44. The optical system of any one of aspects 36 to 43, wherein the computing device is further configured to determine the selected subsets of the plurality of analytes based on the received indications of the property of each of the plurality of analytes.

45. The optical system of any one of aspects 36 to 44, wherein each of the selected subsets of the plurality of analytes includes only undesired analytes.

46. The optical system of any one of aspects 36 to 45, wherein each of the selected subsets of the plurality of analytes includes at least one undesired analyte.

47. The optical system of any one of aspects 36 to 46, wherein each of the selected subsets of the plurality of analytes includes a first number of undesired analytes that is the same or greater than a second number of desired analytes.

48. The optical system of any one of aspects 36 to 47, wherein each of the selected subsets of the plurality of analytes includes a first number of undesired analytes that is greater than a second number of desired analytes.

49. A method of selecting analytes for irradiation, the method comprising: for each of a plurality of analytes traveling in a stream: receiving an indication of a measured property of the analyte, determining, based on the indication of the measured property, if the analyte is to be irradiated by one or more pulses emitted by a source of radiation, and one of: if it is determined that the analyte is to be irradiated, causing the analyte to be irradiated by the one or more pulses, or if it is determined that the analyte is not to be irradiated, causing the analyte to not be irradiated by the one or more pulses.

50. The method of aspect 49, wherein causing the analyte to be irradiated by the one or more pulses includes: determining a time at which the analyte passes a sorting point, wherein the one or more pulses intersect the stream at the sorting point, and controlling a modulator to direct the one or more pulses towards the stream at the determined time.

51. The method of either one of 49 or 50, wherein determining the time at which the analyte passes the sorting point includes pre-determining the time at which the analyte passes the sorting point.

52. The method of any one of aspects 49 to 51, wherein each of the plurality of analytes is a sperm cell, and wherein determining if the analyte is to be irradiated includes determining, based on the indication of the measured property, a sex chromosome of the sperm cell.

53. An optical system for selectively irradiating analytes, the optical system comprising: a source of radiation emitting pulses of radiation; a modulator through which the pulses of radiation pass, the modulator operating to selectively direct the pulses of radiation; a detector; and a computing device at least one of electrically or communicatively coupled to the modulator and to the detector, the computing device configured to: for each of a plurality of analytes: receive an indication of a measured property of the analyte from the detector, determine, based on the indication of the measured property, if the analyte is to be irradiated by the pulses of radiation, and one of: if it is determined that the analyte is to be irradiated, control the modulator to direct the pulses of radiation towards the analyte, or if it is determined that the analyte is not to be irradiated, control the modulator to direct the pulses of radiation away from the analyte.

54. The optical system of aspect 53, wherein the plurality of analytes travel in a stream, wherein the plurality of analytes pass through a sorting point at a first rate, wherein the pulses of radiation intersect the stream at the sorting point, and wherein the source or radiation emits the pulses of radiation at a second rate greater than or equal to the first rate.

55. The optical system of aspect 54, wherein controlling the modulator to direct the pulses of radiation towards the analyte includes directing multiple of the pulses of radiation towards the sorting point.

56. The optical system of any one of aspects 53 to 55, wherein the source of radiation is a laser utilizing mode-locking.

57. The optical system of any one of aspects 53 to 56, wherein the source of radiation utilizes Q-switching and mode-locking techniques to generate the pulses of radiation.

58. The optical system of any one of aspects 53 to 57, wherein the source of radiation emits the pulses of radiation at a repetition rate greater than or equal to one gigahertz.

59. The optical system of any one of aspects 53 to 58, wherein the source of radiation emits the pulses of radiation at a repetition rate greater than or equal to 100 kilohertz.

60. The optical system of any one of aspects 53 to 59, wherein the source of radiation emits the pulses of radiation at a repetition rate greater than or equal to one megahertz.

61. The optical system of any one of aspects 53 to 60, wherein each of the pulses of radiation has a pulse duration less than or equal to a hundred picoseconds.

62. The optical system of any one of aspects 53 to 61, wherein each of the pulses of radiation has a pulse duration less than or equal to a hundred nanoseconds.

63. A method of selecting analytes for irradiation, the method comprising: for each of a plurality of analytes traveling in a stream: receiving an indication of a measured property of the analyte, and determining a swath of a stream in which the analyte is disposed, the swath of the stream being one of a plurality of swaths; and for each of the plurality of swaths: determining, based on the measured properties of a subset of the plurality of analytes disposed in the swath, if the swath is to be irradiated by radiation emitted by a source of radiation.

64. The method of aspect 63, further comprising, for each of the plurality of swaths, one of: if it is determined that the swath is to be irradiated, controlling a modulator to direct the radiation emitted by the source of radiation towards the swath at a sorting point, or if it is determined that the swath is not to be irradiated, controlling the modulator to direct the radiation emitted by the source of radiation away from the swath.

65. The method of aspect 64, wherein controlling the modulator to direct the radiation emitted by the source of radiation towards the swath includes triggering an acousto-optic modulator to switch from one state to another state.

66. The method of either aspect 64 or aspect 65, wherein controlling the modulator to direct the one or more pulses emitted by the source of radiation towards the swath includes providing voltage signals to a Pockels cell.

67. The method of any one of aspects 63 to 66, further comprising, for each of the plurality of swaths, one of: if it is determined that the swath is to be irradiated, controlling the source of radiation to emit a pulse of radiation towards the swath at a sorting point, or if it is determined that the swath is not to be irradiated, controlling the source of radiation to not emit radiation directed towards the swath at a sorting point.

68. An optical system for selectively irradiating analytes, the optical system comprising: a source of radiation; a detector; and a computing device at least one of electrically or communicatively coupled to the modulator and to the detector, the computing device configured to: for each of a plurality of analytes: receive an indication of a measured property of the analyte from the detector, determine, based on the indication of the measured property, if the analyte is to be irradiated by radiation emitted by the source of radiation, and one of: if it is determined that the analyte is to be irradiated, cause the radiation emitted by the source of radiation to be directed towards the analyte, or if it is determined that the analyte is not to be irradiated, cause the radiation emitted by the source of radiation to be directed away from the analyte.

69. The optical system of aspect 68, wherein the source of radiation is a continuous wave laser.

70. The optical system of aspect 68 or aspect 69, further comprising a modulator through which the radiation emitted by the source of radiation passes, the modulator configured to selectively direct the radiation.

71. The optical system of aspect 70, wherein causing the radiation emitted by the source of radiation to be directed towards the analyte includes controlling the modulator to direct the radiation towards the analyte.

72. The optical system of aspect 55 or aspect 71, wherein causing the radiation emitted by the source of radiation to be directed away from the analyte includes controlling the modulator to direct the radiation away from the analyte.

73. The optical system of any one of aspects 68 to 72, wherein the source of radiation is a controllable laser, wherein the controllable laser is configured to emit pulses of radiation upon receiving one or more trigger signals.

74. The optical system of aspect 73, wherein causing the radiation emitted by the source of radiation to be directed towards the analyte includes communicating the one or more trigger signals to the controllable laser.

75. The optical system of aspect 73 or aspect 74, wherein causing the radiation emitted by the source of radiation to be directed away from the analyte includes not communicating the one or more trigger signals to the controllable laser.

76. A method of sorting sperm cells in flow, the method comprising: selecting a sperm cell in the flow to irradiate with radiation emitted by a laser; and using the laser to irradiate the sperm cell in the flow with the radiation, the radiation having a wavelength between one hundred nanometers and eight hundred nanometers, the radiation including pulses having a repetition rate greater than one megahertz, and the radiation delivering an energy density greater than one microjoule per millimeter squared to the sperm cell.

77. The method of aspect 76, wherein using the laser to irradiate the sperm cell in the flow includes using the laser to irradiate the sperm cell in the flow with the radiation having the wavelength between two hundred nanometers and three hundred nanometers.

78. The method of aspect 76 or aspect 77, wherein using the laser to irradiate the sperm cell in the flow includes using the laser to irradiate the sperm cell in the flow with the radiation having the wavelength between two hundred and fifty nanometers and two hundred and eighty nanometers.

79. The method of any one of aspects 76 to 78, wherein using the laser to irradiate the sperm cell in the flow includes using the laser to irradiate the sperm cell in the flow with the radiation having the wavelength between two hundred and sixty nanometers and two hundred and seventy nanometers.

80. The method of any one of aspects 76 to 79, wherein using the laser to irradiate the sperm cell in the flow includes using the laser to irradiate the sperm cell in the flow with the radiation including the pulses having the repetition rate greater than one hundred megahertz.

81. The method of any one of aspects 76 to 80, wherein using the laser to irradiate the sperm cell in the flow includes using the laser to irradiate the sperm cell in the flow with the radiation including the pulses having the repetition rate between one hundred megahertz and two hundred megahertz.

82. The method of any one of aspects 76 to 81, wherein using the laser to irradiate the sperm cell in the flow includes using the laser to irradiate the sperm cell in the flow with the radiation including the pulses having the repetition rate between one hundred megahertz and one hundred and twenty megahertz.

83. The method of any one of aspects 76 to 82, wherein using the laser to irradiate the sperm cell in the flow includes using the laser to irradiate the sperm cell in the flow with the radiation including the pulses, each of the pulses having a pulse duration less than one hundred picoseconds.

84. The method of any one of aspects 76 to 83, wherein using the laser to irradiate the sperm cell in the flow includes using the laser to irradiate the sperm cell in the flow with the radiation including the pulses, each of the pulses having a pulse duration less than one hundred picoseconds.

85. The method of any one of aspects 76 to 84, wherein using the laser to irradiate the sperm cell in the flow includes using the laser to irradiate the sperm cell in the flow with the radiation including the pulses, each of the pulses having a pulse duration less than one picosecond.

86. The method of any one of aspects 76 to 85, wherein using the laser to irradiate the sperm cell in the flow includes using the laser to irradiate the sperm cell in the flow with the radiation delivering the energy density greater than one hundred microjoules per millimeter squared to the sperm cell.

87. The method of any one of aspects 76 to 86, wherein using the laser to irradiate the sperm cell in the flow includes using the laser to irradiate the sperm cell in the flow with the radiation delivering the energy density between one hundred microjoules per millimeter squared and one hundred and forty microjoules per millimeter squared to the sperm cell.

88. A system for sorting sperm cells in flow, the system comprising: a laser emitting radiation, the radiation: having a wavelength between one hundred nanometers and eight hundred nanometers, including pulses having a repetition rate greater than one megahertz, and delivering an energy density greater than one microjoule per millimeter squared to the sperm cells; and a computing device configured to cause the radiation emitted by the laser to be modulated such that select ones of the sperm cells are irradiated by the radiation.

89. The system of aspect 88, wherein the radiation has a wavelength between two hundred nanometers and three hundred nanometers.

90. The system of aspect 88 or aspect 89, wherein the radiation has a wavelength between two hundred and sixty nanometers and two hundred and seventy nanometers.

91. The system of any one of aspects 88 to 90, wherein the pulses have a repetition rate greater than one hundred megahertz.

92. The system of any one of aspects 88 to 91, wherein the pulses have a repetition rate between one hundred megahertz and one hundred and twenty megahertz.

93. The system of any one of aspects 88 to 92, wherein the energy density is greater than one hundred microjoules per millimeter squared.

94. The system of any one of aspects 88 to 93, wherein the energy density is between one hundred microjoules per millimeter squared and one hundred and forty microjoules per millimeter squared.

95. The system of any one of aspects 88 to 94, wherein each of the pulses has a duration of less than one hundred picoseconds.

96. The system of any one of aspects 88 to 95, wherein each of the pulses has a duration of less than one picosecond.

97. The system of any one of aspects 88 to 96, wherein the laser is a mode-locking laser.

98. The system of any one of aspects 88 to 97, wherein the laser utilizes Q-switching.

99. The system of any one of aspects 88 to 98, wherein the laser utilizing Q-switching and mode-locking techniques.

Core Stream Recovery

As should be apparent by now, it is important to be cognizant that analyte cells may be delicate, particularly when those cells are mammalian sperm cells intended for later use in a fertilization process. Thus, the process of characterizing and/or sorting the analyte cells may result in collateral, or unintended damage, to the analyte cells. Such collateral damage can be caused by any number of factors, including: exposure, especially prolonged exposure, to sheath fluid in the core-in-sheath flow and dilution of the cells by mixing with the sheath fluid; excessive forces on the cells as a result of the fluidics of the cytometry system, including depressurization, deceleration, and/or fluidic turbulence; exposure to environmental pathogens, etc. Any of these factors may negatively affect the fertility, viability, motility, and/or other determinants of quality of the cells.

Accordingly, the present disclosure is directed in part to systems, devices, and methods that at least partially mitigate some of the above-noted factors that can cause collateral damage to the analyte cells, by, for example: (1) reducing potentially harmful depressurization, turbulence, and/or dilution effects; (2) capturing and/or concentrating the core flow exiting a flow cell to provide a low-dilution and low stress passageway out of the flow cell for the analyte cells; and (3) capturing core flow exiting a flow cell to simplify subsequent recovery and/or processing of the analyte cells exiting a flow cell in which a core-in-sheath flow is used wherein the analyte cells are localized substantially within the core flow.

FIGS. 9A-9D illustrate one example of a device 9000 constructed in accordance with the principles of the present disclosure. The device 9000, which in the illustrated example takes the form of a flow cell, generally includes an inlet nozzle 9004, a tube member 9008, an outlet nozzle 9012, and a capture mechanism 9016. The capture mechanism 9016 is positioned in the outlet nozzle 9012 proximate to an end of the tube member 9008 and is configured to recover core flow from the core-in-sheath flow once or as the core-in-sheath flow exits the tube member 9008, as will be described in greater detail below.

Figure 9A:
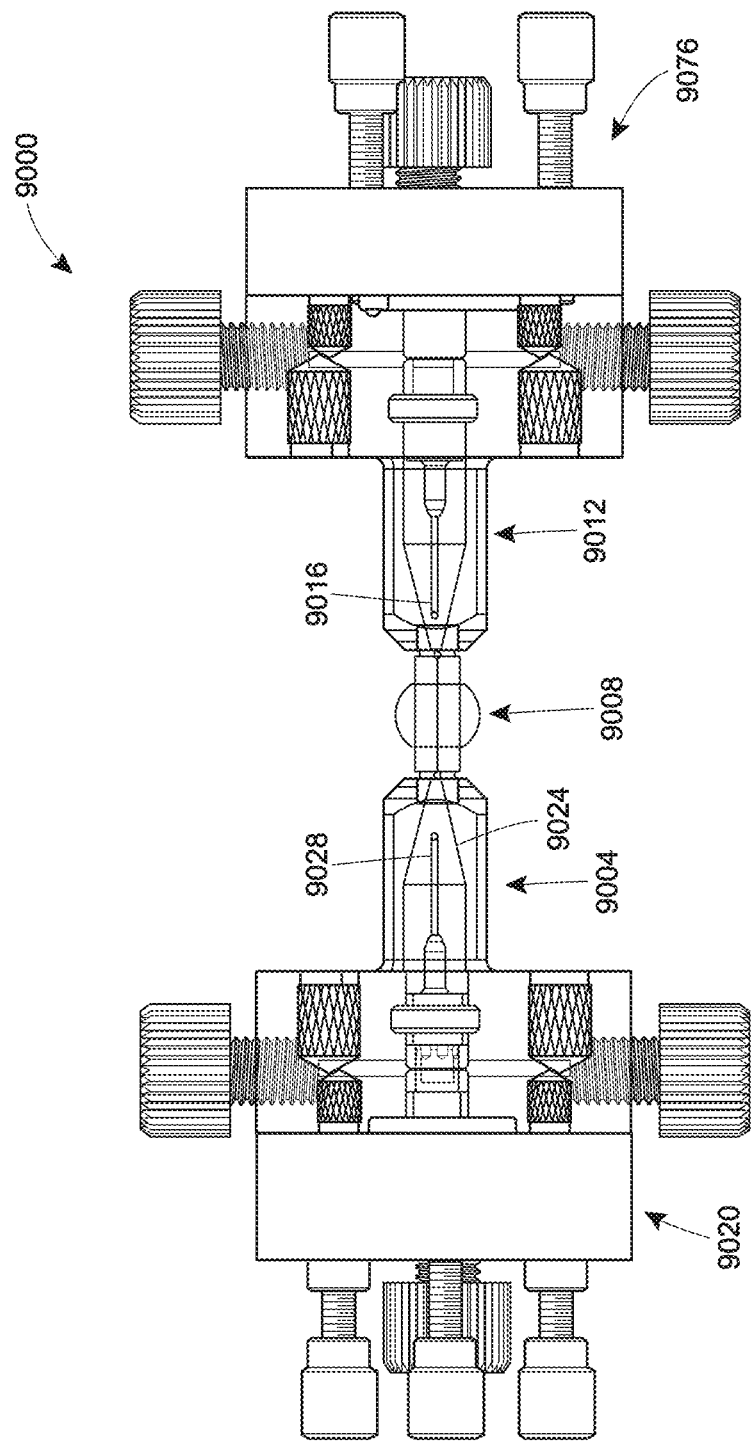
FIG. 9A is a side view of a device for use in performing flow cytometry and having a capture mechanism constructed in accordance with the principles of the present disclosure.
Figure 9B:
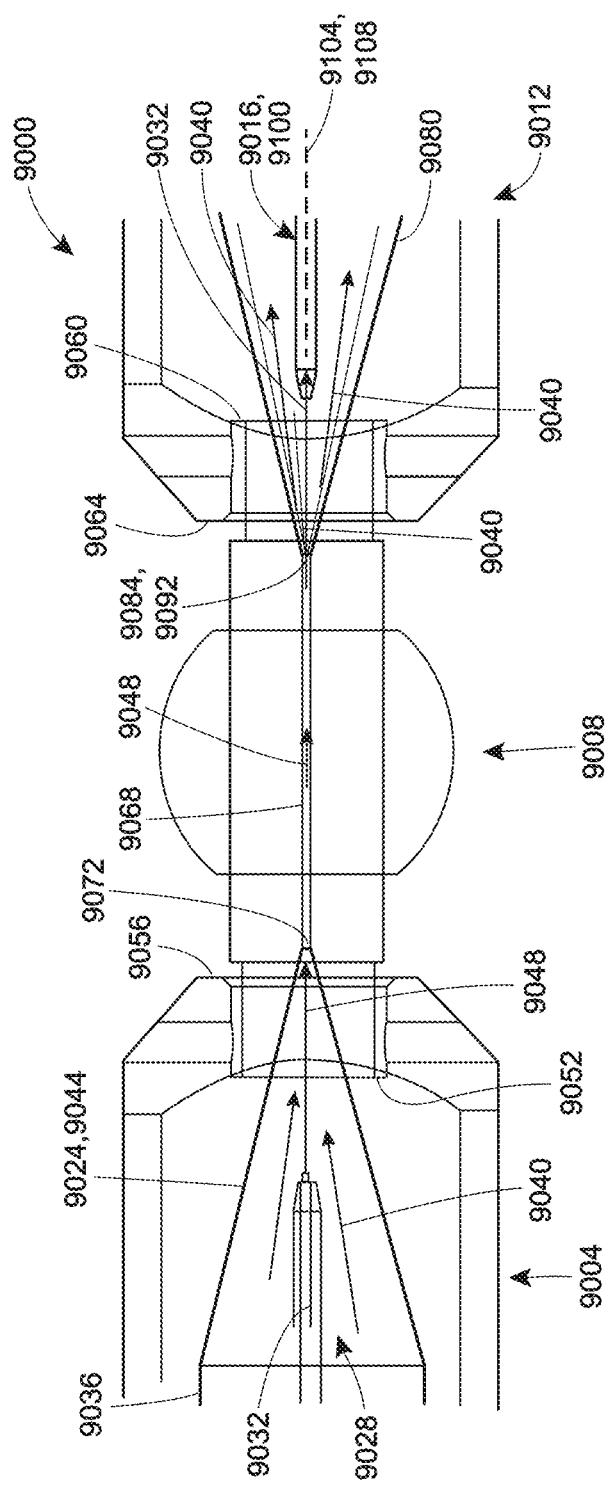
FIG. 9B is a close up view of a portion of the device of FIG. 9A.

As illustrated in FIGS. 9A and 9B, the inlet nozzle 9004 is arranged at an inlet 9020 of the device 9000, and defines an inlet cavity 9024. An inlet tube 9028, which in this example takes the form of a needle, is disposed in the inlet cavity 9024 of the inlet nozzle 9004, such that the inlet tube 9028 is arranged to receive a core stream 9032 that includes analytes (e.g., non-human mammalian sperm cells). The inlet cavity 9024 has a main portion 9036 that is arranged to receive sheath fluid 9040, injected at a higher pressure and velocity than the core stream 9032 around the inlet tube 9028, and a transition portion 9044 that has a cross-sectional shape (in this case, a conical cross-sectional shape) that decreases in diameter so as to focus the core stream 9032 and the sheath fluid 9040 to form a core-in-sheath flow 9048. The core-in-sheath flow 9048 includes the sheath fluid 9040 surrounding the core stream 9032 (which generally contains the analytes).

The tube member 9008, which in the illustrated example takes the form of a round capillary tube having a ball for illumination, detection, and killing purposes, is coupled to and disposed between the inlet and outlet nozzles 9004, 9012. In alternate embodiments the tube member 9008 may have a different cross-sectional shape and/or functions. The tube member 9008 has an inlet end 9052 that is disposed proximate to an outlet end 9056 of the inlet nozzle 9004, and an outlet end 9060 that is similarly disposed proximate to an inlet end 9064 of the outlet nozzle 9012. The tube member 9008 has or defines a tube passageway 9068 that passes the core-in-sheath flow 9048 between the inlet nozzle 9004 and the outlet nozzle 9012. More particularly, the tube passageway 9068 has an inlet end 9072 arranged to receive the core-in-sheath flow 9048 from the transition portion 9044 of the inlet nozzle 9004; the core-in-sheath flow 9048 is, in turn, passed to or toward the outlet nozzle 9012. At this happens, the core-in-sheath flow 9048, and particularly the stream of analytes, may be subjected to flow cytometric processes (e.g., analysis and/or sorting).

As illustrated in FIG. 9B, the outlet nozzle 9012 is arranged at an outlet 9076 of the device 9000 so as to receive the core-in-sheath flow 9048 from the tube member 9008. The outlet nozzle 9012 defines an outlet cavity 9080 that has an inlet end 9084 that is in fluid communication with an outlet end 9092 of the tube passageway 9068. The outlet nozzle 9012, specifically the outlet cavity 9080, is thus arranged to receive the core-in-sheath flow 9048 from the tube passageway 9068 as or once it exits via the outlet end 9092.

At the outlet nozzle 9012, the core-in-sheath flow 9048 is allowed to decelerate and expand, which generates significant, often detrimental, forces on the analytes contained in the core-in-sheath flow. Thus, the capture mechanism 9016 is positioned in the outlet nozzle 9012 proximate to the outlet end 9092 of the tube passageway 9068. So arranged, the capture mechanism 9016 recovers or collects the core stream from the core-in-sheath flow 9048 as or once the core-in-sheath flow exits the tube member 9008. This serves to separate the analytes from the majority of the sheath fluid, which shields the analytes from the harmful physical forces that occur in the outlet nozzle 9012 (as the flow decelerates and expands). In other words, the capture mechanism 9016 erects a protective barrier between the analytes and the turbulent effects of deceleration. The capture mechanism 9016 also prevents significant dilution of the analytes, as the recovered flow is substantially composed of the core stream 9032 (with the analytes contained therein).

Figure 9C:
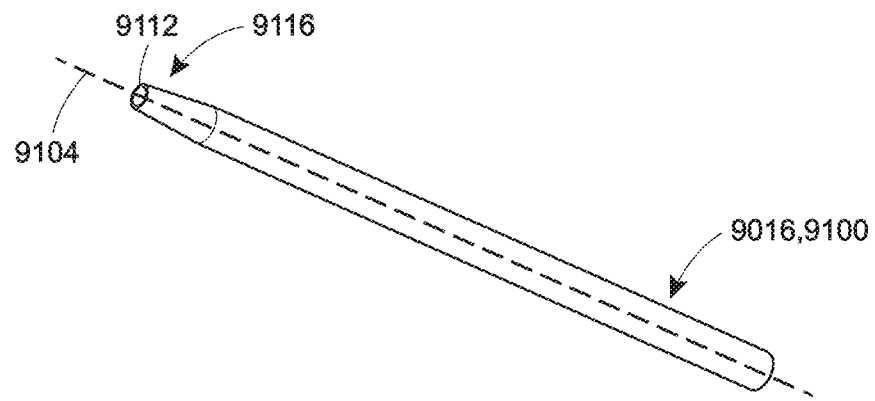
FIG. 9C is a perspective view of a first example of the capture mechanism of FIG. 9A, in the form of a capture tube.
Figure 9D:
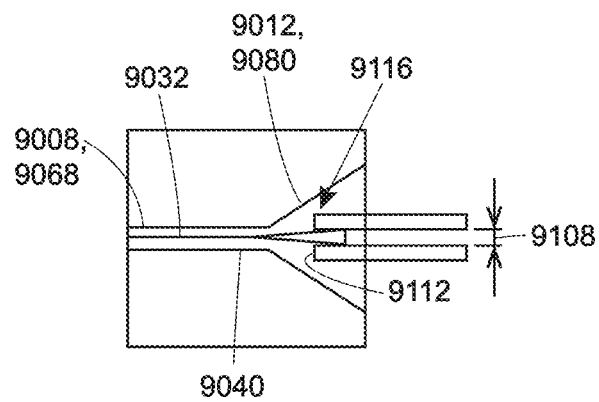
FIG. 9D is a cross-sectional view of a core stream of a core-in-sheath flow being recovered by the capture mechanism of FIG. 9C.

The capture mechanism 9016 illustrated in FIGS. 9A-9D takes the form of a capture tube 9100. The capture tube 9100, which may, as illustrated, be a needle, has or defines a longitudinal axis 9104 that is coaxial with a flow axis 9108 of the core-in-sheath flow 9048, and has an inner diameter 9108 that is larger than a diameter of the core stream 9032 but smaller than a diameter of the sheath fluid 9040, such that the core stream 9032, upon exiting the tube member 9008, passes through the capture tube 9100, while the sheath fluid 9040 (or at least a substantial portion of the sheath fluid) is passed around the capture tube 9100. In one example, the inner diameter 9108 of the capture tube 9100 is equal to approximately 20 μm. As best illustrated in FIGS. 9C and 9D, the capture tube 9100 has an exposed tip 9112 at an end 9116 of the capture tube 9100 that is positioned closest to the tube member 9008. The exposed tip 9112 is shaped to accommodate an expanded flow of the core stream 9032 upon exiting the tube member 9008, which in turn minimizes an energy dissipation rate (EDR) of the core stream 9032 as it passes therethrough and, more specifically, minimizes the kinetic energy imparted to particles of the analyte. By minimizing the EDR of the core stream 9032, the tip 9112 helps to reduce harmful physical stresses on the analytes contained in the core stream 9032.

Figure 9E:
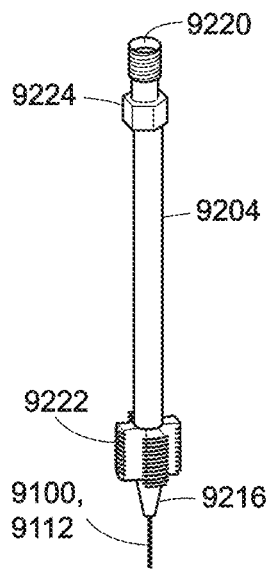
FIG. 9E is a perspective view of a second example of a capture mechanism constructed in accordance with the principles of the present disclosure, in the form of an adjustable capture tube assembly.
Figure 9F:
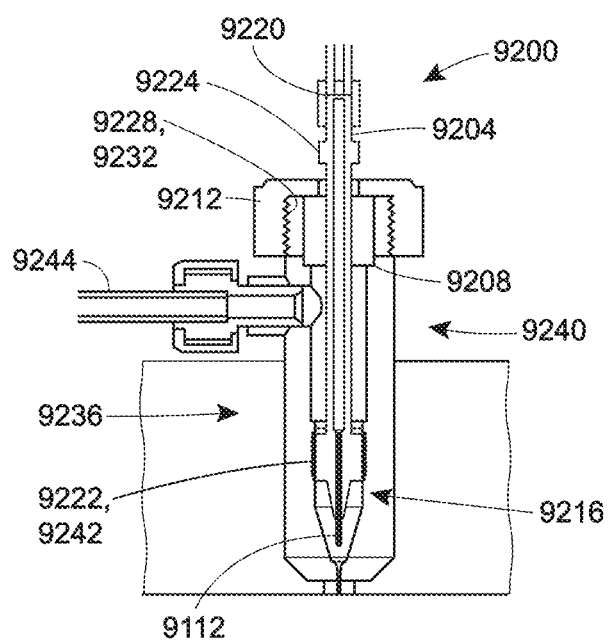
FIG. 9F is a cross-sectional view of the capture mechanism of FIG. 9E coupled to an outlet nozzle of the device.

In some cases, it may be desirable to permit the capture tube 9100 to be adjusted to move the capture tube 9100 closer to or further from the exit of the tube member 9008 in a direction that is parallel to the tube axis 9104 and is parallel to the flow axis 9108. FIGS. 9E-9F illustrate an example of a capture mechanism 9200 that can be used, instead of the capture mechanism 9016, to facilitate such movement. In other cases, it may be desirable to permit the capture tube 9100 to be adjusted in this direction and in one or more directions that are perpendicular to the tube axis 9104 and are perpendicular to the flow axis 9108. FIGS. 9H and 9I illustrate an example of a capture mechanism 9300 that can be used, instead of the capture mechanism 9016, to facilitate such movement.

The capture mechanism 9200 illustrated in FIGS. 9E-9F takes the form of an adjustable capture tube assembly having an elongate conduit 9204 that is movably disposed in the outlet nozzle 9012, a sealing element 9208, and a fastener 9212 configured to fasten the sealing element 9208 to the conduit 9204. With reference specifically to FIG. 9E, the elongate conduit 9204 has a first end 9216 and a second end 9220 opposite the first end 9216. The elongate conduit 9204 includes a threaded portion 9222 at or proximate to the first end 9216. An adjuster 9224, which in this example is a hex adjuster, is arranged on the elongate conduit 9204 proximate to the second end 9220. The capture tube 9100 is disposed in the elongate conduit 9204 such that the tip 9112 projects outwardly from the first end 9216. With reference to FIG. 9F, the sealing element 9208 in the illustrated example is a gasket having a threaded exterior surface 9228. The fastener 9212 has a corresponding threaded interior surface 9232 such that the fastener 9212 can be threaded to the sealing element 9208 to secure the sealing element 9208 in position around the elongate conduit 9204, as illustrated in FIG. 9F.

Figure 9G:
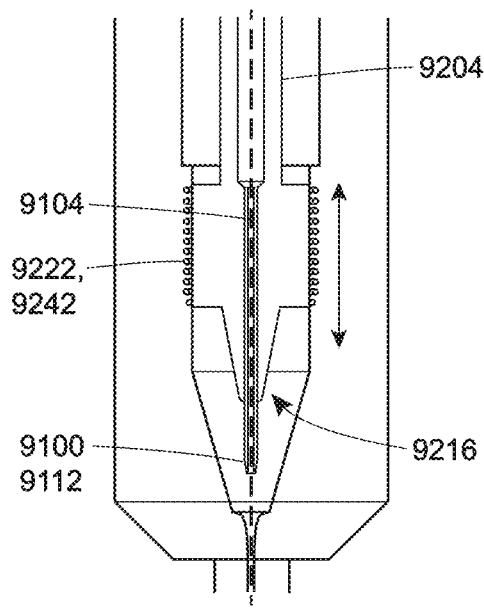
FIG. 9G is a close-up view of the capture mechanism of FIG. 9F, showing how the capture mechanism can be adjusted in a direction parallel to a flow axis of the core-in-sheath flow.
Figure 9H:
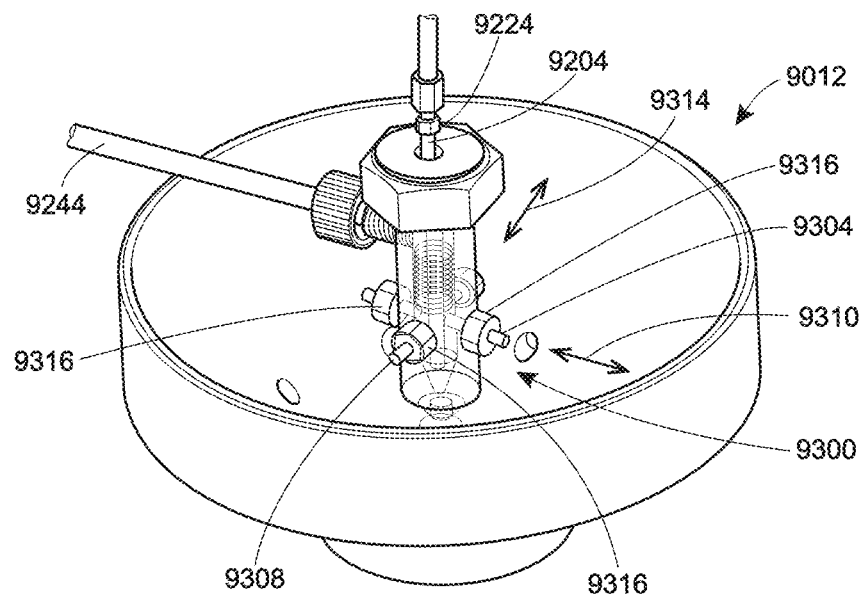
FIG. 9H is a perspective view of a third example of a capture mechanism constructed in accordance with the principles of the present disclosure, in the form of an adjustable capture tube assembly.
Figure 9I:
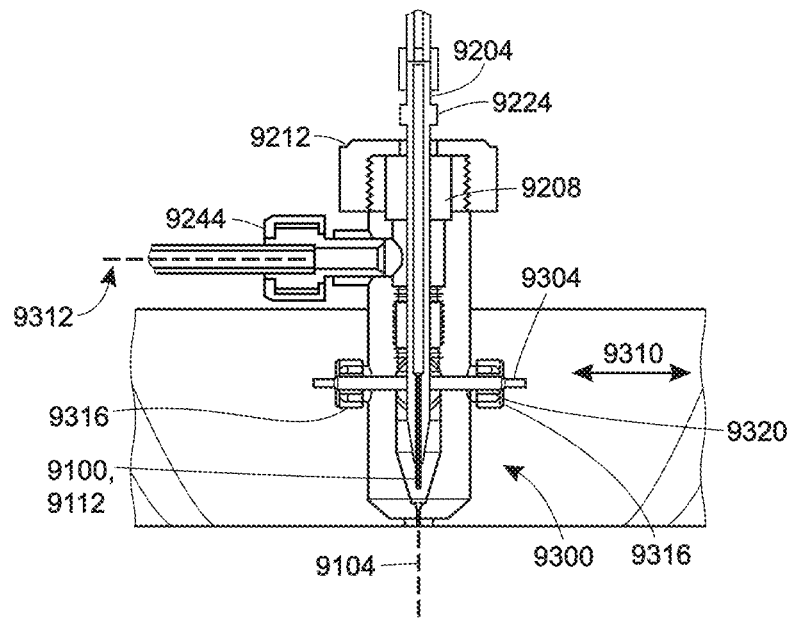
FIG. 9I is a close-up, cross-sectional view of the capture mechanism of FIG. 9H coupled to an outlet nozzle of the device and movable in two directions perpendicular to the flow axis of the core-in-sheath flow.

When the capture mechanism 9200 is coupled to the outlet nozzle 9012, as illustrated in FIGS. 9F and 9G, a first portion 9236 of the capture mechanism 9200, including the threaded portion 9222 of the conduit 9204 and the tip 9112 of the tube 9100, is arranged in the outlet nozzle 9012, while a second portion 9240 of the capture mechanism 9200, including the adjuster 9224 of the conduit 9204, the sealing element 9208, and the fastener 9212, are arranged outside of the outlet nozzle 9012. The capture tube 9100 is thus positioned to recover or collect the core stream 9032 from the core-in-sheath flow 9048 as or once the core-in-sheath flow exits the tube member 9008. The threaded portion 9222 of the conduit 9204 threadingly engages a corresponding threaded portion 9242 of the outlet nozzle 9012. Fluid that is not recovered by the tube 9100, i.e., the sheath fluid 9040, flows around the tube 9100 and is diverted via a sheath fluid line 9244. The sealing element 9208 is arranged to prevent the sheath fluid 9040, i.e., the fluid that is not recovered, from passing, or leaking, between the conduit 9204 and the outlet nozzle 9012, and is, as noted above, secured in place by the fastener 9212.

When it is desired to move the capture tube 9100 closer to or further from the exit of the tube member 9008, the adjuster 9224 can be rotated, which in turn drives the threaded portion 9222 of the conduit 9204 downward or upward relative to the outlet nozzle 9212, as best illustrated in FIG. 9G. When, for example, it is desired to move the capture tube 9100 closer to the exit of the tube member 9008, the adjuster 9224 can, at least in this example, be rotated in a clockwise direction, which in turn drives the threaded portion 9222 of the conduit 9204 downward relative to the threaded portion of the outlet nozzle 9012. Likewise, when it is desired to move the capture tube 9100 further from the exit of the tube member 9008, the adjuster 9224 can, at least in this example, be rotated in a counter-clockwise direction, which in turn drives the threaded portion 9222 of the conduit 9204 upward relative to the threaded portion of the outlet nozzle 9012.

The capture mechanism 9300 illustrated in FIGS. 9H and 9I takes the form of an adjustable capture tube assembly that is substantially similar to the adjustable capture tube assembly described in connection with FIGS. 9E-9F, with common components referred to using common reference numerals. In addition to these common components, the capture mechanism 9300 includes two additional adjusters—a first additional adjuster 9304 and a second additional adjuster 9308. The first and second additional adjusters 9304, 9308 move the capture tube 9100 in directions that are perpendicular to the tube axis 9104 and perpendicular to the flow axis 9108. The first additional adjuster 9304 moves the capture tube 9100 in a direction 9310 that is parallel to a flow axis 9312 of the sheath fluid line 9244, while the second additional adjuster 9308 moves the capture tube 9100 in a direction 9314 that is perpendicular to the flow axis 9312 and perpendicular to the axes 9104, 9108. The first and second additional adjusters 9304, 9308 each take the form of a threaded rod that is coupled to the elongate conduit 9204 by way of a pair of fasteners 9316 threaded to each of the threaded rods. Each pair of fasteners 9316 also serves to couple a pair of sealing elements 9320 to a respective one of the first and second adjusters 9304, 9308.

When it is desired to move the capture tube 9100 in one or both of these directions, the first and/or second adjusters 9304, 9308 can be actuated by rotating a respective one of the fasteners 9316, which in turn drives the first and/or second adjusters 9304, 9308 in the desired direction. When, for example, it is desired to move the capture tube 9100 in the direction 9310, one of the fasteners 9316 corresponding to the adjuster 9304 can be rotated, which in turn drives the associated threaded rod forward or backward in the direction 9310, and which in turn moves the elongate conduit 9204 in a similar manner. Likewise, when it is desired to move the capture tube 9100 in the direction 9314, one of the fasteners 9316 corresponding to the adjuster 9308 can be rotated, which in turn drives the associated threaded rod forward or backward in the direction 9310, and which in turn moves the elongate conduit 9204 in a similar manner.

Figure 9J:
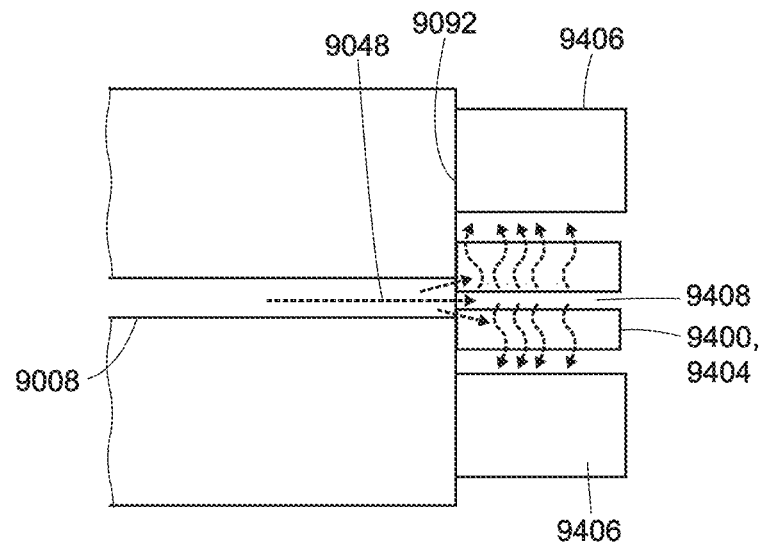
FIG. 9J is a cross-sectional view of a fourth example of a capture mechanism constructed in accordance with the principles of the present disclosure, in the form of a porous medium.
Figure 9K:
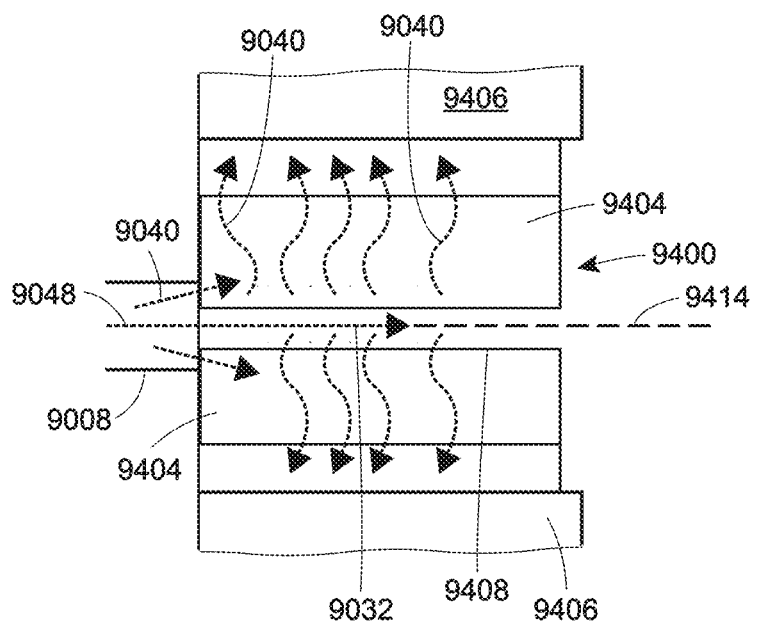
FIG. 9K is a close-up view of the capture mechanism of FIG. 9J.

FIGS. 9J and 9K illustrate another example of a capture mechanism 9400 that can be used instead of the capture mechanism 9016. The capture mechanism 9400 takes the form of a porous medium 9404 that, like the capture mechanism 9016, can be positioned in the outlet nozzle 9012 proximate to the outlet end 9092 of the tube passageway 9068. The porous medium 9404 is arranged or disposed between, and secured in this position by, a pair of opposing walls 9406. Alternatively, the porous medium 9404 takes a cylindrical or prismatic shape and is enclosed within a suitable containment boundary 9406 (which is shown in cross-section). The porous medium 9404 is preferably made of or from Poron® or Versapor®, for example, and has an opening 9408 formed or defined therethrough. The opening 9408 defines a flow path through the porous medium 9404 that has a central axis 9414 coaxial with the flow axis 9108 of the core-in-sheath flow 9048. A plurality of pores are formed or defined in the porous medium 9404. The pores generally have a size that is smaller than a size of the core stream 9032, such that the core stream 9032, upon exiting the tube member 9008, flows unobstructed through the opening 9408 (and cannot be drawn through the medium 9404) and out of the outlet nozzle 9012, while a substantial portion of the sheath fluid 9040 is filtered out or siphoned off through the pores, either upon exiting the tube member 9008 and reaching the porous medium 9404 or while flowing through the opening 9408 with the core stream 9032. The exact size of the pores will of course vary depending on the given application. For example, in applications in which flow cytometry and/or sorting are performed with respect to sperm cells, the pores may be sized such that the pores are smaller than the size of the cells, to prevent the cells from being siphoned off therethrough. The pores may, for example, have a size of less than approximately 1 µm, a size of less than approximately 3 µm, a size of less than approximately 5 µm, or a size in a range of between approximately 0.5 µm and 5 µm. In any event, the capture mechanism 9400, by filtering out or siphoning off a substantial portion of the sheath fluid 9040, is configured to recover or collect the core stream 9032 from the core-in-sheath flow 9048. It should be noted that an advantage of this design is to slow the core flow gradually as the total fluid volume passing along the central axis 9414 of the device 9400 decreases between the entry and the exit. Those skilled in the art will readily appreciate that appropriate choices of pressure and the ratio of fluid drawn away through the porous substrate 9404 will result in a slowing of the core stream without the introduction of turbulence which could damage sensitive analytes therein.

Figure 9L:
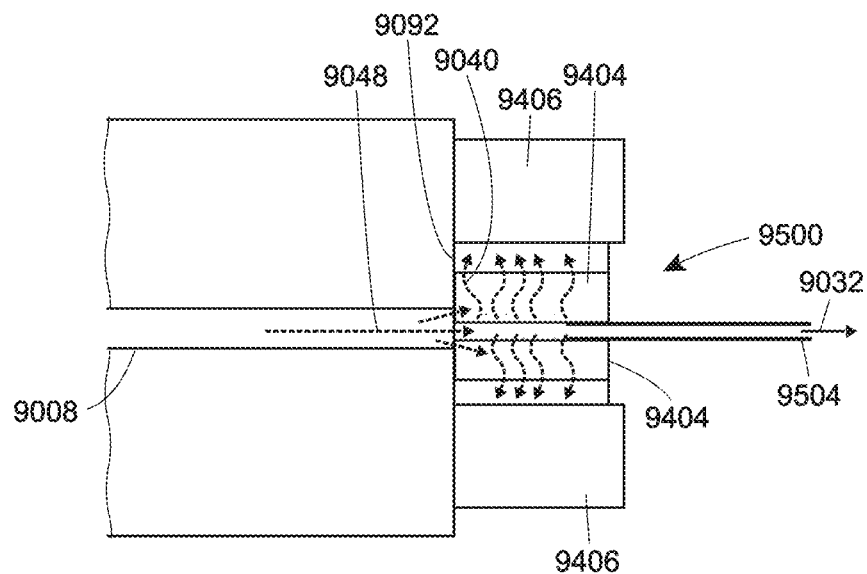
FIG. 9L is a cross-sectional view of a fifth example of a capture mechanism constructed in accordance with the principles of the present disclosure, in the form of a porous medium and a capture tube disposed therein.
Figure 9M:
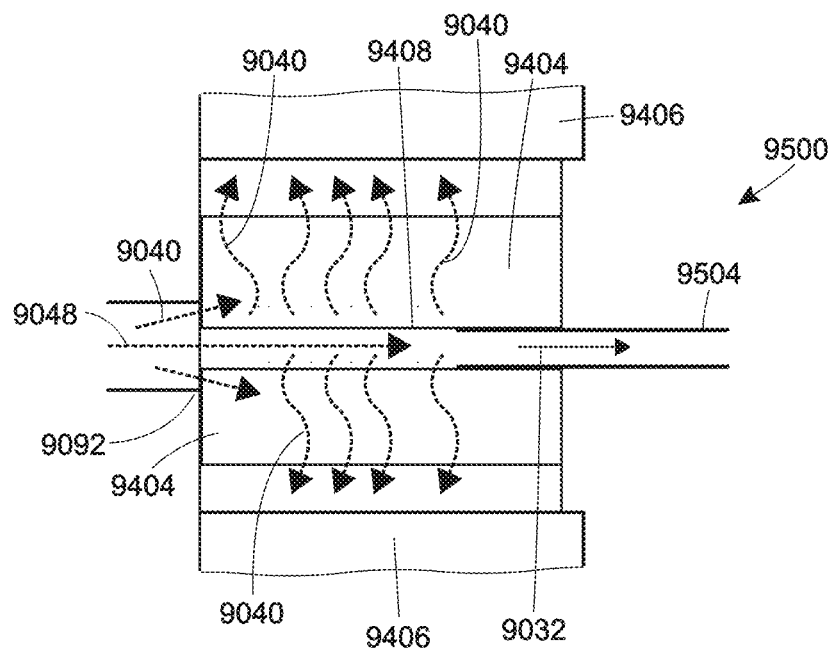
FIG. 9M is a close-up view of the capture mechanism of FIG. 9L.

FIGS. 9L and 9M illustrate yet another example of a capture mechanism 9500 that can be used instead of the capture mechanism 9016. The capture mechanism 9500 is similar to the capture mechanism 9400 illustrated in FIGS. 9J and 9K, with common components referred to using common reference numerals, but also includes a capture tube 9504, e.g., the capture tube 9100 described above. The capture tube 9504 is positioned in the opening 9408 of the porous medium 9404 at a distance from the outlet end 9092 of the tube passageway 9068. As described above, the porous medium 9404 operates to filter out or siphon off sheath fluid 9040 through the pores of the medium 9404. The porous medium 9404 also operates to create a back pressure on the core stream 9032 flowing therethrough, helping to maintain a flow of the core stream 9032 into the capture tube 9504, and allowing the core stream 9032 to be recovered or collected with very little sheath fluid 9040 (which is filtered out or siphoned off).

Figure 9N:
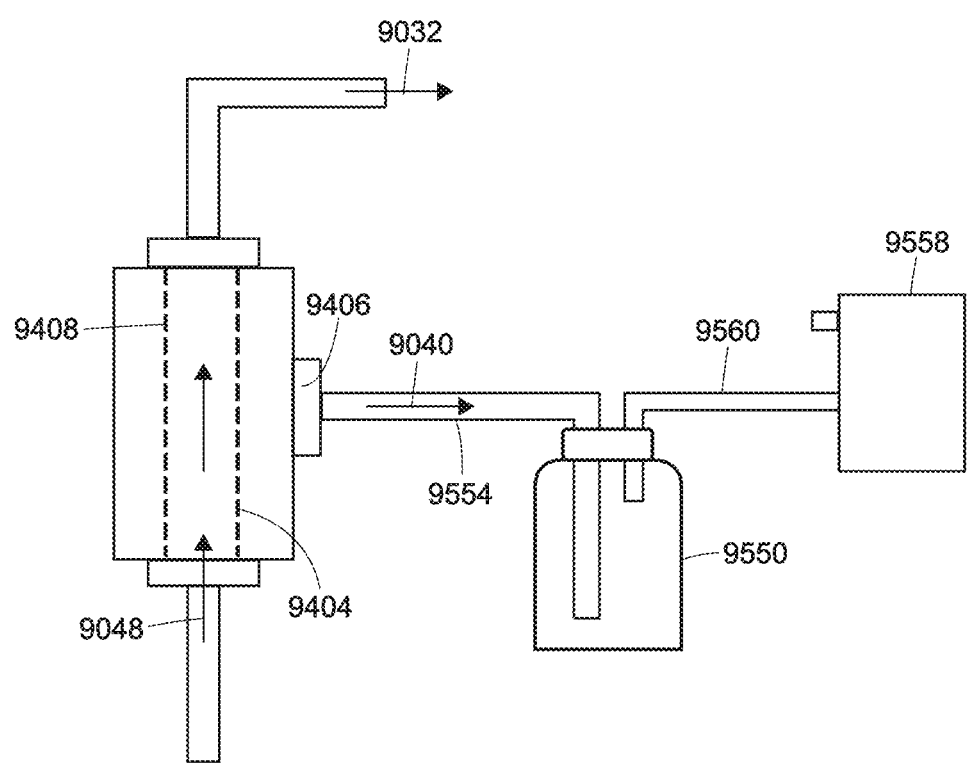
FIG. 9N is a schematic diagram illustrating a vacuum pump connected to one of the capture mechanisms to apply a vacuum pressure to help siphon off sheath fluid and direct the sheath fluid to a fluid connection receptacle.
Figure 90:
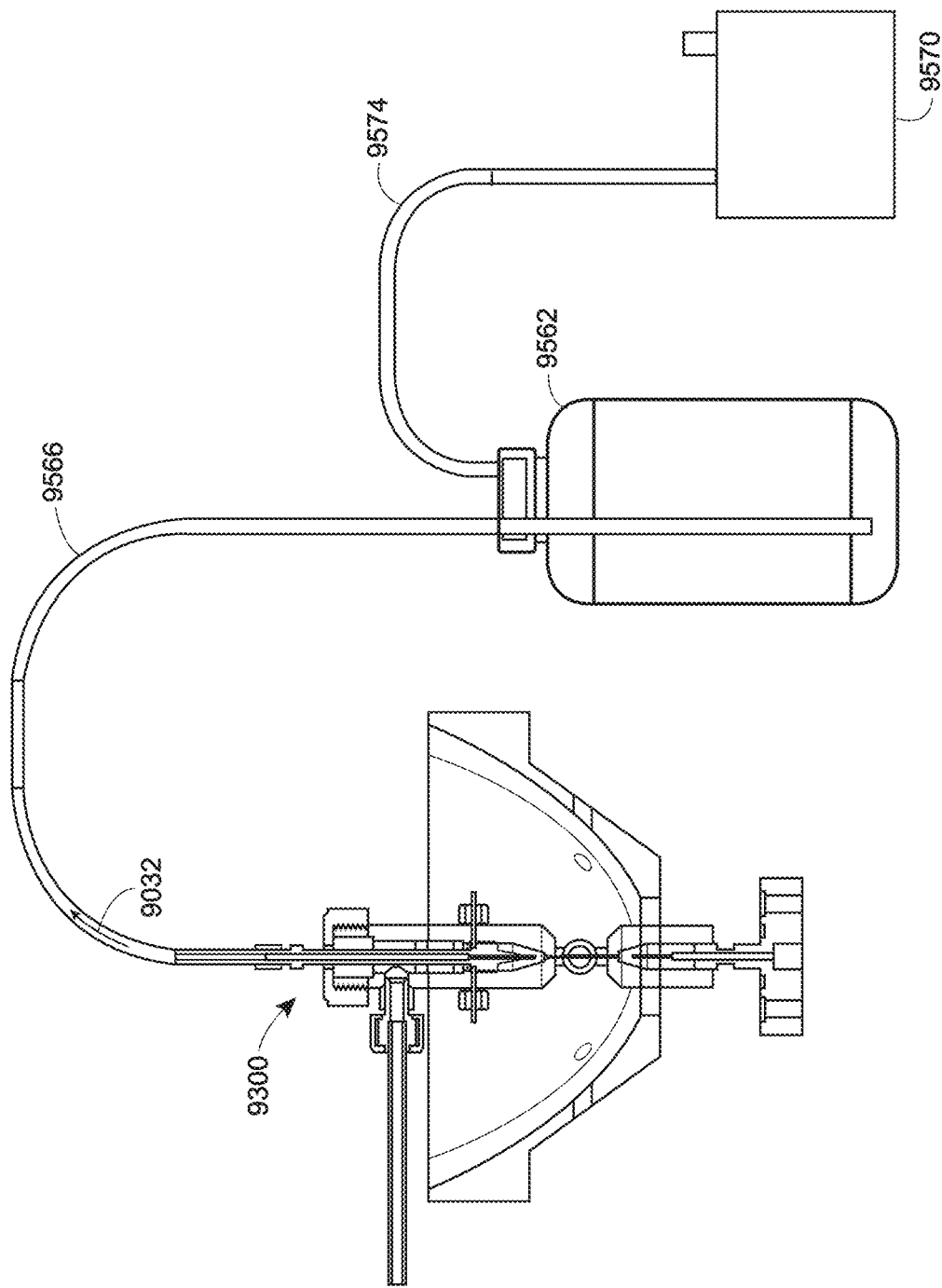

As illustrated in FIG. 9N, the siphoned off or filtered out sheath fluid 9040 may be collected as waste by directing the sheath fluid 9040 to a sheath fluid collection receptacle 9550 via a sheath fluid flow line 9554 in fluid communication with the porous medium 9404. This may, as also illustrated in FIG. 9N, be facilitated by applying a vacuum (negative) pressure to the sheath fluid 9040 (e.g., via a vacuum pump 9558 coupled to the receptacle 9550 via a fluid line 9560). The vacuum pressure helps to draw the sheath fluid 9040 out of the porous medium 9404 through the plurality of pores, and helps to maintain a flow of the sheath fluid 9040 into the receptacle 9550 via the flow line 9554. In other embodiments, the vacuum pressure can be applied in a different manner and/or a differential pressure may be employed to facilitate this process.

As illustrated in FIG. 9O, the core stream 9032, once recovered or collected (with very little sheath fluid 9040) by the capture mechanism (in this case the capture mechanism 9300), may be collected in a core stream collection receptacle 9562 by directing the recovered core stream 9032 toward the receptacle 9562 via a core stream fluid flow line 9566 in fluid communication with the capture mechanism. This may, as also illustrated in FIG. 9O, be facilitated by applying a vacuum (negative) pressure to the sheath fluid 9032 (e.g., via a vacuum pump 9570 coupled to the receptacle 9562 via a fluid line 9574). The vacuum pressure helps to draw or pull the recovered core stream 9032 out of the capture mechanism, and helps to maintain a flow of the core stream 9032 into the receptacle 9562 via the flow line 9566. In other embodiments, the vacuum pressure can be applied in a different manner and/or a differential pressure may be employed to facilitate this process.

Finally, it will be appreciated that the concepts illustrated in FIGS. 9N and 9O can be used in combination with any of the concepts illustrated herein (e.g., the capture mechanism 9016). Moreover, it will be appreciated that any of the concepts described in connection with FIGS. 9A-9O can be used in combination with any of the other concepts described herein.

While various embodiments have been described above, this disclosure is not intended to be limited thereto. Variations can be made to the disclosed embodiments that are still within the scope of the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A method of producing a concentrated stream of analytes in a flow cytometric process, the method comprising: injecting a sheath fluid into an inlet nozzle; injecting a core stream comprising analytes into the sheath fluid via an inlet tube arranged in the inlet nozzle; forming, in the inlet nozzle, a core-in-sheath flow comprising the core stream and the sheath fluid; passing the core-in-sheath flow from the inlet nozzle to an outlet nozzle through a tube member arranged between the inlet nozzle and the outlet nozzle; and recovering the core stream from the core-in-sheath flow once the core-in-sheath flow exits the tube member.

2. The method of aspect 1, wherein forming the core-in-sheath flow comprises focusing the core stream and the sheath fluid using the inlet nozzle.

3. The method of aspect 1 or 2, wherein recovering the core stream comprises: capturing the core stream using a capture tube positioned proximate to an outlet end of the tube member; and passing a substantial portion of the sheath fluid around the capture tube.

4. The method of aspect 3, wherein capturing the core stream comprises: positioning the capture tube proximate to the outlet end of the tube member such that a longitudinal axis of the capture tube is coaxial with a flow axis of the core-in-sheath flow; and passing the core stream through the capture tube.

5. The method of aspect 3 or 4, wherein the capture tube has a diameter that is larger than a diameter of the core stream but smaller than a diameter of the sheath fluid.

6. The method of any one of aspects 3 to 5, further comprising adjusting a position of the capture tube.

7. The method of aspect 5 or 6, wherein adjusting the position comprises moving the capture tube closer to or further from the outlet end of the tube member in a direction that is parallel to a longitudinal axis of the capture tube and parallel to a flow axis of the core-in-sheath flow through the tube member.

8. The method of aspect 6 or 7, wherein adjusting the position comprises moving the capture tube in a direction that is perpendicular to the flow axis.

9. The method of aspect 1 or 2, wherein recovering the core stream comprises: positioning a porous medium in the outlet nozzle proximate to an outlet end of the tube member; passing the core-in-sheath flow through an opening formed in the porous medium, the opening defining a flow path through the porous medium having a central axis coaxial with a flow axis of the core-in-sheath flow; and filtering a substantial portion of the sheath fluid through a plurality of pores formed in the porous medium, the plurality of pores having a size that is smaller than a size of the core stream.

10. The method of aspect 9, wherein the size of the pores is in a range of between approximately 0.5 µm and approximately 5 µm.

11. The method of aspect 9, wherein the size of the pores is less than approximately 1 µm.

12. The method of any one of aspects 9 to 11, wherein the opening extends along an axis that is substantially parallel with a flow axis of the core-in-sheath flow through the tube member.

13. The method of any one of aspects 9 to 12, wherein the substantial portion of the sheath fluid enters the plurality of pores as it exits the tube member, as it flows through the opening formed in the porous medium, or a combination thereof.

14. The method of any one of aspects 9 to 13, wherein recovering the core stream further comprises capturing the core stream using a capture tube disposed in the opening of the porous medium at a distance from the outlet end of the tube member, the capture tube having a tube axis coaxial with a flow axis of the core-in-sheath flow.

15. The method of aspect 14, wherein the capture tube has a diameter that is larger than a diameter of the analytes but smaller than a diameter of the sheath fluid.

16. The method of any one of aspects 9 to 15, wherein filtering the substantial portion of the sheath fluid through the plurality of pores comprises applying a vacuum pressure to the porous medium to draw the sheath fluid out through the plurality of pores.

17. The method of any one of aspects 1 to 16, further comprising passing the recovered core stream to a container configured to store the stream of analytes via a core stream fluid line.

18. The method of aspect 17, wherein passing the core stream to the container comprises drawing the core stream to the container by applying a vacuum pressure.

19. The method of any one of aspects 1 to 18, wherein the analytes comprises non-human mammalian cells.

20. A device for use in a flow cytometric process, comprising: an inlet nozzle comprising an inlet tube, the inlet tube arranged to receive a core stream comprising analytes, the inlet nozzle defining an inlet cavity arranged to receive sheath fluid around the inlet tube, the inlet nozzle configured to form a core-in-sheath flow comprising the sheath fluid surrounding the core stream; a tube member having a tube passageway having an inlet end and an outlet end opposite the inlet end, the inlet end arranged to receive the core-in-sheath flow from the inlet nozzle; an outlet nozzle arranged to receive the core-in-sheath flow from the tube member via the outlet end of the tube member; and a capture mechanism positioned in the outlet nozzle proximate to the outlet end of the tube member, the capture mechanism configured to recover the core stream from the core-in-sheath flow once the core-in-sheath flow exits the tube member.

21. The device of aspect 20, wherein the capture mechanism comprises a capture tube having a diameter that is larger than a diameter of the core stream but smaller than a diameter of the sheath fluid, such that the core stream passes through the capture tube and the sheath fluid passes around the capture tube.

22. The device of aspect 21, wherein the capture tube has an exposed tip that is shaped to minimize the kinetic energy dissipated imparted to particles of the analyte as the core stream passes through the tip.

23. The device of aspect 21, wherein the capture tube has an exposed tip that is shaped to minimize an energy dissipation rate of the core stream as it passes therethrough.

24. The device of any one of aspects 21 to 23, wherein the capture tube is positioned to accommodate an expanded flow of the core stream upon exiting the tube member, thereby minimizing an energy dissipation rate of the core stream.

25. The device of any one of aspects 21 to 24, wherein the capture tube is movable relative to the outlet end of the tube member.

26. The device of aspect 25, wherein the capture tube is movable, relative to the outlet end of the tube member, in a direction that is parallel to a flow axis of the core-in-sheath flow through the tube member.

27. The device of any one of aspects 21 to 26, wherein the capture tube is movable in a direction that is perpendicular to the flow axis.

28. The device of any one of aspects 25 to 27, wherein the capture mechanism comprises an elongate conduit movably disposed in the outlet nozzle, the elongate conduit including an adjuster, and the capture tube being disposed in the elongate conduit, and wherein the adjuster is configured to move the elongate conduit relative to the outlet nozzle, thereby moving the capture tube.

29. The device of aspect 28, wherein the adjuster is configured to move the elongate conduit in the direction parallel to the flow axis and/or in the direction perpendicular to the flow axis.

30. The device of aspect 28 or 29, wherein the elongate conduit comprises a threaded portion arranged to engage a corresponding threaded portion of the outlet nozzle, and wherein the adjuster is configured to move the threaded portion of the elongate conduit relative to the corresponding threaded portion of the outlet nozzle, thereby moving the capture tube.

31. The device of any one of aspects 21 to 30, wherein the capture tube comprises a capture needle.

32. The device of aspect 20, wherein the capture mechanism comprises a porous medium comprising an opening defining a flow path through the porous medium having a central axis coaxial with a flow axis of the core-in-sheath flow, the porous medium having plurality of pores having a size that is smaller than a size of the analytes, such that the core-in-sheath flow passes through the opening and a substantial portion of the sheath fluid is filtered out through the plurality of pores.

33. The device of aspect 32, wherein the size of the pores is in a range of between approximately 0.5 μm and approximately 5 μm.

34. The device of aspect 32, wherein the size of the pores is less than approximately 1 μm.

35. The device of any one of aspects 32 to 34, wherein the capture mechanism further comprises a capture tube disposed in the opening of the porous medium at a distance from the outlet end of the tube member, the capture tube having a diameter that is larger than a diameter of the analytes but smaller than a diameter of the sheath fluid, such that the core stream passes through the capture tube and the sheath fluid is filtered out through the plurality of pores.

36. The device of aspect 35, wherein the capture tube comprises a capture needle.

37. The device of any one of aspects 32 to 36, further comprising a vacuum pump coupled to the capture mechanism, the vacuum pump configured to apply a vacuum pressure to the porous medium to draw the sheath fluid out through the plurality of pores.

38. The device of any one of aspects 20 to 37, further comprising a container configured to store the stream of analytes, the container coupled to the capture mechanism via a core fluid line.

39. The device of any one of aspects 20 to 38, wherein the analytes comprises non-human mammalian cells.

Additional Considerations

Upon reading this disclosure, those of ordinary skill in the art will appreciate still additional alternative structural and functional designs for optical systems configured to irradiate analytes. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "analyzing," "identifying," "presenting," "displaying," or the like may refer to actions or processes of a machine (e.g., a computer processor) that is specially configured to manipulate or transform data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and modules described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of configuring an optical system to reduce variations in measured properties of an analyte, the method comprising:
   selecting a number of beams into which radiation from a source of radiation is to be split, wherein, upon irradiating the analyte from a plurality of directions by the number of beams, a measured coefficient of variation of a resulting measurement of the analyte is at or below 5 percent;
   aligning the source of radiation and a plurality of optical elements optically coupled to the source of radiation such that the selected number of beams irradiate the analyte upon emission of radiation by the source of radiation; and
   measuring the analyte, wherein one or more of:
   (a) the method further comprises determining a saturation of the analyte as a function of one or more non-spatial properties of the radiation emitted by the source of radiation and wherein selecting the number of beams includes selecting the number of beams based on the determined saturation of the analyte as a function of the one or more non-spatial properties;
   (b) the method further comprises determining a saturation of the analyte as a function of one or more non-spatial properties of the radiation emitted by the source of radiation and wherein selecting the number of beams includes selecting the number of beams based on the determined saturation of the analyte as a function of the one or more spatial properties and based on an anisotropy of the analyte;
   (c) the method further comprises determining a saturation of the analyte as a function of one or more non-spatial properties of the radiation emitted by the source of radiation and wherein determining the saturation of the analyte includes:
      determining an overall detected saturation of the analyte,
      determining a detector nonlinearity corresponding to a detector, wherein the detector is utilized to make the resulting measurement of the analyte, and
      based on the overall saturation and the detector nonlinearity, determining the saturation of the analyte as a function of the one or more non-spatial properties of the radiation such that the saturation of the analyte compensate for the detector nonlinearity;
   (d) the method further comprises determining a saturation of the analyte as a function of one or more non-spatial properties of the radiation emitted by the source of radiation and wherein determining the saturation of the analyte includes modeling the saturation of the analyte upon irradiation by a continuous wave laser or a quasi-continuous wave laser;
   (e) selecting the number of beams includes:
      determining the threshold for the measured coefficient of variation of the resulting measurement of the analyte based on one or more constraints of a device in which the optical system is integrated, and
      selecting the number of beams such that irradiation of the analyte from the plurality of directions by the number of beams produces a particular level of saturation of the analyte and produces the measured coefficient of variation of the resulting measurement of the analyte at or below the threshold;
   (f) aligning the source of radiation and the plurality of optical elements includes:
      positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions, and
      wherein aligning the source of radiation and the plurality of optical elements further includes positioning third optical elements in the paths of the selected number of beams to ensure that each of the selected number of beams is circularly polarized at a point where the selected number of beams irradiate the analyte;

(g) aligning the source of radiation and the plurality of optical elements includes:
positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions, and
wherein positioning the first optical elements and the second optical elements includes positioning the first optical elements at first positions and positioning the second optical elements at second positions, the method further comprising automatically adjusting at least one of the first positions or the second positions based on measured properties of the analyte;

(h) aligning the source of radiation and the plurality of optical elements includes:
positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions, and
wherein positioning the first optical elements and the second optical elements includes positioning the first optical elements at first positions and positioning the second optical elements at second positions, the method further comprising automatically adjusting at least one of the first positions or the second positions based on measured properties of the selected number of beams; and (i) aligning the source of radiation and the plurality of optical elements includes:
positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions, and
wherein positioning the first optical elements and the second optical elements includes positioning the first optical elements at first positions and positioning the second optical elements at second positions, the method further comprising automatically adjusting at least one of the first positions or the second positions based on measured properties of the radiation emitted by the source of radiation.

2. The method of claim 1, wherein (a).
3. The method of claim 1, wherein (b).
4. The method of claim 1, wherein (c).
5. The method of claim 1, wherein (d).
6. The method of claim 1, wherein measuring the analyte includes measuring (i) fluorescence of the analyte; (ii) absorption of the analyte; (iii) phosphorescence of the analyte; (iv) light scattering off of the analyte; and/or (v) polarization or depolarization of the radiation.
7. The method of claim 1, wherein (e).

8. The method of claim 1, wherein:
aligning the source of radiation and the plurality of optical elements includes:
positioning first optical elements in a path of the radiation emitted by the source of radiation to split the radiation emitted by the source of radiation into the selected number of beams, and positioning second optical elements in the paths of the selected number of beams to direct the selected number of beams towards the analyte from the plurality of directions, and
upon splitting the radiation from the source of radiation into the selected number of beams, the first optical elements cause the selected number of beams to be balanced in a non-spatial property.

9. The method of claim 1, wherein (f).
10. The method of claim 1, wherein (g).
11. The method of claim 1, wherein (h).
12. The method of claim 1, wherein (i).
13. An optical system for saturated irradiation of analytes, the system comprising:
a source of radiation; and
a plurality of optical elements, wherein at least some of the optical elements are configured to split radiation emitted by the source of radiation into multiple beams, the multiple beams saturating the analytes, and the multiple beams irradiating the analytes from multiple directions;
one or more motors, actuators, drivers, and/or piezoelectric devices physically coupled to the plurality of optical elements, wherein each of the one or more aligning components is configured to:
receive signals based on measurements from a detector, the detector detecting at least one of properties of the radiation emitted by the source of radiation, properties of the multiple beams, or the measured property of the analytes, and
automatically adjust one or more of the plurality of optical elements based on the signals,
wherein the source of radiation and the plurality of optical elements are configured to cooperate to result in a measurement having a variation in a measured property of the analytes at or below 5 percent.

14. The optical system of claim 13, wherein the plurality of optical elements includes polarizing optical elements configured to ensure that each of the multiple beams has the same polarization at a point where each of the multiple beams intersects the flow cell.

15. The optical system of claim 13, wherein the plurality of optical elements includes one or more optical attenuators configured to ensure that each of the multiple beams has the same intensity at a point where each of the multiple beams intersects the flow cell.

16. The optical system of claim 13, wherein, to split the radiation emitted by the source of radiation into the multiple beams, the plurality of optical elements sequentially:
modify a polarization of the radiation emitted by the source of radiation, and
split the radiation emitted by the source of radiation and having the modified polarization based on polarization directions of the radiation emitted by the source of radiation.

17. An optical system for saturated irradiation of analytes, the system comprising:
a source of radiation; and
a plurality of optical elements, wherein at least some of the optical elements are configured to split radiation emitted by the source of radiation into multiple beams, the multiple beams saturating the analytes, and the multiple beams irradiating the analytes from multiple directions;

wherein the source of radiation and the plurality of optical elements are configured to cooperate to result in a measurement having a variation in a measured property of the analytes at or below 5 percent, and wherein the plurality of optical elements are further configured to polarize each of the multiple beams such that each of the multiple beams is circularly polarized upon irradiating the analytes.

* * * * *